US011962235B2

(12) United States Patent
Gray et al.

(10) Patent No.: US 11,962,235 B2
(45) Date of Patent: Apr. 16, 2024

(54) MODULAR MULTI-LEVEL DC/DC CONVERTER WITH CURRENT-SHAPING

(71) Applicants: Philippe Gray, Stouffville (CA); Peter Waldemar Lehn, Toronto (CA); THE GOVERNING COUNCIL OF THE UNIVERSITY OF TORONTO, Toronto (CA)

(72) Inventors: Philippe Gray, Stouffville (CA); Peter Waldemar Lehn, Toronto (CA)

(73) Assignees: Philippe Gray, Stouffville (CA); Peter Waldemar Lehn, Toronto (CA)

( * ) Notice: Subject to any disclaimer, the term of this patent is extended or adjusted under 35 U.S.C. 154(b) by 623 days.

(21) Appl. No.: 17/134,153

(22) Filed: Dec. 24, 2020

(65) Prior Publication Data
US 2021/0111629 A1 Apr. 15, 2021

Related U.S. Application Data

(63) Continuation-in-part of application No. PCT/CA2019/050880, filed on Jun. 25, 2019.
(Continued)

(51) Int. Cl.
*H03F 3/04* (2006.01)
*H02M 1/15* (2006.01)
(Continued)

(52) U.S. Cl.
CPC ............. *H02M 1/15* (2013.01); *H02M 3/157* (2013.01); *H02M 3/1584* (2013.01);
(Continued)

(58) Field of Classification Search
CPC ................. H03F 1/0244; H03F 1/0211; H03F 2200/504; H03F 3/04; H02M 1/15; H02M 3/157; H02M 3/1584; H02M 3/33569; H02M 7/4835; H02M 1/0095; H02M 3/072; H02M 3/1586; H02M 1/009; H02M 1/08;
(Continued)

(56) References Cited

U.S. PATENT DOCUMENTS 9,318,968 B2 4/2016 Lehn
9,780,557 B2 * 10/2017 Davidson ............... H02M 7/483
(Continued)

OTHER PUBLICATIONS

International Search Report and Written Opinion issued in international application No. PCT/CA2019/050880 dated Aug. 21, 2019.
(Continued)

*Primary Examiner* — Khanh V Nguyen
(74) *Attorney, Agent, or Firm* — Norton Rose Fulbright Canada LLP

(57) ABSTRACT

Embodiments are directed to a modular multi-level DC/DC power electronic converter for transferring power from or between a higher-voltage DC network and a lower-voltage DC network. The power electronic converter features a series connection of low-voltage voltage source modules (VSM) and a current source module (CSM). The series connection of the sub-module elements forms a string. The higher-voltage DC network is interfaced to the converter by connecting across the outer terminals of the string. The lower-voltage DC network is interfaced to the converter through the CSM.

32 Claims, 84 Drawing Sheets

Related U.S. Application Data

(60) Provisional application No. 62/824,048, filed on Mar. 26, 2019, provisional application No. 62/689,614, filed on Jun. 25, 2018.

(51) Int. Cl.
*H02M 3/157* (2006.01)
*H02M 3/158* (2006.01)
*H02M 3/335* (2006.01)
*H02M 7/483* (2007.01)
*H02M 1/00* (2006.01)
*H02M 3/07* (2006.01)

(52) U.S. Cl.
CPC ..... *H02M 3/33569* (2013.01); *H02M 7/4835* (2021.05); *H02M 1/0095* (2021.05); *H02M 3/072* (2021.05); *H02M 3/1586* (2021.05)

(58) Field of Classification Search
CPC .......... H02M 1/12; H02M 3/158; H02M 3/28; H02M 3/335; H02M 3/33584; H02M 3/33592; Y02B 70/10
See application file for complete search history.

(56) References Cited

U.S. PATENT DOCUMENTS 10,075,091 B2 * 9/2018 Kuroda ................. H02H 7/1216
10,164,428 B2 * 12/2018 Shen ........................ H02M 1/32

OTHER PUBLICATIONS

Kung et al., "A Modular Multilevel HVDC Buck-Boost Converter Derived From its Switched-Mode Counterpart", IEEE Transactions on Power Delivery, vol. 33, No. 1, pp. 82-92, Feb. 2018.

Kish et al., "A Modular Multilevel DC/DC Converter With Fault Blocking Capability for HVDC Interconnects", IEEE Transactions on Power Electronics, vol. 30, No. 1, pp. 148-162, Jan. 2015.

* cited by examiner a) Charge Mode a) Discharge Mode

Preferred Embodiment
Forward Power: Operating Modes a) Charge Mode b) Discharge Mode Preferred Embodiment
Reverse Power: Operating Modes a) Charge Mode: $i_p = i_{L1}$ b) Charge Mode: $i_p = -i_{L2}$ c) Overlap Interval: $i_p = 0$ Alternate Embodiment #1
Forward Power: Operating Modes in Charge Mode a) Operating Mode 1 b) Operating Mode 2 a) Operating Mode 1 b) Operating Mode 2 a) Operating Mode 1 b) Operating Mode 2 a) Operating Mode 1 b) Operating Mode 2

(a) $v_{c,1}, v_t, i_L, i_H$ (b) $v_{c,2}, v_H, v_o, i_{c,2}$ (a) $v_{c,1}, v_t, i_L, i_H$ (b) $v_{c,2}, v_H, v_o, i_{c,2}$ (a) No input filter (b) Input Filter Variation #1

(c) Input Filter Variation #2

(a) No input filter (b) Input Filter Variation #3

(b) Input Filter Variation #4

(a) Full-Bridge CSM Configuration 1

(b) Full-Bridge CSM Configuration 2

(a) VSM string of cascaded half-bridge cells (b) VSM string of cascaded full-bridge cells (a) Experimental $v_t, i_{L2}, i_{L1}, i_s$ (b) Experimental $v_H, v_o, v_{c,1}, v_{c,2}$ (a) Output Voltage ($v_o$) and Cell Capacitor Voltages ($v_{c1}, v_{c2}, v_{c3}$)

(b) Voltage across a primary transformer winding ($v_{t1}$), output inductor current ($i_L$), the current into VSM string 1 ($i_{H1}$), and the current into VSM string 2 ($i_{H2}$)

MODULAR MULTI-LEVEL DC/DC CONVERTER WITH CURRENT-SHAPING

CROSS REFERENCE

This application is a continuation in part of, and claims all benefit to, including priority to, PCT Application No. PCT/CA2019/050880, filed on 25 Jun. 2019, entitled "MODULAR MULTI-LEVEL DC/DC CONVERTER WITH CURRENT-SHAPING".

PCT/CA2019/050880 is a non-provisional of, U.S. Provisional Application No. 62/689,614 dated 25 Jun. 2018 and entitled "HYBRID MULTI-MODULAR DC/DC POWER CONVERSION MECHANISM", and U.S. Provisional Application No. 62/824,048 dated 26 Mar. 2019 and entitled "MODULAR MULTI-LEVEL DC/DC CONVERTER WITH CURRENT-SHAPING". All of these applications are incorporated herein by reference in their entirety.

FIELD

The disclosure generally relates to power electronics for grid applications. More specifically, the disclosure relates to converters for the interconnection of DC networks at differing voltage levels.

INTRODUCTION

Advantages of DC over AC include lower line losses, reduced conductor requirements as well as enhanced controllability, for instance. In addition, DC power transmission offers the possibility for lower number of power conversion stages from generation to load enabling improved overall system efficiencies, reliability and costs.

DC power transmission is competitive with respect to AC power transmission currently for transferring bulk power from remote locations and/or offshore wind farms, for instance. It is also a competitive solution in specific distribution applications such as DC powered data centres, for instance.

A commonly proposed approach to interface a LVDC and a HVDC or MVDC network involves use of a dual-active bridge with a multi-modular converter (MMC) front-end at the high-voltage side and a two-level voltage source converter at the low-voltage side.

The MMC for this application typically consists of 4 or 6 strings of voltage sub-modules (VSMs), a transformer and an arm inductor for each string of VSMs. Each VSM string is typically rated for the full high-side voltage. In addition, the transformer and arm inductors are typically rated for the full high-side voltage.

While this approach may be effective in higher power application, the cost and complexity limit its potential for use in lower power applications such as for HVDC to LVDC or MVDC to LVDC tap applications, for instance.

SUMMARY

A converter topology which enables high step-down ratio power exchange between DC networks at differing voltage levels in a more cost-efficient manner is desirable. A number of variant and additional alternate embodiments are described, along with a number of simulation results established for a number of different operating cases and modes.

Embodiments described herein are directed to a new power-electronic converter for exchanging power between a higher-voltage DC network and a lower-voltage DC network. An improved circuit architecture is described that, in accordance with some embodiments, allows for improved DC/DC step down and/or step up power conversion. Accordingly, DC power distribution is more practically feasible if DC power can both be distributed at a higher voltage levels and either consumed and/or generated at lower voltage levels.

There are two main variations described in this application.

In a first main variation, the power electronic converter is able to transfer power from a higher voltage dc network to a lower voltage dc network all while maintaining capacitor charge balance of the VSM cell capacitors. If charge balance of the VSM cell capacitors were not maintained, the cell capacitor voltages would either continually rise and therefore overcharge or otherwise the cell capacitor voltages would collapse. The power electronic converter is able to maintain charge balance of the VSM cell capacitors through its use of a current source module (CSM). Through the use of a CSM, the converter is able to change the direction of the current into the VSM cell capacitors through changing the state of the CSM. The CSM is able to essentially force a current to flow down or up the VSMs, which is described in further detail in various embodiments. It is through a controlled switching action that the converter is able to force current from inductive elements upwards or downwards through the VSM strings.

This ability to change the direction of the current through switch action enables the current to be flipped rapidly and in some cases nearly instantly. Accordingly, this allows the system to change the power flow into each individual VSM rapidly and balance the power so that the cell capacitors do not charge or discharge over a longer period interval of time so that it maintains charge balance over time. This ability to change the direction of the string current nearly instantly enables the cell capacitor voltages to achieve charge balance over a short time in some embodiments. Therefore, this allows the cell capacitors to be realized with very low cell capacitances. This cell capacitance can be potentially reduced, for example, by up to a 100× factor if this power electronic is run at high frequencies compared to other approaches.

As the cell capacitance is proportional to the energy in a cell capacitor, the cell capacitors can be made physically small and thus the volume of the converter can be reduced significantly and therefore this power electronic circuit has the ability to achieve much greater power densities.

The VSMs in the power electronic circuit set the voltage appearing across the input terminals of the CSM. The VSMs, in effect, step-down the higher voltage dc network voltage and in this way, a much lower voltage is appearing across the CSM input terminals. When transitioning between different CSM states, only a fraction of the total number of VSM switches are switched. This is advantageous as it results in reduced switching losses in the VSMs compared to if all VSM switches were to be switched.

In the second main variation, in selected CSM configurations, the topology is configured such that zero DC (or substantially near zero) voltage appears across this input to the CSM module, yielding a special configuration that makes integration of transformer isolation within the CSM itself possible. This allows galvanic transformer isolation to be introduced using fewer switching devices, reducing complexity, part count and cost. Typically, DC current within a transformer leads to a DC magnetic flux superimposed on the AC flux needed for power transfer. This leads to the need for a larger transformer core. Transformer size reduction is achieved through a process of DC flux cancellation in variant embodiments, which ensures zero net DC flux within the magnetic core of the transformer. Through elimination of DC flux in the transformer, a lower peak flux level is achieved requiring less ferromagnetic material for the transformer core. Additionally, through controller control action, in variant embodiments of the second main variation, the converter does not need to measure the cell capacitor voltages. In this way, the converter is able to achieve self-balancing and therefore is much simpler than approaches that require the cell capacitor voltages to be measured. The circuit architectures for implementing the above variations can be described as a circuit topology, and can includes a system established using electronic circuitry and devices which interoperate with one another to, in concert, provide the improved step down or step up power conversion. The circuitry can include energy storage elements, power electronics components (e.g., capacitors, inductors), and switches (e.g., transistors). The switches are controlled through the operation of a switch controller circuit, which may control the operation of the switches based on a switching pattern provided through, for example, machine interpretable instruction sets stored on non-transitory machine readable media for execution by a processor of the switch controller circuit. The switching pattern, for example, can be generated using pulse-width modulation and function generators.

Embodiments are directed to several different variant topologies which interconnect VSM(s) and CSM(s), and control approaches in respect of controlling the circuit topologies. In some embodiments, devices, control methods, non-transitory computer readable media are described for DC conversion.

As described herein, the circuit topologies may be utilized to reduce a need for AC transformers or AC transformation networks for household power distribution (or power delivery back to the grid), potentially reducing unnecessary conversion losses, and allowing for physically smaller and/or lighter power conversion components to be utilized. For example, where power generation provides a DC source, rather than changing the power to AC for transmission and then back to DC at the DC consuming device (DC consuming device being at a household, for instance), DC power may be directly stepped up to a higher-voltage DC for transmission and then stepped down to a lower-voltage DC at the DC consuming device.

Regarding unnecessary conversion losses, when loads and generators are DC-based, an AC/DC converter is required both at the load and at the generator so that both can be interfaced with the grid. Therefore, there are two AC/DC stages between the actual generation and load with both stages having to process the full load power. Examples of DC based loads are cell phones or computers. Examples of DC based generators include solar PV.

By replacing this AC grid with a DC grid, an AC/DC converter is not required at the load and generator. Instead, the load and generator could be connected with a single DC/DC conversion stage, in some cases. By removing one of the conversion stages it is possible to realize higher overall efficiencies as the power is only processed by one conversion stage. Also, unlike in the traditional AC grid approach, a transformer is not functionally necessary for voltage conversion.

A 50/60 Hz transformer is a source of significant volume and weight which is avoided by the circuit topologies described in some of the embodiments herein. As illustrated in some embodiments, a transformer can also be integrated into some embodiments converter circuit of the circuit architecture but this transformer is not tied to a specific grid frequency (i.e. 50/60 Hz) and therefore can be designed for much higher AC frequencies (for example, 10 kHz). The transformer volume and weight can be constrained by the AC frequency and therefore for some embodiments a transformer can be integrated but at significantly reduced transformer size, volume and magnetic material compared to that of a traditional 50/60 Hz transformer.

This capability is realized through a string of power electronic sub-modules that comprise of a mixture of voltage source sub-module elements and a current source sub-module element. In some embodiments, an optional galvanic isolation stage can be added between the lower-voltage DC network and the current source sub-module element. Additionally, in some embodiments an optional grounding circuit can be added to the mid-point of the current source sub-module element.

Galvanic isolation is primarily important for safety reasons. With galvanic isolation, one can have a separate ground on secondary side of the transformer. This limits the voltage seen on the secondary side of the transformer to safe levels. Many grid codes would require galvanic isolation. It also provides other benefits. The transformer also gives another degree of design freedom which could be very important.

By changing the relative ratio of the number of turns on the primary winding of the transformer with respect to the turns on the secondary winding of the transformer one can reduce the current that has to be conducted by our VSMs even though the system is delivering the same output power to the same output voltage. This flexibility enables one to employ this converter for a much wider range of conversion ratios. Without the transformer the approach may be limited to 10:1 conversion ratio but with the transformer, one does not have this limitation. For example, a ratio could be 40:1, etc.

In a non-limiting example, a module represents a physical device or unit. A power electronic sub-module or module represents a physical device or unit that contains one or multiple power semiconductor switches. A voltage source sub-module represents a physical device or unit that has at least two external electrical terminals, contains one or multiple power semiconductor switches and an energy storage device that holds a relatively constant voltage. Examples of energy storage devices with this feature include a capacitor or battery. A current source sub-module represents a physical device or unit, containing one or multiple power semiconductor switches, has at least two external electrical terminals and contains an energy storage device that holds a relatively constant current. An example of an energy storage device with this feature includes an inductor.

The voltage source sub-modules (VSMs) are controlled to act as a variable voltage source with steps defined by the state of charge of the individual VSM cell capacitors.

In this mechanism, power inductors are separated from the string by CSM switching elements. Switching of the CSM switching elements can therefore direct the power inductor current either to the positive or negative terminal of the high voltage DC network. This is referred to as "current shaping". Through this separation of the power inductors, the string inductance is minimized, enabling a nearly square-wave current at a high-frequency to propagate down the series string of voltage source sub-module elements enabling the energy transfer mechanism. The CSM shapes this current propagating down the series string of VSM elements.

The separation of the inductor, in accordance with an example embodiment, is the following, if the inductor is not separated from the string of power electronic sub-modules then the inductor is in series with the string of power electronic sub-modules. Therefore, regardless of the string switch states, the current through the string is equal to the inductor current.

Instead, in the mechanism of example embodiments described herein, the power inductor or power inductors are separated from the string and therefore for certain string switch states the current through the string is not equal to the inductor current.

This enables advantages such as a string current that can be quickly changed during parts of a switching period and for other parts of the switching period equal to a relatively constant inductor current, in some embodiments. As described further, switching protocols and control mechanisms are also disclosed that aid in achieving the advantages described herein.

The CSM can feature two power inductors in an example embodiment (although not all embodiments are thus limited to having two power inductors). The lower-voltage DC network current is shared between these two power inductors. This sharing of the current is advantageous as only a fraction of the lower-voltage DC network current is conducted by the series string of VSMs enabling improved efficiencies and reduced rating requirements of the VSM cells, for instance. In this converter, near continuous power can be exchanged between the DC networks irrespective of the direction of the current propagating down the series string of sub-modules.

Examples of the higher-voltage DC side networks include a medium-voltage (MVDC) or high-voltage DC grid (HVDC). Examples of lower-voltage DC side networks include a residential home, an industrial plant, a microgrid or an energy storage system.

A summary of some of the key features of the power-electronic converter include high-step down ratio power exchange, delivery of near constant power, optional grounding circuit, optional galvanic isolation, bidirectional power transfer capability and near square-wave string currents at a high-frequency made possible by separating the power inductors with the CSM.

In a first aspect, a converter circuit for transferring power between a higher-voltage DC network and a lower-voltage DC network is provided; the converter circuit comprising: one or more voltage source modules (VSMs); a current source module (CSM), the one or more voltage source modules (VSMs) and the current source module (CSM) connected as a series connected string, the series connected string coupled to the higher-voltage DC network; two AC side terminals of the CSM connected in series with the one or more VSMS; two or three DC side terminals of the CSM coupled to a lower-voltage network; a CSM consisting of one or more inductors; and a controller configured to control one or more states of one or more switches within the string modules such that a current into the series connected string is equal to a current in one of the inductors of the CSM for a fraction of each period and equal to a negative of the current in one of the inductors of the CSM for a fraction of each period.

The positive and negative intervals can be changed, and accordingly, in this variation, the negative interval comes before the positive interval. Fractions of a period can include, for example, a proportion of a switching period selected from approximately 1%, 5%, 10%, 25%, 50%, 75%, or 100%. The fractions of each period do not necessarily have to be the same (e.g., different fractions allow for different control methods), and the fractions of the period allow a current to reverse in a switching period.

In another aspect, neither of the two AC terminals of the CSM are electrically bonded to either of the DC terminals of the CSM.

In another aspect, the string comprises two or more VSMs, and is configured with at least one VSM of the two or more VSMs connected to each of the two AC terminals of the CSM.

In another aspect, the CSM comprises two switches and two inductors, wherein the CSM is configured such that both inductors can simultaneously either deliver current to or receive current from the lower-voltage DC network, yielding an amplified current to or from the lower-voltage DC network, respectively; wherein for a set of CSM switch states, the current into the series connected string is equal to the current in a first CSM inductor; and wherein for an alternate set of CSM switch states, the current into the series connected string is equal to the negative of a current of a second CSM inductor. During the positive current interval, the string current magnitude is equal to the first inductor. During the negative current interval, the string current magnitude is equal to the second inductor.

In another aspect, the CSM comprises four switches and one inductor, wherein the CSM is configured such that the inductor either delivers current to or receives current from the lower-voltage DC network; wherein for a set of CSM switch states, the current into the series connected string is equal to the current in the CSM inductor; and for an alternate set of CSM switch states, the current into the series connected string is equal to the negative of the current in the CSM inductor.

In another aspect, the two or more VSMs are of half-bridge type each containing a positive and negative external terminal; wherein, either the positive and negative external terminals of the VSM are electrically bonded to the midpoint and the negative terminal of the VSM cell capacitor, respectively; or the positive and negative external terminals are electrically bonded to the positive terminal of the VSM cell capacitor and the midpoint of the VSM, respectively. This feature can be specific to the half-bridge submodule of some embodiments, and there are other ways to connect this half-bridge submodule. The VSM module can be the upper most module in the substring.

In another aspect, the positive external terminal of the first VSM of the first VSM stack is electrically bonded to a positive terminal of the higher-voltage DC network; and the negative external terminal of the last VSM of the second VSM stack is electrically bonded to a negative terminal of the higher-voltage DC network.

In another aspect, the negative external terminal of the last VSM of the first VSM stack is electrically bonded to a first AC terminal of the CSM; and the positive external terminal of the first VSM of the second VSM stack is electrically bonded to a second AC terminal of the CSM.

In another aspect, when there is only one VSM in the first VSM stack the first and last VSM are the same VSM in that stack.

In another aspect, when there is only one VSM in the second VSM stack the first and last VSM are the same VSM in that stack.

In another aspect, there are two or more VSMs in the first VSM stack and/or the second VSM stack, the negative external terminal of all the VSMs excluding the last VSM of the stack are electrically bonded to the positive terminal of the adjacent VSM in the sequence (i.e. the negative external terminal of the first VSM is electrically bonded to the positive external terminal of the second VSM in the stack).

In another aspect, wherein the CSM is configured to shape the current into the series connected string, through a control protocol provided by the controller to one or more switches of the one or more switches that reside within the string modules. In particular, the control protocol can control any of the VSM switches. It may switch multiple VSM switches at the same instant. In an alternate variation, the CSM switches are indirectly controlled by control of the VSM string switches. For instance, when the CSM switches are diodes.

In another aspect, after the controller acts to change the direction of the current into the series string a commutation or free-wheeling state first occurs where a loop is formed wherein the current in the series connected string is equal to a loop current and accordingly, there is no inductor of the CSM limiting a change in the current into the series connected string and an inductance in the loop is only a leakage inductance of the loop. In a variation, it is also possible to add an external leakage inductance and actually this may be preferable in some embodiments.

In another aspect, the voltage source modules (VSM) are configured to operate in concert as a variable voltage source with steps defined by the state of charge of individual VSM cell capacitors.

In another aspect, the voltage source modules are configured to conduct bi-directional current and insert unipolar voltages. An example implementation is a VSM of half-bridge type. It can only insert a positive voltage or a zero voltage.

In another aspect, the voltage source modules are of half-bridge type.

In another aspect, the voltage source modules are configured to conduct bi-directional current and insert bipolar voltages.

In another aspect, the voltage source modules are of full-bridge type.

In another aspect, the voltage source modules are of different type.

In another aspect, the voltage source modules are of the same type.

In another aspect, the switches of the VSMs consist of one or more switches in series and/or parallel to increase the voltage blocking and/or current conduction capabilities of the voltage sub-module, respectively.

In another aspect, the converter circuit is configured for uni-directional power transfer.

In another aspect, the converter circuit is configured for bi-directional power transfer.

In another aspect, the switches of the current source sub-module consist of one or more switches in series and/or parallel to increase the voltage blocking and/or current conduction capabilities of the current source module, respectively.

In another aspect, the CSM switches feature positive current conduction and reverse voltage blocking capabilities such as diodes.

In another aspect, the CSM switches feature positive current conduction and bipolar voltage blocking capabilities such as MOSFETs with series diodes or GTOs.

In another aspect, the power inductor or power inductors of the converter circuit are separated from the series string of sub-module elements by the current source module.

In another aspect, current into the series connection of one or multiple voltage source modules can be quickly changed due to the low commutation loop inductance enabling higher switching frequencies.

In another aspect, the switching frequency can be adapted to reduce capacitive and inductive energy storage requirements of the VSMs and the CSM, respectively.

In another aspect, an isolation stage interfaces the CSM to the lower-voltage DC network. The isolation stage consisting of (i) one or more transformers; (ii) a secondary-side AC/DC power conversion stage between the one or more transformers and the lower-voltage DC network; and (iii) a primary-side DC/AC power conversion stage between the CSM and the one or more transformers.

In another aspect, the primary-side DC/AC power conversion stage consists of two switches.

In another aspect, the secondary-side AC/DC power conversion stage is of single-phase converter type.

In another aspect, the switches of the secondary-side AC/DC power conversion stage feature positive current conduction and reverse-voltage blocking capability such as diodes.

In another aspect, the switches of the secondary-side AC/DC power conversion stage feature bidirectional current conduction and positive voltage blocking capability such as MOSETs or IGBTs with anti-parallel diodes.

In another aspect, the primary-side DC/AC power conversion stage switches are controllable and feature positive current conduction and positive voltage blocking capability such as MOSFETs or IGBTs.

In another aspect, the primary-side DC/AC power conversion stage switches are controllable and feature positive current conduction and bipolar voltage blocking capability such as MOSFETs with series diodes or IGBTs with series diodes.

In another aspect, the isolation stage features a two-winding transformer.

In another aspect, the isolation stage features a center-tapped winding transformer.

In another aspect, the isolation stage switches are made up of 1 or more switches in parallel and/or series to increase the current conduction and/or voltage blocking capability, respectively.

In another aspect, a grounding circuit is electrically connected between the two switches of the CSM.

In another aspect, a series choke is added in series with the series string of sub-module elements reducing the di/dt in the high-voltage (HV) loop.

In another aspect, a filtering circuit interfaces the higher-voltage DC network and the series string of sub-module elements reducing the harmonic currents into the higher-voltage DC network.

In another aspect, the converter circuit is incorporated into electronic components coupled to a residential home.

In another aspect, the converter circuit is incorporated into electronic components coupled to an industrial plant.

In another aspect, the converter circuit is incorporated into electronic components coupled to a microgrid.

In another aspect, the converter circuit is incorporated into electronic components coupled to an energy storage system.

In another aspect, the converter circuit is incorporated into electronic components coupled to a DC network which may be a grid, a load or generator or a combination of component/s of these types.

In another aspect, a switching controller for operating the circuit of is provided, for transferring power between a higher-voltage DC network and a lower-voltage DC network; the converter circuit comprising a series connection of voltage source modules (VSM) and a current source module, across the terminals of the higher-voltage DC network; wherein the lower voltage network is interfaced to the converter circuit through the CSM; the method comprising:

In another aspect, the switching controller controls the direction of the main loop current by applying bipolar voltages to the input terminals of the CSM.

In another aspect, the switching controller controls the direction of the main loop current by sending gating signals to the CSM switches.

In another aspect, the switching controller regulates the lower voltage DC network voltage.

In another aspect, the switching controller maintains energy balance of the string of voltage source submodules by controlling the total sum of VSM cell capacitor voltages.

In another aspect, the switching controller maintains energy balance between the individual voltage source submodules by distributing the gating signals to the VSM cells based on their relative states of charge.

In another aspect, the switching controller regulates the difference of the two CSM inductor currents.

In another aspect, the switching controller acts to minimize the difference between the two CSM inductor currents reducing the rms current conducted by the string of VSMs.

In another aspect, the switching controller acts to minimize the difference between the two CSM inductor currents, reducing (i) the rms current conducted by the string of VSMs and (ii) the DC current flowing through the primary-side transformer windings.

In another aspect, the switching controller sends gating signals to the CSM switches to control the direction of power being exchanged between the CSM and the higher-voltage DC network.

In another aspect, the upper and lower voltage source modules (VSM) strings are configured to operate in concert to minimize the DC voltage component at the mid-point of the two switches of the CSM.

In another aspect, the upper and lower voltage source modules (VSM) strings are configured to operate in concert to minimize the DC voltage component at the input terminals of the CSM.

In another aspect, the primary-side DC/AC isolation stage switches are controlled such that power is transferred between the CSM and the lower voltage DC network without saturating the transformer.

In another aspect, the secondary-side AC/DC isolation stage switches are controlled in concert with the primary-side DC/AC isolation stage switches to control the power being exchanged between the CSM and the lower-voltage DC network.

In another aspect, a method for operating a circuit described in various embodiments herein, including control of a switching controller is provided.

A non-transitory machine readable media, storing machine interpretable instructions, which when executed, cause a controller processor to perform steps of a method for modular multi-level DC/DC conversion with current-shaping, according to various embodiments herein.

In another aspect, the disclosure relates to a power electronic circuit consisting of a cascaded string of voltage source submodules and a current source submodule (CSM), electrically in series, for interconnecting a higher and a lower DC voltage network.

The current source submodules consist of one or more inductors, and two or more switches in some embodiments of the converter circuit. The current source submodules have one or more inductors, two or more switches and one or more transformers in some embodiments of the converter circuit. The voltage source submodules each consist of two or more switches and a DC voltage source in some embodiments of the converter circuit. In a non-limiting example, the DC voltage source may include a capacitor, a battery, a super capacitor or a PV array.

One or more controllers are configured to control one or more states of the one or more switches within the submodules such that a linear combination of the CSM inductor currents are injected into the one or more VSM strings during a first portion of a fundamental AC period and the string current is positive and in a second portion of a fundamental AC period a different linear combination of the CSM inductor currents are injected into the one or more VSM strings.

Some embodiments of the converter circuit include one or more controllers that are configured to control one or more states of the one or more switches within the submodules such the string current and is equal to a linear combination of the CSM inductor currents and the CSM transformer currents during a first portion of a fundamental AC period and in a second portion of a fundamental AC period the VSM string currents are equal to different linear combination of the CSM inductor currents and CSM transformer currents.

In some embodiments of the converter circuit, when the one or more controllers act to change the polarity of the VSM string currents, the power electronic circuit enters a freewheeling operating mode whereby a current loop or alternatively a commutation loop is formed whereby the VSM string currents can vary independently of the CSM inductor currents. The equivalent inductance of this commutation loop is equal to a leakage or stray inductance which contains the cascaded string of submodules. The power electronic circuit can be operated at elevated effective frequencies by reducing the leakage inductance of the cascaded string of submodules in some embodiments of the converter circuit.

In some embodiments of the converter circuit, the one or more controllers regulates the voltage across the input terminals of the CSM. In variant embodiments of the converter circuit there is no or negligible DC voltage component across the AC-side terminals of the CSM. By having no or negligible DC voltage component, a transformer or inductor can be electrically bonded across the input terminals of the CSM in some embodiments of the converter circuit. In some embodiments of the converter circuit the converter naturally achieves volt-second balance for the transformer or inductor connected across the AC terminals of the transformer. This represents a significant advantage as many topologies for DC-DC applications as it can be difficult, requiring a complex control or auxiliary circuits to ensure that the transformer does not saturate.

In a non-limiting example, a submodule represents a physical device or unit. The voltage source submodule represents a physical device or unit and the current source submodule represents a physical device or unit.

In some embodiments of the converter circuit, each inductor of the current source submodule conducts a DC current.

In some embodiments of the converter circuit, the effective frequency of the converter circuit is greater than the actual switching frequency of the VSM switches. In some embodiments of the converter circuit, by increasing the number of VSMs, the power electronic circuit can achieve a higher effective frequency. This is advantageous from a power density perspective. If the effective frequency is increased, it is possible to use smaller capacitance for the VSM cell capacitors while achieving the same cell capacitor voltage ripple. Since the energy stored in a capacitor is proportional to capacitance in some embodiments of the converter circuit the cell capacitors can be physically smaller when the effective frequency is increased. The fundamental AC frequency of the string current is the same as the effective frequency in some embodiments of the converter circuit.

By increasing the effective frequency of the power circuit, the magnetic circuit elements of the power electronic circuit can be made smaller. In some embodiments of the converter circuit, this includes the CSM transformer. The CSM transformer can be made smaller than a line-frequency transformer rated to transfer the same amount of power in some embodiments of the converter circuit due to elevated effective frequencies.

In some embodiments of the converter circuit, the higher voltage network and the cascaded string are coupled through an input filter. The role of the input filter in some embodiments is to attenuate the high frequency harmonic currents generated by the power electronic circuit from entering the higher voltage network. In other embodiments of the input filter, the input filter has the role of attenuating the low order frequency harmonics originating from the higher voltage network. An example of an input filter is a capacitor (C) or capacitor and an inductor (LC) circuit.

In some embodiments of the converter circuit, the cascaded string is grounded. In some embodiments of the converter circuit, this grounding can be done directly or through a grounding circuit. In some embodiments of the converter circuit, one of the CSM terminals is grounded. In some embodiments of the converter circuit, multiple CSM terminals are grounded. In other embodiments of the converter circuit the cascaded string is ungrounded. The input terminals of the CSM are used interchangeably with AC-side terminals of the CSM or AC terminals of the CSM in this document.

In one embodiment of the converter circuit, the CSM consists of two switches and two inductors.

In another embodiment of the converter circuit, the CSM consists of four switches, two inductors and one transformer.

In another embodiment of the converter circuit, the CSM consists of one transformer, two switches and two inductors.

In another embodiment of the converter circuit, the CSM consists of one transformer, two switches and one inductor.

In some embodiments of the converter circuit the power electronic circuit is tolerant to faults on the lower voltage DC network.

In some embodiments of the converter circuit the power electronic circuit is tolerant to faults on the higher voltage DC network.

In some embodiments of the converter circuit, a diode can be added between the higher voltage DC network and the cascaded string of submodule elements to prevent current from flowing into the higher voltage DC network during faults.

In some embodiments of the converter circuit, the CSM string features a near current doubling property, whereby the amplitude of the current into the VSM string or strings is nearly ½ the amplitude of the DC currents delivered to the lower voltage DC network.

In some embodiments of the converter circuit, the controller or controllers are not required to measure the VSM cell capacitor voltages to operate the converter. The converter is said to be self-balanced if operating in this way.

In some embodiments, in which at least VSM strings are employed, the VSM strings can be controlled synchronously to cancel DC flux in the CSM transformer.

In some embodiments of the converter circuit, the input filter acts as a DC blocking capacitor which facilitates DC flux cancellation in the CSM transformer since it forces the DC current flowing through the two VSM strings connected in series to be equal. Cancelling the DC flux enables the CSM transformer to be physically smaller in some embodiments of the converter circuit.

In some embodiments, the higher voltage DC source can be a load or a source. Examples of higher voltage DC sources or loads include a DC distribution grid, an AC distribution grid that is rectified, or the DC-link of a converter.

In some embodiments, the lower voltage DC source can be a load or a source. Examples of lower voltage DC source include a pv array or a battery, electric vehicle. Examples of a lower voltage DC load include a battery, an electric vehicle, auxiliary power system for electric trains, an AC network with a rectification stage at the input or the DC-link of a converter.

In some embodiments of the converter circuit, the CSM features a transformer connected in such a way that the higher voltage DC network and the lower voltage DC network are galvanically isolated. By changing the number of turns on the transformer it is possible to alter the amplitude of the VSM string current for a given current flowing into the lower voltage DC network in some embodiments.

In some embodiments of the converter circuit, the CSM is implemented with two quadrant switches such as MOSFETS which enables power to be transferred from the higher voltage DC network to the lower voltage DC network and for power to be transferred from the lower voltage DC network to the higher voltage DC network.

In another aspect, the control protocol maintains a DC voltage across the two or more VSMs that is equal to the DC voltage of the higher voltage dc network.

In another aspect, the control protocol changes the switching state of at least two of the VSMs each fundamental AC period. A logic state machine that sequentially switches the VSMs such that after an integer number of fundamental ac periods, each VSM capacitor has been inserted for an equal amount of time.

In another aspect, wherein the control protocol switches only a subset of the two or more VSMs every fundamental AC period.

In another aspect, wherein the converter circuit, further comprising: a transformer within the CSM, the transformer having at least one primary winding and at least one secondary winding. The one or more primary windings are electrically in series with the VSMs. The one or more secondary windings are coupled to the lower voltage DC network through a network of switches and inductive elements. The primary and secondary windings are isolated from each other.

In another aspect, wherein the CSM transformer has at least two primary windings. Each primary winding connected as a series string with two or more voltage source modules (VSMs)

In another aspect, wherein the one or more controllers, through control action, cause the DC component of the current through the two or more primary windings to sum to zero. The result is that the DC flux component in the transformer is zero or near zero.

In another aspect, the converter circuit, further comprising: an input filter with at least two capacitors connected in series. The mid-point of the two capacitors is electrically bonded to two primary windings of the CSM transformer. Wherein, the two primary windings have equal number of turns and are wound in opposing directions around the transformer core.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1 is a drawing of a prior art circuit.

In FIG. 3, additional detail on the current source sub-module is provided and a model representation of the higher voltage network and lower voltage network are provided. In a variant embodiment, there is no isolation stage.

In FIG. 4, additional detail on the current source sub-module is provided and a typical model representation of a higher voltage network and lower voltage network are provided. Additionally, an isolation stage featuring a two-winding transformer is added between the CSM and the lower voltage network.

In FIG. 5, additional detail on the current source sub-module is provided and typical model representations of the higher voltage network and lower voltage network are provided. Additionally, an isolation stage featuring a centre-tapped transformer is added between the CSM and the lower voltage network.

In FIG. 60a there is no input filter; in FIG. 60b a first variation of the input filter is provided which is a capacitor and in FIG. 60c a third variation of the input filter is provided which is a capacitor with an inductor.

In FIG. 62a there is no input filter; in FIG. 62b a third variation of the input filter is provided which is two capacitors with an accessible neutral and in FIG. 62c a fourth variation of the input filter is provided which is two capacitors and two inductors. In some embodiments of the converter circuit, the input filter capacitors in FIG. 62b and FIG. 62c block DC current and therefore the DC current into two VSM strings which are connected in series is equal in some embodiments.

In some embodiments of the converter circuit, this blocking of the DC current enables DC flux cancellation for the CSM transformer.

Figure 63:
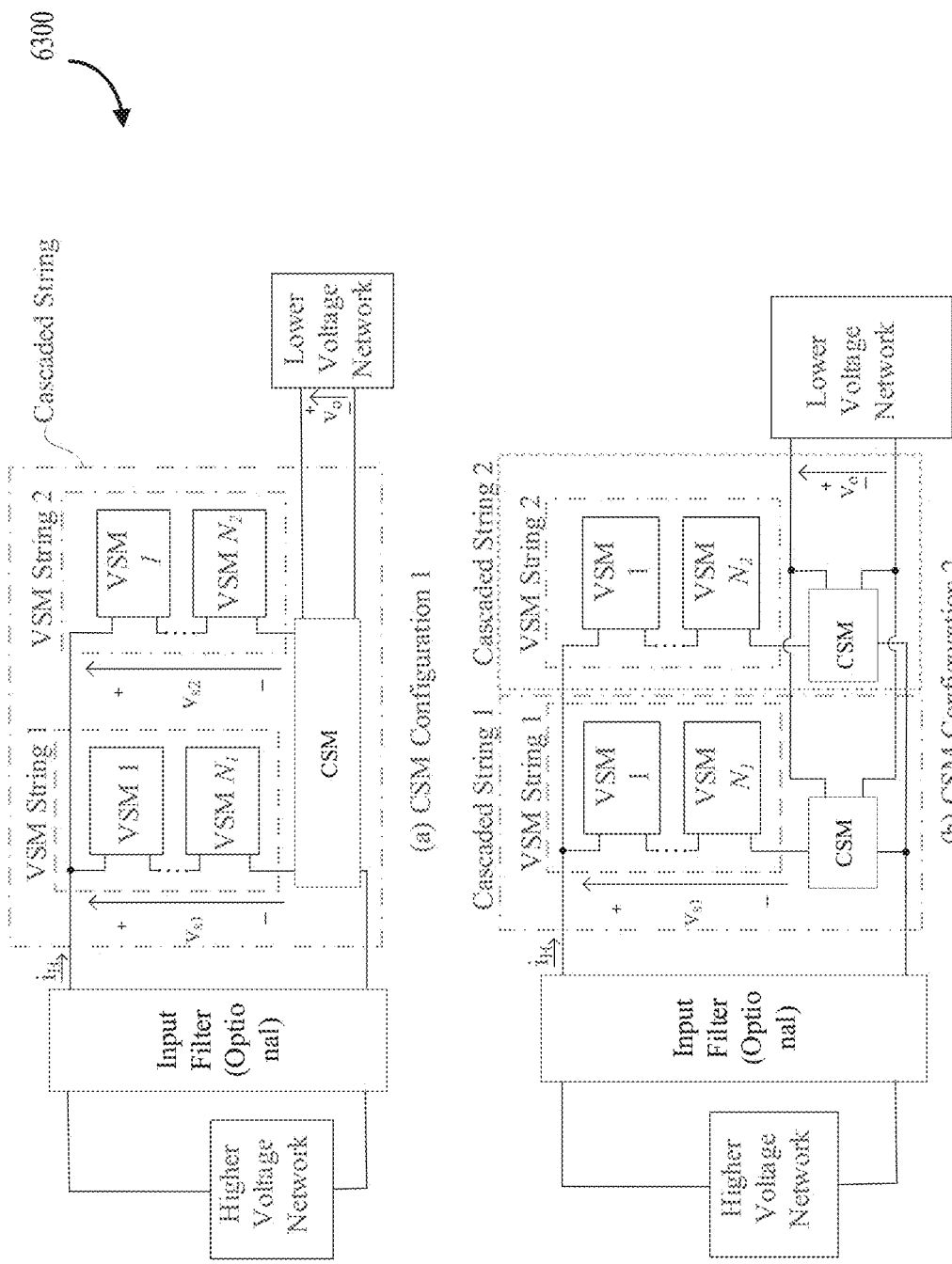

FIG. 63 presents two variant embodiments of the converter circuit. Both embodiments feature two VSM strings that are connected in parallel. By connecting in parallel, the string current $i_H$ is shared by the VSM strings in some embodiments. In FIG. 63a there is a single cascaded string featuring two VSM strings. The VSM strings are connected in parallel and therefore share the string current $i_H$. In this variant embodiment there is 1 CSM. In FIG. 63b there are two cascaded strings with one VSM string and 1 CSM in each of the two cascaded string of submodules.

Figure 61:
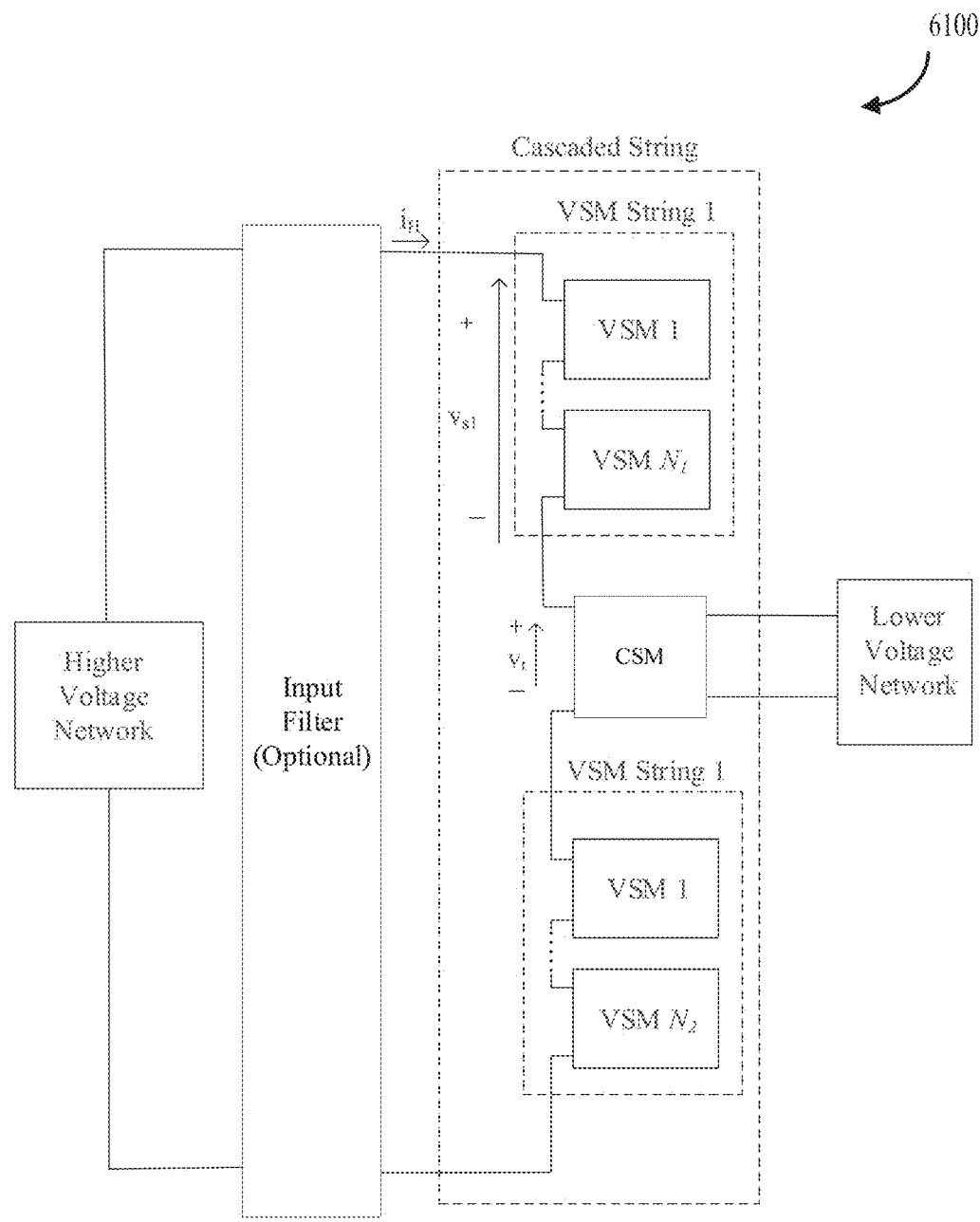
FIG. 61 provides an alternate embodiment of the converter circuit in which the two or more VSMs are distributed to 2 VSM strings. In this embodiment, the VSM strings are series connected but are interfaced to different AC-side terminals of the CSM. An application for this alternate embodiment is for interfacing a lower voltage network to a higher voltage network of bipolar type.
Figure 62:
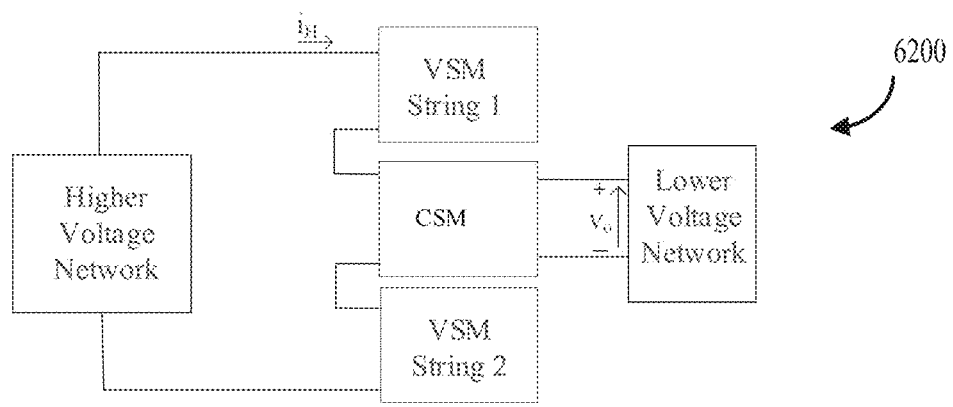
FIG. 62 presents the alternate embodiment of the converter circuit with two series connected VSM strings with no input filter and with different input filter stages.
Figure 62:
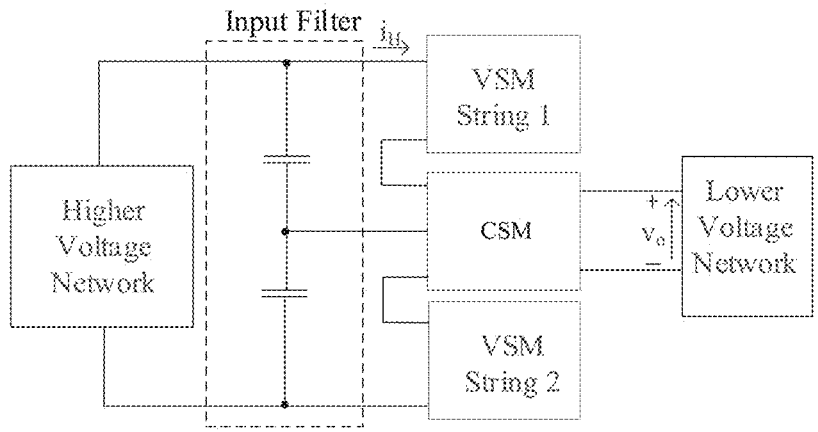
Figure 62:
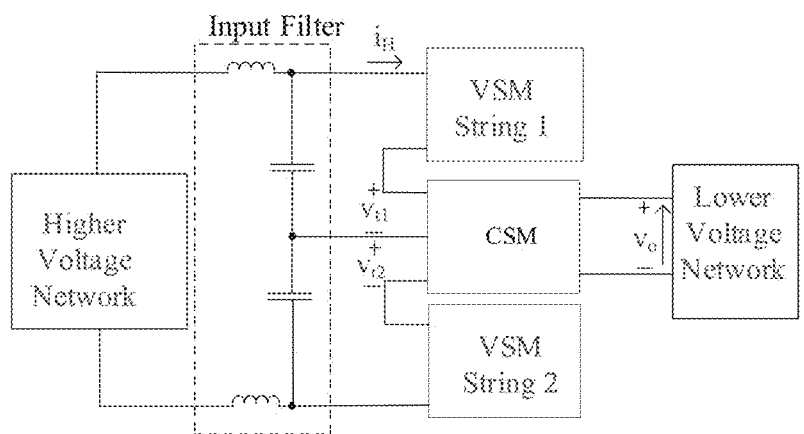
Figure 64:
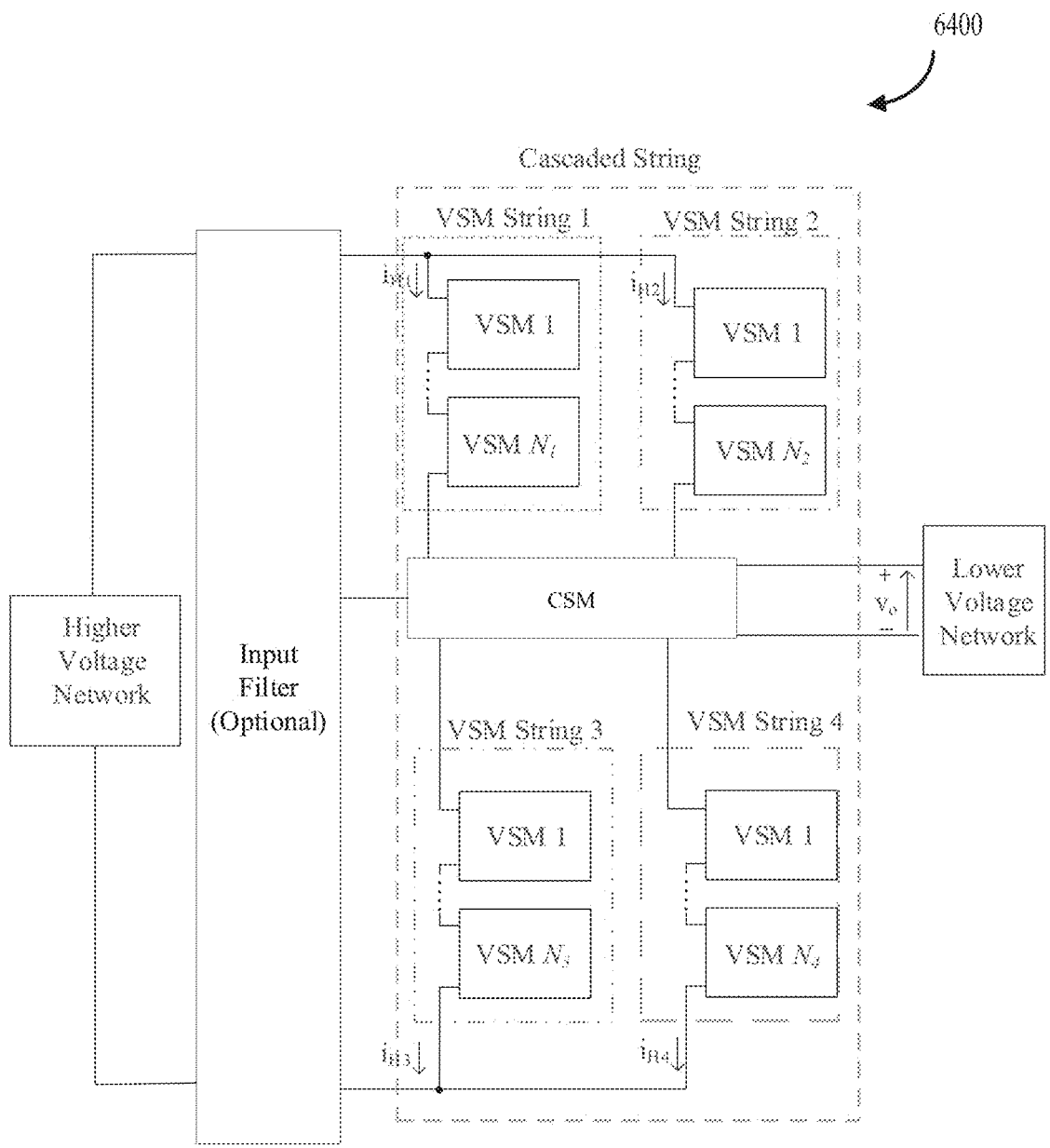

FIG. 64 provides an alternate embodiment in the converter circuit consisting of 4 VSM strings. The VSM string 1 and VSM string 3 are series connected. The VSM string 2 and VSM string 4 are series connected. This alternate embodiment represents a combination of FIG. 63a and FIG. 61. Other alternate embodiments are also possible such as combining FIG. 63b and FIG. 61.

Figure 65:
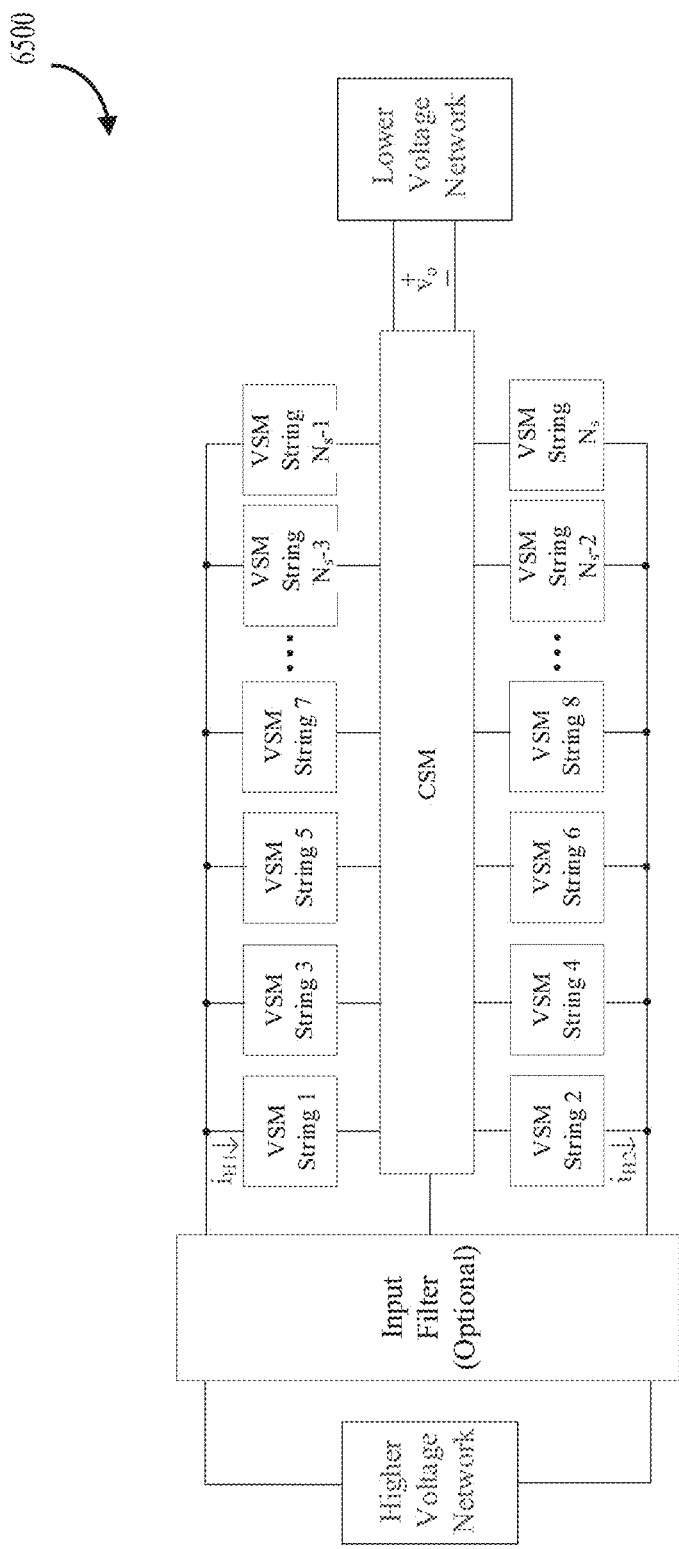

FIG. 65 provides an alternate embodiment of the converter circuit that extends the alternate embodiment of FIG. 64 from 4 VSM strings to $N_s$ VSM strings.

Figure 59:
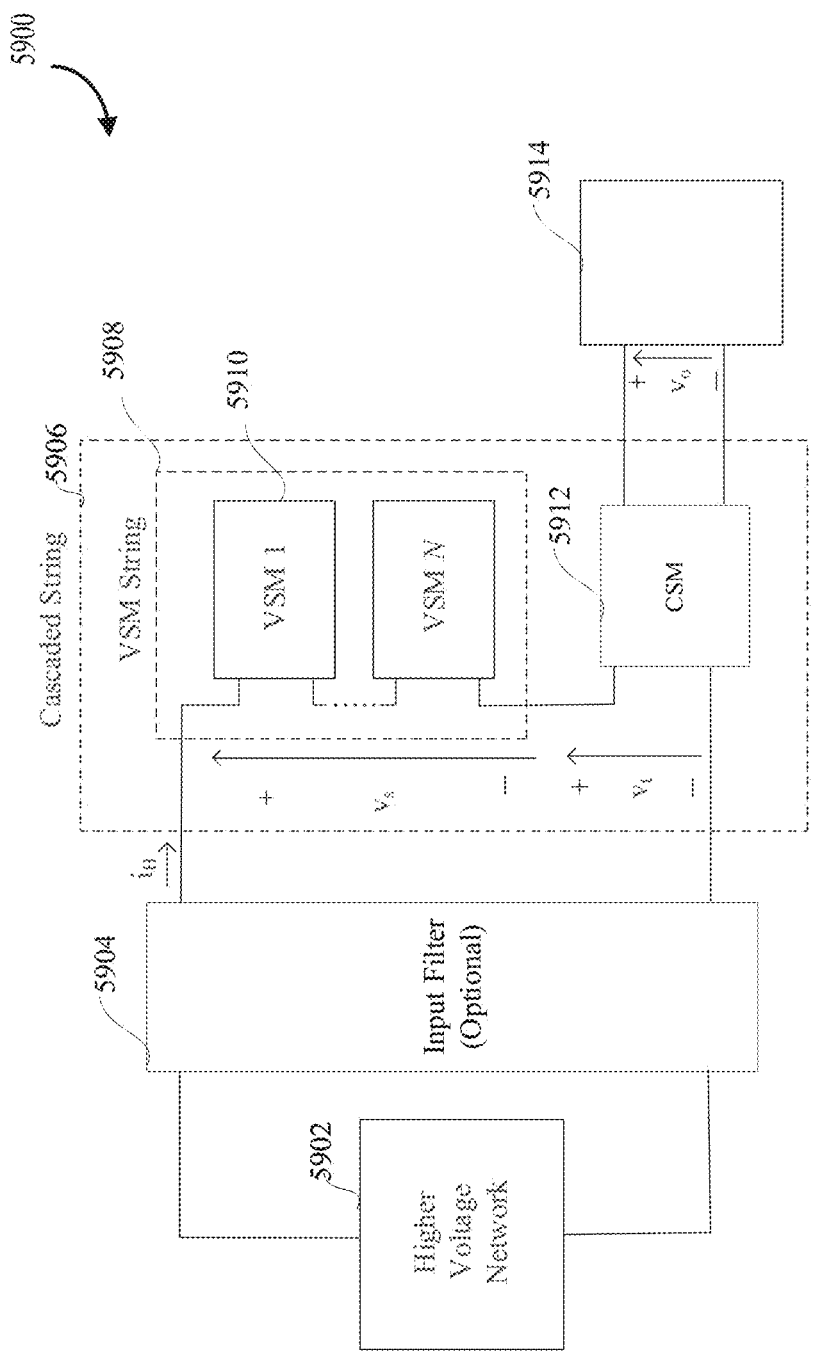
FIG. 59 presents a variant embodiment of the converter circuit. The higher voltage DC network is interfaced to the lower voltage network via a cascaded string of voltage source submodules and a CSM. There is an optional input filter between the cascaded string and the higher voltage DC network. The voltage source submodules are cascaded together forming a VSM string.
Figure 60:
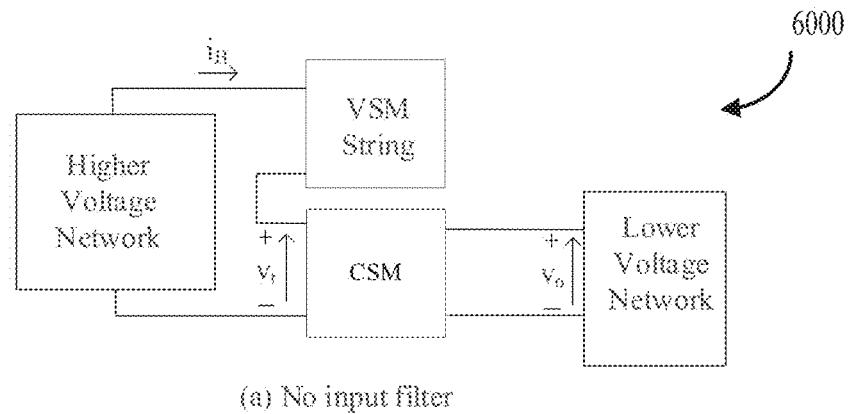
FIG. 60 presents variant embodiments of the converter circuit with no input filter and with two different input filter types.
Figure 60:
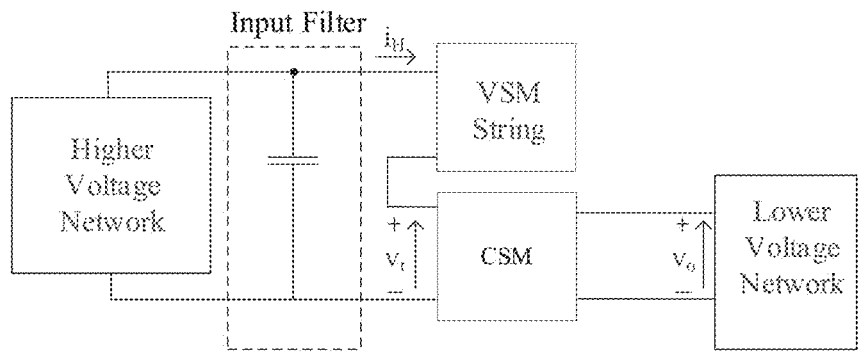
Figure 60:
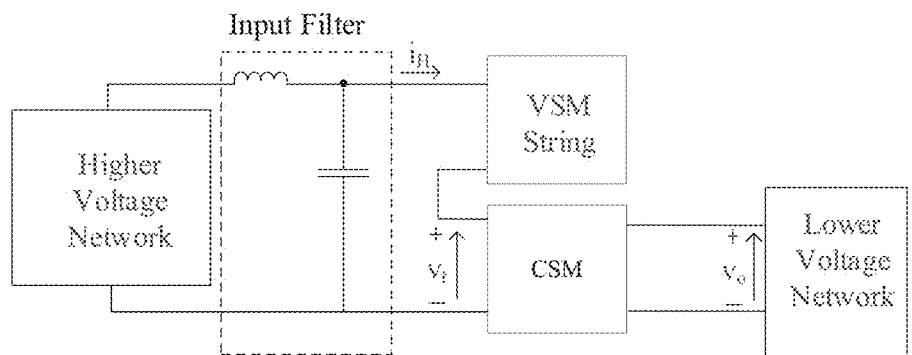

FIG. 66a represents a more specific embodiment of FIG. 59 in which the CSM is of full-bridge type with one inductor and one transformer. This just represents one example of many conventional CSMs that can be employed in embodiments of the converter circuit. FIG. 66b represents a more specific embodiment of FIG. 61. In the embodiment of FIG. 66b, the transformer has an accessible neutral. The neutral of the transformer is connected to the mid-point of the input filter in this embodiment. In some embodiments, while there is DC current through the primary side of the transformer it does not contribute to DC flux in the transformer core due to the way in which the primary side windings are wrapped around the transformer core.

Figure 67:
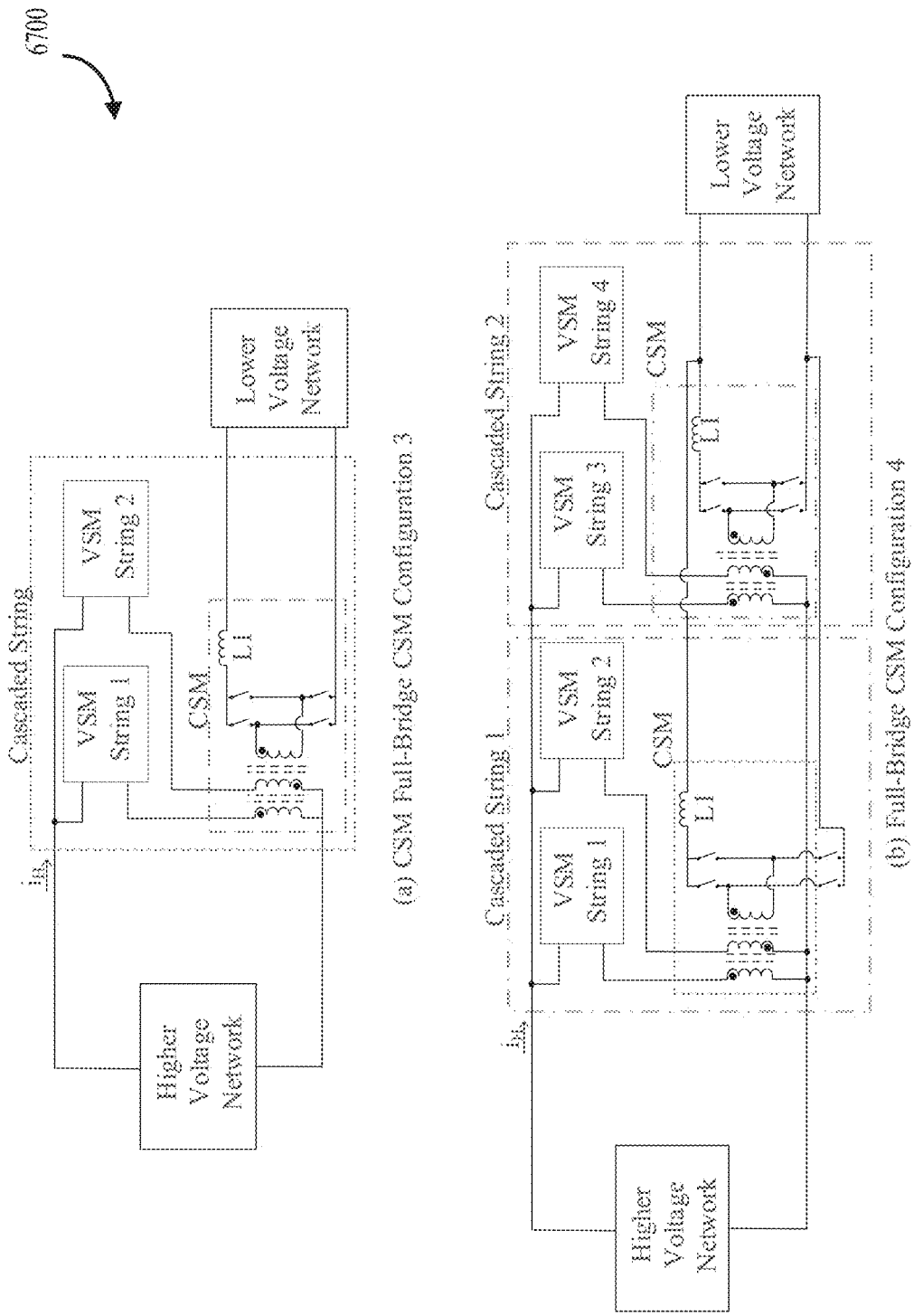

FIG. 67a is a more specific embodiment of FIG. 63a in which the CSM is of full-bridge type. In this embodiment, the transformer has three windings. In this embodiment, it is also possible to cancel the DC flux due to DC current flowing in the primary windings of the transformer in some embodiments by controlling the DC current into VSM string 1 to be equal to the DC current into VSM string 2. In some embodiments, it is also possible to reduce the harmonic currents generated by the power circuit from entering into the higher voltage DC network. By attenuating the harmonics, it is possible to eliminate the DC input filter in some embodiments. The term DC input filter and input filter are used interchangeably in this document. The DC filter is required in some embodiments to meet grid code requirements. Therefore, it is possible to achieve sufficient attenuation of harmonics in some embodiments such as in FIG. 67a that grid code requirements can be met without a DC input filter. FIG. 67b is an alternate embodiment of the converter circuit in which there are four parallel VSM strings. In this embodiment, a first and second VSM strings are distributed to a first cascaded string and a third and fourth VSM string is distributed to a second cascaded string. The two cascaded string share the current delivered to or from the higher voltage DC network.

Figure 68:
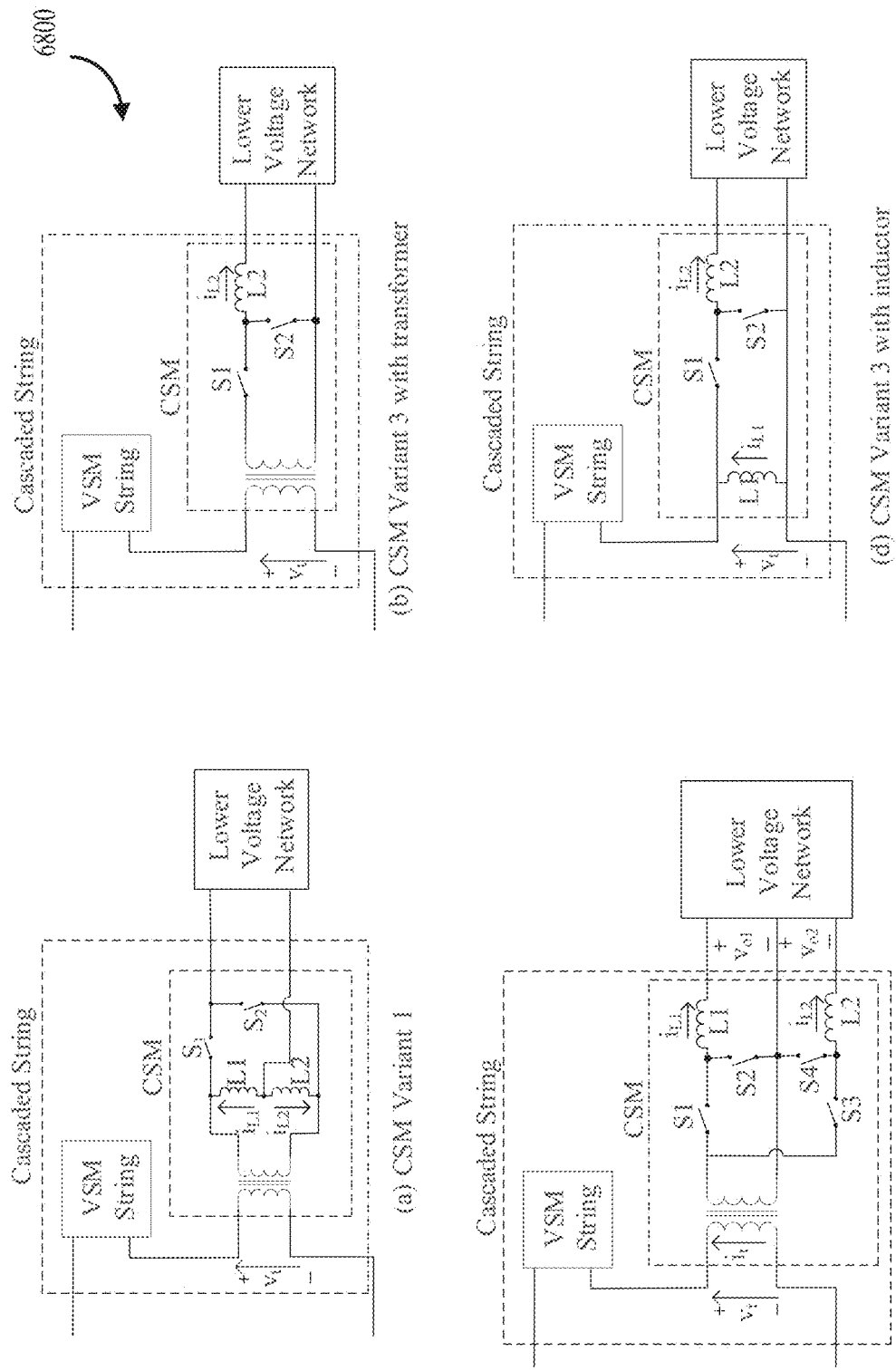

FIG. 68 presents four variant alternate embodiments of the current source modules (CSM). The variation in FIG. 68c is a CSM with three DC-side terminals. The CSMs with three DC-side terminals are particularly well suited for bipolar output voltages. In some embodiments of the CSM with three DC-side terminals such as in FIG. 68c the DC current component of inductor $i_{L1}$ does not have to be equal to $i_{L2}$. This is particularly well suited for applications such as future households that may be at +/−190 V where the loads or generators connected to +190 V terminal may not be matched with the loads or generators connected to the −190 V terminal in some embodiments. In FIG. 68c the loads and/or generation connected between the positive and neutral lower voltage DC network terminal do not have to be matched with the loads and/or generation connected between the neutral and the negative lower voltage DC network terminal. This is advantageous since no extra balancing circuit is required which would add cost and bulk to the converter in some embodiments. In some embodiments of the converter circuit, the transformer can be replaced by an inductor or visa versa. The CSM of FIG. 68b is similar to FIG. 68d with the exception that the transformer is replaced by an inductor.

Figure 69:
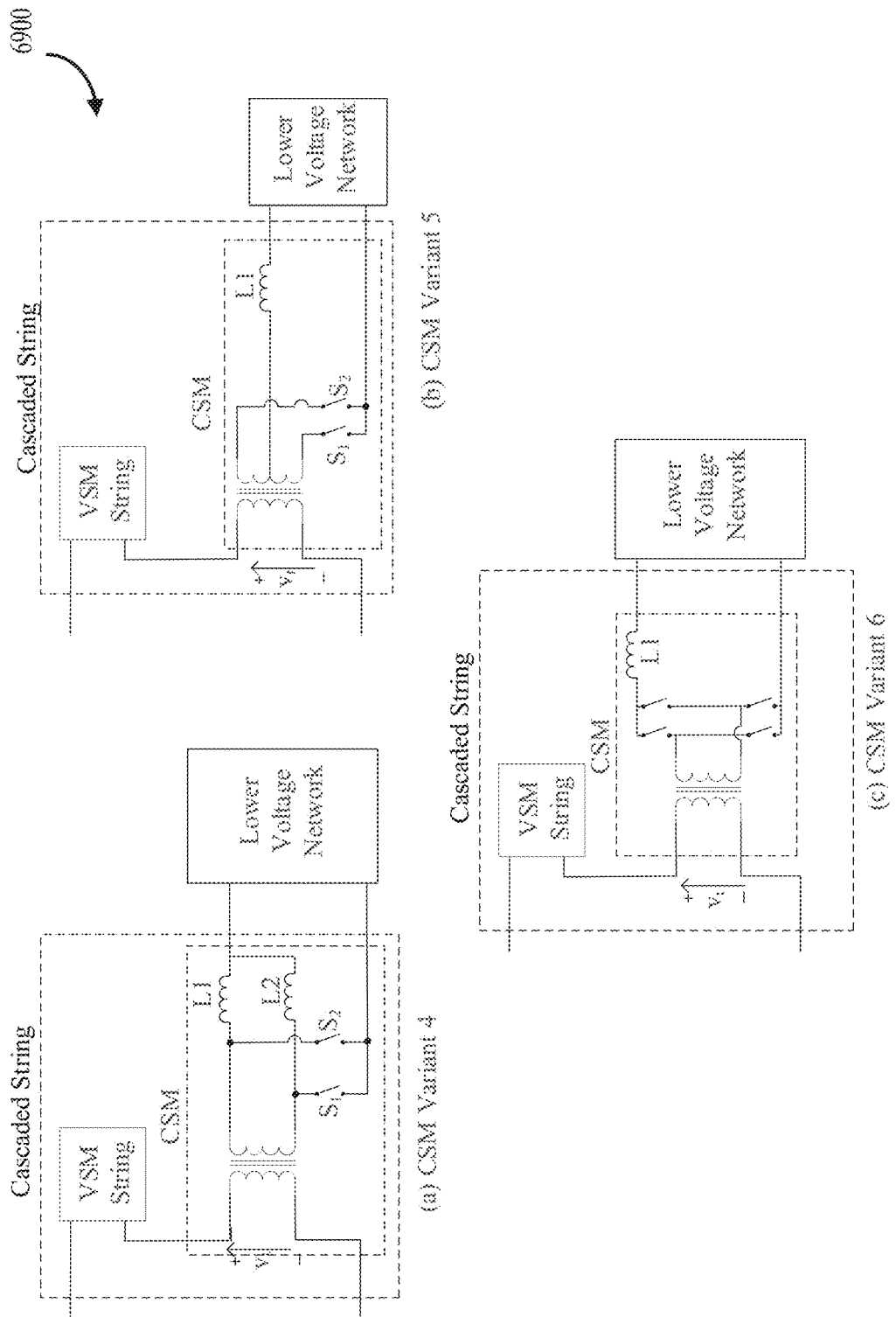

FIG. 69 presents three other variations of the current source module (CSM).

Figure 70:
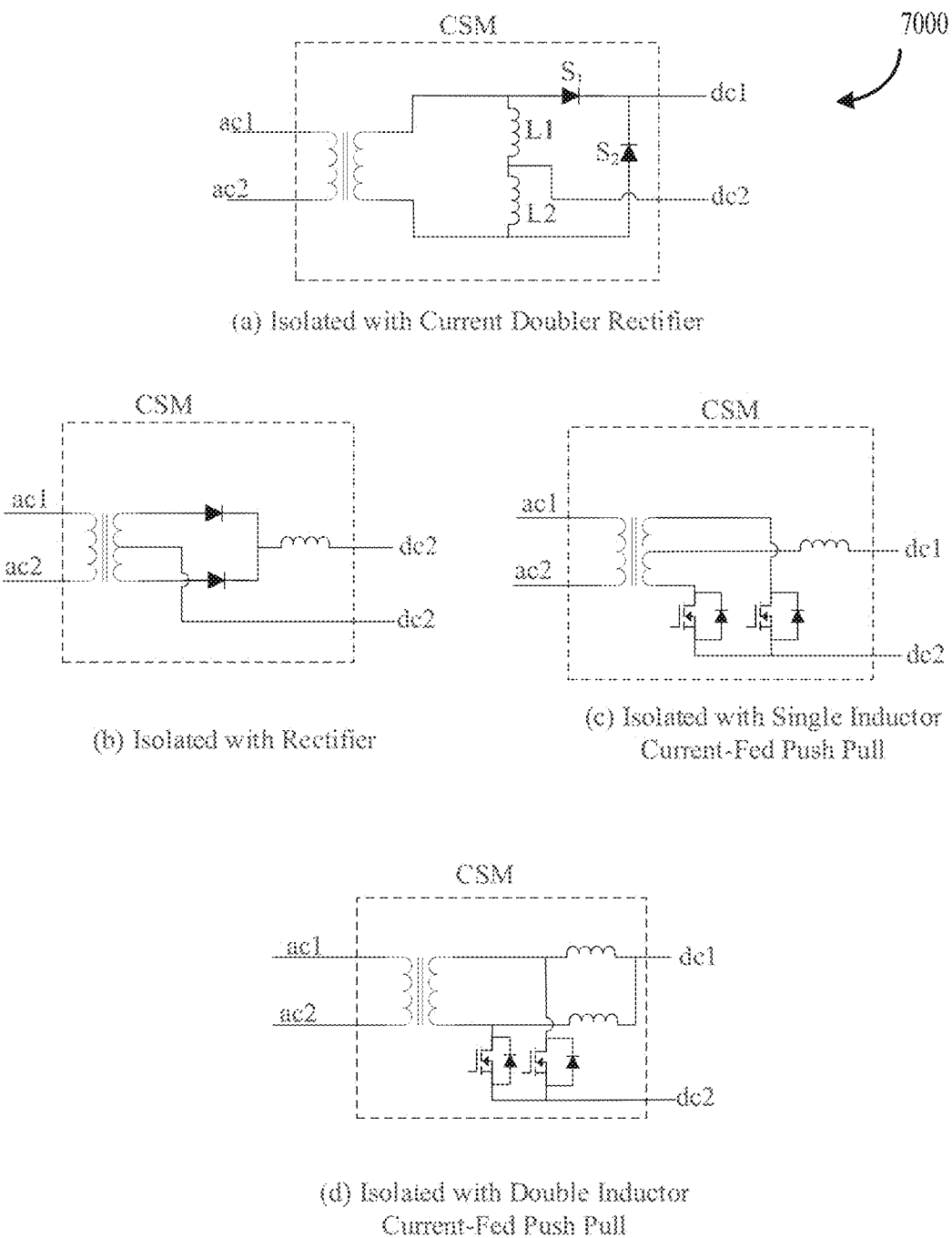

FIG. 70 presents example implementations of some embodiments of the current source modules. In FIG. 70b and FIG. 70a, for example, the CSM is configured for unidirectional power from the higher voltage network to the lower voltage network. In FIG. 70c and FIG. 70d the CSM is configured for bidirectional power transfer between the higher voltage and the lower voltage networks.

Figure 71:
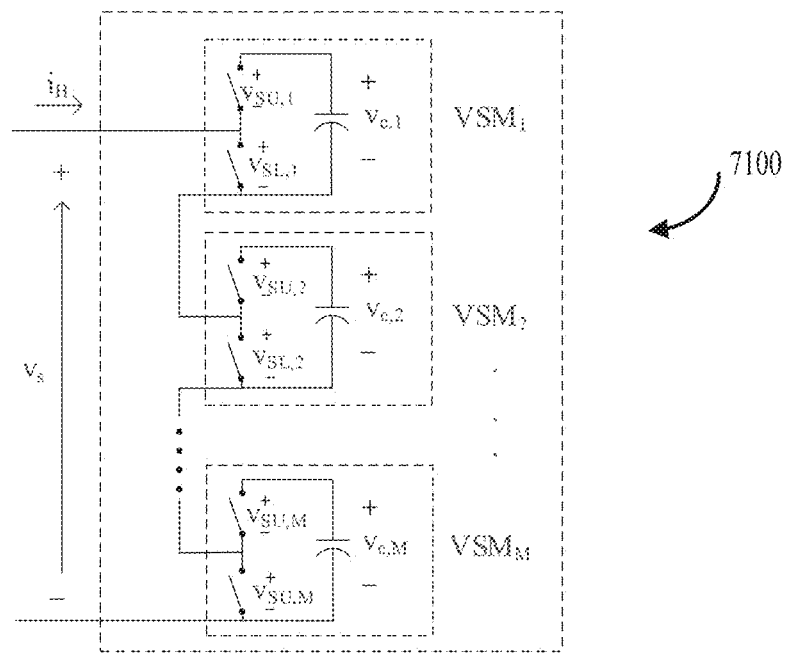
Figure 71:
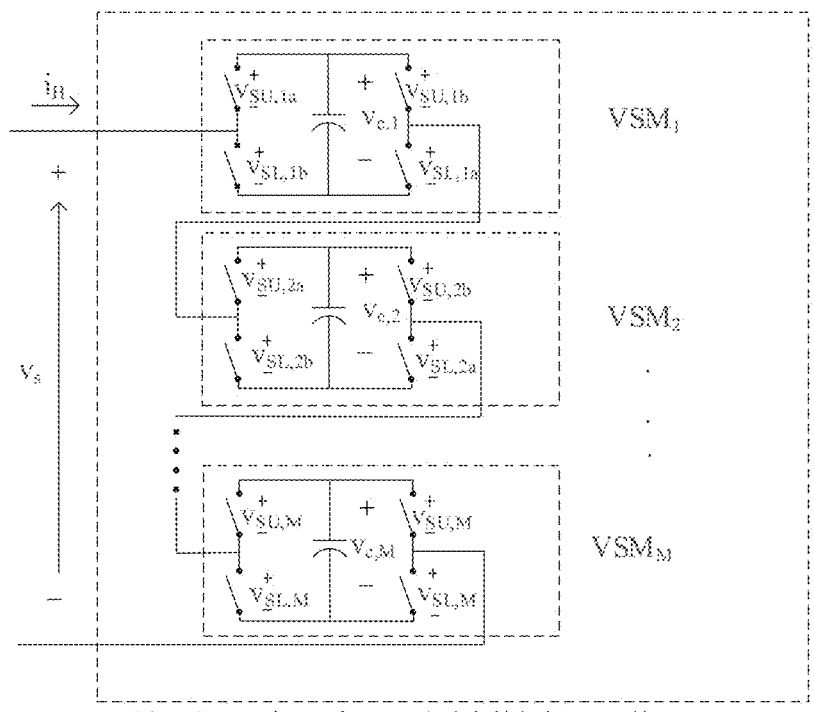

FIG. 71 presents two alternate embodiments of a VSM string. In FIG. 71a the embodiment consists of a cascaded string of half-bridge VSM cells. In FIG. 71b the embodiment consists of a cascaded string of full-bridge VSM cells. It is also possible to use VSM cells of other types. It is also possible to combine different VSM cell types in one VSM string. For instance, it is possible to employ both half-bridge and full-bridge VSM cells in one VSM string. The full-bridge VSM cells can insert both positive and negative voltages. This capability may be required in some embodiments of the converter circuit for instance when the higher voltage network can alternate between positive and negative voltage values. It applications where the higher voltage network is of only one polarity such as a positive or negative voltage then the half-bridge VSM cell type can be employed as by inserting additional VSM cells it is possible to reduce the voltage appearing across the AC-side terminals of the CSM.

Figure 72:
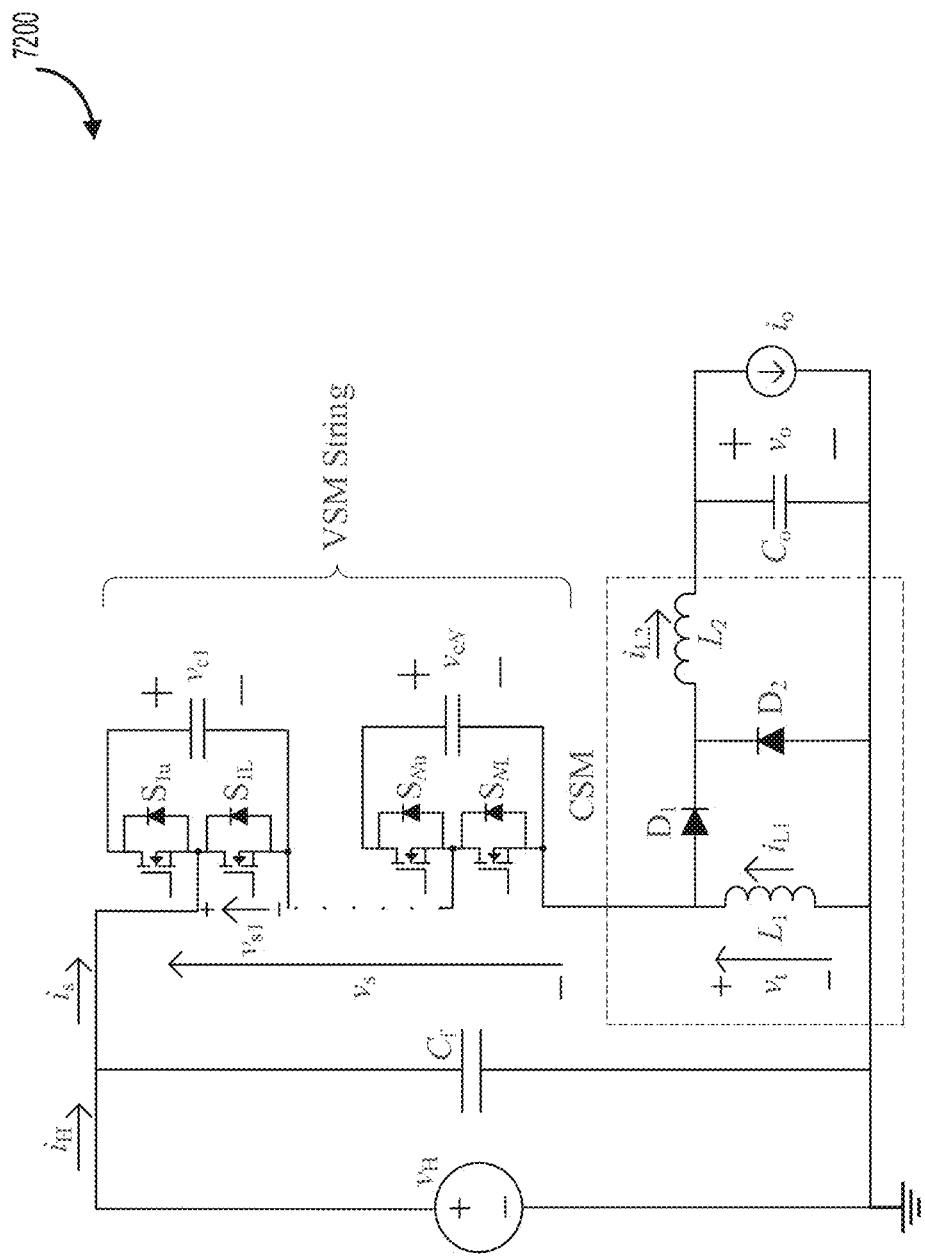

FIG. 72 presents an example embodiment of the converter circuit configured for unidirectional power transfer from the higher voltage to the lower voltage DC network.

Figure 73:
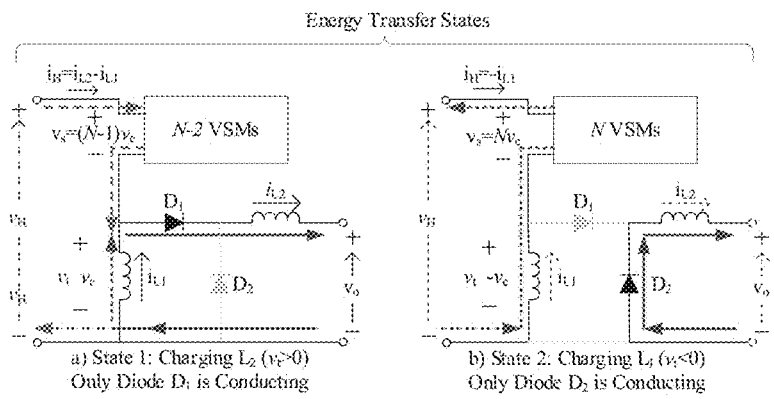
Figure 73:
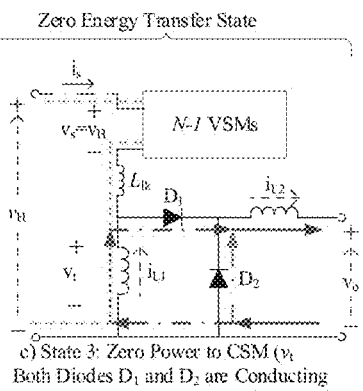

FIG. 73 presents three CSM states for one variant embodiment of the converter circuit. An implementation of this embodiment of the converter circuit is depicted in. FIG. 72. The CSM states are referred to as state 1, state 2 and state 3. These states are also referred to as charge, discharge and freewheeling states, respectively. In the charge and discharge mode either power is delivered to the AC-side terminals of the CSM or power is delivered from the AC-side terminals of the CSM in some embodiments of the converter circuit.

Figure 74:
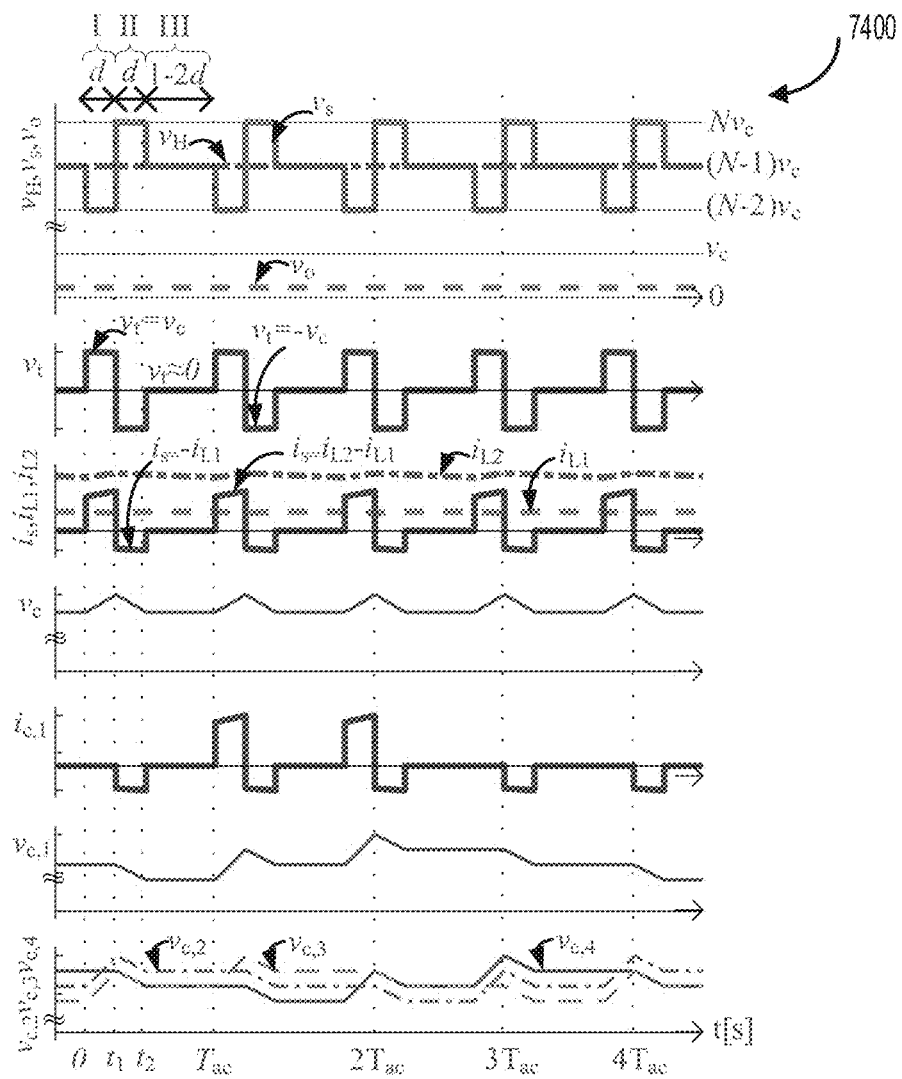
Figure 74:
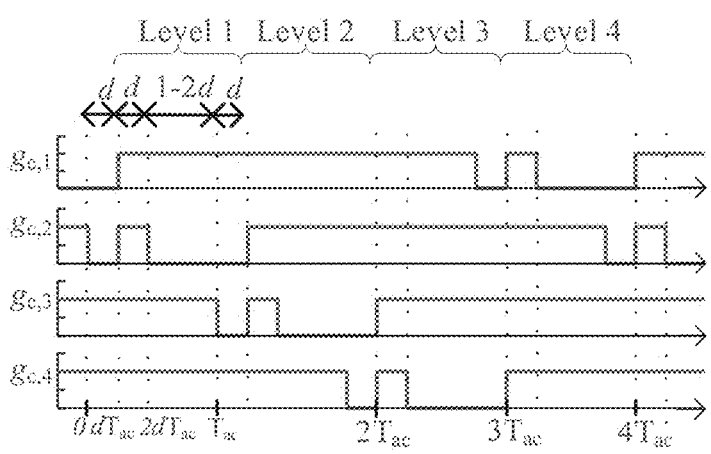

FIG. 74 presents representative operating waveforms for the embodiment of the converter circuit of FIG. 72.

Figure 75:
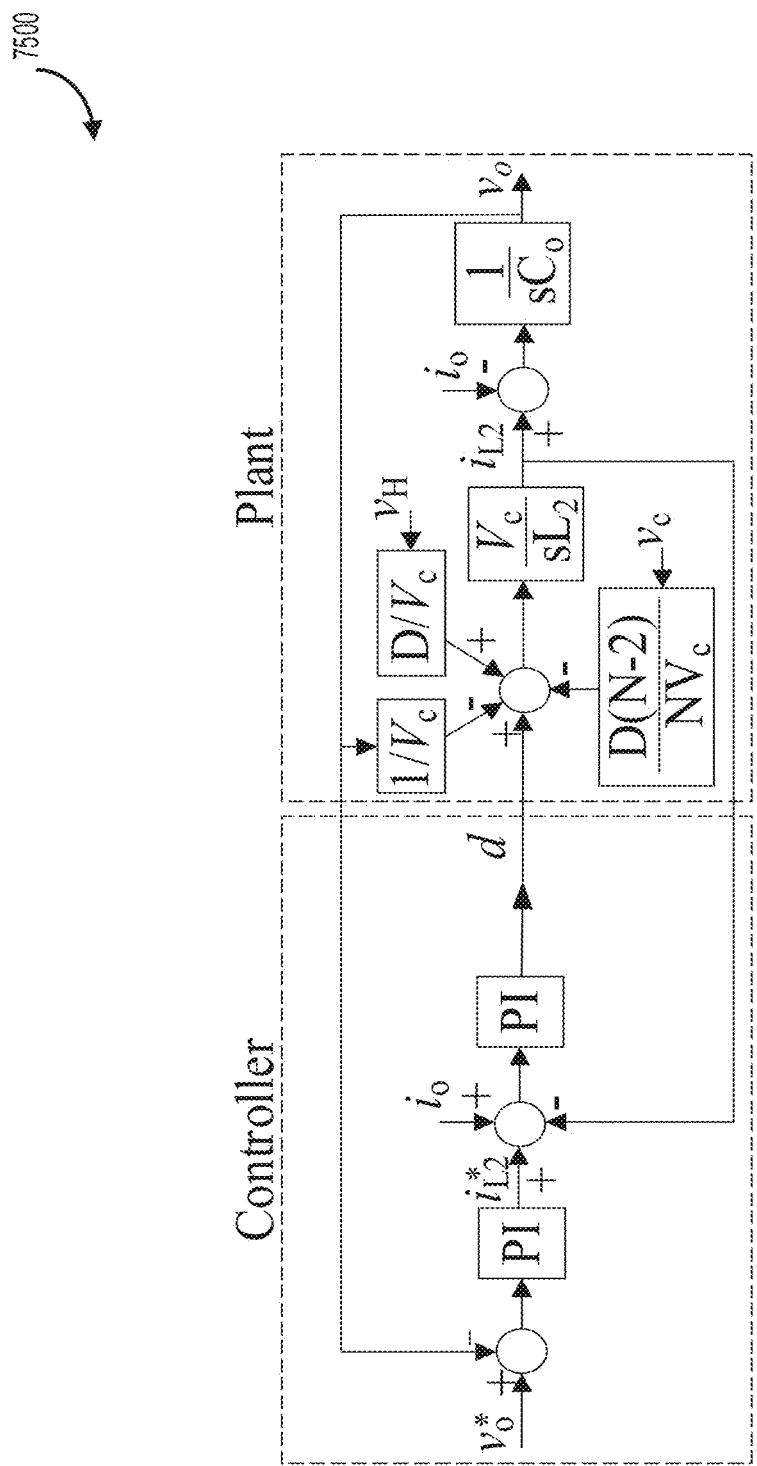

FIG. 75 presents an example of one of many possible controller implementations for some embodiments of the converter circuit.

Figure 76:
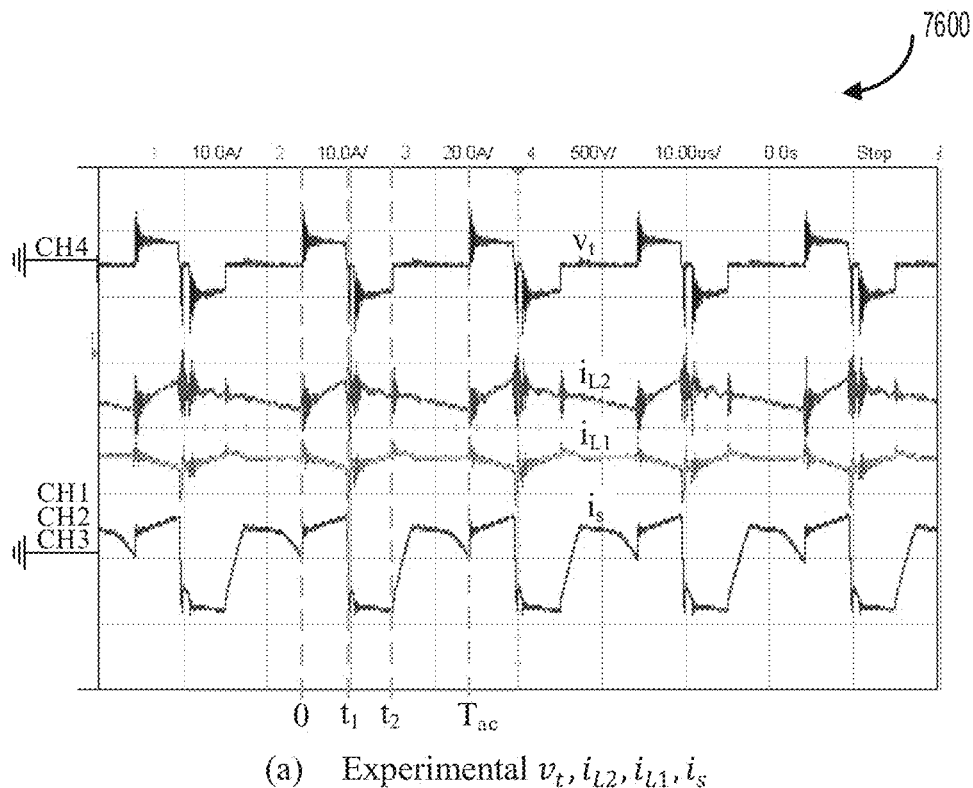
Figure 76:
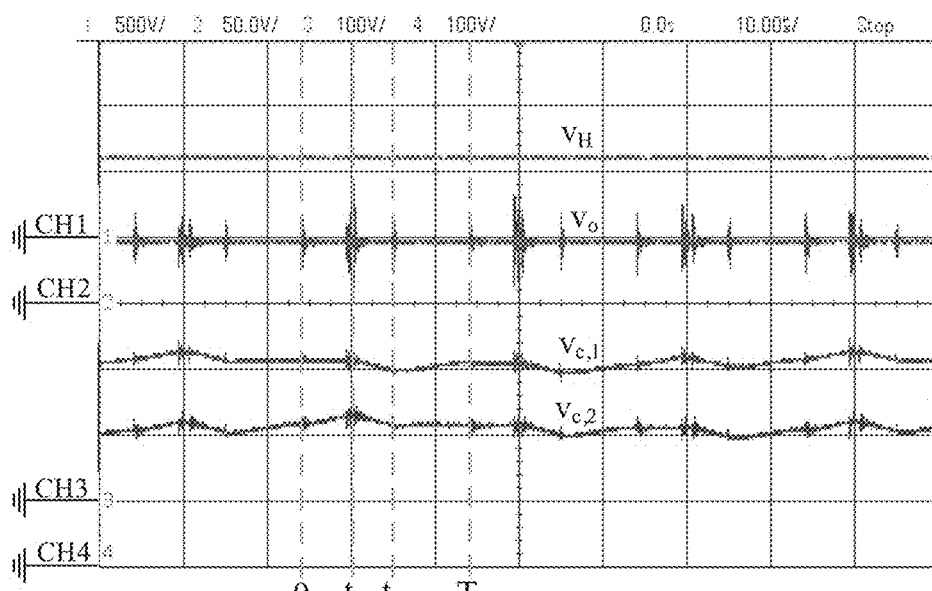

FIG. 76 presents steady-state experimental results for the embodiment of the converter circuit of FIG. 72. The results demonstrate the energy transfer mechanism of some embodiments of the converter circuit. It is also shown that power is delivered to the AC-terminals of the CSM in both the charge and discharge modes. The cell capacitor voltages are balanced, and the output voltage is regulated. The results correspond to a higher voltage DC network at 625V, a lower voltage DC network voltage of 47.5 V and an output current equal to 25 A.

Figure 77:
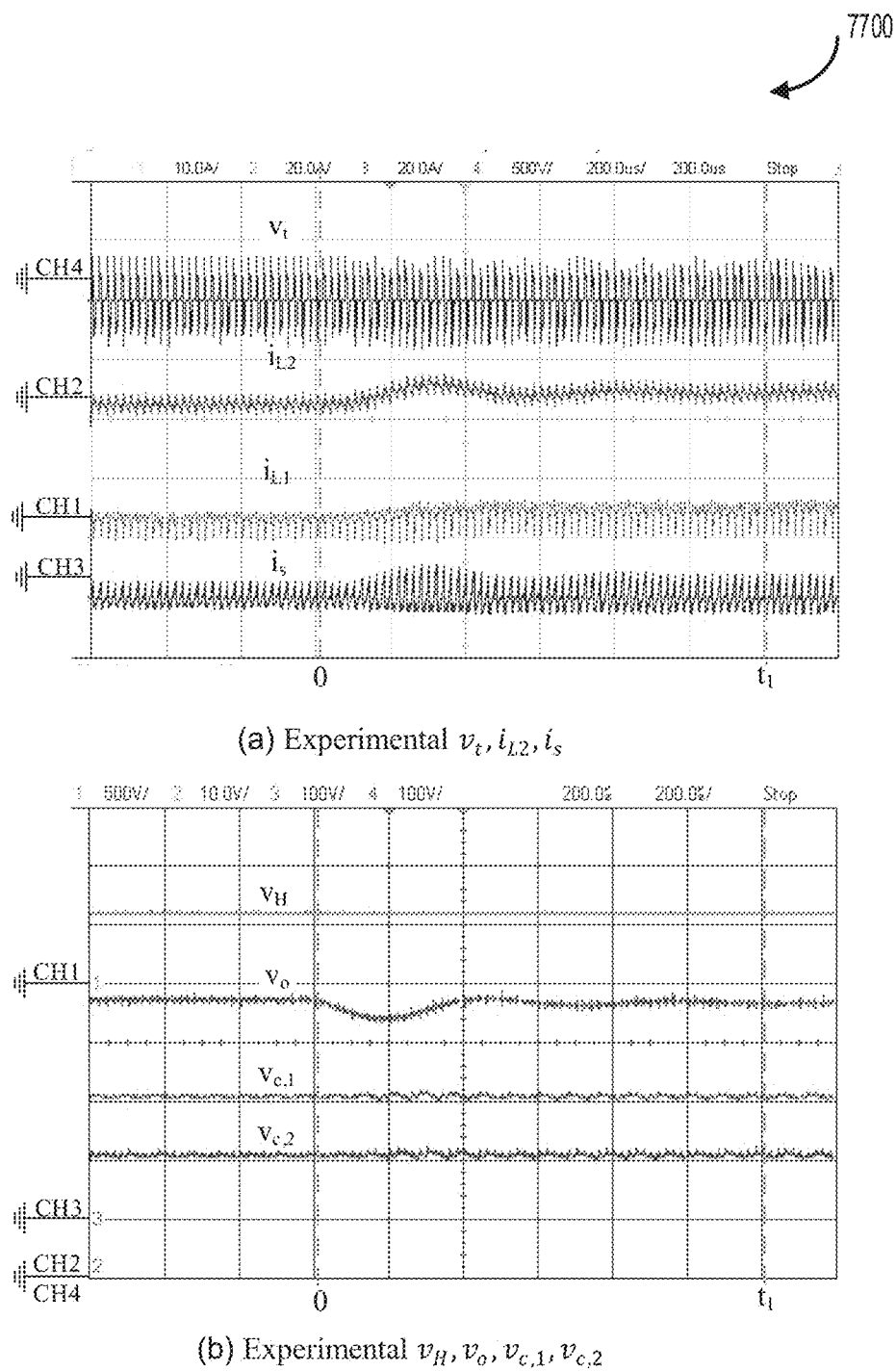

FIG. 77 presents transient experimental results for the embodiment of the converter circuit of FIG. 72. A step change in the load occurs at time t=0. These results demonstrate the fast transient response that is achievable in some embodiments of the converter circuit.

Figure 78:
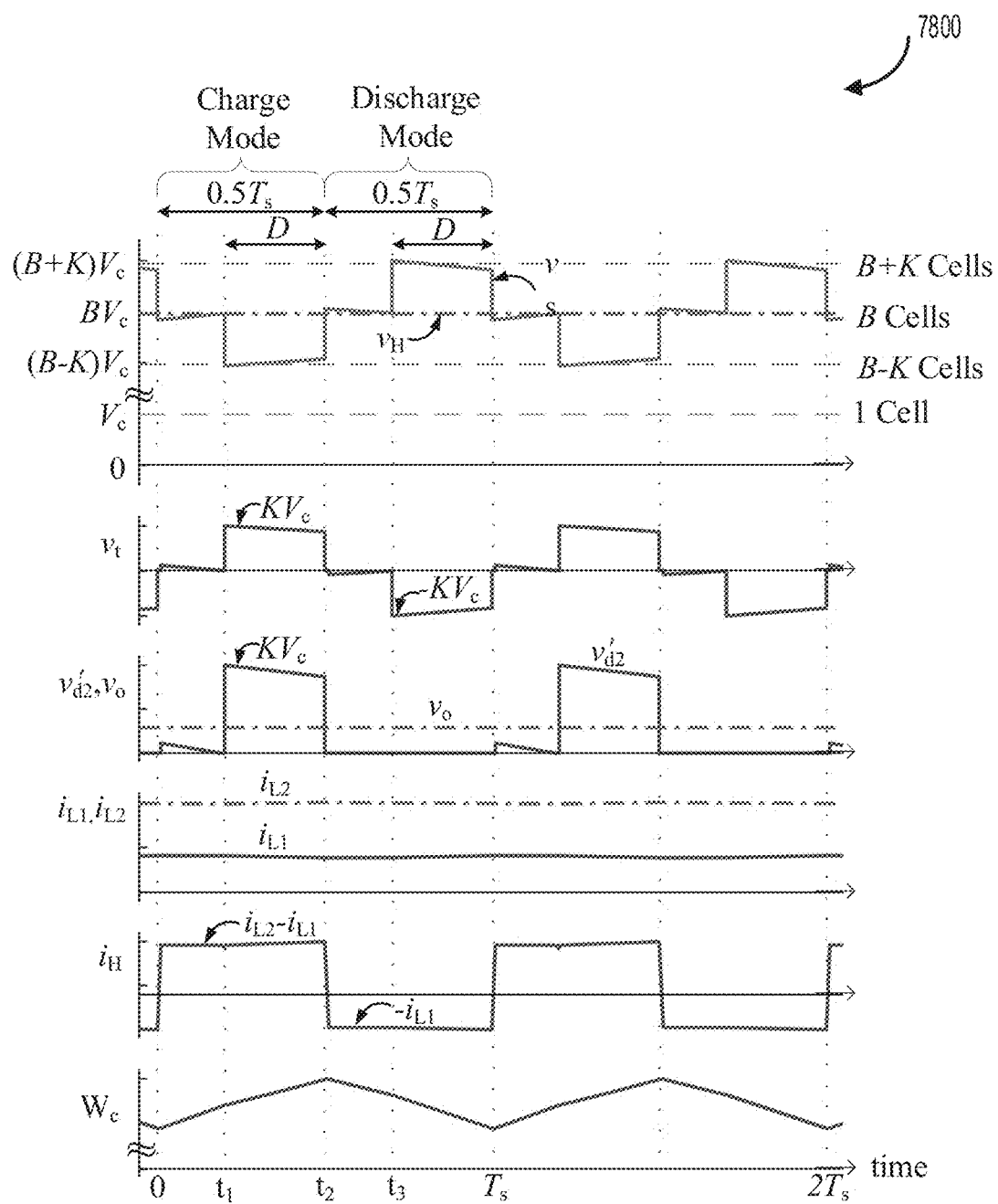

FIG. 78 presents an alternate set of representative operating waveforms for some embodiments of the converter circuit.

Figure 79:
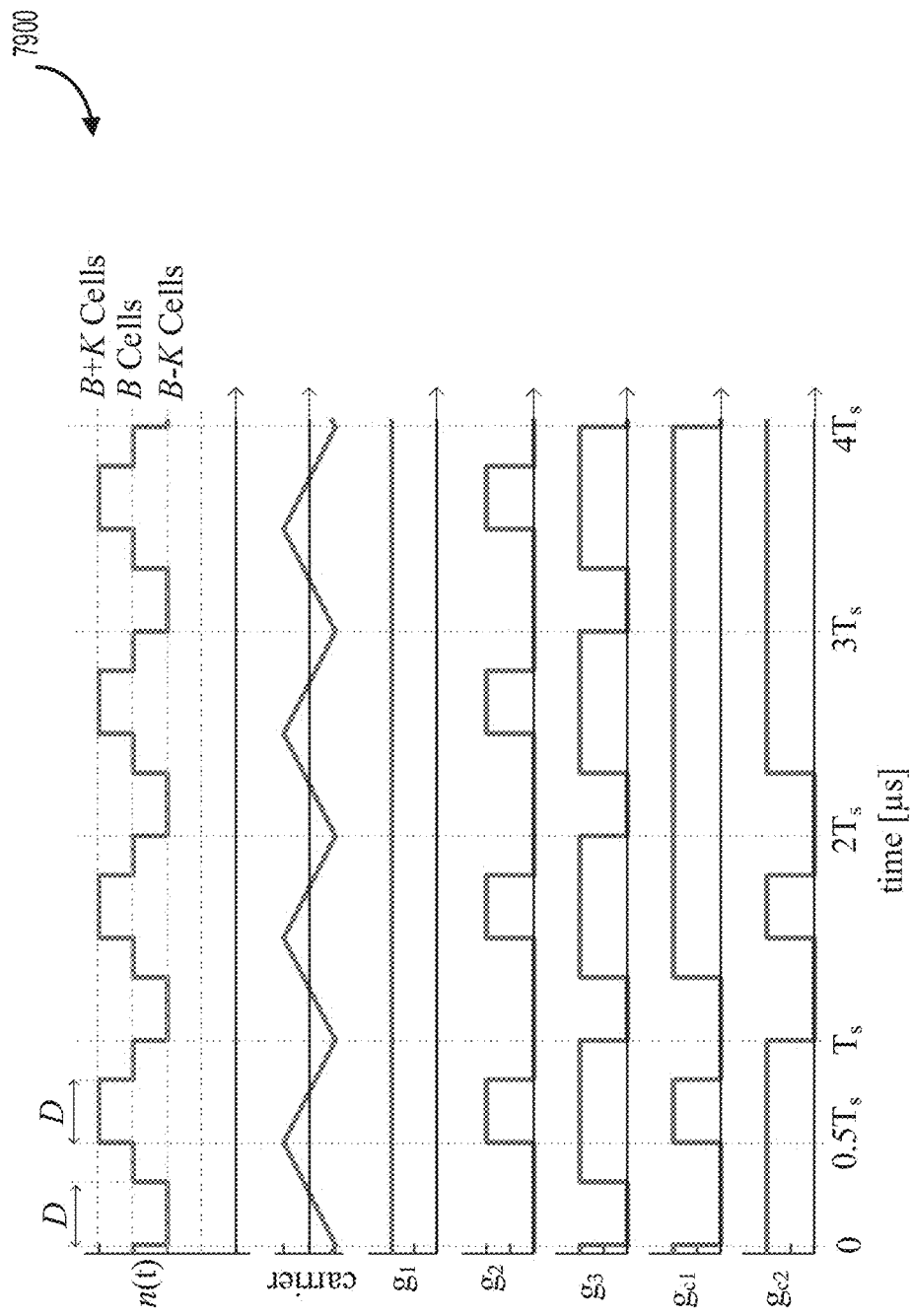

FIG. 79 presents representative modulation waveforms for one embodiment of the converter circuit. In this figure, representative gating signals which are delivered to two of the four VSMs is provided. The last two subplots, $g_{c1}$ and $g_{c2}$ correspond to the gating signals delivered to VSM 1 and to VSM 2, respectively. Other modulation approaches are also possible. This is just an example of one such approach.

Figure 80:
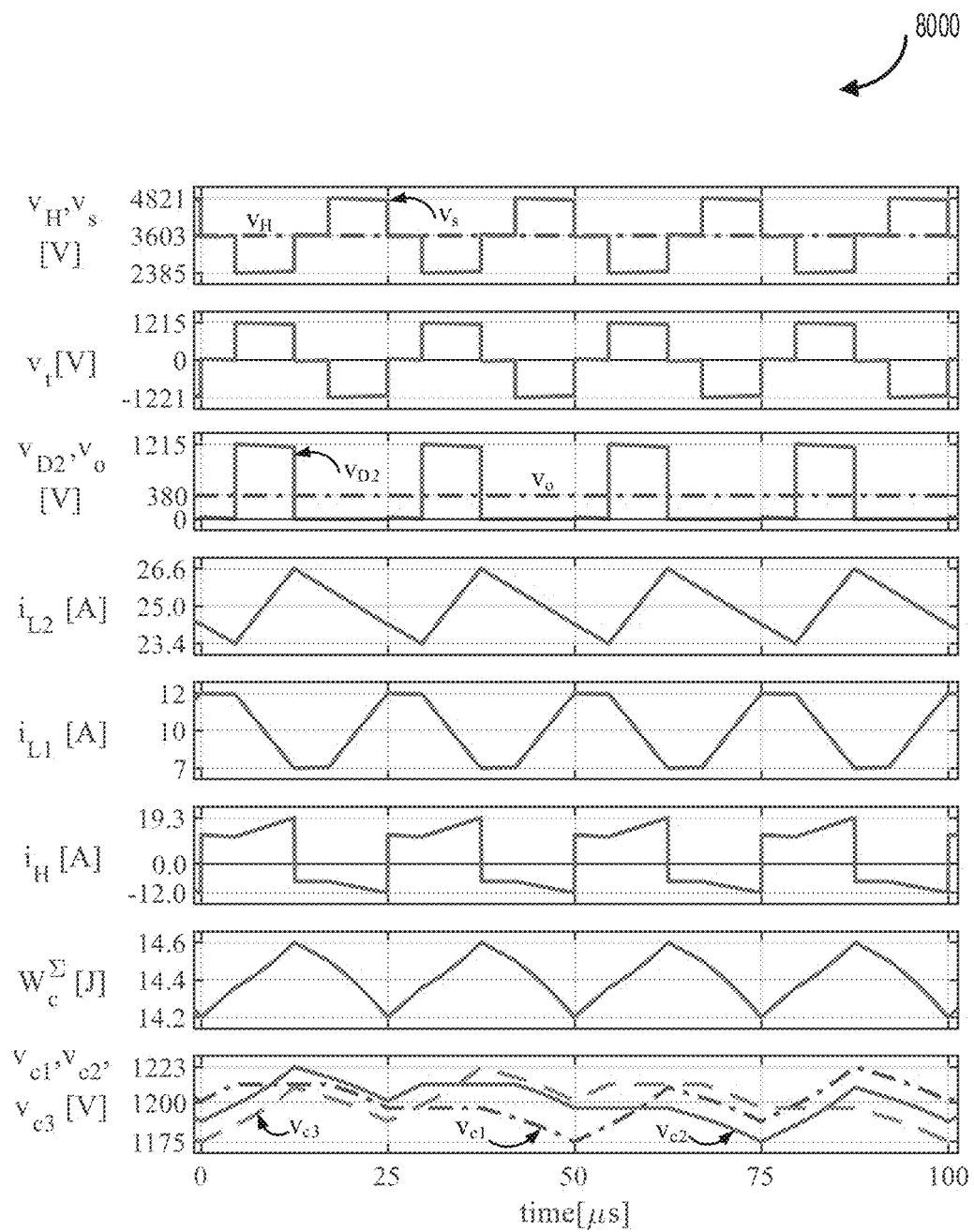

FIG. 80 presents steady-state results for the embodiment of the converter circuit of FIG. 59 with the CSM of FIG. 68b where the CSM is operating in forward power transfer mode.

Figure 81:
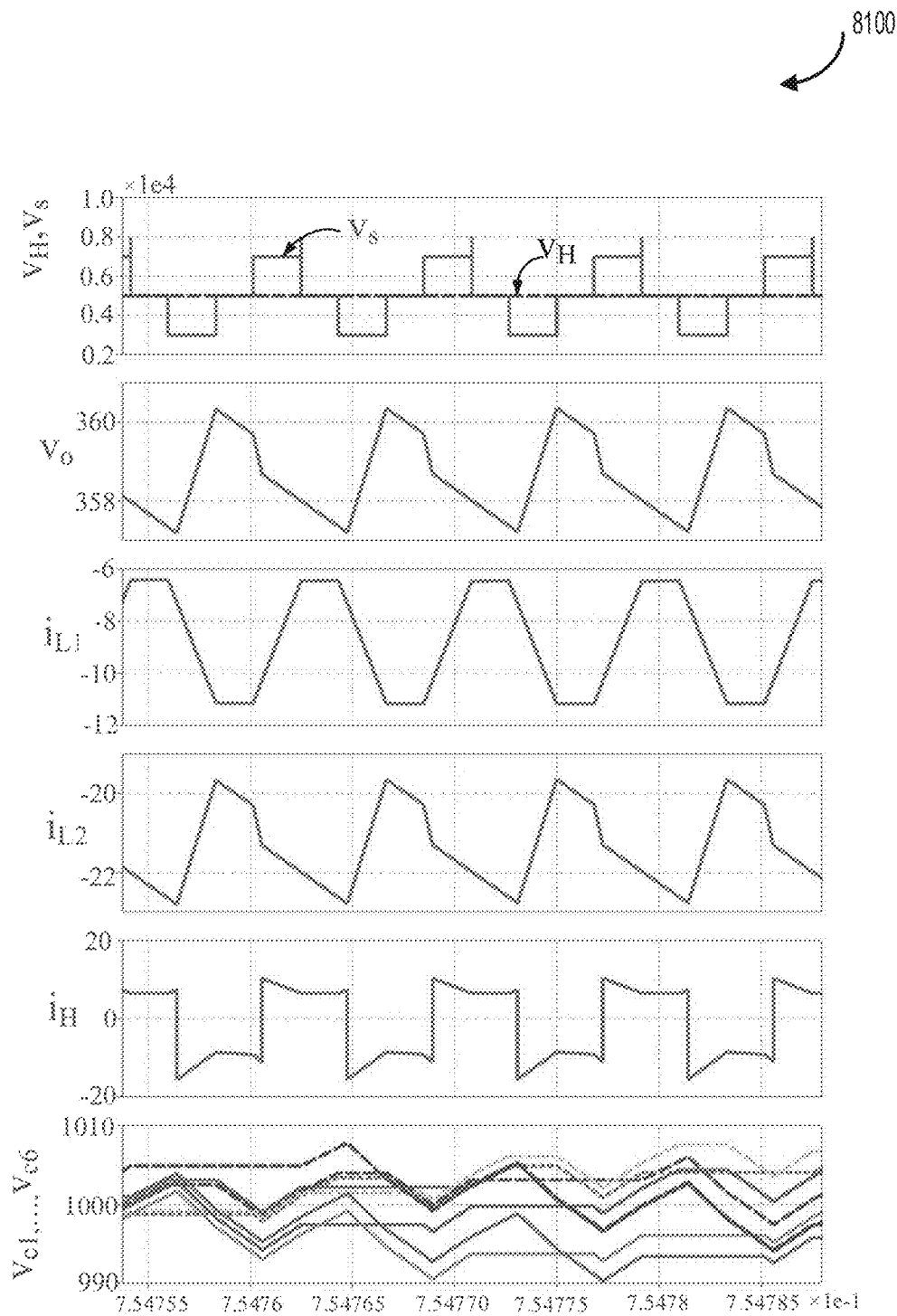

FIG. 81 presents steady-state results for the embodiment of the converter circuit of FIG. 59 with the CSM of FIG. 68b where the CSM is operating in reverse power transfer mode.

Figure 82:
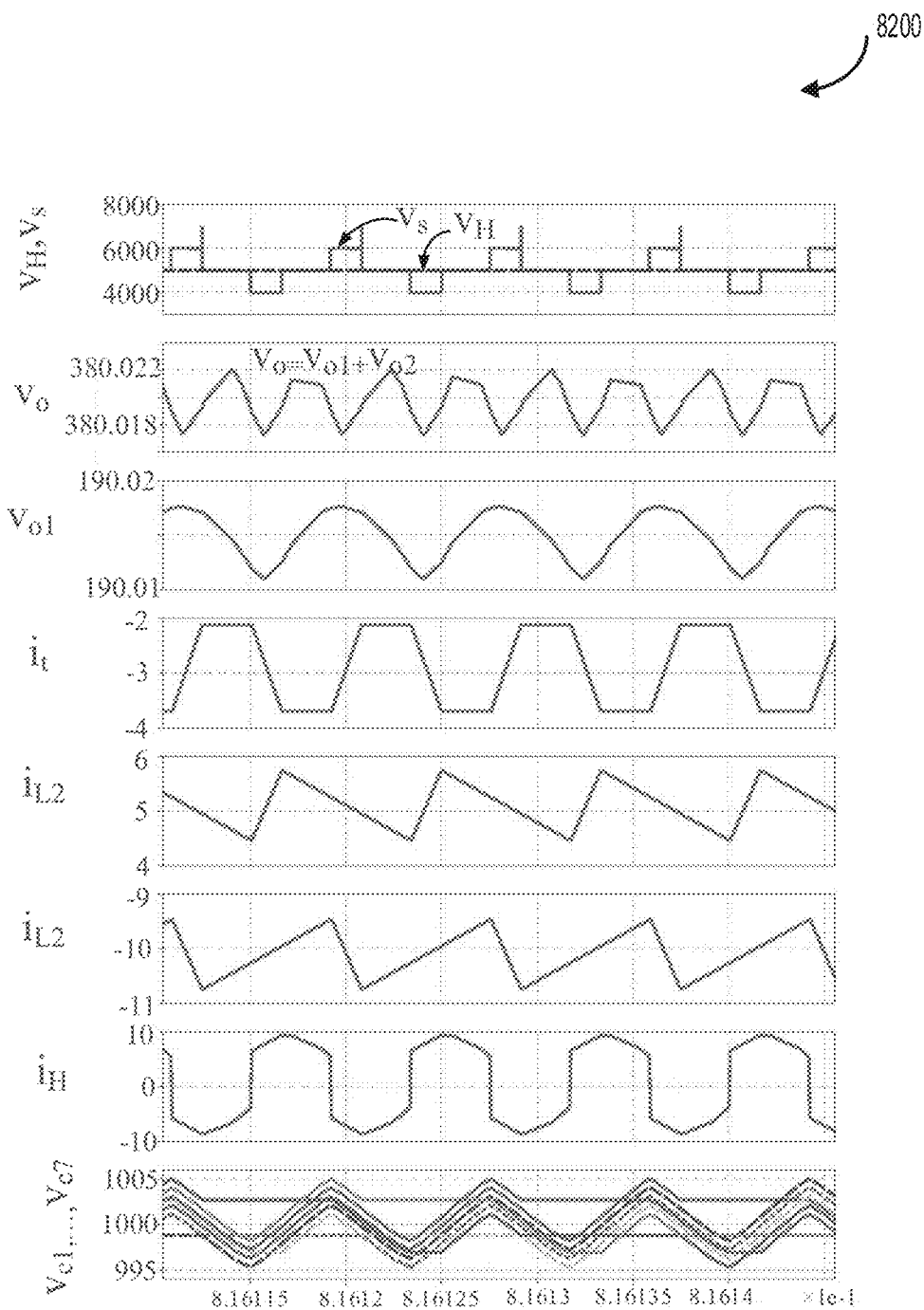

FIG. 82 presents steady-state results for the variant embodiment of the converter circuit of FIG. 59 with the CSM of FIG. 68c configured for forward power transfer and a bipolar lower voltage DC network.

Figure 66:
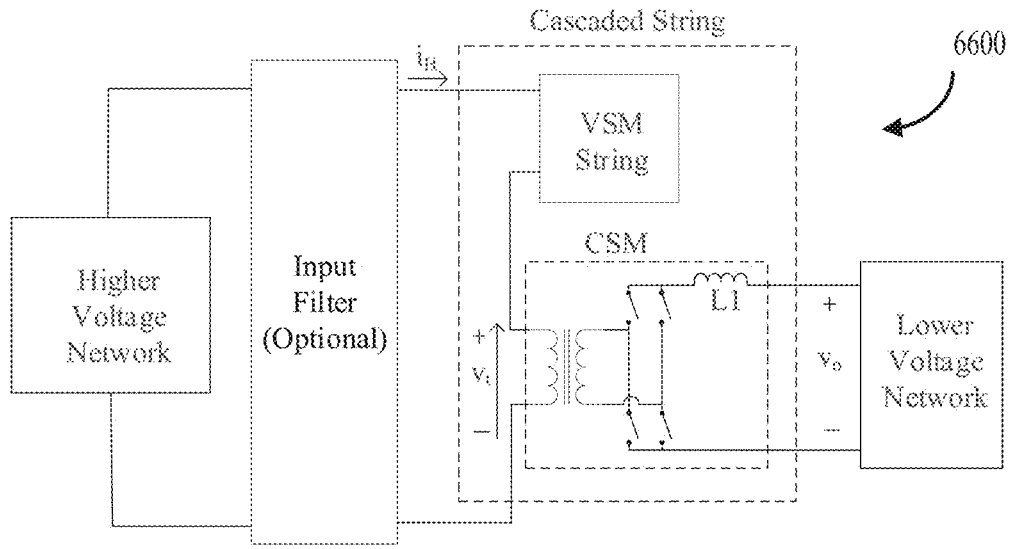
Figure 66:
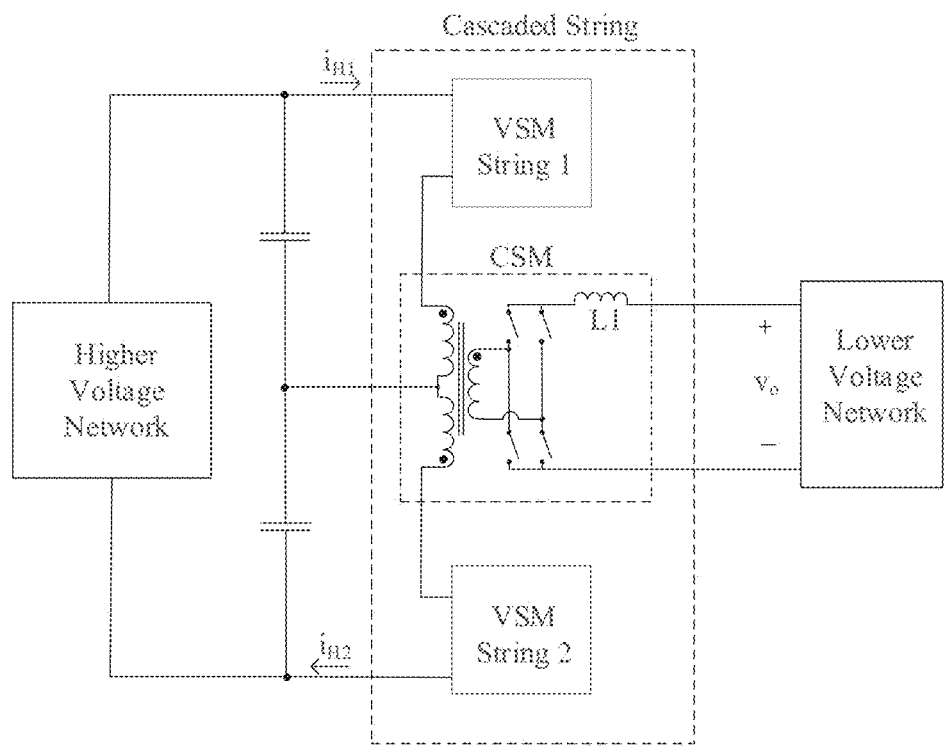
Figure 83:
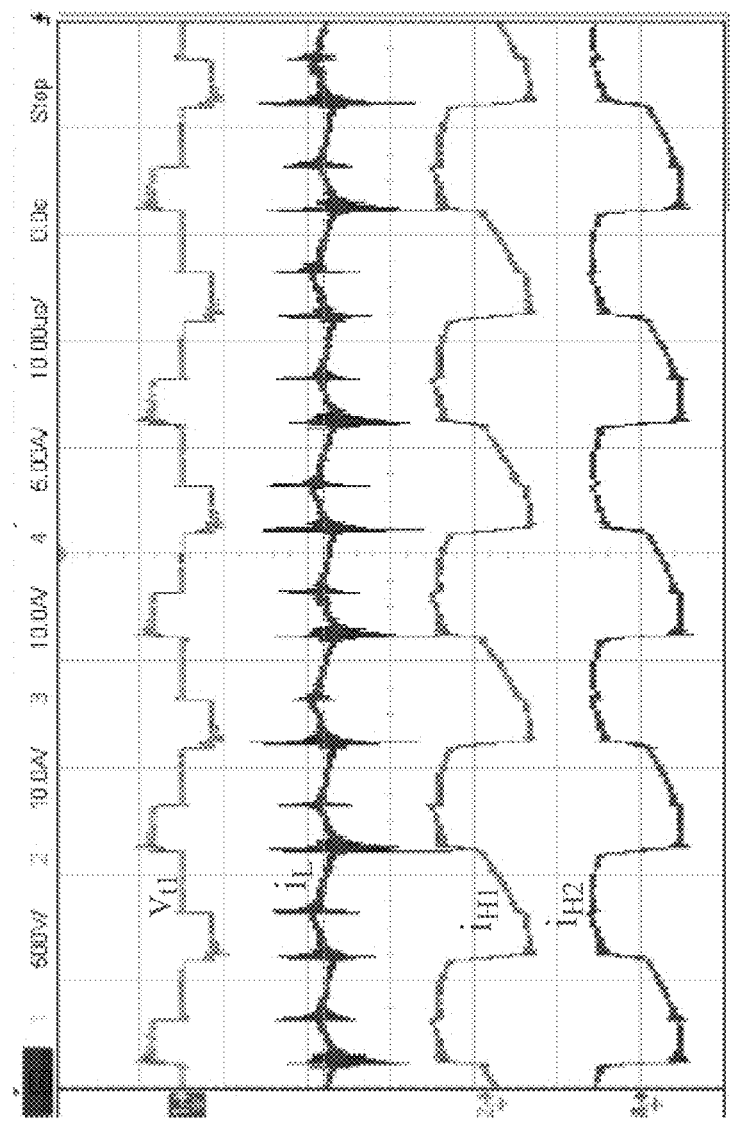

FIG. 83 presents steady-state experimental results for the alternate embodiment of the converter circuit of FIG. 66. These experimental results demonstrate galvanic isolation, DC flux cancellation in the transformer and DC current blocking with the input filters. The two string currents are identical but phase shifted by $T_{ac}/2$ in some embodiments of the converter circuit. Where, $T_{ac}$, represents the fundamental AC period. The effective frequency of the converter is related in some embodiments to the fundamental AC period by the following relation: $f_{ac}=1/T_{ac}$.

Figure 84:
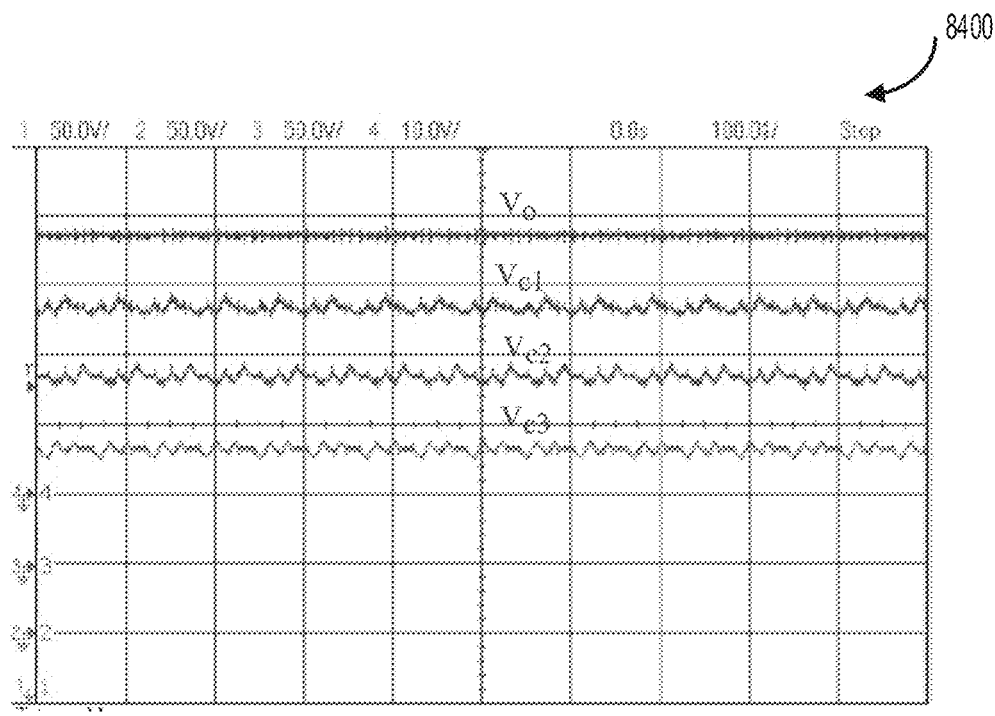
Figure 84:
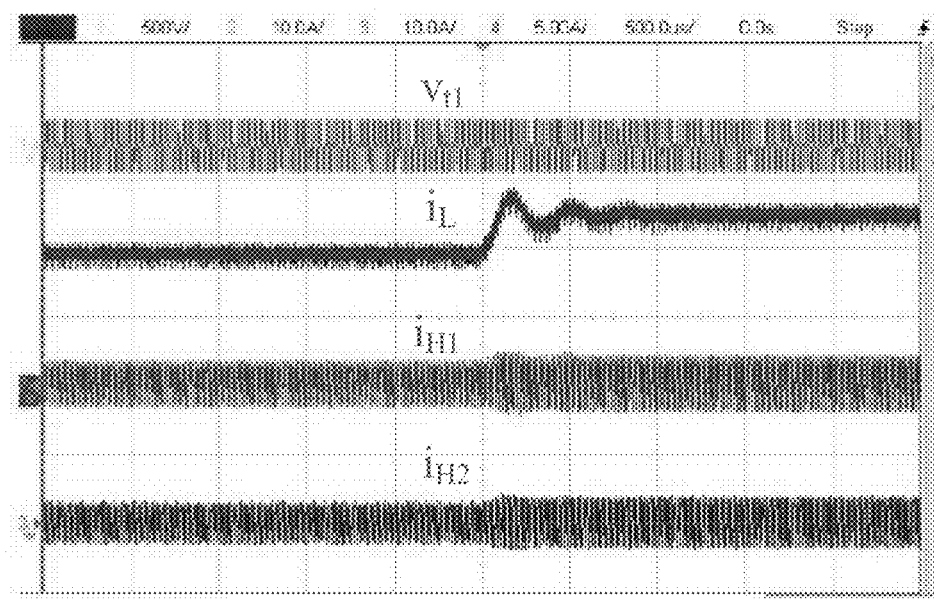

FIG. 84 presents transient experimental results for the alternate embodiment of the converter circuit of FIG. 66. The converter is shown to respond fast to a step change in the load.

DETAILED DESCRIPTION

Embodiments described herein are directed to a modular multi-level power-electronic converter which enables power exchange between a higher-voltage DC network and a lower-voltage DC network through a string of power electronic sub-modules, that comprise of a mixture of voltage sub-module elements and a current source sub-module element.

There are two main variations described in this application.

Figure 1:
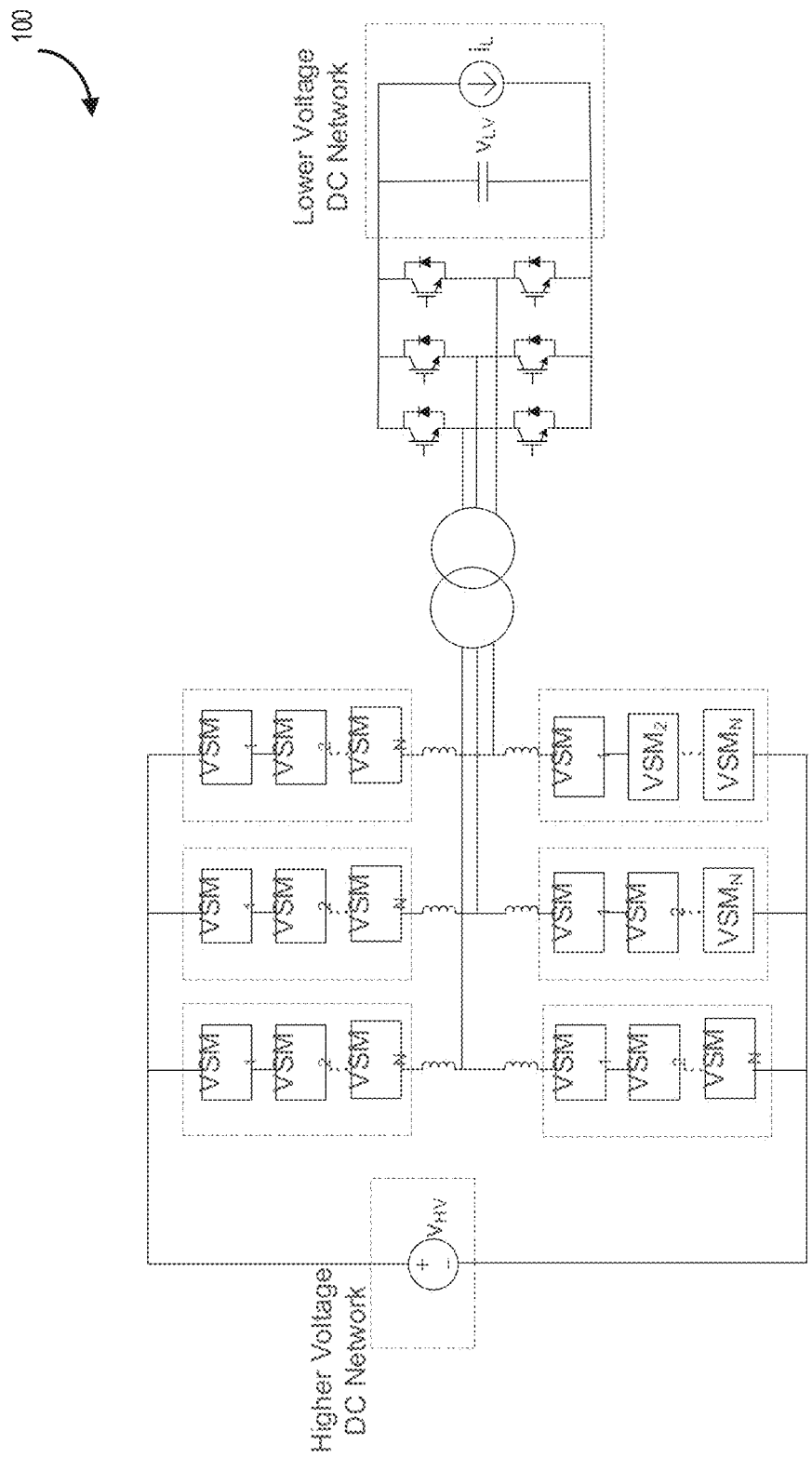
FIG. 1 presents a dual-active bridge circuit with a multi-modular converter front-end on one side of the transformer and a 2-level voltage source converter on the other side of the transformer. The multi-modular converter front-end interfaces the higher-voltage network and the 2-level voltage source converter interfaces the lower-voltage network.
Figure 58:
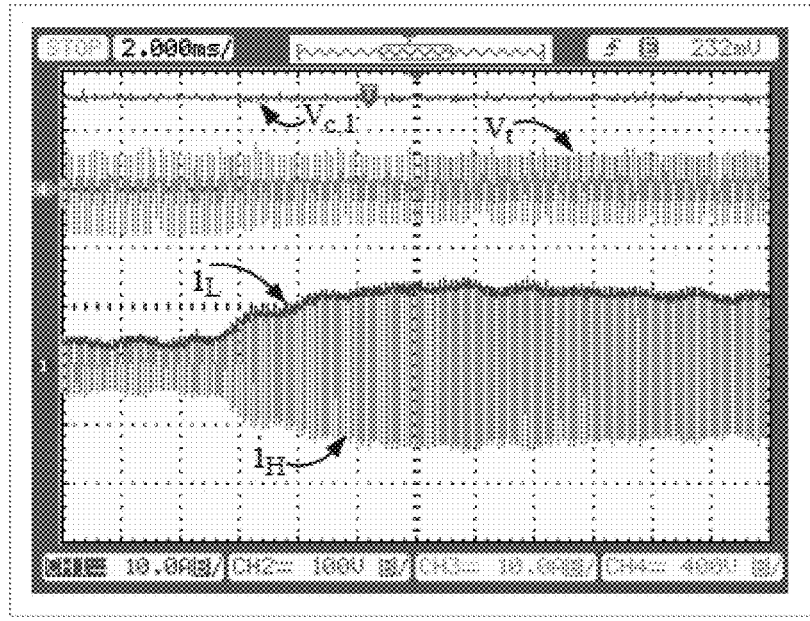
FIG. 58 presents transient experimental results for an alternate embodiment of the converter circuit. This is for the topology of FIG. 38.
Figure 58:
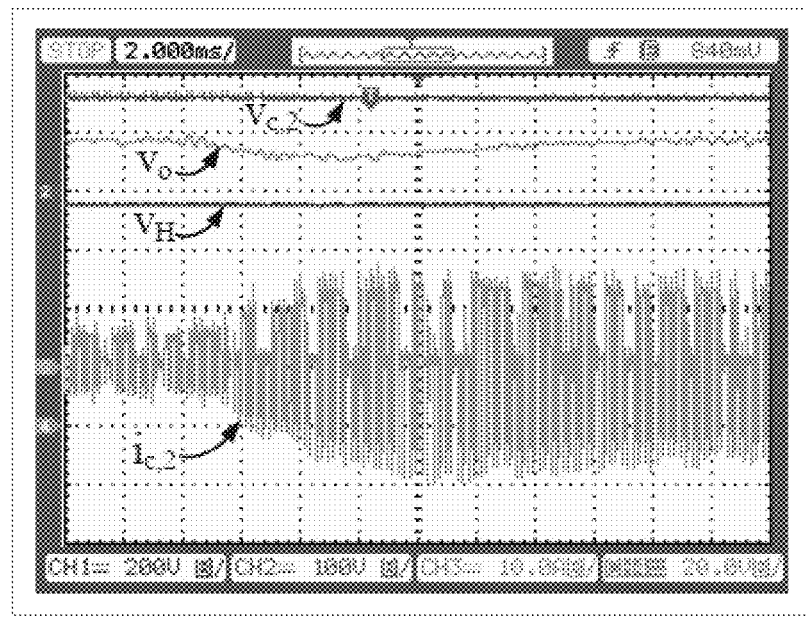

In a first main variation shown in FIGS. 1-58, the power electronic converter is able to transfer power from a higher voltage DC network to a lower voltage dc network all while maintaining capacitor charge balance of the VSM cell capacitors. If charge balance of the VSM cell capacitors were not maintained, the cell capacitor voltages would either continually rise and therefore overcharge or otherwise the cell capacitor voltages would collapse. The power electronic converter is able to maintain charge balance of the VSM cell capacitors through its use of a current source module (CSM). Through the use of a CSM, the converter is able to change the direction of the current into the VSM cell capacitors through changing the state of the CSM. The CSM is able to essentially force a current to flow down or up the VSMs, which is described in further detail in various embodiments. It is through a controlled switching action that the converter is able to force current from inductive elements upwards or downwards through the VSM strings.

This ability to change the direction of the current through switch action enables the current to be flipped rapidly and in some cases nearly instantly. Accordingly, this allows the system to change the power flow into each individual VSM rapidly and balance the power so that the cell capacitors do not charge or discharge over a longer period interval of time so that it maintains charge balance over time. This ability to change the direction of the string current nearly instantly enables the cell capacitor voltages to achieve charge balance over a short time in some embodiments. Therefore, this allows the cell capacitors to be realized with very low cell capacitances. This cell capacitance can be potentially reduced, for example, by up to a 100× factor if this power electronic is run at high frequencies compared to other approaches.

Since, the cell capacitance is proportional to the energy in a cell capacitor, the cell capacitors can be made physically small and thus the volume of the converter can be reduced significantly and therefore this power electronic circuit has the ability to achieve much greater power densities.

The VSMs in the power electronic circuit set the voltage appearing across the input terminals of the CSM. The VSMs, in effect, step-down the higher voltage DC network voltage and in this way, a much lower voltage is appearing across the CSM input terminals. When transitioning between different CSM states, only a fraction of the total number of VSM switches are switched. This is advantageous as it results in reduced switching losses in the VSMs compared to if all VSM switches were to be switched.

In the second main variation, shown in FIGS. 59-84, in selected CSM configurations, the topology is configured such that zero dc voltage appears across this input to the CSM module, yielding a special configuration that makes integration of transformer isolation within the CSM itself possible. This allows galvanic transformer isolation to be introduced using fewer switching devices, reducing complexity, part count and cost. Typically, DC current within a transformer leads to a DC magnetic flux superimposed on the AC flux needed for power transfer. This leads to the need for a larger transformer core. Transformer size reduction is achieved through a process of DC flux cancellation in variant embodiments, which ensures zero net DC flux within the magnetic core of the transformer. Through elimination of DC flux in the transformer, a lower peak flux level is achieved requiring less ferromagnetic material for the transformer core. Additionally, through controller control action, in variant embodiments of the second main variation, the converter does not need to measure the cell capacitor voltages. In this way, the converter is able to achieve self-balancing and therefore is much simpler than approaches that require the cell capacitor voltages to be measured. The circuit architectures for implementing the above variations can be described as a circuit topology, and can includes a system established using electronic circuitry and devices which interoperate with one another to, in concert, provide the improved step down or step up power conversion. The circuitry can include energy storage elements, power electronics components (e.g., capacitors, inductors), and switches (e.g., transistors). The switches are controlled through the operation of a switch controller circuit, which may control the operation of the switches based on a switching pattern provided through, for example, machine interpretable instruction sets stored on non-transitory machine readable media for execution by a processor of the switch controller circuit. The switching pattern, for example, can be generated using pulse-width modulation and function generators.

As described in various embodiments herein, the modular multi-level power-electronic converter is an improved electronic circuit topology that is adapted for power conversion. The improved power conversion, for example, can have practical advantages in commercial applications, for example, in relation to DC power distribution, where the circuit of some embodiments can be used in place of or complementarily with traditional AC transmission networks. For example, a circuit according to some embodiments can be used to step down the DC grid voltage to a residential voltage level, performing a similar role to the traditional AC transformer but for DC systems. Distributing DC power directly allows a potential user to avoid having to incur the AC/DC stage conversion losses when interfacing a DC source or DC load to a conventional AC power distribution system.

Instead, DC power can be distributed to the homes instead. A reason why conventionally, DC distribution grids are not typically utilized is because the type of system described in embodiments herein have not been conventionally available—AC is easy to step down, and the topology of some embodiments described herein effectively performs this function using solid state components.

The device of some embodiments has the potential to be cost competitive relative to the AC transformer solution for stepping down voltages given its minimal power number of power electronics, relatively simple control, and ability to circulate harmonic currents and voltages at frequencies higher than line frequency (i.e., 50 or 60 Hz, for example).

The ability to circulate higher order frequencies enables significant reductions in the capacitor and inductor size within the converter topology as well as the internal transformer for some embodiments of the converter circuit with the optional isolation stage.

Therefore, the form factor of this device can be made potentially smaller relative to that of a conventional AC transformer.

Additionally, while the cost of the AC transformer is an important consideration for comparing relative costs, it is also the cost of installation that is important to consider. It can be costly to install a conventional line frequency transformer involving specialized equipment and personnel. Its relatively large size also tends to require more than 1 worker to install. Given the potential for the device of some embodiments to be of a small form factor, the installation cost has the potential to be significantly cheaper and potentially may only require 1 worker.

In the other DC/DC topologies that have been proposed such as that of FIG. 1, which is a three-phase modular multi-level converter interfaced to a transformer. These topologies tend to involve more number of voltage submodules than of the embodiments described herein, i.e. 6 inductors and a transformer. This will be costly and involves relatively more volume.

Other approaches have attempted to replace one of the switches of a conventional topology (buck, boost converters, for example) meant for lower voltage applications with a string of cascaded VSMs. In these other topologies, the lower voltage network and the VSM string is interfaced through 1 switch and 1 diode, and there may also be a extra inductor that is in series with the VSM string.

It is important to note that in some embodiments of the proposed topology described herein, this extra inductor is not provided as it would be detrimental to the performance. Accordingly, some of the proposed topologies described herein maximize performance by eliminating inductance in series with the VSM string.

Compared with these approaches, the CSMs of the proposed topologies have at least 3 states because they all have at least two switches (switch 1 on, switch 2 off, switch 1 off, switch 2 on, switch 1 and switch 2 on). By having three states, the proposed topologies are able to transfer power to the CSM (or from) even when the string current is negative, in contrast to other approaches where power is transferred to the CSM only when the string current is positive. The proposed topologies herein have a defined positive string current value and a defined negative string current value, and are adapted such that one can impose objectively large positive and negative voltages across the input terminals of the CSM without any issue, in contrast with the other approaches where the string current is uncontrolled when a negative voltage is applied across the input terminals of the CSM and therefore one would need a large inductor in series with the VSM string to limit the rate of rise of the current. Furthermore, other approaches have challenges dealing with resonance frequencies being excited within the circuit which are not a challenge in the proposed topologies. Other approaches may require the converter to be operated at a low frequencies (100$s$ to low kHz frequency range), while the proposed topologies described herein can operate at a higher frequency, such as 50 kHz which has been demonstrated experimentally.

Also, the device of some embodiments described herein, can be configured to only include a single string (although not all embodiments are limited to one string). The three-phase modular multi-level converter being of three strings in parallel adds additional control complexity when the current circulating between the phases is controlled and makes the inductors between the arms necessary to limit the current circulating between the phases, for instance.

Accordingly, an increased simplicity and reduced number of components is potentially possible, which is a useful advantage for practical implementations. As noted in some non-limiting variant embodiments, power can also flow bi-directionally, similar to an AC transformer, with power flowing from the low voltage side to the high voltage side. An example scenario, is home energy storage device or an electric vehicle. Both the home energy storage device and the energy vehicle could then supply power back to the DC grid for a bi-directional converter, which could be useful in emergency situations, among others. A useful for scenario for this may injecting power from solar arrays or battery systems into high voltage DC network; or injecting power from households into DC distribution network.

Accordingly, in another example application, the device can be used to collect energy at DC voltages for consumption without having to incur losses associated with DC/AC or AC/DC conversion. These losses can be significant.

For example, in the context of a large solar array, power could be collected at medium voltage DC, and then consume the DC power without ever any DC/AC or AC/DC conversion (e.g., for charging a car using a solar array).

Efficiency is an important consideration, especially for green technologies, and while it may depend on an application and power level, the circuit of some embodiments can potentially achieve up to 50% conversion loss reduction, and the solid state step down conversion stage can be physically smaller and lighter than a comparable AC transformer. An AC transformer at line frequency is typically large for distribution applications. Solid state switches are therefore physically smaller than a line frequency AC transformer. Furthermore, the size of an inductor and capacitor is tied to the frequency of the voltage and current across or into that inductor or capacitor, respectively.

Given solid state switches that can be switched at frequencies much greater than line frequency, it is possible to impose voltage and currents across the inductor and capacitor at frequencies greater than line frequency which enables the inductor and capacitor to be of reduced size.

The result is that the electronic components (e.g., inductor, capacitor) with a solid state step-down conversion stage can shrink by increasing the switching frequency in some embodiments. Additionally, with future device advances it is possible to realize smaller solid state converters however the line frequency AC transformer for a fixed AC voltage level can be assumed to be relatively fixed in the future.

As power electronics becomes cheaper, the topology of some embodiments becomes cheaper due to its use of solid state components—whereas, the cost of AC transformers rise along with costs of raw materials. Accordingly, an increased variety of applications are possible in view of components with lower cost, reduced volume and weight. For instance, a typical AC transformer is required to serve a number of houses due to its size and cost (e.g., a pole-mounted transformer). However, circuits according to some embodiments described herein can serve a role similar to the typical AC transformer (but for DC/DC power conversion) and can be made smaller in volume (e.g., transportable by car), with simpler installation, and can be used on a per-house basis.

Embodiments are directed to a modular multi-level DC/DC power electronic converter for transferring power from or between a higher-voltage DC network and a lower-voltage DC network.

The power electronic converter features a series connection of low-voltage voltage source modules (VSM) and a current source module (CSM). The series connection of the sub-module elements forms a string. The higher-voltage DC network is interfaced to the converter by connecting across the outer terminals of the string. The lower-voltage DC network is interfaced to the converter through the CSM.

This interface can either be direct or indirect through an optional isolation stage between the CSM and the lower-voltage DC network. In this mechanism, the power inductors are separated from the high voltage string of series connected VSMs by the CSM switching device.

By separating the power inductors, commutation intervals are limited by the leakage inductance of the high-voltage loop allowing for a near square-wave current at high-frequencies to propagate down the series string of VSMs. The CSM switching device features two or more inductors which share the low-voltage DC network current. This sharing of the current reduces the rms current conducted by the VSM cells and minimizes the transformer DC-current component in one of the embodiments of the isolation stage.

Some of features of embodiments of the converter include high-step down ratio capability, transformer-less operation capability, bi-directional power transfer capability, an optional grounding circuit, ability to deliver near constant power to the lower-voltage and/or the higher-voltage side and a comparatively simple control when compared to the traditional modular multi-level converter.

Figure 2:
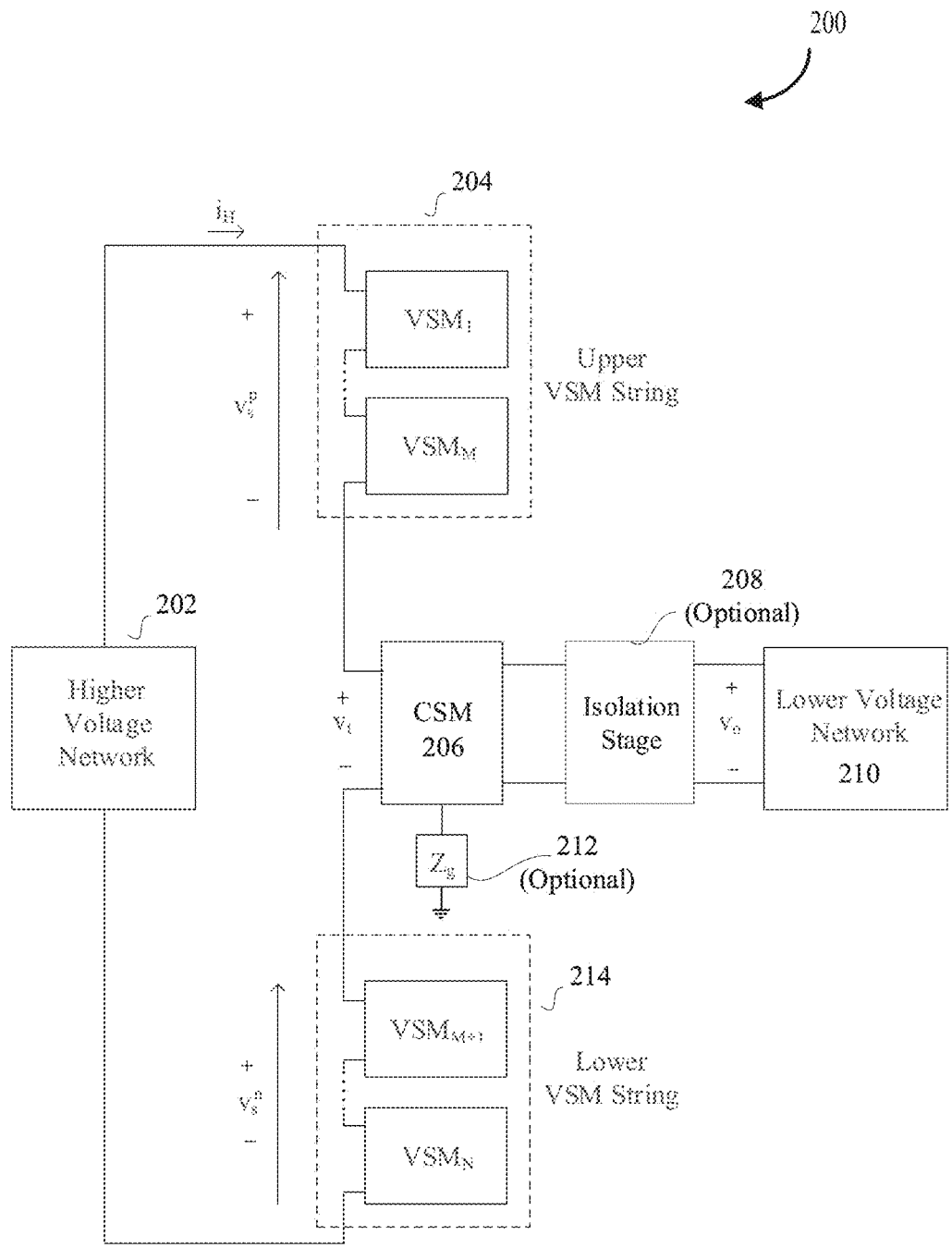
FIG. 2 presents a high-level block diagram of a topology of some embodiments. The topology includes the following elements: a higher voltage DC network, lower voltage DC network, sub-modules of voltage source type, a sub-module of current source type, an optional isolation stage and an optional grounding circuit.

A high-level block diagram of a proposed circuit topology of some embodiments is provided in FIG. 2. In some embodiments, a converter consists of a higher-voltage DC network 202, two voltage-source sub-module strings 204 and 214, a current source sub-module 206, a lower voltage DC network 210, an optional isolation stage 208 and an optional grounding circuit 212. A more detailed version is presented in FIG. 3. Alternate embodiments are presented in FIG. 4 and FIG. 5.

Figure 6:
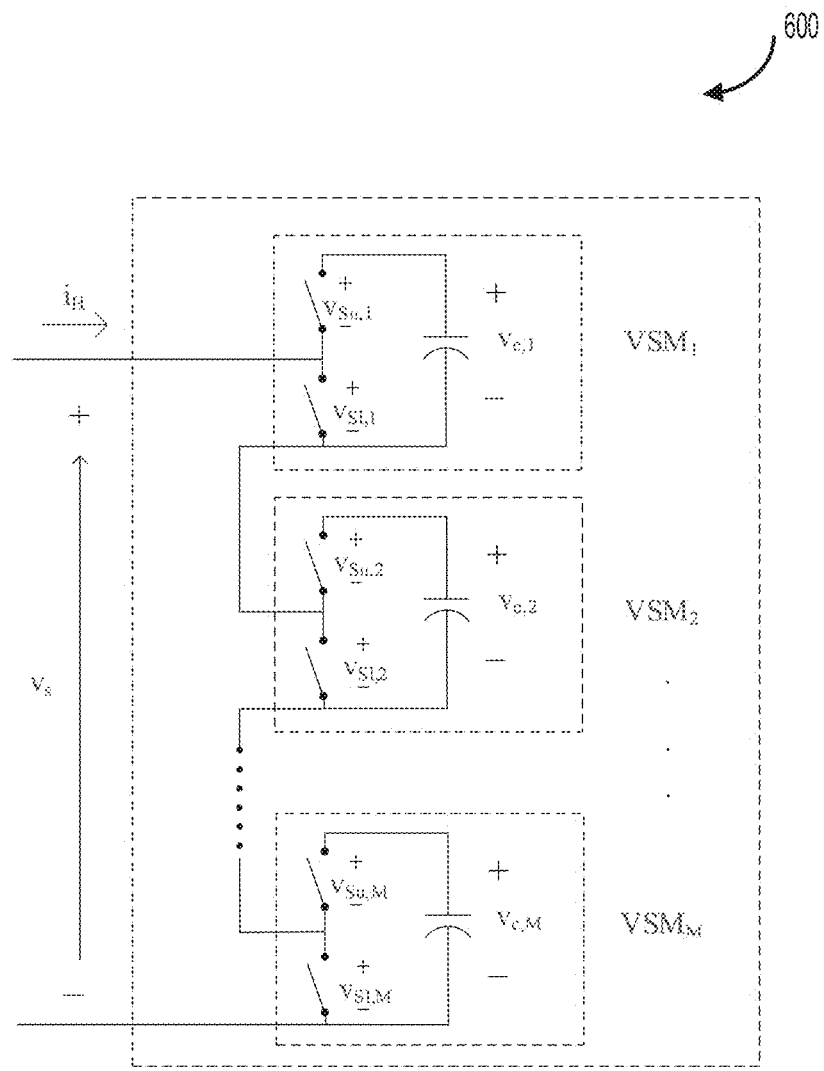
FIG. 6 presents an embodiment for the voltage source sub-module strings of FIG. 2.

A detailed version of the string of voltage source sub-modules is presented in FIG. 6. A detailed version of the current source sub-module is presented in FIG. 7. Two embodiments of the isolation stage are presented in FIG. 8 and FIG. 9.

Figure 10:
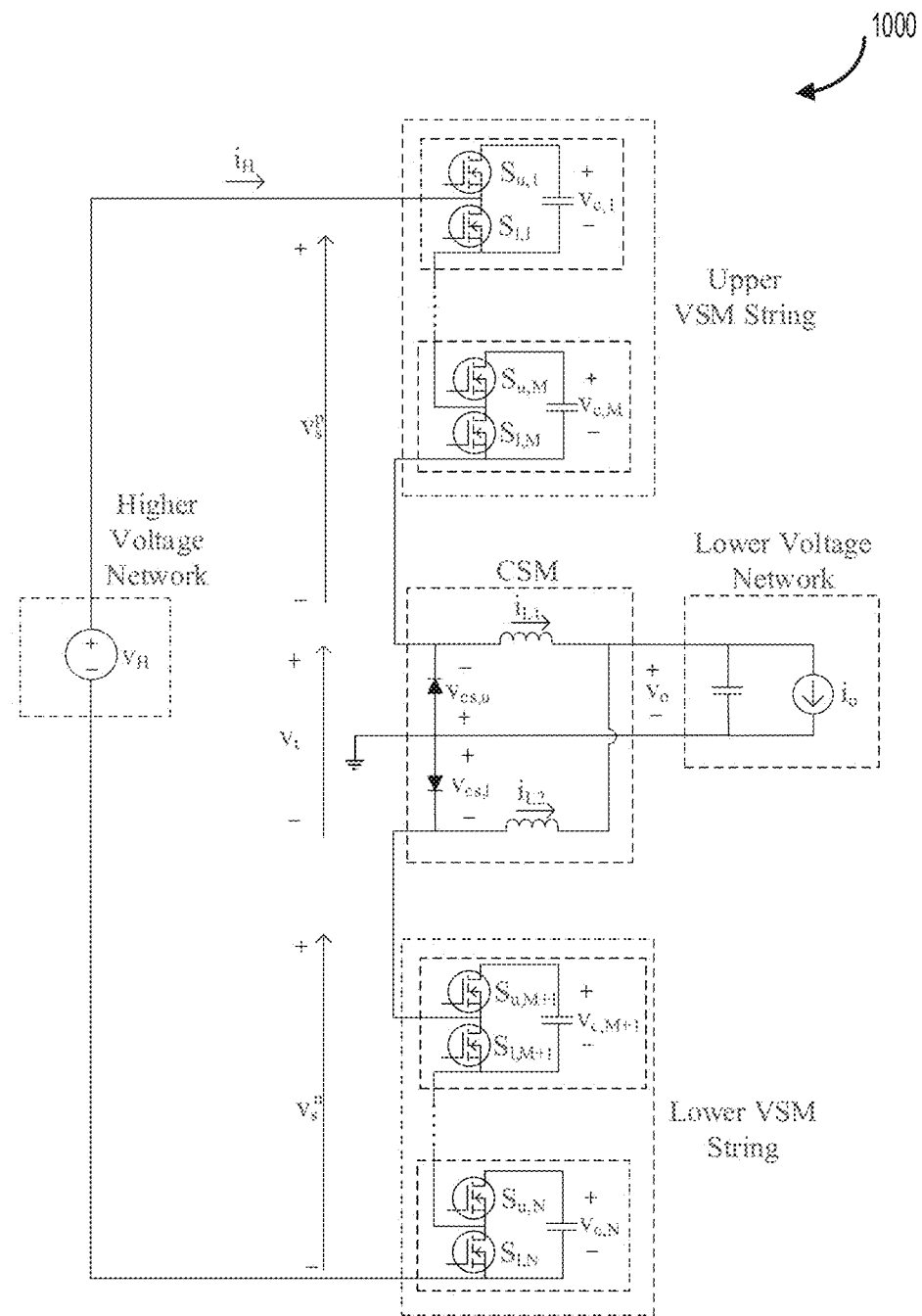
FIG. 10 presents an example implementation configured for uni-directional power flow from the higher-voltage network to the lower-voltage network.

An example implementation configured for uni-directional power flow from the higher-voltage to the lower-voltage network (forward power transfer mode) is presented in FIG. 10. An example implementation configured for bi-directional power flow exchange between the higher-voltage and lower-voltage networks is presented in FIG. 11.

In the following section the main elements of some embodiments are described. This is followed in a later section by a description of the operating modes, control design considerations and circuit element rating considerations.

Description of the Component Blocks

Cascade String of Voltage-Source Sub-Modules

A detailed representation of the voltage source sub-module string 204 and 214 of FIG. 2 is presented in FIG. 6. An example implementation of a VSM string is presented in FIG. 12.

The VSM string consists of a cascade connection of voltage source sub-module elements. In an embodiment, the sub-modules are of half-bridge type. Three half-bridge cells are drawn in FIG. 6. Each half-bridge sub-module consists of two series switches and a capacitor across the outer terminals of the two switches.

In an embodiment, the voltage sub-modules are distributed to two strings as can be observed in FIG. 2. The VSM strings can be considered as a variable voltage sources with fixed voltage steps. If half-bridge type sub-modules are considered, the variable voltage source has an output voltage that can range from 0 to $v_{s,max}$.

Where, $v_{s,max}$ is defined as follows, $$v_{s,max} = \sum_{i=1}^{M} v_{c,i} \tag{1}$$

Where, M is the number of voltage sub-modules in the string; $v_{c,i}$ is the voltage of sub-module i; and $v_{s,max}$ is the sum of all the individual sub-module voltages for the string. The maximum voltage is realized when all sub-modules in the string are inserted in the circuit.

Figure 12:
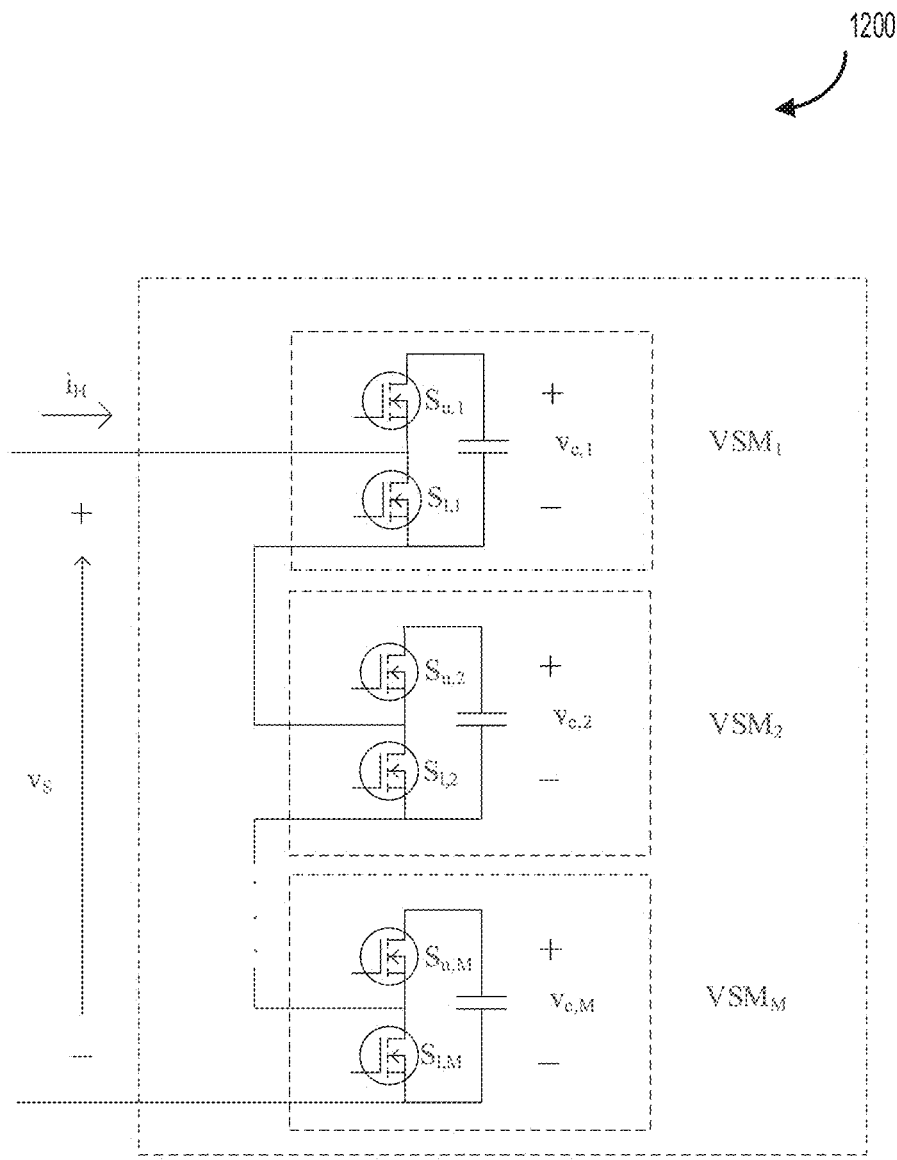
FIG. 12 presents an example implementation of the voltage source sub-module strings of FIG. 2.

The minimum voltage of 0 V is realized when all sub-modules in the string are by-passed. Referring to FIG. 12, $VSM_1$ is inserted into the circuit if switch $S_{u,1}$ is on (i.e. $S_{u,1}=1$) and $S_{l,1}$ is off (i.e. $S_{l,1}=0$); and conversely $VSM_1$ is by-passed if $S_{u,1}=0$ and $S_{l,1}=1$.

Figure 3:
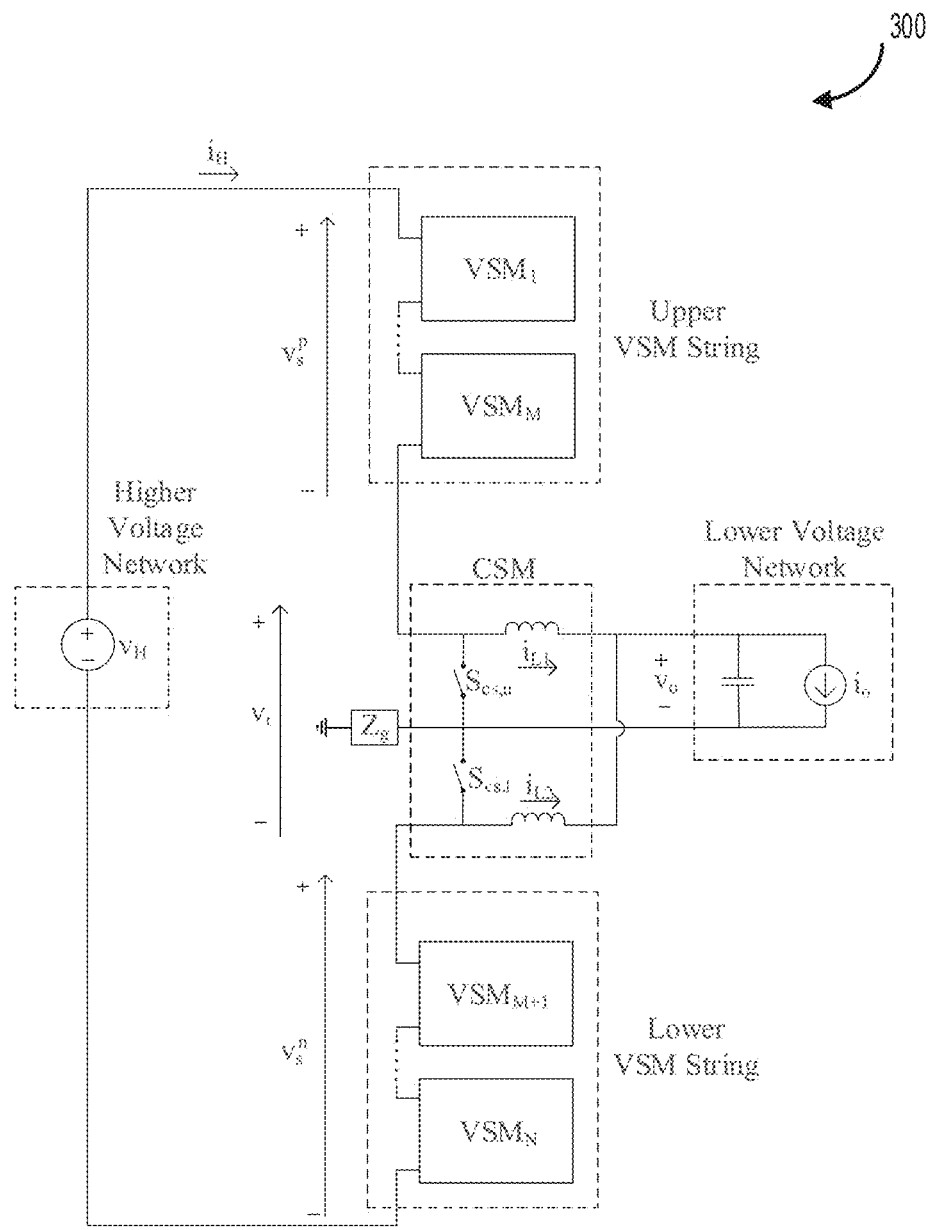
FIG. 3 presents a variant embodiment of FIG. 2.

Referring to FIG. 3, the upper VSM string is electrically connected such that the positive polarity end of the VSM string is electrically connected to the positive terminal of the higher-voltage network and the negative terminal is electrically connected to the positive terminal of the CSM switching device. The lower VSM string is electrically connected such that the positive polarity end of the string is electrically connected to the negative terminal of the CSM switching device and the negative polarity end of the VSM string is electrically connected to the negative terminal of the higher-voltage network. With this configuration of the two strings, each string inserts a variable positive voltage which is of opposite polarity to the higher-voltage network voltage. This enables the VSM string to step-down the higher-voltage network voltage to a lower-voltage at the input terminals of the CSM. Higher-voltage network refers to higher-voltage DC network in this disclosure. Lower-voltage network refers to lower-voltage DC network in this disclosure.

In this disclosure, the term "electrically connected" is meant in the same way as the term electrical bonded or the alternative expression electrically bonded through a low impedance.

In this example, the sub-module at the positive polarity end of the VSM strings is called the upper sub-module ($VSM_1$ for the upper VSM string and $VSM_{M+1}$ for the lower VSM string of FIG. 3); and the sub-module at the negative polarity end of each of the VSM strings is called the lower sub-module ($VSM_M$ for the upper VSM string and $VSM_N$ for the lower VSM string of FIG. 3). The upper VSM string is also termed the first VSM string. The lower VSM string is also termed the second VSM string.

By having a symmetrical string of sub-modules on each side of the CSM (position 204 and 214 of FIG. 2) a DC-voltage approximately equal to ½ the high-voltage network voltage, $v_H$, can be imposed by each string, for example. This symmetrical application of ½ the DC voltage in bipolar or floating high-voltage DC networks may minimize the insulation stress on the converter elements in some embodiments of this converter circuit, for instance. In addition, through this symmetrical application of ½ the DC voltage, the low-voltage DC-network can be solidly or low-impedance grounded in specific applications which can be advantageous from a safety and insulation coordination design perspective. With sub-modules on either side of the CSM it is understood that that the string is configured with at least one VSM connected to each of the two AC terminals of the CSM.

It should also be noted, that it is possible to use only 1 string of sub-modules rather than the 2 strings considered in an embodiment. If only 1 string of sub-modules is employed this string can be located in either position 204 or 214 of FIG. 2. Additionally, it is also possible that the two strings of 204 and 214 may each be composed of multiple series connected VSM strings.

A single string of sub-modules could be advantageous when one of the higher-voltage grid DC terminals is grounded or near ground potential.

The 2 strings of sub-modules could be advantageous when the higher-voltage grid is of floating type and therefore neither one of the higher-voltage grid DC terminals is grounded.

Commercially, it may be advantageous to use more than 2 strings of sub-modules. For instance, multiple strings of voltage sub-modules with M cells could be employed. If M is less than N (where N is the total number of VSM cells required for the particular converter) then the total number of additional M cell strings (Ns) could be such that M*Ns> or equal to N, for example.

In an embodiment, the mid-point of the series switches of $VSM_1$ (upper most sub-module of the upper VSM string) is electrically connected to the positive polarity terminal of the higher-voltage network.

The mid-point of the $VSM_{M+1}$ (upper most sub-module of the lower VSM string) is electrically connected to an AC terminal of the CSM element (also termed the positive terminal of the CSM element).

In this disclosure, the term "stack" is also sometimes meant in the same way as the term a substring of voltage source modules or a string of voltage source modules.

For all other VSM sub-modules in the stack, the mid-point of the two series switches is electrically connected to the negative terminal of the capacitor above it. For instance, referring to FIG. 12, the mid-point of $VSM_2$ is electrically connected to the negative terminal of the capacitor of $VSM_1$. The negative terminal of $VSM_M$ (lower most sub-module of the upper VSM string) is electrically connected to the other AC terminal of the CSM element (also termed the negative terminal of the CSM element). The negative terminal of $VSM_N$ (lower most sub-module of the lower VSM string) is electrically connected to the negative terminal of the higher-voltage network.

It is equivalently possible to connect the VSM string such that the positive terminal of the upper most sub-module (sub-module 1 in FIG. 4) is electrically connected to the positive polarity terminal of the higher-voltage network for the upper string or to the negative terminal of the CSM element for the upper most sub-module of the lower VSM string.

In this configuration, the mid-point of the lower-most sub-module is electrically connected to the positive terminal of the CSM element for the upper VSM string and to the negative terminal of the higher-voltage network for the lower-most sub-module of the lower string. For all other sub-modules of this alternate configuration of the string, the positive terminal of the sub-module is electrically connected to the mid-point of the two series switches of the sub-module above it ($VSM_1$ in FIG. 12 is above $VSM_2$, for instance).

Note, electrically connected is used in the same context as electrically bonded.

In some embodiments of the converter circuit, the VSMs are of half-bridge type and the VSM contain a positive and negative external terminal. The positive and negative external terminals of the VSM are electrically bonded to the midpoint and the negative terminal of the VSM cell capacitor, respectively; or the positive and negative external terminals are electrically bonded to the positive terminal of the VSM cell capacitor and the midpoint of the VSM, respectively. In this embodiment with VSMs of half-bridge type, the positive external terminal of the first VSM of the first VSM stack is electrically bonded to a positive terminal of the higher-voltage DC network; and the negative external terminal of the last VSM of the second VSM stack is electrically bonded to a negative terminal of the higher-voltage DC network. Referring to the preferred embodiment of FIG. 2, the upper VSM string 204 is the first VSM stack and the lower VSM string 214 is the second VSM stack.

The negative external terminal of the last VSM of the first VSM stack ($VSM_M$ in FIG. 2) is electrically bonded to a first AC terminal of the CSM; and the positive external terminal of the first VSM of the second VSM stack ($VSM_{M+1}$ in FIG. 2) is electrically bonded to the other AC terminal of the CSM. Note, when there is only one VSM in the first VSM stack the first and last VSM will be the same VSM in that stack. Similarly, when there is only one VSM in the second VSM stack the first and last VSM are the same VSM in that stack.

When there are two or more VSMs in the first VSM stack and/or the second VSM stack, the negative external terminal of all the VSMs excluding the last VSM of the stack are electrically bonded to the positive external terminal of the adjacent VSM in the sequence (i.e., the negative external terminal of the first VSM is electrically bonded to the positive external terminal of the second VSM in the stack).

For example, in reference to FIG. 6, the negative external terminal of $VSM_1$ is electrically bonded to the positive external terminal of $VSM_2$. Similarly, the negative external terminal of $VSM_{M-1}$ is electrically bonded to the positive external terminal of $VSM_M$.

There are two terminals on each VSM stack. These are termed the positive and negative terminal of the VSM stack. Referring to FIG. 6, VSM1 is electrically bonded to the positive terminal of the VSM stack and $VSM_M$ is electrically bonded to the negative terminal of the stack. In the preferred embodiment, the VSMs are of half-bridge type and therefore can only output a unipolar voltage. Therefore, in this preferred embodiment of the converter circuit the voltage across the stack, which is labelled as vs in FIG. 6, is a unipolar voltage. The voltage $v_s$ will be greater than or equal to 0 V in some embodiments of the converter circuit. The first VSM in the stack is connected to the positive terminal of the stack. The last VSM in the stack is connected to the negative terminal of the stack. If there is only one VSM in the stack the first and last VSM refer to the same VSM. If there are three VSMs then the second VSM is connected to both the first VSM and the last VSM. If there are four VSMs then the second VSM is connected to the first VSM and the third VSM; and the last VSM is connected to the third VSM. Therefore, in general for a cell K in the stack (K being an integer greater than 1), the cell will be connected to the K−1 and K+1 cell in that stack (if there is a K−1 and K+1 cell in the stack).

The minimum requirements for the switches of the voltage source sub-modules are positive voltage blocking and bi-directional current conduction capability. Examples of switches that meet this criterion are MOSFETs and IGBTs with anti-parallel diodes, for instance.

Note, when referring to a first and second VSM stack it is understood that the first stack could be composed of multiple sub-stacks. For instance, the first stack may consist of M submodules. However, these M submodules may be distributed to some integer number P substacks. The M submodules would then be divided between these P substacks, in some embodiments. For example, if N was 10 and P was 5 then each of the 5 substacks may contain 2 VSMs in some embodiments. It is also possible that some of the substacks would contain more or less VSMs then other substacks. This is only one such example.

In an embodiment, all sub-modules are of identical type and design. It is noted that it is not necessarily limiting in all embodiments.

It is also possible to use different voltage sub-module types other than the half-bridge sub-module shown in FIG. 6. It is also possible to have voltage sub-module strings with different types of voltage sub-modules such as a mixture of full-bridge and half-bridge sub-modules. The sub-modules within a VSM string can also feature different nominal voltages values and states-of-charge for instance. Additionally, while in an embodiment a symmetrical distribution of voltage sub-modules are in the upper and lower VSM strings, a symmetrical distribution of voltage sub-modules in the upper and lower VSM strings is not required.

Additionally, it is possible to parallel multiple voltage source sub-module strings. By paralleling the voltage source sub-module elements, the high-voltage (HV) loop current can be shared between the strings. If paralleling voltage sub-module strings, a di/dt reactor can be employed to limit the di/dt current between the strings which may result due to voltage imbalances between the strings, for instance. Additionally, for each individual VSM it is possible to parallel or series connect multiple capacitors. It is also possible to parallel and/or series connect multiple switches to increase the current conduction and/or voltage blocking capabilities respectively, for instance.

A HV loop is important because if there are two parallel strings for instance, the switches of the VSM and the VSM cell capacitors only have to be rated for ½ the current (when compared to the case where there is only have 1 VSM string). Therefore, the system can use cheaper VSM switches and physically smaller capacitances. This also enables one to scale this converter for higher power applications potentially since there are less limitations by available switch technology.

We gives us more control freedom which can add additional new features to the converter. For instance, we could operate two VSM strings that are parallel in such a way that the ac current component of the current into the two vsm strings is cancelled and so that that only dc current flows into the higher voltage network. This would negate the need for an input filter for instance.

Current-Source Sub-Module

Figure 7:
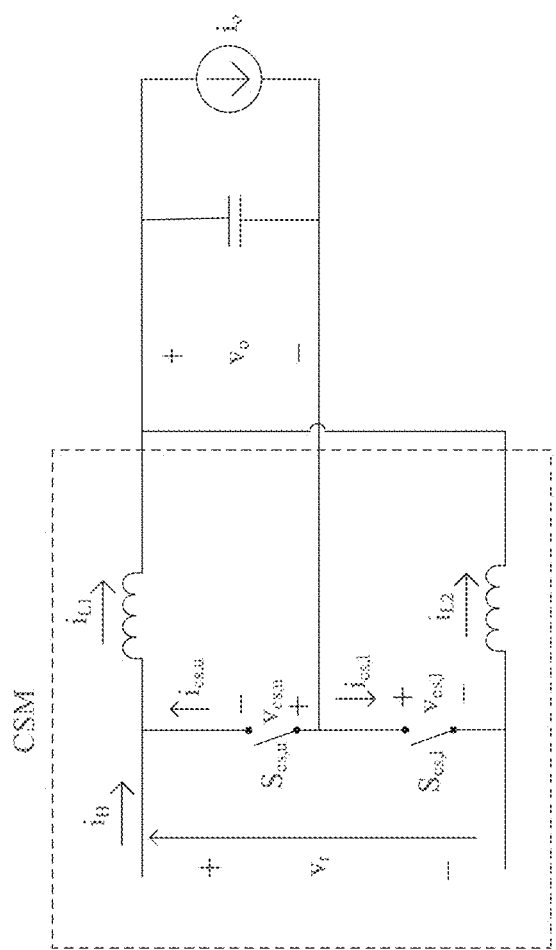
FIG. 7 presents an embodiment of the current source sub-module of FIG. 2.

An embodiment of the CSM is presented in FIG. 7. Depending on the type of switch utilized, the CSM can feature either uni-directional or bi-directional power transfer capability. In an embodiment, the current source sub-module consists of two inductors and two switching devices. In this preferred embodiment of the CSM, the CSM is configured similar to a current doubler circuit.

The CSM has two AC side terminals and two DC side terminals in some embodiments. The AC terminals are not electrically bonded to either of the two DC terminals of the CSM in some embodiments. The AC terminals are connected in series with the VSMs. The DC terminals are connected to the lower-voltage DC network.

The CSM is configured such that both inductors can simultaneously either deliver current to or receive current from the lower-voltage DC network, yielding an amplified current to or from the lower-voltage DC network, respectively.

The states of the switches effect the direction of the current into the string of voltage sub-modules. For a set of CSM switch states, the current into the string is equal to the current in a CSM inductor. For an alternate set of CSM switch states, the current into the string is equal to the negative of a current in a CSM inductor.

Figure 19:
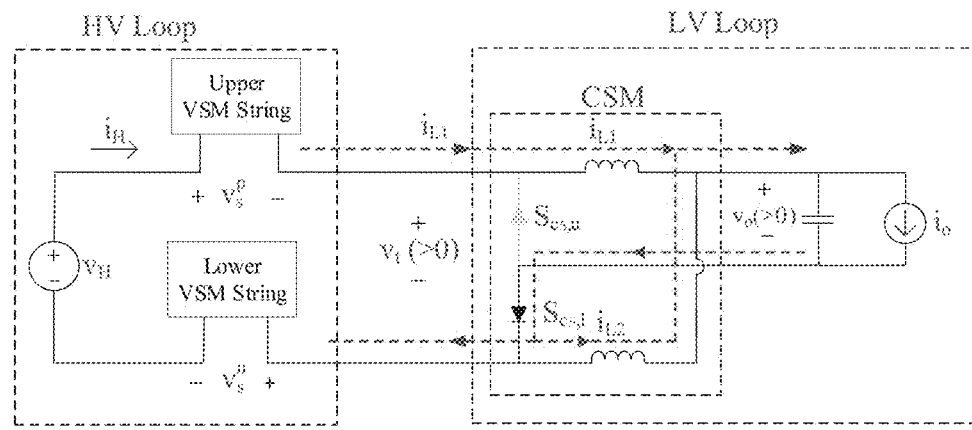
FIG. 19 presents the main operating modes for forward power transfer operation (power transfer from the higher-voltage to the lower-voltage DC network).
Figure 19:
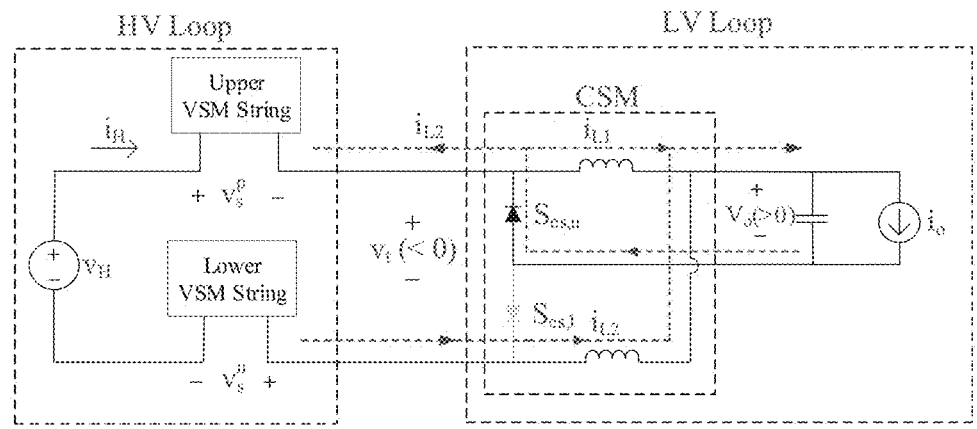

This is illustrated in FIG. 19 which shows the forward power operating modes for an embodiment. In both FIG. 19*a* and FIG. 19*b* the current of inductor L1, $i_{L1}$, and the current of L2, $i_{L2}$, sum together yielding an amplified current. This amplified current is delivered to the lower-voltage DC network.

Furthermore, in FIG. 19*a* the switch $S_{cs,u}$ is non-conducting (reverse biased) and switch $S_{cs,l}$ is conducting (forward biased) corresponding to a current in the string equal to the current in inductor L1. Additionally, in FIG. 19*b* the switch $S_{cs,u}$ is conducting (forward biased) and switch $S_{cs,l}$ is non-conducting (reverse biased) corresponding to a current in the string equal to the negative of the current in inductor L2.

Figure 13:
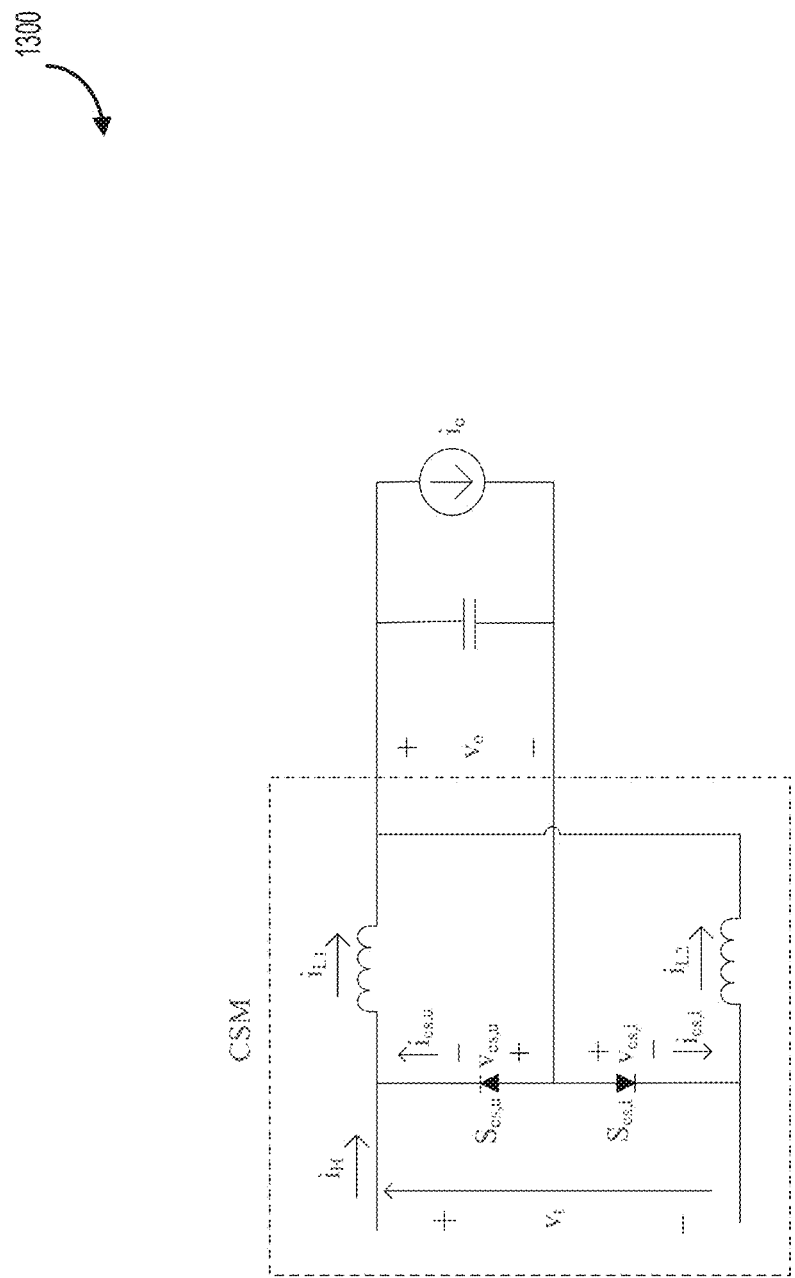
FIG. 13 presents an example implementation of the current source sub-module of FIG. 2. In this example implementation only uni-directional power transfer is possible.

For uni-directional power capability, the minimum requirements of the switch $S_{cs,u}$ is reverse-voltage blocking capability ($V_{cs,u}<0$) and positive current conduction capability ($i_{cs,u}>0$). The minimum requirements of the switch $S_{cs,l}$ is reverse-voltage blocking capability ($V_{cs,l}<0$) and positive current conduction capability ($i_{cs,u}>0$). Note, the location of switches $S_{cs,u}$ and $S_{cs,u}$ could also be interchanged. An example switch implementation with this capability are diodes as shown in the example implementation of FIG. 13.

Figure 14:
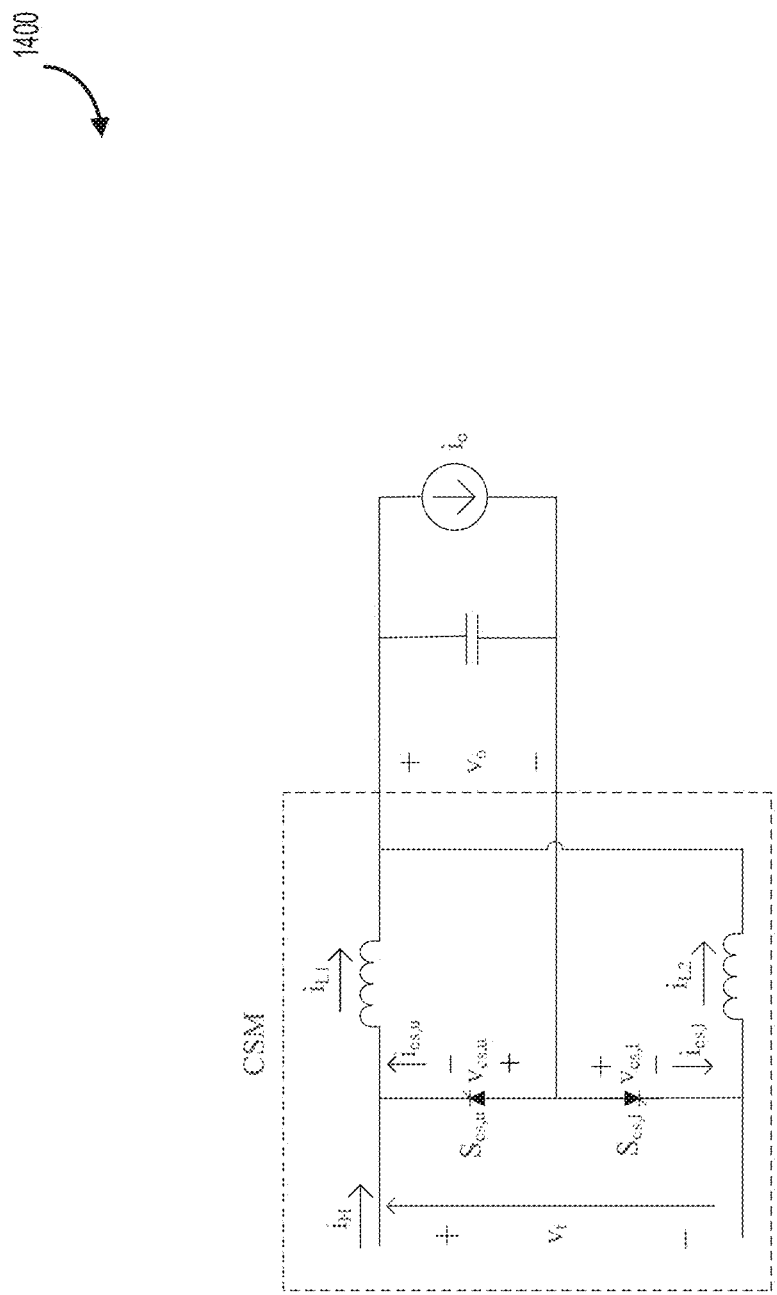
FIG. 14 presents an example implementation of the current source sub-module of FIG. 2. In this example implementation bi-directional power transfer is possible.

For bi-directional power capability, the minimum requirements of the controllable switch $S_{cs,u}$ is bipolar voltage blocking capability and positive current conduction capability ($i_{cs,u}$>0). The minimum requirements of the controllable switch $S_{cs,l}$ is bipolar voltage blocking capability and positive current conduction capability ($i_{cs,u}$>0). Note, the location of switches $S_{cs,u}$ and $S_{cs,u}$ could also be interchanged. An example switch implementation with this capability are thyristors as shown in the example implementation of FIG. 14.

It is also important to note that each of the 2 CSM switching devices of FIG. 3 could be made up of multiple series and/or parallel connected switches in-order to realize higher blocking voltages and/or increased current conduction capabilities, respectively.

Grounding Circuit

Figure 11:
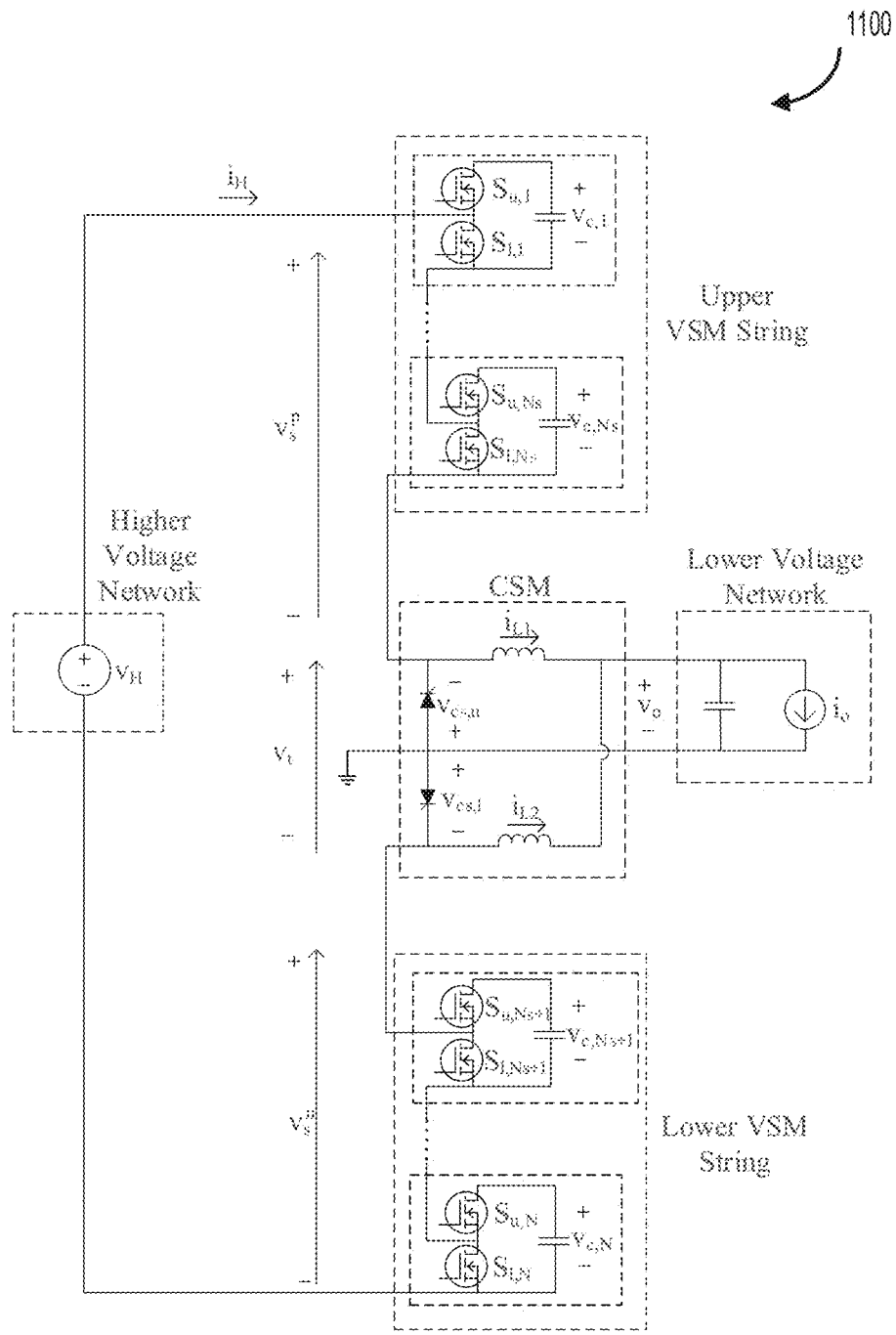
FIG. 11 presents an example implementation configured for bi-directional power exchange between the higher and lower-voltage networks.

The optional grounding circuit 212 is represented as an impedance 4 in FIG. 2. The choice of grounding circuit depends on the specific application. For example, 4 may represent a high-resistance, high-impedance, low-resistance, or solid-ground for instance. In FIG. 10 and FIG. 11, a solid-ground is presented as an example representation of the grounding circuit. The grounding circuit is optional as it is not required for the energy transfer mechanism of this converter in some embodiments.

The grounding circuit provides an electrical ground for the lower-voltage DC network for some embodiments. By having an electrical ground, insulation stresses are reduced on the circuit elements of this alternate embodiment. Additionally, it limits the voltages relative to ground on the lower-voltage DC network.

This improves safety to persons who may be accessing equipment or devices interfaced to the lower-voltage DC network, for example. Without a solid ground some form of isolation transformer may be required for safety reasons to limit potentially high voltages relative to ground that be imposed on the lower-voltage DC network.

A real world application would be a converter which interfaces a MVDC distribution line to a future DC home.

Lower Voltage Network

In an embodiment, the lower-voltage network is represented as a capacitor and a parallel current source. This capacitor functions as a filter. However, it is possible to employ different types of filtering approaches. In addition, this is only one such representation of the lower-voltage network. For instance, the lower-voltage network could alternatively be represented as a resistive load.

Examples of the lower-voltage DC network may include a future DC home, DC street lighting, home energy storage, or solar PV resource.

In some embodiments, the lower-voltage DC network can be regulated or formed through control of the device. The device of some embodiments is also capable of regulating the current into the lower-voltage DC network. This may be required when the lower-voltage DC network already provides regulation of the lower-voltage DC network voltage.

Also for solar PV resources it may be necessary to allow for variable lower-voltage DC network voltage for finding the optimal power point of the solar PV resource. This device of some embodiments is also capable of regulating a variable lower-voltage DC network voltage. The lower-voltage network is therefore free to be many different types of loads or generation resources. The device of some embodiments, in general, is able to deliver a controlled average power to a lower-voltage DC load or in the case of a bi-directional device deliver an average power to or from the lower-voltage DC load.

Higher Voltage Network

Figure 29:
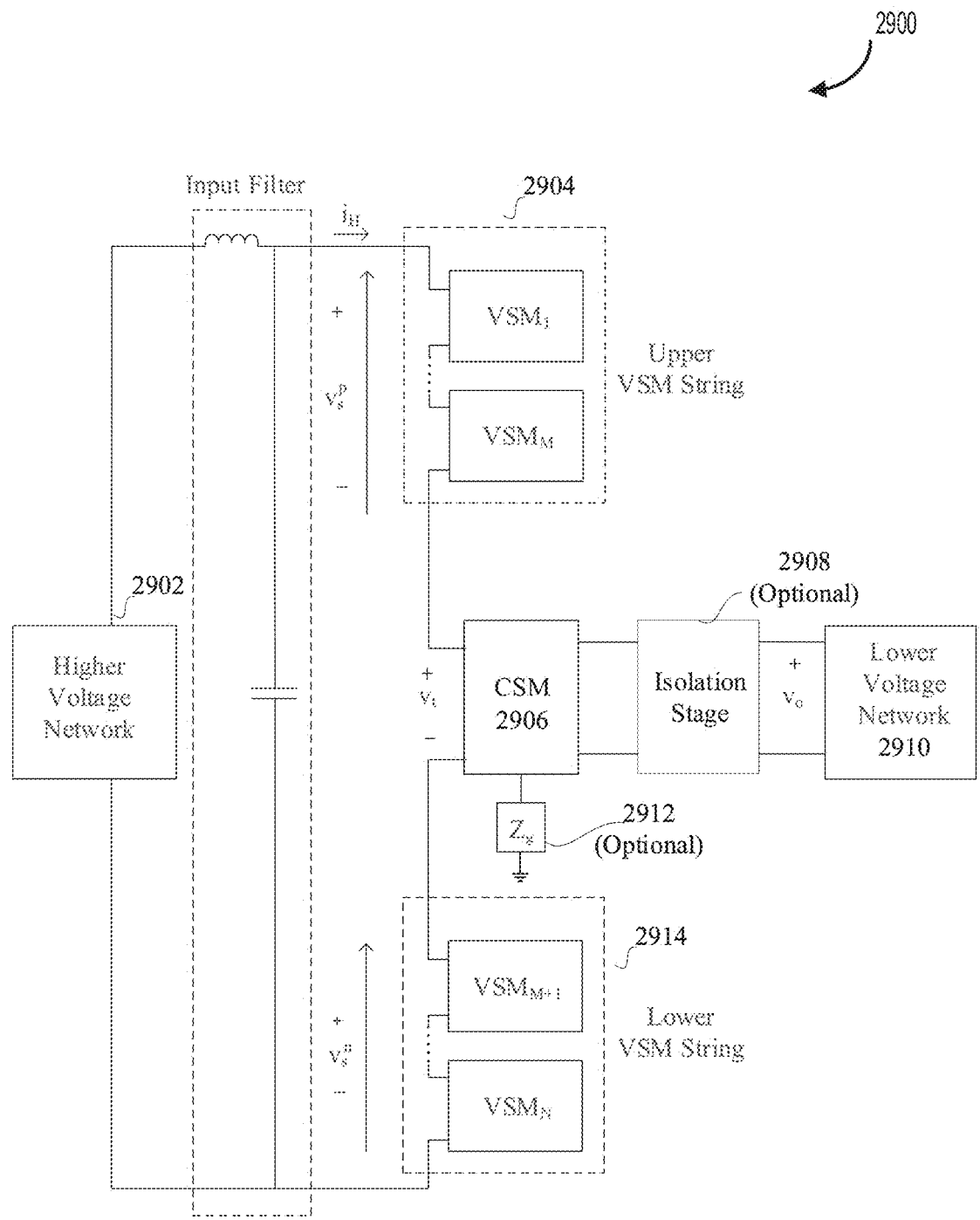
FIG. 29 presents a variant of FIG. 2 with an input filter.

In an embodiment, the higher-voltage network is represented as a DC voltage source. This is only one such representation of the higher-voltage network. For instance, the higher-voltage network could alternatively be represented a DC voltage source with an input filter as shown in FIG. 29.

Examples of a higher-voltage DC network include a DC source such as a solar PV farm.

Alternatively, the network could represent a connection to a DC grid for instance this could be a medium voltage or higher voltage DC grid. In both cases, the higher-voltage DC network could involve many types of circuit elements including DC machines, DC cables, etc.

However, in some embodiments, the higher-voltage DC network is represented as a simplified DC voltage source though it is understood that this is a simplification of the real case higher-voltage network.

Isolation Stage

Figure 8:
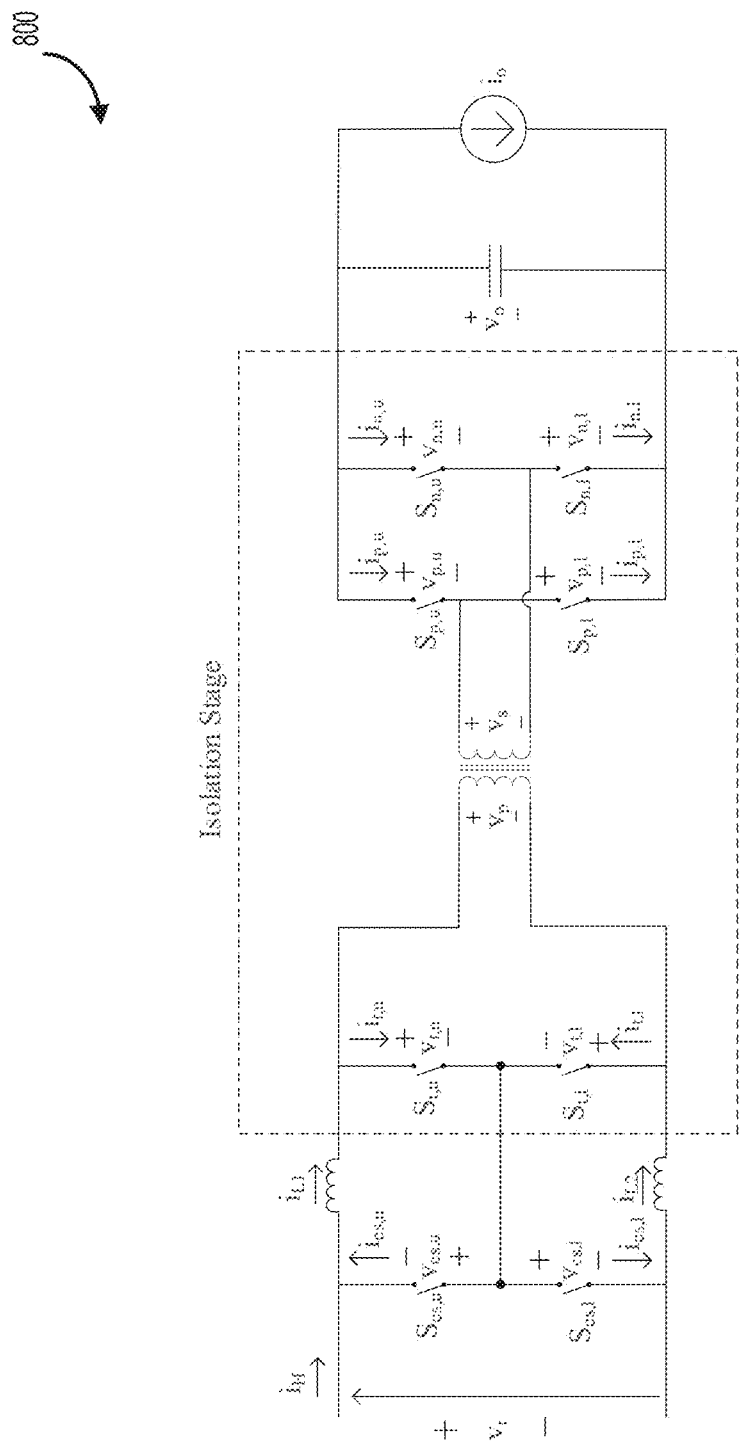
FIG. 8 presents an embodiment of the isolation stage between the CSM and the lower voltage network. This isolation stage features a two-winding transformer.
Figure 15:
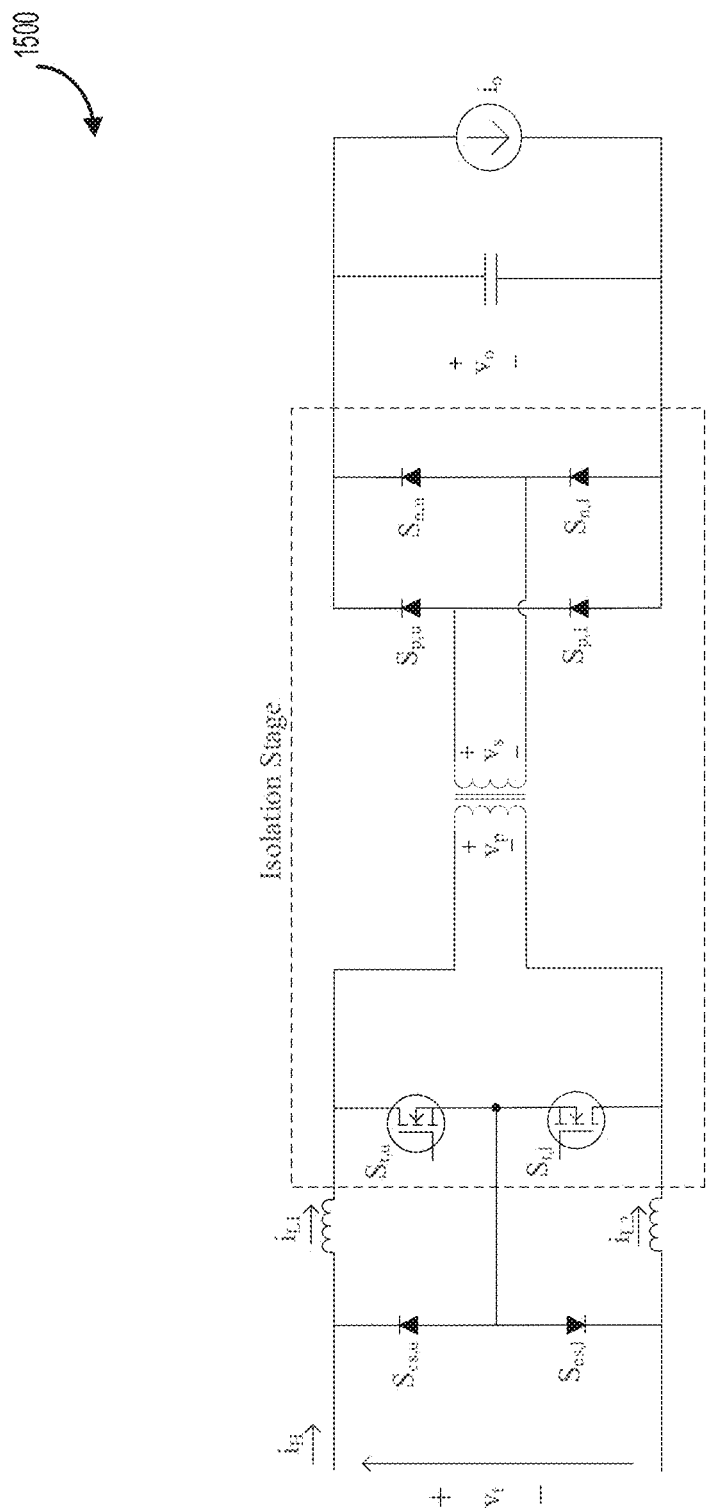
FIG. 15 presents an example implementation of the isolation stage when the converter is configured for uni-directional power transfer.
Figure 16:
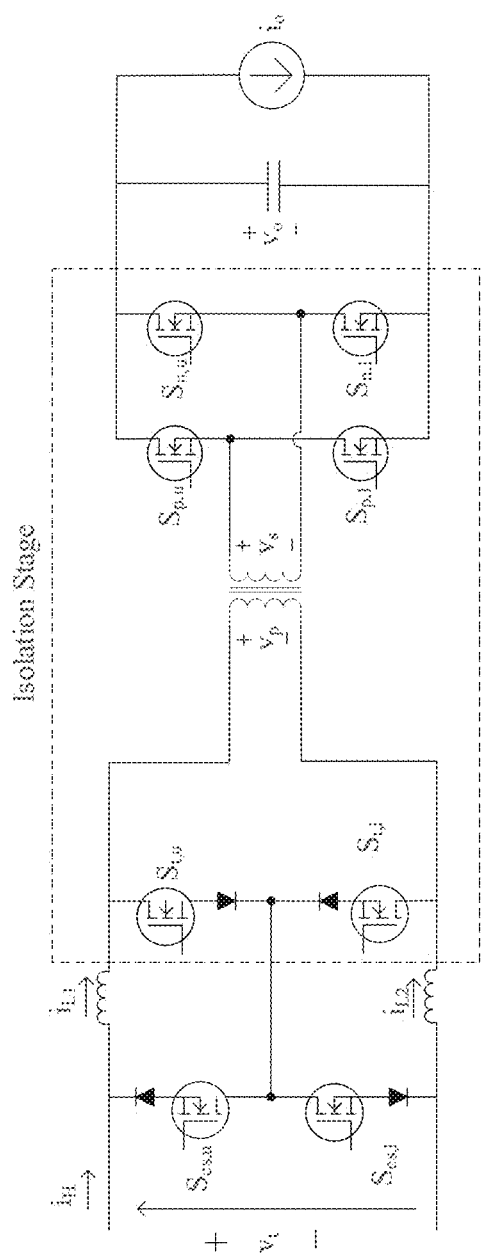
FIG. 16 presents an example implementation of the isolation stage when the converter is configured for bi-directional power transfer.

An embodiment of the isolation stage is presented in FIG. 8. This preferred embodiment features a two-winding transformer. An example implementation of the two-winding transformer implementation of the isolation stage for uni-directional and bi-directional power transfer is presented in FIG. 15 and FIG. 16, respectively.

The isolation stage has two switches on the primary side of the transformer and four switches on the secondary side of the transformer in some embodiments. The isolation stage switches on the primary side of the transformer form the primary-side DC/AC power conversion stage. The isolation stage switches on the secondary side of the transformer form the secondary-side AC/DC power conversion stage.

The isolation stage providing galvanic isolation between the lower-voltage DC network and the higher-voltage DC network; and the isolation stage comprises of the following in some embodiments (i) one or more transformers; (ii) a primary-side AC/DC power conversion stage between the one or more transformers and the lower-voltage DC network; and (iii) a secondary-side DC/AC power conversion stage between the CSM and the one or more transformers.

In some embodiments, with the isolation stage, the CSM comprises two switches and two inductors; wherein for a set of CSM switch states, the current into the series connected string is equal to the current in a first CSM inductor; and wherein for an alternate set of CSM switch states, the current into the series connected string is equal to the negative of a current of a second CSM inductor; wherein the CSM is configured such that the inductors either deliver current to or receive current from the lower-voltage DC network through the intermediary isolation stage, and the isolation stage, in some embodiments, comprises (i) one two-winding transformer; (2) one primary-side DC/AC power conversion stage consisting of two controllable switches wherein a first switch is connected between the first DC terminal of the CSM and the mid-point of the two switches of the CSM; and a second switch is connected between the second DC terminal of the CSM and the mid-point of the two switches of the CSM.

A secondary-side AC/DC power conversion stage which consists of four switches in the full-bridge configuration or two switches in a half-bridge configuration.

The states of the primary switches within the isolation stage of FIG. 8 are controlled such that the transformer primary winding current is equal to the current in a CSM inductor for a fraction of each period and equal to the negative of the current in a CSM inductor for a fraction of a period.

Where a fraction is expected to be greater than 1% of a switching period. Note, the term period and switching period refer to the same term.

In this way, the net DC voltage applied across the transformer winding can be controlled to zero, in some embodiments of this converter circuit.

Figure 9:
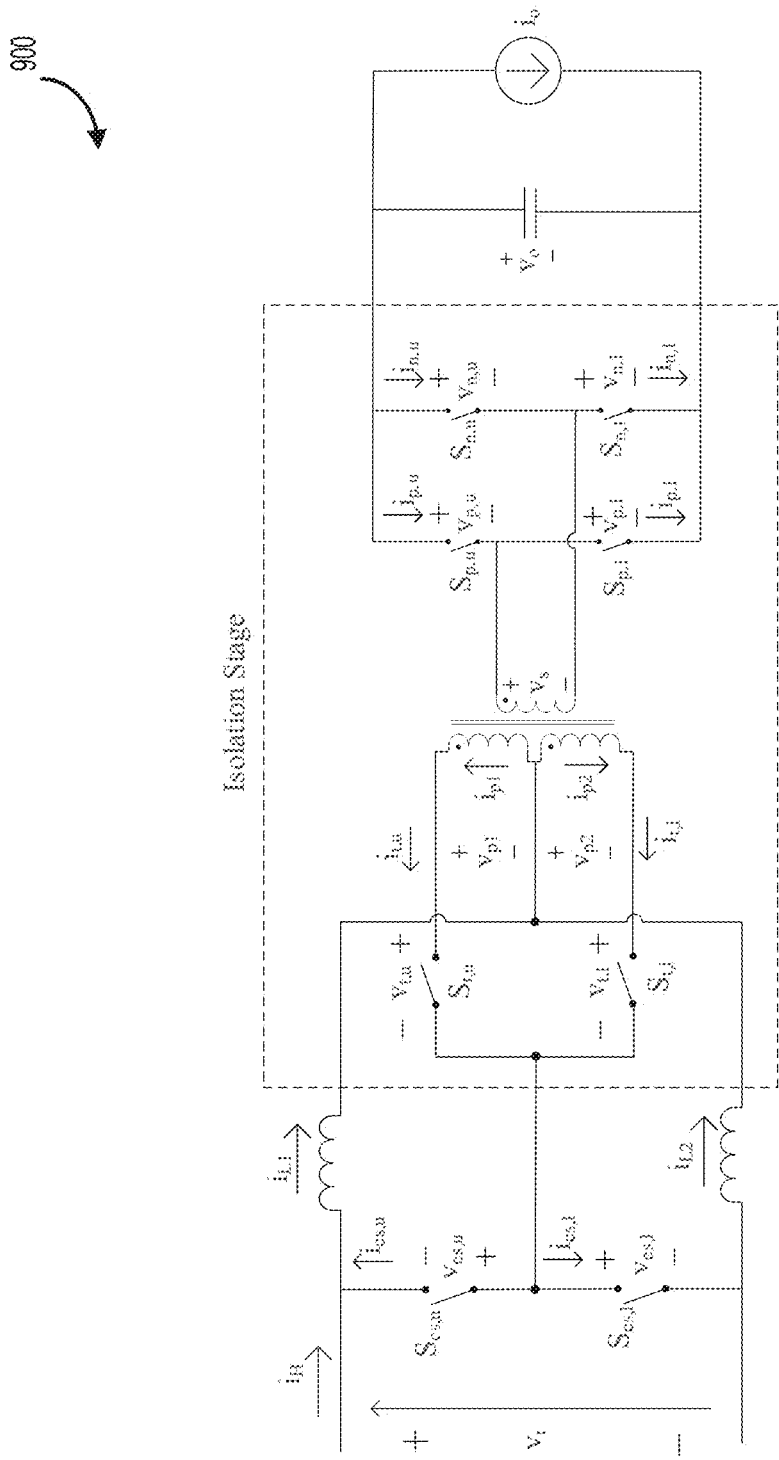
FIG. 9 presents an alternate embodiment of the isolation stage between the CSM and the lower voltage network. This isolation stage features a centre-tapped transformer.
Figure 17:
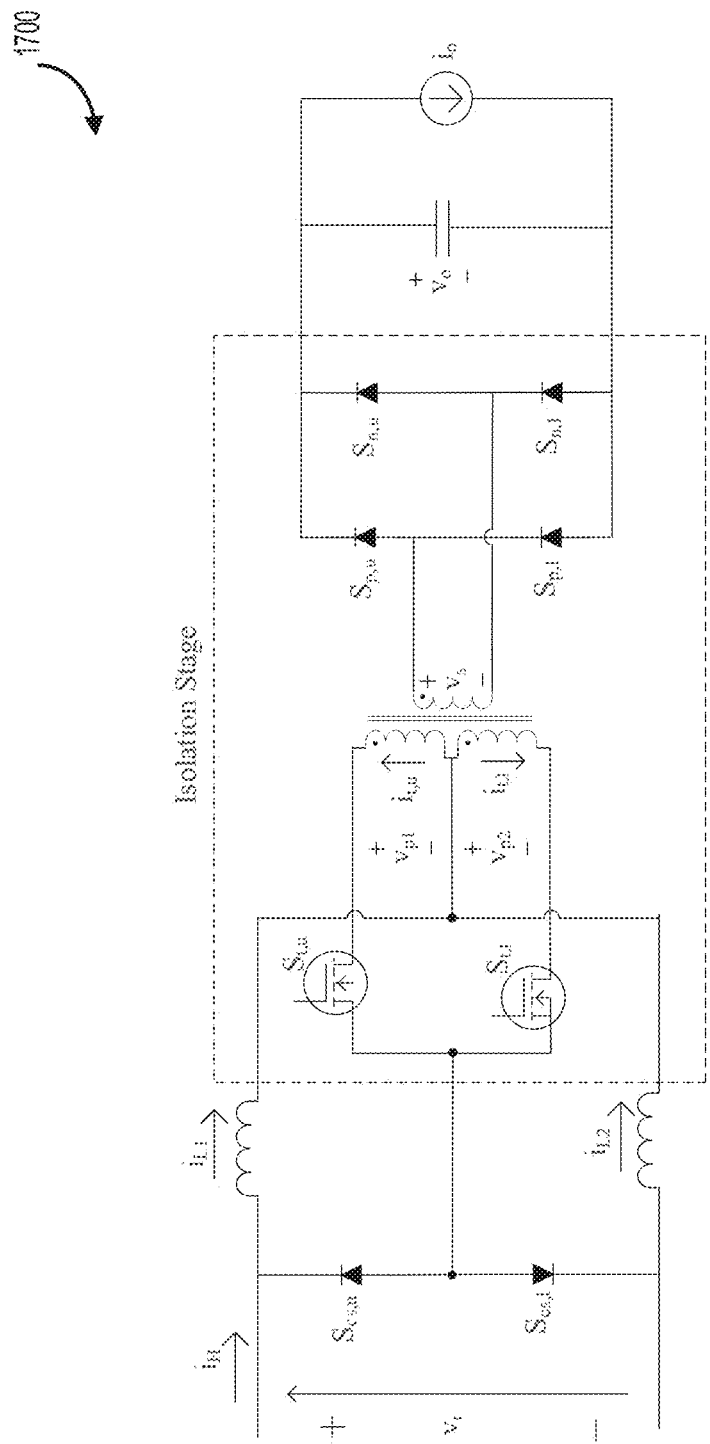
FIG. 17 presents an example implementation of the alternate embodiment of the isolation stage where the converter is configured for uni-directional power transfer.
Figure 18:
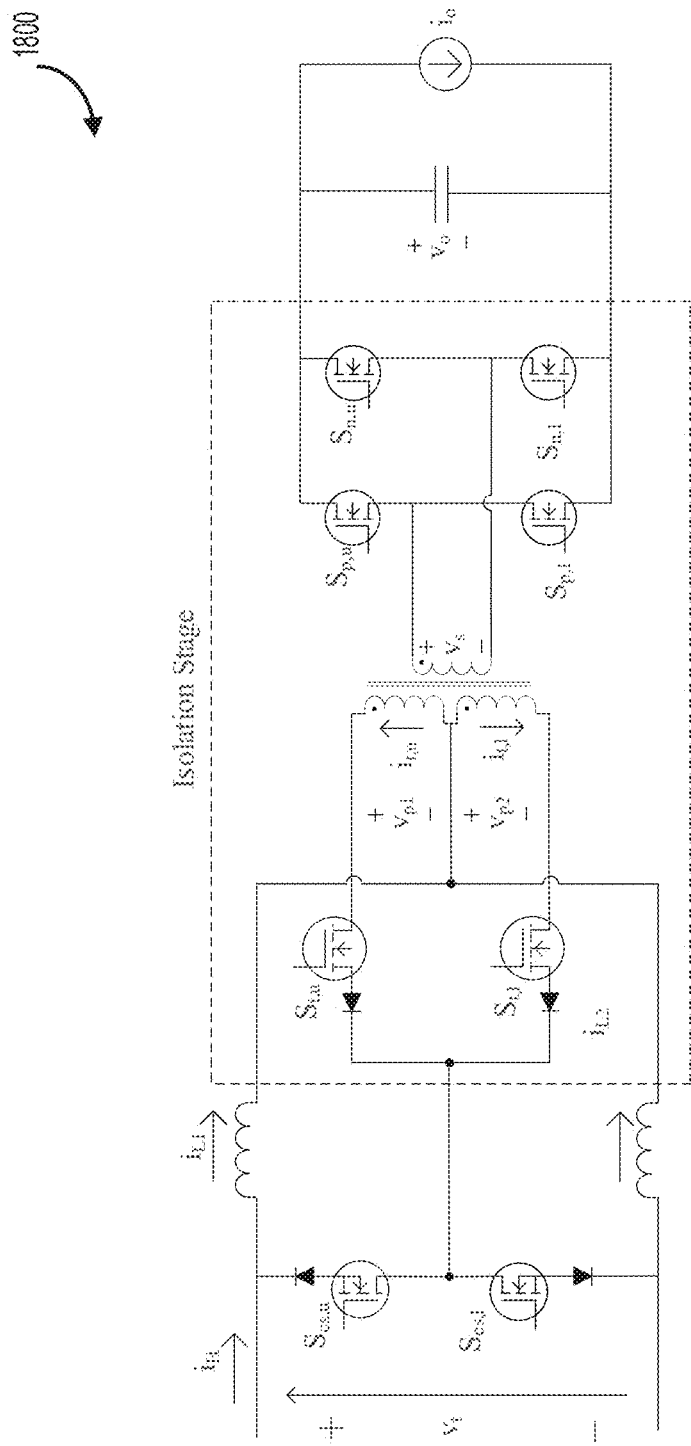
FIG. 18 presents an example implementation of the alternate embodiment of the isolation stage where the converter is configured for bi-directional power transfer.

An alternate embodiment of the isolation stage is presented in FIG. 9. This alternate embodiment features a center-tapped transformer. An example implementation of the center-tapped transformer implementation of the isolation stage for uni-directional and bi-directional power transfer is presented in FIG. 17 and FIG. 18, respectively.

In the isolation stage of the alternate embodiment of FIG. 9, the two inductor currents sum at a terminal which is electrically bonded to the center-tap of the transformer.

The states of the primary switches within the isolation stage of the alternate embodiment of FIG. 9 are controlled such that the transformer primary winding current is equal to the sum of the two inductor currents for a fraction of each period and equal to the negative of the sum of the two inductor currents for a fraction of a period. In this way, the net DC voltage applied across the transformer winding can be controlled to zero, in some embodiments.

In this alternate embodiment of the isolation stage, the CSM comprises two switches and two inductors; wherein for a set of CSM switch states, the current into the series connected string is equal to the current in a first CSM inductor; and wherein for an alternate set of CSM switch states, the current into the series connected string is equal to the negative of a current of a second CSM inductor. The CSM is configured such that both inductors can simultaneously either deliver current to or receive current from the lower-voltage DC network through a connection to the center-tap of the center-tapped winding transformer of the intermediary isolation stage.

The isolation stage in this alternate embodiment consists of (i) one center-tapped winding transformer with three-terminals; a primary-side DC/AC power conversion stage consisting of two controllable switches wherein a first switch is connected between the first winding terminal and the mid-point of the CSM; and a second switch is connected between the second terminal and the mid-point of the CSM.

The secondary-side DC/AC power conversion stage which consists of four switches in a full-bridge configuration or two switches in a half-bridge configuration in some embodiments. An alternate terminology for the full-bridge circuit being a single phase voltage source converter. An alternate terminology for the single-phase half-bridge voltage source inverter topology can also be referred to as a half-bridge circuit. Note, many other types of DC/AC power conversion stages can be used instead. This is only one such example.

In some embodiments, there are three DC terminals of the CSM that interface the CSM and the isolation stage. The three terminals are the mid-point of the two switches of the CSM (also referred to in this disclosure as the mid-point of the CSM), and the terminals of the CSM inductors which are not the AC terminals in some embodiments. The voltage vt (voltage across the input terminals of the CSM) is the voltage that corresponds to the voltage applied across the AC side terminals of the CSM in some embodiments.

In some embodiments, when there are two DC terminals of the CSM that interface the CSM and the lower-voltage DC network. In some embodiments, these two DC terminals are the mid-point of the two switches of the CSM and the terminal that is electrically bonded to the two CSM inductors.

The switches on the secondary side of the transformer act as an AC/DC conversion stage (alternate terminology is DC/AC conversion stage) to interface the lower-voltage DC network and the AC transformer. In an embodiment, this AC/DC conversion stage has four switches.

For the unidirectional power flow an example implementation of the AC/DC conversion stage is a full bridge diode rectifier.

For bidirectional power flow an example implementation of the AC/DC conversion stage is a single phase voltage source converter. The single phase voltage source converter can also be referred to as a full-bridge circuit.

However, many other realizations of the AC/DC conversion stage are possible. For instance, it is also possible to realize the AC/DC conversion stage with two switches where a split lower-voltage DC network capacitor were to be employed such as is done in a single-phase half-bridge voltage source inverter topology. An alternate terminology for single-phase half-bridge voltage source inverter topology can also be referred to as a half-bridge circuit.

Additionally, the secondary side of the transformer is presented as a single phase winding. However, other realizations of the secondary side of the transformer are possible. For instance, a center tapped secondary winding can also be employed, for example.

The transformer provides galvanic isolation and step-up or step-down voltage conversion capability. Galvanic isolation offers advantages in terms of safety. The step-down or step-up voltage conversion is done through varying the number of relative turns on the primary and secondary sides of the transformer. The ability to step-up or step-down the voltage is advantageous for some embodiments as it enables the device to better optimized for a particular application.

For instance, for a DC home where the lower-voltage DC network is at 380 V it may be more desirable to operate a transformer with a 2:1 step-down ratio compared to a 1:1 ratio, for example.

By operating with a 2:1 step-down ratio, for instance, it would result in a lower average inductor current and as a result lower amplitude of current into the string, in some embodiments. However, a drawback would be increased voltage stress on the CSM and potentially additional VSM switching operations and number of VSM cells.

To realize a converter configured for uni-directional power capability with an isolation stage, the minimum requirements of the switch $S_{t,u}$ are positive voltage blocking capability ($v_t$, >0) and positive current conduction capability ($i_t$, >0). The minimum requirements of the switch $S_{t,l}$ are positive voltage blocking capability ($v_{t,l}$>0) and positive current conduction capability ($i_{t,l}$>0). Example switch implementations are MOSFETS. The minimum requirements for the AC/DC conversion stage switches $S_{p,u}$, $S_{p,l}$, $S_{n,u}$ and $S_{n,l}$ are reverse-voltage blocking capability ($v_{p,u}$, $V_{p,l}$, $V_{n,u}$, $V_{n,l}$>0 in FIG. 8 and FIG. 9) and positive current conduction capability ($i_{p,u}$, $i_{p,l}$, $i_{n,u}$, $i_{n,l}$<0 in FIG. 8 and FIG. 9). Example switch implementations are diodes.

For bi-directional power capability, the minimum requirements of the switch $S_{t,u}$ are bipolar voltage blocking capability and positive current conduction capability ($i_{t,u}$>0). The minimum requirements of the switch $S_{t,l}$ are bipolar voltage blocking capability and positive current conduction capability ($i_{t,l}$>0). Example switch implementations are MOSFETS with series diodes or IGBTs with series diodes. The minimum requirements for the switches $S_{p,u}$, $S_{p,l}$, $S_{n,u}$ and $S_{n,l}$ are positive voltage blocking capability ($V_{p,u}$, $V_{p,l}$, $V_{n,u}$, $V_{n,l}$>0 in FIG. 8 and FIG. 9) and bidirectional current conduction capability i ($i_{p,u}$, $i_{p,l}$, $i_{n,u}$, $i_{n,l}$<0 in FIG. 8 and FIG. 9). Example switch implementations are MOSFETs or IGBTs with anti-parallel diodes.

It is also important to note that each of the 6 isolation stage switches could be made up of multiple series and/or parallel connected switches in-order to realize higher blocking voltages and/or higher current conduction capabilities, respectively.

In the embodiments of the isolation stage for this converter circuit, the AC/DC conversion stage has been represented as a full-bridge converter featuring 4 switches ($S_{p,u}$, $S_{p,l}$, $S_{n,u}$, and $S_{n,l}$). However, other realizations of the AC/DC conversion stage are also possible. For instance, another realization is to use a half-bridge converter which features 2 switches ($S_{p,u}$, $S_{p,l}$) with a split LVDC network capacitor $C_o$ where the mid-point of the split-capacitor is accessible. The mid-point of the split capacitor is connected to the transformer winding terminal not interfaced to $S_{p,u}$ and $S_{p,l}$.

Operating Principles

Operating Principles

In this section, the operating principles for forward and reverse power transfer operation are presented. Note, the operating principles described in this section apply to an embodiment as well as to the alternate embodiments featuring the isolation stage. Note, there may be other ways to operate the converter. This is only one such example which is presented to illustrate the capabilities of the converter. Other operating modes are also possible with the embodiments of this converter circuit. Additionally, other control methods are possible are possible to be realized. Provided below are only example or examples of possible control methods and operating principles with some embodiments of this converter circuit.

Operating principles are established through control of the switches and electronic components of the circuit system.

Forward Power Transfer Operation

There are two operating modes: charge and discharge mode. These operating modes are illustrated in FIG. 19 for an embodiment. In charge mode, the inserted voltage source sub-modules are charged and in discharge mode, the inserted voltage source sub-modules are discharged.

Charge Mode

The current flows during charge mode are provided in FIG. 19*a*. In charge mode, a voltage of positive polarity is applied across the input terminals of the CSM ($v_t$>0). In this mode, $S_{cs,u}$ is reverse biased and $S_{cs,l}$ is forward biased. Since, $S_{cs,u}$ is reverse biased it will not conduct current. Therefore, the HV loop current, $i_H$, will be equal to $i_{L1}$, i.e. $i_H=i_{L1}$. Therefore both the sub-modules of the upper and lower VSM string will be charged in this operating mode. The power delivered to the VSM sub-module strings can be expressed by the following formula, $$p_{VSM}=V_c N_c i_{L1} \qquad (2)$$

where, $N_c$ is the average number of cells inserted during charge mode;
and $V_c$ is the average sub-module cell voltage which can be calculated as follows, $$V_c = \frac{1}{N}\sum_{i=1}^{N} v_{c,i} \qquad (3)$$

By definition $N_c$ is subject to the following constraint, $$N_c < \frac{V_H}{V_c} \qquad (4)$$

The power delivered to the input terminals of the CSM will be equal to the following, $$p_t=(V_H-N_c V_c)i_{L1}>0 \qquad (5)$$

Discharge Mode

The current flows during discharge mode are presented in FIG. 19*b*. In discharge mode, a voltage of negative polarity is applied across the terminals of the CSM ($v_t$<0). In this mode, $S_{cs,u}$ is forward biased and $S_{cs,l}$ is reverse biased. Since, $S_{cs,l}$ is reverse biased it will not conduct current. Therefore, the HV loop current, $i_H$, will be equal to the negative of $i_{L2}$, i.e. $i_H=-i_{L2}$. The inserted sub-modules of the upper and lower VSM string are discharged in this operating mode. The power discharged by the VSM sub-module strings can be expressed by the following formula, $$p_{VSM}=-V_c N_d i_{L2} \qquad (6)$$

where, $N_d$ is the average number of cells inserted during discharge mode. By definition, $N_d$ is subject to the following constraint, $$N_d > \frac{V_H}{V_c} \qquad (7)$$

The power delivered to the CSM will be equal to the following:

$$p_t=(N_d V_c-V_H)i_{L2}>0 \qquad (8)$$

Therefore, irrespective of whether the VSM strings are being charged or discharged, power is delivered to the CSM.

Reverse Power Transfer Mode

Figure 20:
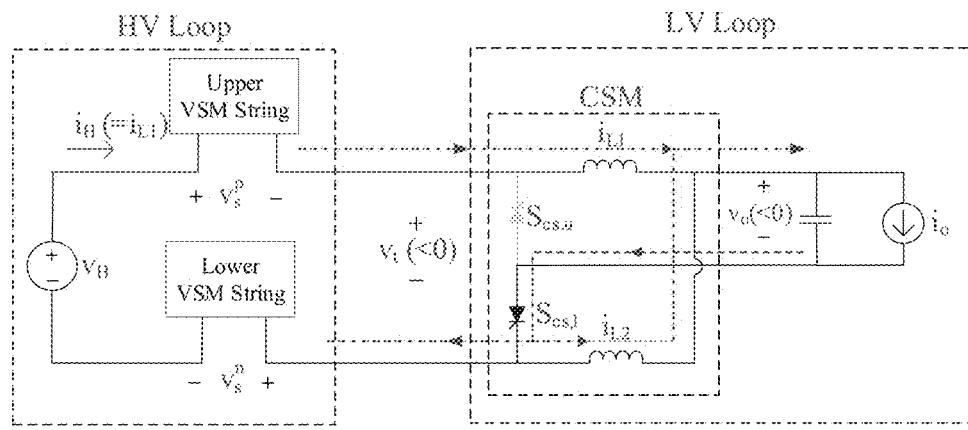
FIG. 20 presents the main operating modes for reverse power transfer operation (power transfer from the lower-voltage to the higher-voltage DC network).
Figure 20:
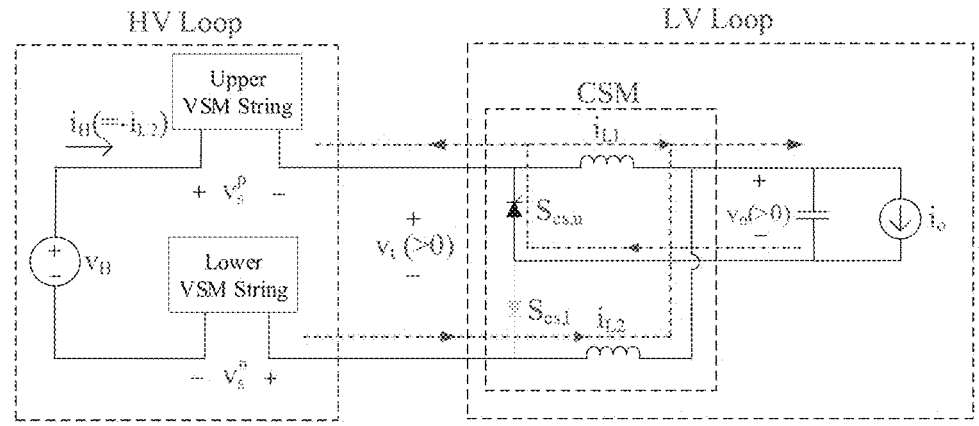

Similar to forward power transfer operation there are two main operating modes for the reverse power transfer mode: charge and discharge mode. These operating modes are presented in FIG. 20 for an embodiment. The main differences of the reverse power transfer operation compared with forward power transfer operation are highlighted in the following two sub-sections.

Charge Mode

The current flows during charge mode are provided in FIG. 20*a*. In charge mode, a voltage of negative polarity (rather than a positive polarity voltage in the forward power transfer mode case) is applied across the input terminals of the CSM ($v_t$<0). Additionally, the average number of cells inserted, $N_c$, is subject to the following constraint, $$N_c > \frac{V_H}{V_c} \qquad (9)$$

The power delivered to the input terminals of the CSM will be equal to the following, $$p_t=(V_H-N_c V_c)i_{L1}<0 \qquad (10)$$

Discharge Mode

The current flows during discharge mode are presented in FIG. 20*b*. In discharge mode, a voltage of positive polarity (rather than a negative polarity voltage in the forward power transfer mode case) is applied across the terminals of the CSM ($v_t$>0). Additionally, the average number of cells inserted, $N_d$, is subject to the following constraint, $$N_d < \frac{V_H}{V_c} \quad (11)$$

The power delivered to the CSM will be equal to the following:

$$p_t = (N_d V_c - V_H) i_{L2} < 0 \quad (12)$$

Therefore, irrespective of whether the VSM strings are being charged or discharged, power is delivered by the CSM.

Commutation Intervals

In order to transition between charge and discharge mode, a voltage of opposite polarity is imposed on the input terminals of the CSM. This initiates a short commutation interval whereupon the current in the HV loop, $i_H$, reverses direction. During this commutation interval, the HV Loop and the LV loop are decoupled as both the CSM switches, $S_{cs,u}$ and $S_{cs,l}$, are forward biased forming a short-circuit.

This is advantageous as in some embodiments, the duration of the commutation interval is limited only by the leakage inductance of the HV loop. By maintaining a short commutation interval duration, higher effective switching frequencies for the converter can be realized.

One way of selecting capacitance and inductance of the capacitors and inductors of the circuit is based on capacitor voltage ripple and inductor current ripple. The ripple components reduce as the effective switching frequency increases.

Therefore, by increasing the effective switching frequency the capacitances and inductances in the circuit have the potential to be decreased in some embodiments. By decreasing the capacitances and inductances, the stored energy required in the capacitor and inductor decreases. Therefore, the converter can be realized with lower volume due to the reduced inductor and capacitor sizes.

This is highly advantageous as it enables the potential of reducing cost and volume of the device. Additionally, it may allow for more variety of capacitor and inductor technologies to be used. Similarly, by increasing the switching frequency, in the embodiments with the optional isolation stage, the transformer size and cost can potentially be reduced, for example. This is especially important as there are many real-world applications where capacitor and inductor sizes need to be limited, and costs reduced. For example, there are important ramifications for portable electronics and implementations directed to consumer-facing electronics.

Embodiment Specific Operating Principles

Each of the three main embodiments (FIG. 3, FIG. 4 and FIG. 5) described feature differences in their operating principles. These differences are the subject of this section.

First Example Embodiment

The operating principles specific to an embodiment of FIG. 3 are described in this section. Please refer to FIG. 19 and FIG. 20 for the main operating modes.

While the application refers to preferred embodiments, Applicant submits that there are other, variant embodiments contemplated, and the term "preferred" should not be read as limiting or narrowing in respect of all other embodiments.

Forward Power Transfer Mode

In forward power transfer mode, the LVDC network voltage will be ≥0, i.e. $v_o \geq 0$.

In charge mode, inductor $L_1$ will be charged and the inductor $L_2$ will be discharged. The voltage applied across the two inductors can be expressed as follows, $$v_{L1} = (V_H - N_c V_c) - v_o \quad (13)$$

$$v_{L2} = -v_o \quad (14)$$

In discharge mode, inductor $L_2$ will be charged and the inductor $L_1$ will be discharged. The voltage applied across the two inductors can be expressed as follows, $$v_{L2} = (N_d V_c - V_H) - v_o \quad (15)$$

$$v_{L1} = -v_o \quad (16)$$

In both charge and discharge operating mode, the current into the lower-voltage network capacitor $C_o$ can be expressed as follows, $$i_{c_o} = i_{L1} + i_{L2} - i_o \quad (17)$$

Reverse Power Transfer Mode

In reverse power transfer mode, the LVDC network voltage will be ≤0, i.e. $v_o \leq 0$.

In charge mode, inductor $L_1$ will be discharged and the inductor $L_2$ will be charged. The voltage applied across the two inductors can be expressed as follows, $$v_{L2} = -v_o \quad (18)$$

$$v_{L1} = (V_H - N_c V_c) - v_o \quad (19)$$

In discharge mode, inductor $L_1$ will be charged and the inductor $L_2$ will be discharged. The voltage applied across the two inductors can be expressed as follows, $$v_{L2} = (N_d V_c - V_H) - v_o \quad (20)$$

$$v_{L1} = -v_o \quad (21)$$

In both charge and discharge operating mode, the current into the lower-voltage network capacitor $C_o$ can be expressed as follows, $$i_{c_o} = i_{L1} + i_{L2} - i_o \quad (22)$$

Alternate Embodiment #1

Figure 4:
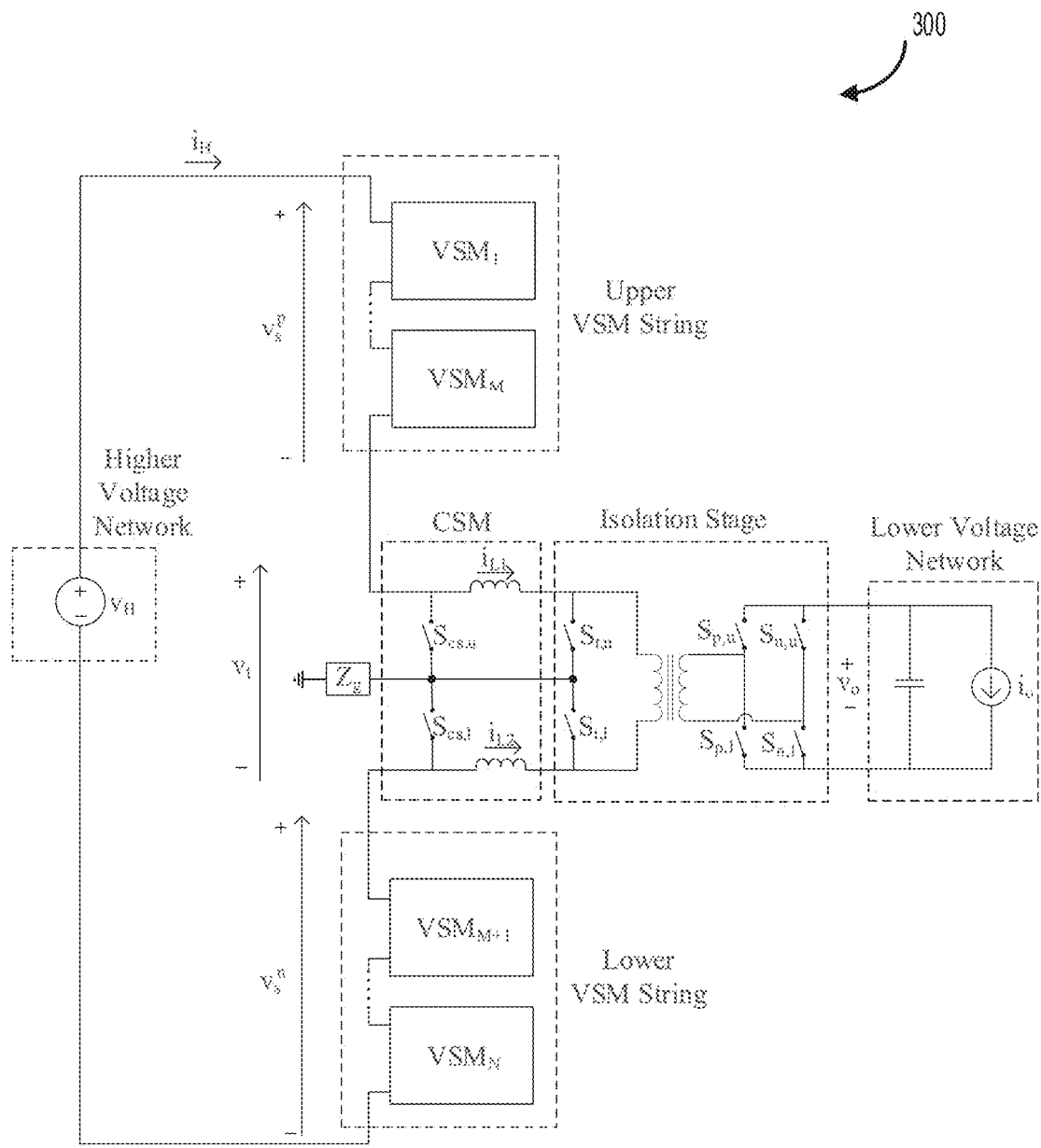
FIG. 4 presents an alternate embodiment of FIG. 2.

In this section, the operating principles specific to the embodiment described by FIG. 4 are presented. Please refer to FIG. 21 to FIG. 24 for the operating states specific to this embodiment. Note, unlike in an embodiment of FIG. 3, $v_o$>0 in both forward and reverse power transfer modes in this alternate embodiment.

Forward Power Transfer Mode

There are 6 main operating states during forward power transfer mode: 3 operating states during charge mode and 3 operating states during discharge mode. These 6 operating states are described further in the following sub-sections.

Charge Mode

Figure 21:
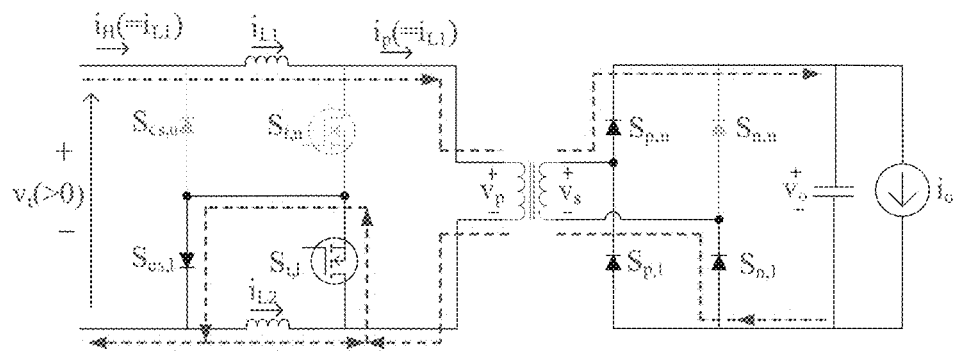
FIG. 21 presents main operating modes for an alternate embodiment with a two-winding transformer isolation stage. The presented operating modes are specific to VSM charge mode and for forward power transfer operation (power transfer from the higher-voltage to the lower-voltage DC network).
Figure 21:
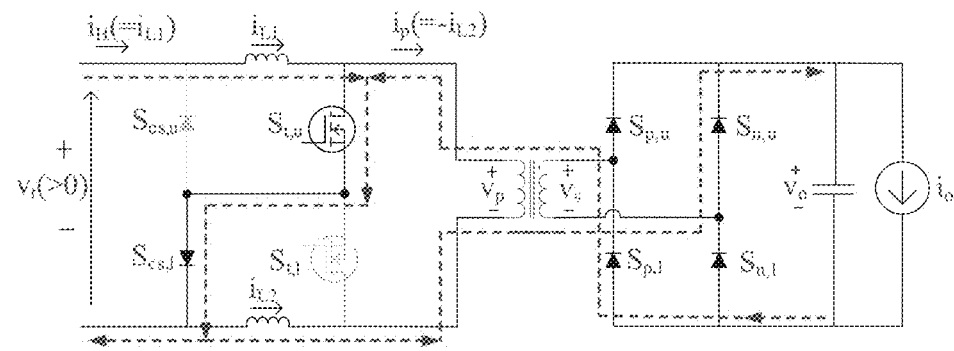
Figure 21:
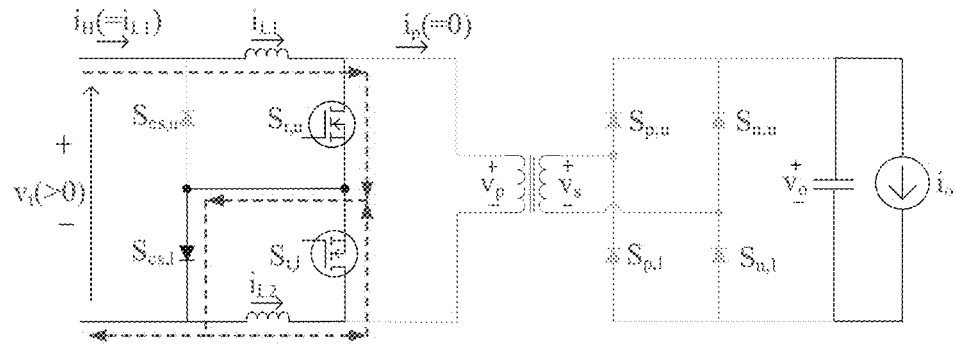
Figure 22:
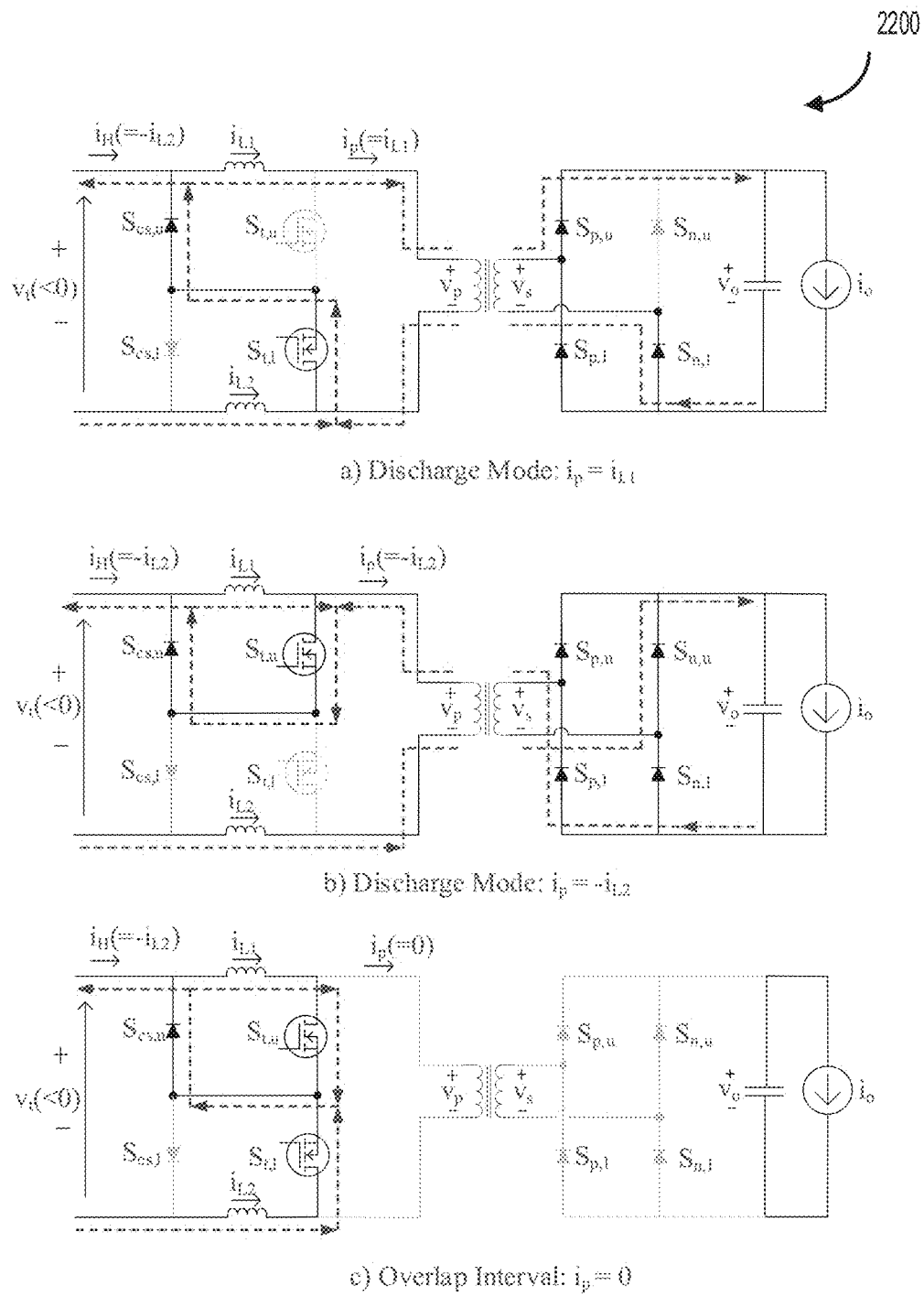
FIG. 22 presents main operating modes for an alternate embodiment with a two-winding transformer isolation stage. The presented operating modes are specific to VSM discharge mode and for forward power transfer operation (power transfer from the higher-voltage to the lower-voltage DC network).
Figure 23:
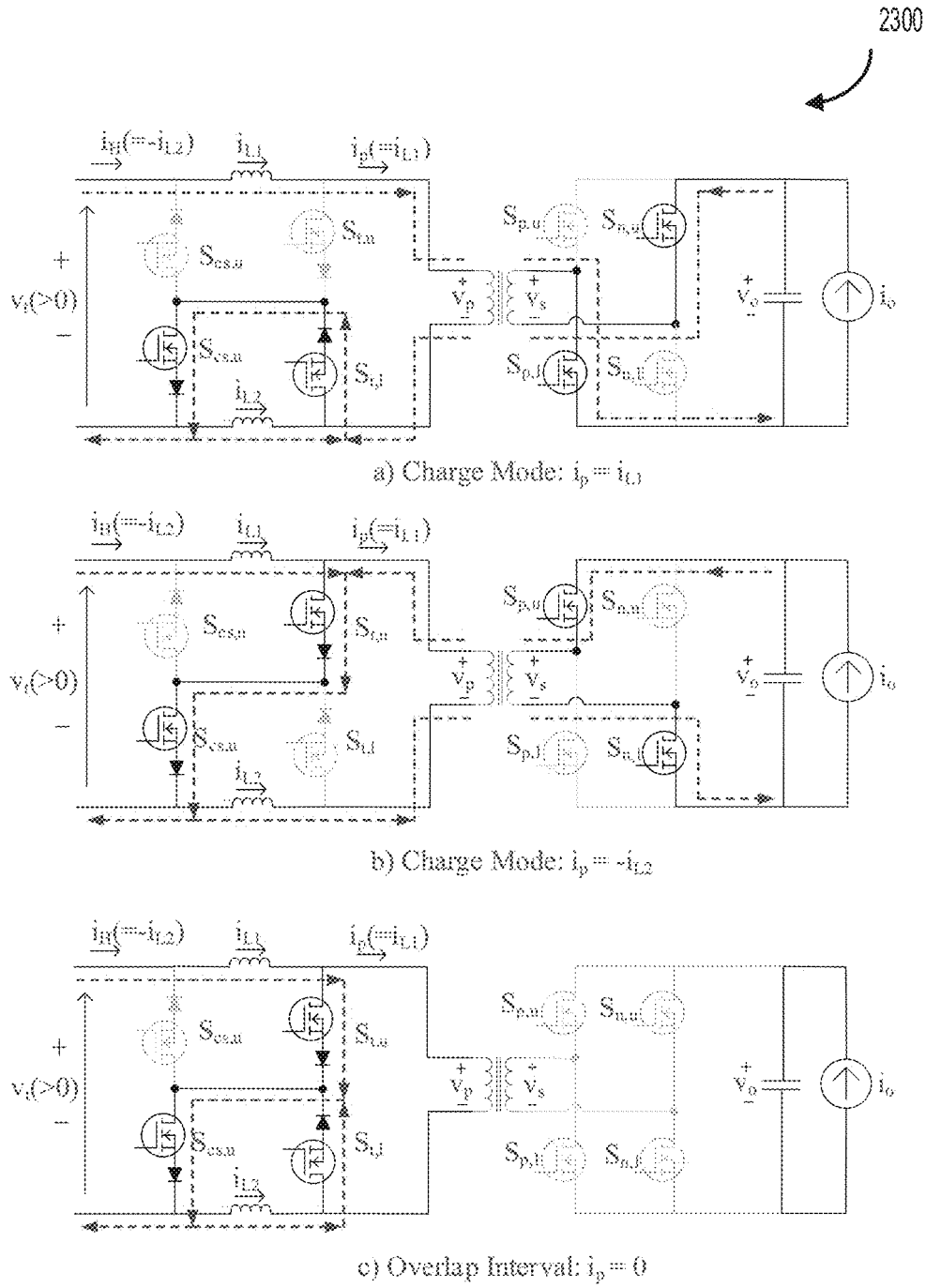
FIG. 23 presents main operating modes for an alternate embodiment with a two-winding transformer isolation stage. The presented operating modes are specific to VSM charge mode and for reverse power transfer operation (power transfer from the lower-voltage to the higher-voltage DC network).
Figure 24:
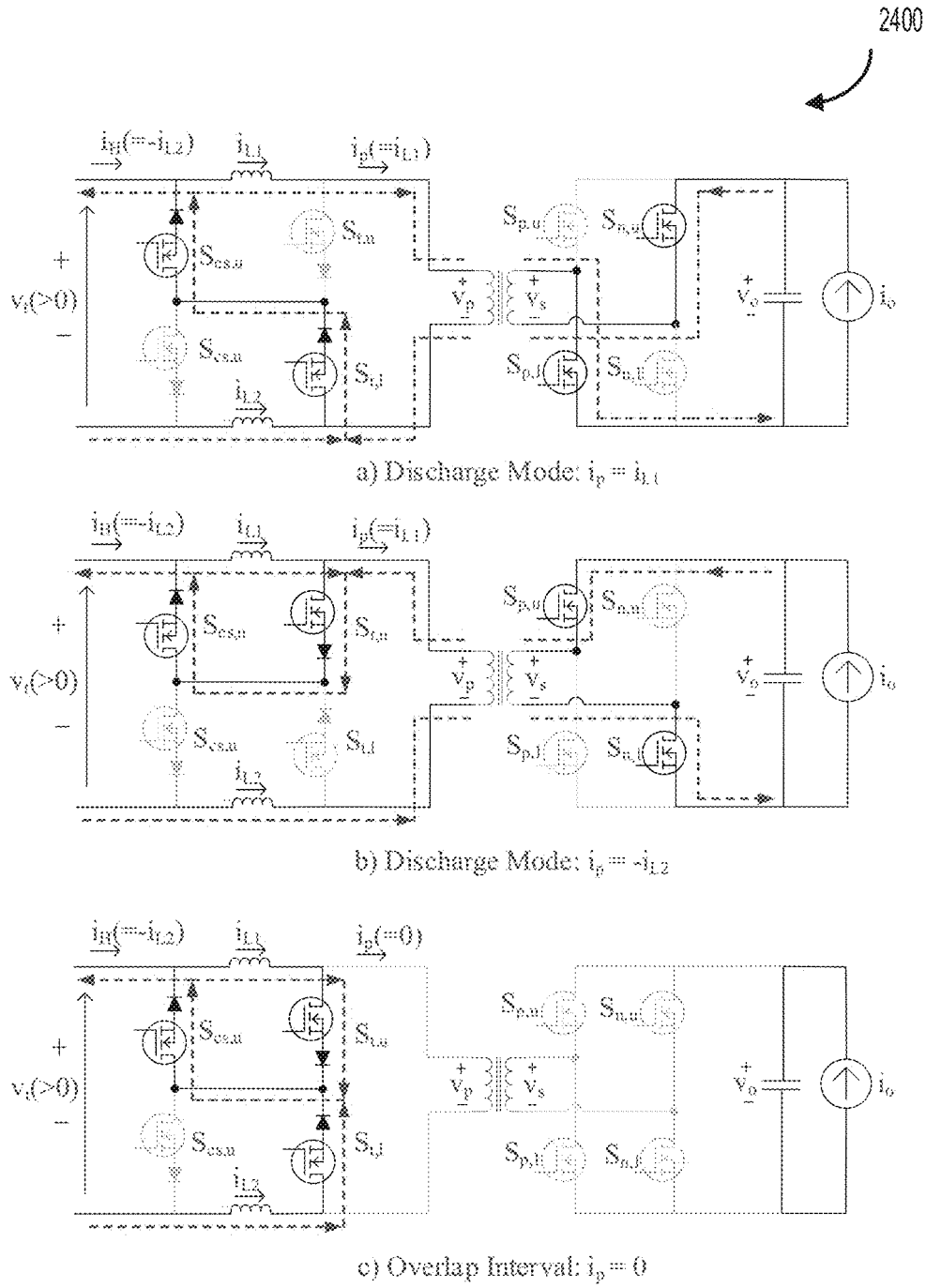
FIG. 24 presents main operating modes for an alternate embodiment with a two-winding transformer isolation stage. The presented operating modes are specific to VSM discharge mode and for reverse power transfer operation (power transfer from the lower-voltage to the higher-voltage DC network).

The 3 operating states during charge mode are described in FIG. 21. The three operating states are defined by the states of $S_{t,u}$ and $S_{t,l}$.

FIG. 21a corresponds to the condition where $S_{t,u}$ is off and $S_{t,l}$ is on. Key voltage and current relations for this operating state are described by the following equations, $$v_{L1} = (V_H - N_c V_c) - n_t v_o \quad (23)$$

$$v_{L2} = 0 \quad (24)$$

$$v_{p1} = n_t v_o \quad (25)$$

$$v_s = v_o \quad (26)$$

$$i_p = i_{L1} \quad (27)$$

$$i_s = \frac{1}{n_t} i_{L1} \quad (28)$$

Where, $n_t$ is the turns ratio of the transformer.

FIG. 21b corresponds to the condition where $S_{t,u}$ is on and $S_{t,l}$ is off. Key voltage and current relations for this operating state are described by the following equations, $$v_{L1} = (V_H - N_c V_c) \tag{29}$$

$$v_{L2} = -n_t v_o \tag{30}$$

$$v_{p1} = -n_t v_o \tag{31}$$

$$v_s = -v_o \tag{32}$$

$$i_p = -i_{L2} \tag{33}$$

$$i_s = -\frac{1}{n_t} i_{L2} \tag{34}$$

FIG. 21c corresponds to an overlap mode condition where both $S_{t,u}$ and $S_{t,l}$ are on. The main voltages and currents impressed in this operating state are described by the following equations, $$v_{L1} = v_{L2} = (V_H - N_c V_c)/2 \tag{35}$$

$$v_{p1} = v_{p2} = 0 \tag{36}$$

$$i_p = i_s = 0 \tag{37}$$

Therefore, through appropriate gating of $S_{t,u}$ and $S_{t,l}$ the average applied voltage to the transformer can be made to be equal to 0. This is to avoid saturation of the transformer. Additionally, the primary side transformer winding current is positive and equal to $i_{L1}$ when $S_{t,u}$ is on and $S_{t,l}$ is off and negative and equal to $-i_{L2}$ when $S_{t,u}$ is off and $S_{t,l}$ is on. Therefore, the average DC current of the transformer can be minimized by reducing the difference between $i_{L1}$ and $i_{L2}$, for instance.

Figure 51:
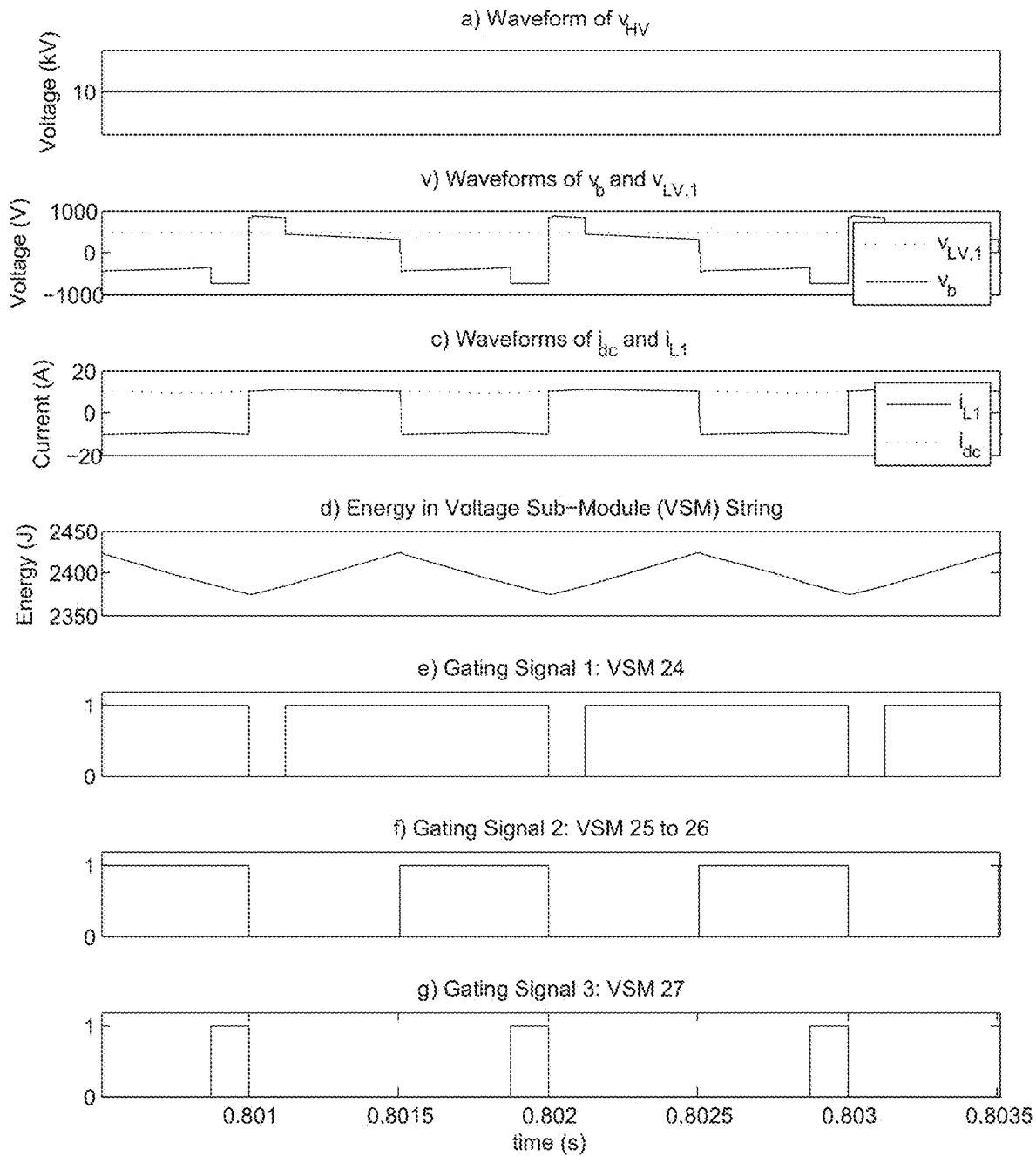
FIG. 51 presents the simulation results for Case 8. This is a steady-state operating case. This is a simulation of the topology of FIG. 38. In Case 8, 20 amps is delivered to a 500 V lower-voltage DC network. Power is supplied by the 10 kV higher-voltage DC side.

An example of gating signals is provided in FIG. 51e, FIG. 51f and FIG. 51g. Note, FIG. 51 corresponds to an alternate embodiment and this gating signal may not work for an embodiment described in this section. This alternate embodiment is referenced here strictly to illustrate what a gating signal pulse may look like.

When the gating signal is equal to a high value (in this particular example, the high value equals 1) the switch corresponding to this gating signal is triggered on. Conversely when the gating signal is equal to a low value (in this particular example, the low value equals 0) the switch corresponding to this gating signal is triggered off. Note, the gating signal values may be of different values other than 1. Additionally, the waveforms for the gating signals are idealized in FIG. 51. Furthermore, this is only one such example of a gating signal pulse, other types of gating signals are also possible.

Gating signals can be controlled through a controller device, which may reside on a same circuit, in some embodiments, or be interfaced with from another circuit (e.g., through an electronic interconnection). Gating signals may be associated with one or more clock signals which are used to synchronize the gating commands provided to various switches (e.g., the high/low values to be sent, or other values sent to the switches to operate them). Gating signals control timing of switch activation/actuation. The gating signals can be obtained, for example, as provided by a gating protocol (alternatively referred to as a control protocol, with gating signals similarly referred to as controlling actions) stored thereon on machine-interpretable memory or instruction sets, which may be interpreted and executed on a processor or waveform function generator.

The converter through control action can change the state of the CSM. The CSM state can be changed directly or indirectly in some embodiments of the invention. If the CSM switches are implemented with diodes for instance then the CSM state is changed indirectly. By controlling the state of the VSM switches it is possible to forward bias and reverse bias select CSM diodes since by changing the total number of inserted VSMs it is possible to change the polarity of the voltage being applied across the input terminals of the CSM. The CSM state can be changed directly if the CSM switches are implemented with active switches such as MOSFETs in some embodiments, GTOs in some embodiments, or other controllable switches. Discharge Mode The three operating states for discharge mode are presented in FIG. 22. A similar analysis to that performed for the charge mode can be carried out for the discharge mode operating mode.

Reverse Power Transfer Mode

A similar analysis to that for forward power transfer mode can be carried out for the reverse power transfer mode operating modes. The 6 operating states for reverse power transfer mode are presented in FIG. 23 and FIG. 24. The analysis for reverse power transfer mode is similar to that of the forward power transfer mode case. However, an important difference between forward and reverse power transfer mode should be highlighted. The previous discussion on the forward power transfer mode considered passively controlled secondary side switches ($S_{p,u}, S_{p,l}, S_{n,u}, S_{n,l}$). Unlike, for the forward power transfer mode case, in the reverse power case, active control of the secondary side switches is required in some embodiments. In the reverse power transfer mode case, the gating of the isolation stage primary side switches ($S_{t,u}, S_{t,l}$) is synchronized with the gating of the isolation stage secondary side switches ($S_{p,u}, S_{p,l}, S_{n,u}, S_{n,l}$).

In some embodiments, the gating of $S_{p,u}$ and $S_{n,l}$ is complementary to the gating of $S_{p,l}$ and $S_{n,u}$. As way of illustration, when $S_{t,u}=1$ and $S_{t,l}=0$: if $S_{p,u}$ and $S_{n,l}$ are on and $S_{p,l}$ and $S_{n,u}$ are off, power will be delivered by the lower-voltage network. Conversely, if $S_{p,u}$ and $S_{n,l}$ are off and $S_{p,l}$ and $S_{n,u}$ are on power will be delivered to the lower-voltage network. When $S_{t,u}=0$ and $S_{t,l}=1$: if $S_{p,u}$ and $S_{n,l}$ are off and $S_{p,l}$ and $S_{n,u}$ are on power will be delivered by the lower-voltage network. Conversely, if $S_{p,u}$ and $S_{n,l}$ are on and $S_{p,l}$ and $S_{n,u}$ are off power will be delivered to the lower-voltage network. Therefore in the reverse power case, $S_{t,u}$, and $S_{n,l}$ are gated on and $S_{p,l}$ and $S_{n,u}$ are gated off for intervals when $S_{t,u}=1$ and $S_{t,l}=0$; and $S_{p,u}$ and $S_{n,l}$ are gated off and $S_{p,l}$ and $S_{n,u}$ are gated on for intervals when $S_{t,u}=0$ and $S_{t,l}=1$. This can be observed in FIG. 23 and FIG. 24.

Alternate Embodiment #2

Figure 5:
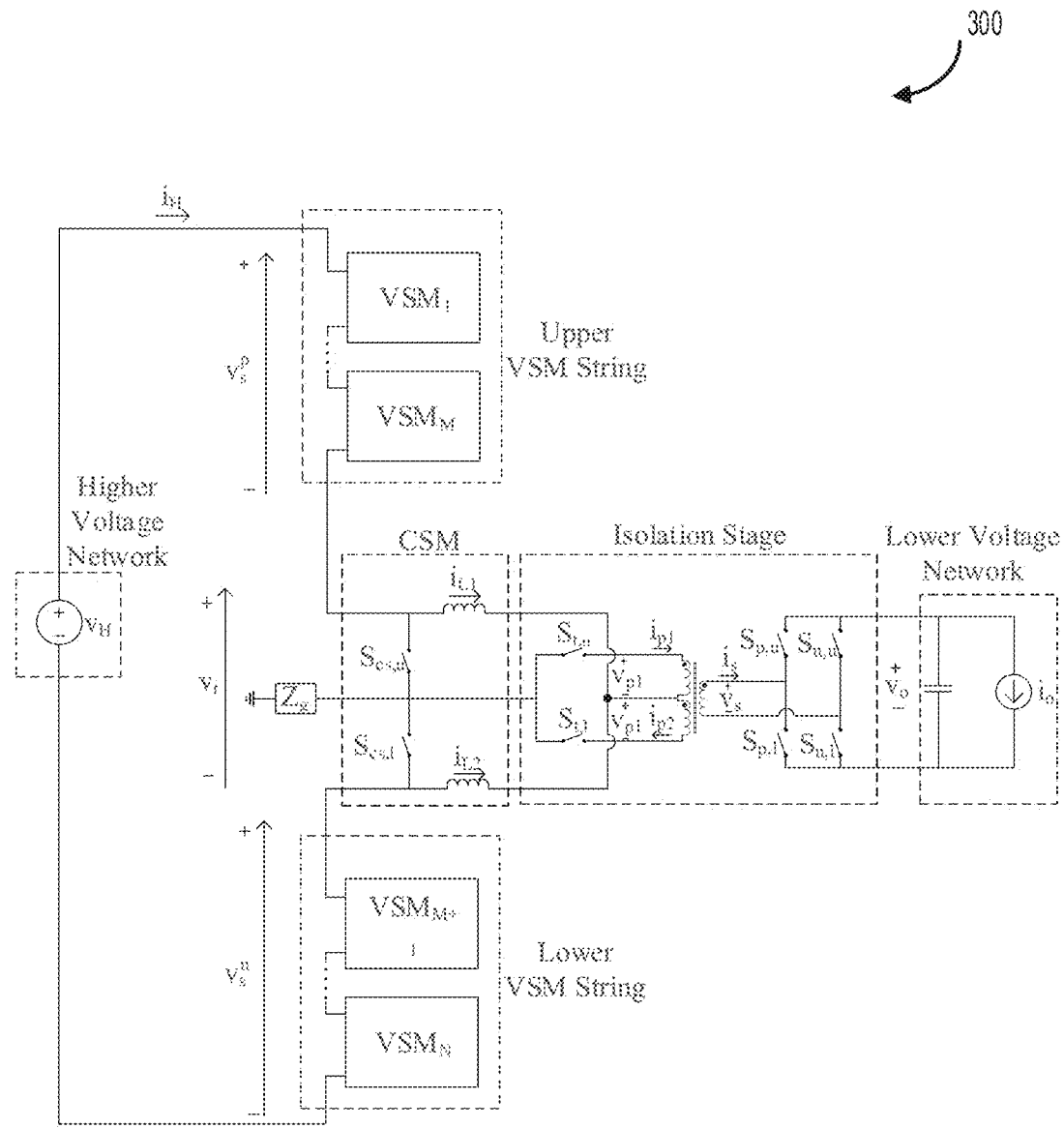
FIG. 5 presents an alternate embodiment of FIG. 2.

In this section, the operating principles specific to the alternate embodiment of FIG. 5 are described. Please refer to FIG. 25 to FIG. 28 for the operating states specific to this embodiment. Note, unlike in an embodiment of FIG. 3, $v_o>0$ is both forward and reverse power transfer mode in this alternate embodiment.

Forward Power Transfer Mode

There are 6 main operating states during forward transfer mode: 3 operating states during charge mode and 3 operating states during discharge mode. These 6 operating states are described further in this section.

Charge Mode

Figure 25:
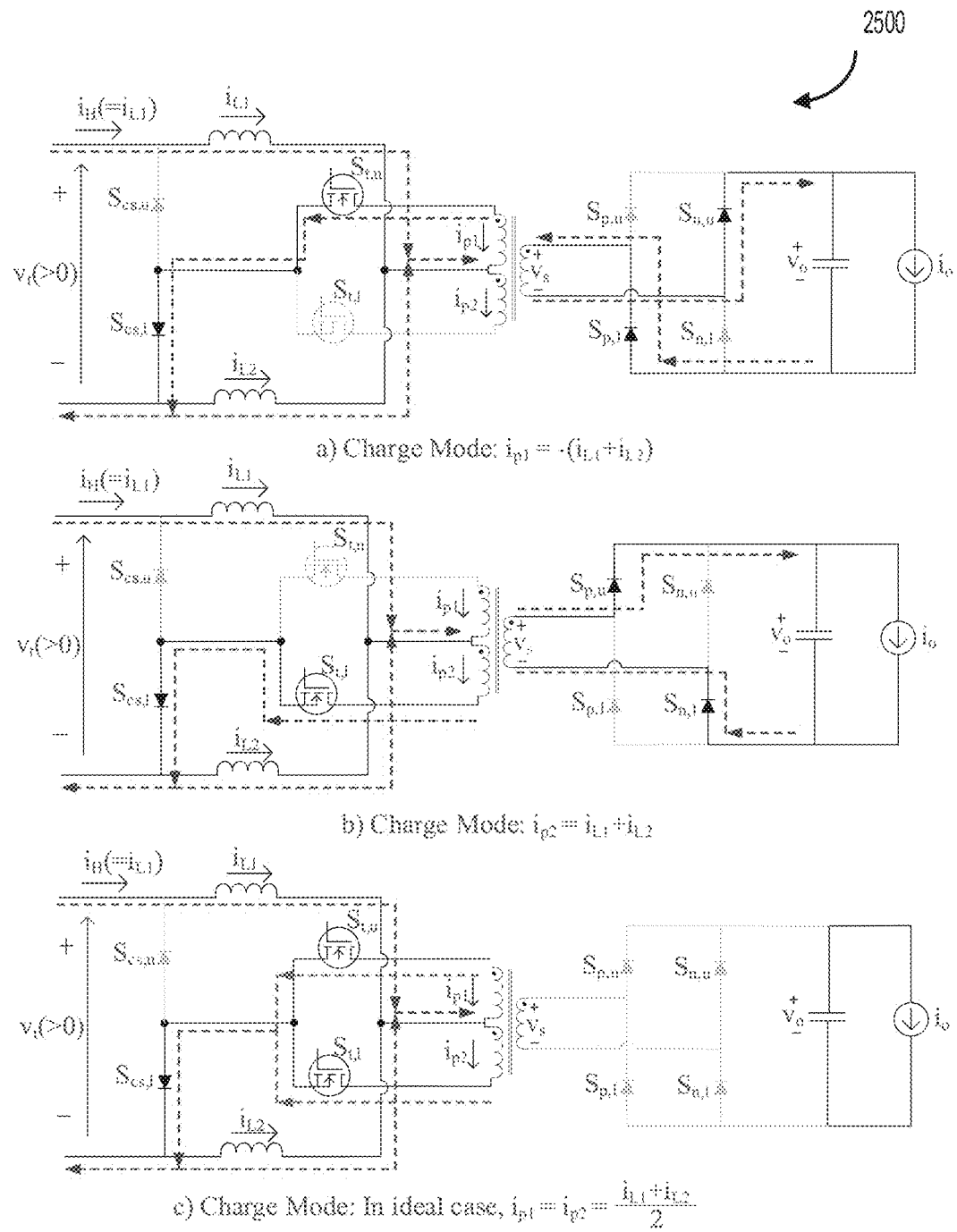
FIG. 25 presents main operating modes for an alternate embodiment with a center-tapped transformer isolation stage. The presented operating modes are specific to VSM charge mode and for forward power transfer operation (power transfer from the higher-voltage to the lower-voltage DC network).

The 3 main operating states during charge mode are described in FIG. 25. The three operating states are defined by the states of $S_{t,u}$ and $S_{t,l}$.

FIG. 25a corresponds to the condition where $S_{t,u}$ is on and $S_{t,l}$ is off. Key voltages and current relations for this operating state are described by the following equations, $$v_{L1} = (V_H - N_c V_c) - n_{t1} v_o \quad (38)$$

$$v_{L2} = -n_{t1} v_o \quad (39)$$

$$v_{p1} = -n_{t1} v_o \quad (40)$$

$$v_{p2} = -n_{t2} v_o \quad (41)$$

$$v_s = -v_o \quad (42)$$

$$i_{p1} = -(i_{L1} + i_{L2}) \quad (43)$$

$$i_{p2} = 0 \quad (44)$$

$$i_s = -\frac{1}{n_{t1}}(i_{L1} + i_{L2}) \quad (45)$$

Where, $n_{t1}$ is the turns ratio of primary winding 1 with respect to the secondary winding of the transformer; and $n_{t2}$ is the turns ratio of primary winding 2 with respect to the secondary winding of the transformer.

FIG. 25b corresponds to the condition where $S_{t,u}$ is off and $S_{t,l}$ is on. Key voltages and current relations for this operating state are described by the following equations, $$v_{L1} = (V_H - N_c V_c) - n_{t2} v_o \quad (46)$$

$$v_{L2} = -n_{t2} v_o \quad (47)$$

$$v_{p1} = n_{t1} v_o \quad (48)$$

$$v_{p2} = n_{t2} v_o \quad (49)$$

$$v_s = v_o \quad (50)$$

$$i_{p1} = 0 \quad (51)$$

$$i_{p2} = i_{L1} + i_{L2} \quad (52)$$

$$i_s = \frac{1}{n_{t2}}(i_{L1} + i_{L2}) \quad (53)$$

FIG. 25c corresponds to the condition where both $S_{t,u}$ and $S_{t,l}$ are on. The main voltages and currents impressed in this operating state are described by the following equations, $$v_{L1} = (V_H - N_c V_c) \quad (54)$$

$$v_{L2} = 0 \quad (55)$$

$$v_{p1} = 0 \quad (56)$$

$$v_{p2} = 0 \quad (57)$$

$$v_s = 0 \quad (58)$$

$$i_{p1} \approx i_{p2} \approx i_{L1} \quad (59)$$

$$i_s = 0 \quad (60)$$

Therefore, similar to the embodiment of FIG. 4, through appropriate gating of $S_{t,u}$ and $S_{t,l}$ the average applied voltage to the transformer can be made to be equal to 0. This to avoid saturating the transformer. The primary side transformer winding 1 current is negative and equal to $-(i_{L1}+i_{L2})$ is when $S_{t,u}$ on and $S_{t,l}$ is off. The primary side transformer winding 2 current is positive and equal to $i_{L1}+i_{L2}$ when $S_{t,u}$ is off and $S_{t,l}$ is on.

Therefore, the average current of the transformer can be made to be equal to 0 through appropriate control action of $S_{t,u}$ and $S_{t,l}$. Unlike in the alternate embodiment of FIG. 4, in this embodiment minimizing the difference between the inductor currents, $i_{L1}-i_{L2}$, is not necessary for minimizing the average DC current through the transformer windings. This is because the currents conducted by the primary side of the transformer are equal to the sum of the inductor 1 and inductor 2 currents in this embodiment.

Discharge Mode

Figure 26:
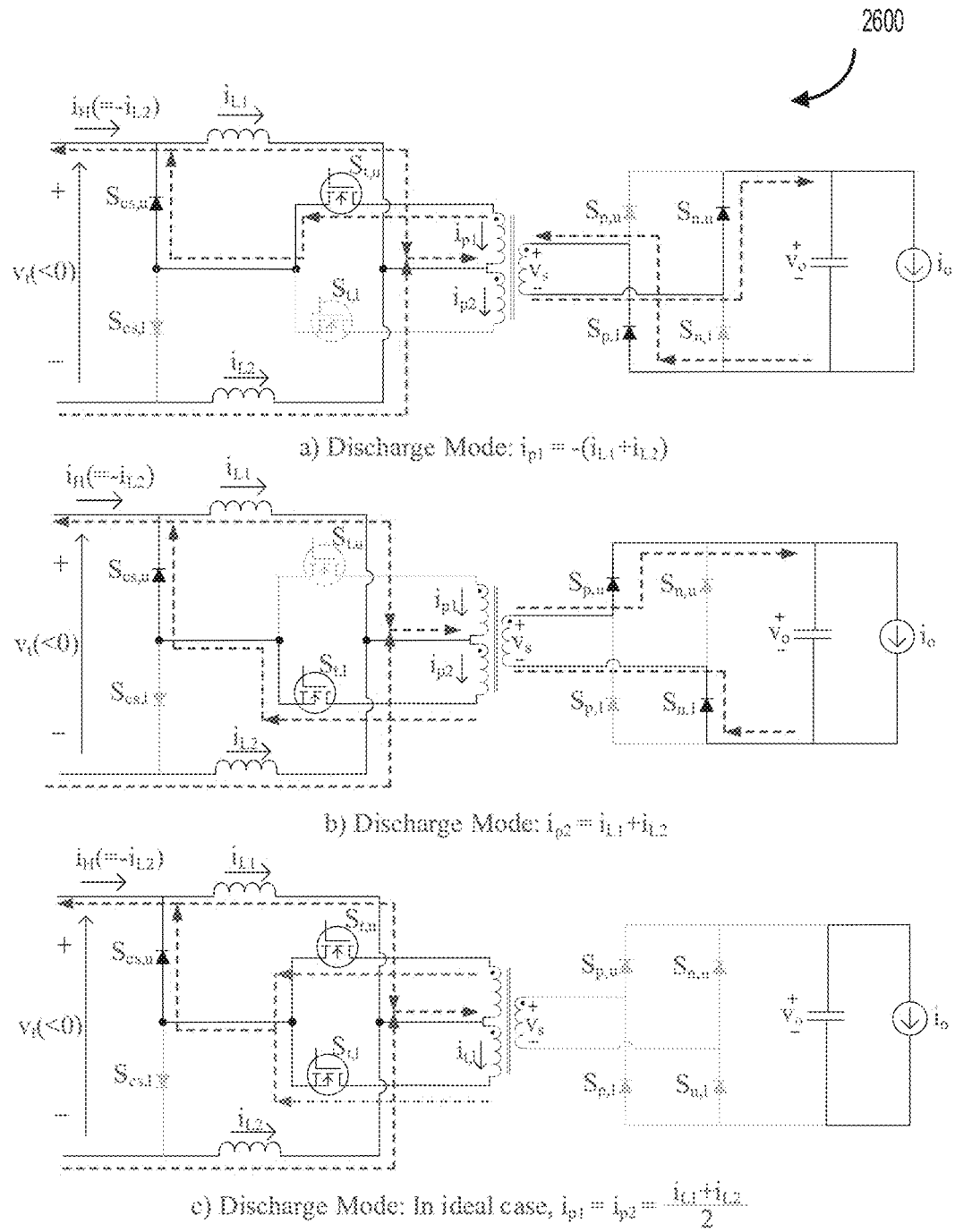
FIG. 26 presents main operating modes for an alternate embodiment with a center-tapped transformer isolation stage. The presented operating modes are specific to VSM discharge mode and for forward power transfer operation (power transfer from the higher-voltage to the lower-voltage DC network).
Figure 27:
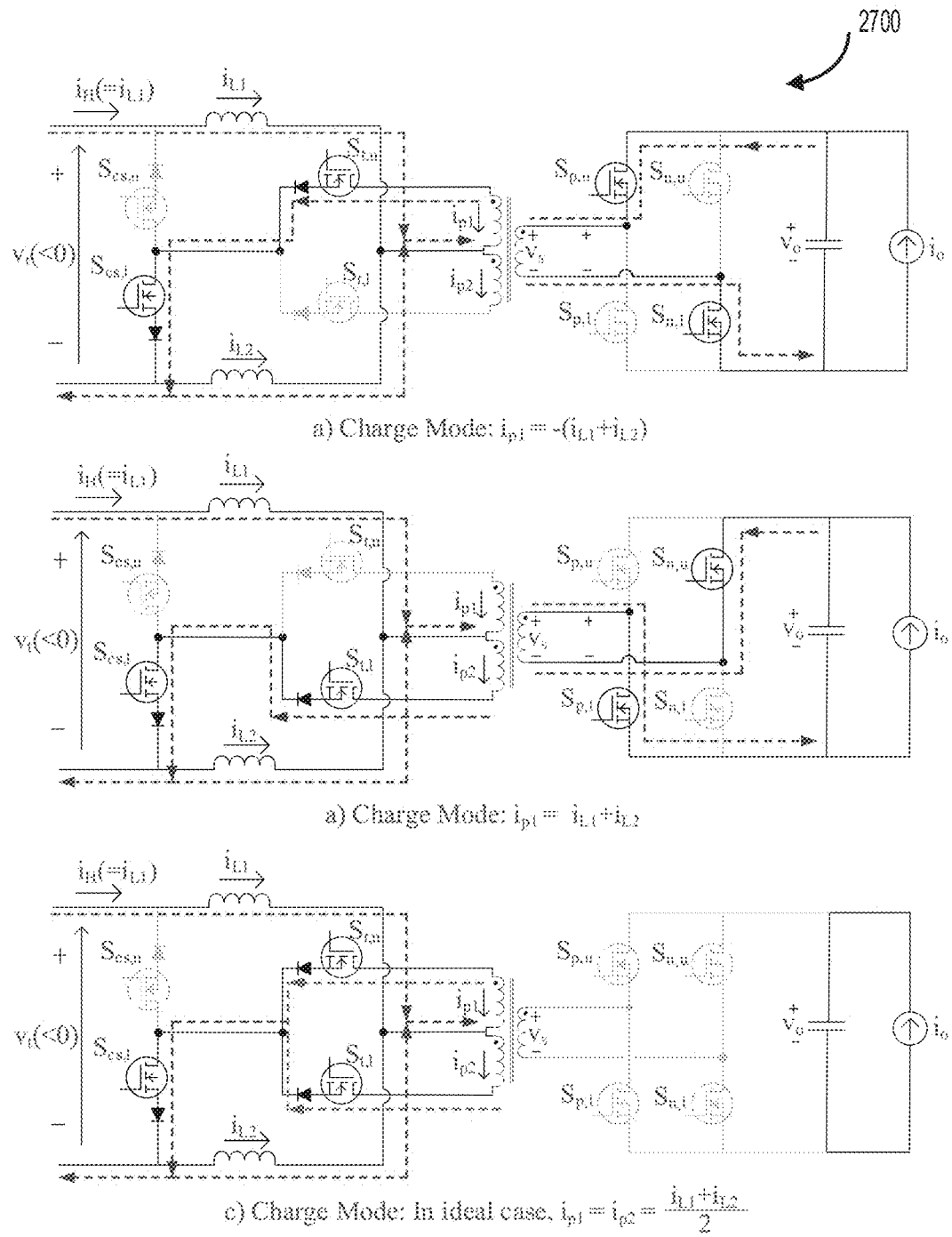
FIG. 27 presents main operating modes for an alternate embodiment with a center-tapped transformer isolation stage. The presented operating modes are specific to VSM charge mode and for reverse power transfer operation (power transfer from the lower-voltage to the higher-voltage DC network).
Figure 28:
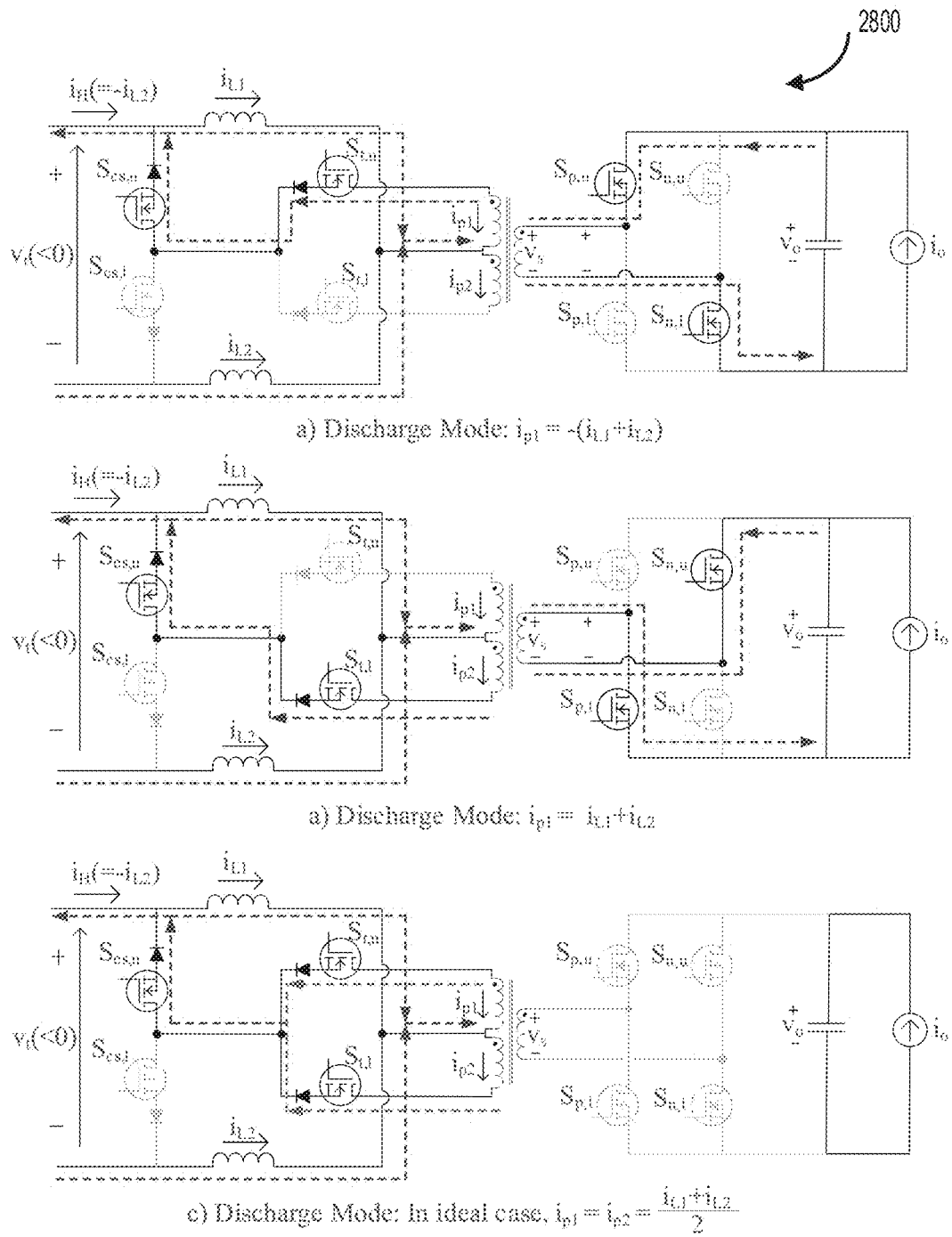
FIG. 28 presents main operating modes for an alternate embodiment with a center-tapped transformer isolation stage. The presented operating modes are specific to VSM discharge mode and for reverse power transfer operation (power transfer from the lower-voltage to the higher-voltage DC network).

The three operating states for discharge mode are presented in FIG. 26. A similar analysis to that performed for the charge mode can be carried out for the discharge mode operating mode. Therefore, the discharge mode is not discussed further here.

Reverse Power Transfer Mode

A similar analysis to that for forward power transfer can be carried out for the reverse power transfer mode operating modes. The 6 main operating states for reverse power transfer mode are presented in FIG. 27 and FIG. 28. The analysis is not detailed here.

The reverse power transfer mode cases are similar for the alternate embodiment of FIG. 4 and therefore is not discussed further here.

Control Considerations

In this section, an analysis is performed to demonstrate one possible control approach for an embodiment. A similar control approach can be employed for the two alternate embodiments with the isolation stage. Note there are multiple ways to realize the control of this converter this is only one such implementation. The control objectives for this control approach are as follows:

1. Regulate the lower voltage network voltage, $V_o$, to a reference value.
2. Minimize the difference between the two CSM inductor currents, $I_{L1}-1_{L2}=0$.
3. Regulate the sum of the VSM sub-module voltages, $v_c^\Sigma$ to a reference value. Note, the sum of the VSM sub-module values can be calculated via the following expression, $$v_c^\Sigma = \sum_{i=1}^{N} v_{c,i}$$

4. Regulate the individual voltage sub-module voltages.

This section describes this control approach with respect to the forward power transfer operation case. However, this control approach can be similarly applied to the reverse power transfer operation case with some modifications which are detailed in the section following this one.

One or multiple controller devices take measurements of the circuit states such as current and voltage. This may be done by current measurement devices and voltage measurement devices, respectively, for example.

These measurements are fed as input signals to the controller devices. These input signals are then processed by the one or multiple controller devices. The one or multiple controller devices generates output signals.

These output signals in an embodiment are influenced by the measurement inputs. However, this may not be the case in some embodiments. The gating signals fed as an input to the directly controllable switches of the converter may originate from the one or multiple controller devices, in some embodiments. Examples of the controller device includes a microcontroller or FPGA.

The control approach or control algorithm is stored in memory on the one or multiple controller devices in some embodiments. In an embodiment the control approach or control algorithm influences how the input signals are processed by the one or multiple controller devices which in turn influences the gating signals.

Steady-State Analysis

If volt-second balance is applied to the two inductors $L_1$ and $L_2$ for an embodiment over a switching period, the following two expressions can be derived, $$\langle V_{L1} \rangle_{T_s} = D_o(V_H - N_c V_c) - V_o$$

$$\langle V_{L2} \rangle_{T_s} = D'_o(N_d V_c - V_H) - V_o \quad (61)$$

where, $D_o \in [0,1]$ is a duty ratio term which denotes the relative duration of the charge and discharge operating modes; and $\langle \bullet \rangle_{T_s}$ denotes the average over a switching period.

Since, $\langle V_{L1} \rangle_{T_s} = \langle V_{L2} \rangle_{T_s} = 0$ in steady-state, the above equations can be re-arranged to solve for the following expressions for $N_c$ and $N_d$, $$N_c = \frac{D_o V_H - V_o}{D_o V_c} \quad (62)$$

$$N_d = \frac{V_o + V_H D'_o}{V_c D'_o}$$

Since, $D_o$ is unknown, an additional expression must be derived.

By employing Eq. 2 and Eq. 6, the average power delivered to the VSM string over a switching period can be expressed as follows, $$\langle P_o \rangle_{T_s} = D_o N_c V_c I_{L1} - D'_o N_d V_c I_{L2} \quad (63)$$

where, the first term denotes the average power delivered to the VSM string during charge mode; the second term denotes the average power delivered by the VSM string during discharge mode.

This expression for $\langle P_o \rangle_{T_s}$ can be simplified by noting that in steady-state $\langle P_o \rangle_{T_s} = 0$ and in addition in steady-state if the control objectives are met the output current, $I_o$, is equally shared between $i_{L1}$ and $i_{L2}$, i.e.

$$\frac{I_o}{2} = I_{L1} = I_{L2} \quad (64)$$

Therefore, the expression (63) for $\langle P_o \rangle_{T_s}$ can be simplified into the following expression, $$0 = \frac{D_o N_c V_c I_o}{2} + \frac{D'_o N_d V_c I_o}{2} \quad (65)$$

The above expression can be re-arranged and simplified into the following, $$D_o N_c = N_d D'_o \quad (66)$$

Expressions for $N_c$ and $N_d$ were previously derived in (62). By substituting these two expressions into (66) and then simplifying, the following expression for $D_o$ can be derived, $$D_o = \frac{1}{2} + \frac{V_o}{V_H} \quad (67)$$

Therefore in this particular implementation of the control, the outer duty ratio, $D_o$, is a function of the lower-voltage network voltage, $V_o$, and the higher-voltage network voltage, $V_H$.

This expression for $D_o$ can be substituted into (62) resulting in the following expressions for $N_c$ and $N_d$, $$N_c = \frac{V_H}{V_c}\left(1 - \frac{2V_o}{V_H + 2V_o}\right) \quad (68)$$

$$N_d = \frac{V_H}{V_c}\left(1 + \frac{2V_o}{V_H - 2V_o}\right)$$

Note, $N_c$ and $N_d$ are continuous numbers and denote the average number of cells inserted during the charge and discharge intervals. However, it is important to note that due to the modular nature of the VSM string $v_s(t)$ can only take on fixed voltage levels.

Therefore, the control functionality of the converter controller is such that the average number of cells inserted during charge mode equals $N_c$ and the average number of cells inserted during discharge mode equals $N_d$.

This can be expressed as follows, $$N_c = D_c \lfloor N_c \rfloor + D'_c \lceil N_c \rceil$$

$$N_d = D'_d \lfloor N_d \rfloor + D_d \lceil N_c \rceil \quad (69)$$

Where $D_d \in [0,1]$ is a duty ratio term specific to the VSM charge operating mode; $D_0 \in [0,1]$ is a duty ratio term specific to the VSM discharge operating mode; $\lceil \bullet \rceil$ represents the ceiling function; $\lfloor \bullet \rfloor$ represents the floor function.

Charge mode consists of two sub-intervals in this particular control implementation. In sub-interval 1, $\lfloor N_c \rfloor$ VSMs are inserted and in sub-interval 2 $\lceil N_c \rceil$ VSMs are inserted. $\lfloor N_c \rfloor$ and $\lceil N_c \rceil$ are separated by 1 VSM cell in this control implementation. Therefore, $\lceil N_c \rceil - \lfloor N_c \rfloor = 1$; $D_c$ denotes the relative duration of $\lceil N_c \rceil$ with respect to $\lfloor N_c \rfloor$ during charge mode. The discussion, for the $N_d$ terms follows similarly and therefore is not discussed here.

If the expressions of $\lceil N_c \rceil = \lfloor N_c \rfloor + 1$ and $\lceil N_d \rceil = \lfloor N_d \rfloor + 1$ are substituted into (69) the resulting expressions for $D_c$ and $D_d$ can be derived, $$D_C = 1 - N_c + \lfloor N_c \rfloor$$

$$D_d = N_d - \lfloor N_d \rfloor \quad (70)$$

Therefore, by selecting $D_c$ and $D_d$ as per the above expressions, the continuous $N_c$ and $N_d$ values are obtained even though the VSM string $v_s(t)$ features only fixed voltage levels.

It should be noted that in this analysis it is assumed that in both charge and discharge mode the average $N_c$ and $N_d$ values are controlled through the adjustment of the relative dwell times of two adjacent voltage levels ($\lfloor N_d \rfloor$ and $\lceil N_d \rceil$ for instance) of $v_s(t)$, respectively. However, this is only one such approach. For instance, it is possible to obtain the average $N_c$ and $N_d$ values by adjusting the relative dwell times of voltage levels that are not adjacent. Additionally, it is possible to use more than 2 sub-intervals during charge and discharge mode, for instance.

Therefore from the above control approach there are in effect 4 sub-intervals for the converter with the implemented control. The charge mode consists of 2 sub-intervals and the discharge mode consists of 2 sub-intervals. A summary of the 4 sub-intervals is provided here.

Charge Mode:

In sub-interval 1, $$N_1 = \left\lfloor \frac{V_H}{V_c}\left(1 - \frac{2V_o}{V_H + 2V_o}\right) \right\rfloor$$

sub-modules are inserted in the circuit for a duration equal to $D_o D_c T_s$

In sub-interval 2, $N_2 = N_1 + 1$ sub-modules are inserted in the circuit for a duration equal to DAT, Discharge Mode:

In sub-interval 3, $$N_3 = \left\lceil \frac{V_H}{V_c}\left(1 + \frac{2V_o}{V_H - 2V_o}\right) \right\rceil$$

sub-modules are inserted in the circuit for a duration equal to $D'_o D_d T_s$

In sub-interval 4, $N_4 = N_3 - 1$ sub-modules are inserted in the circuit for a duration equal to Do Regulation of the Individual Cell Voltages The approach presented in the previous section will ensure that the total sum of the VSM cell voltages is regulated. However, additional control functionality is required in some embodiments to control the individual VSM voltages of the VSM strings. To control the individual VSM voltages, a sort and select control approach is employed in an embodiment to the converter circuit.

Over a given switching period, some VSM cells will be receive an excess of charge while some VSM cells will receive a deficit of charge in the control approach proposed in the preceding section.

In order to regulate the voltage of the individual VSM cells, in this sort and select control approach, gating signals are distributed to the VSM cells such that the cells of lowest state of charge receive an excess of charge; while the VSM cells of greatest state of charge receive a deficit of charge over the given switching periods. Note, this is only one such implementation for controlling the individual cell voltages. Other approaches are also possible.

Reverse Power Transfer Mode

To reverse the power direction from the lower-voltage network to the higher-voltage network, the CSM switch $S_{cs,u}$ is off and $S_{cs,l}$ is on when $v_t$<0; and $S_{cs,u}$ is on and $S_{cs,l}$ is off when $v_t$>0. The gating of $S_{cs,u}$ and $S_{cs,l}$ is synchronized with the charge and discharge operating modes of the converter in order to realize this reversal of power from the lower-voltage network to the higher-voltage network.

Note, the gating of $S_{cs,u}$ and $S_{cs,l}$ for reverse power transfer mode is made just prior to the polarity reversals of $v_t$ in some embodiments. This is required to turn-on switching devices in some embodiments that requires a positive voltage to turn-on.

SUMMARY

In summary, through adjustment of the duty cycles $D_o$, $D_c$ and $D_d$ together with the appropriate selection of the number of sub-modules $N_c$, and $N_d$ corresponding to the 4 sub-intervals, the control objectives of this particular application of the control can be achieved in steady-state. Note, this is only one such control implementations. Other control objectives and control approaches are also possible for this converter circuit Additional Details In this section, some additional aspects of some embodiments of the topology are described.

By separating the power inductor from the HV loop by the CSM, the topology features both a fast di/dt during commutation intervals (limited by the HV loop inductance) and also a slow di/dt limited by a CSM inductor inductance. This combination of both a slow and fast di/dt enables a VSM string current, $i_H$, that both features fast direction changes but also a controlled magnitude with low ripple component in some embodiments. The CSM in effect clamps the string current when undergoing a direction change.

Short commutation intervals enable the converter to realize greater effective switching frequencies. Higher effective switching frequencies enable reduced capacitance for the capacitors and inductances for the inductors in the circuit, for instance. An example of a higher effective switching frequency may be 10 kHz in some embodiments of the converter circuit. The conventional AC transformer operates at line frequency which is at 50 or 60 Hz and therefore with this topology it is possible to operate at higher frequencies than AC grid connected systems. In some embodiments with the isolation stage, the AC frequencies seen by the isolation stage transformer are not restricted to being at the line frequency as in conventional AC distribution grid transformers. Therefore, the transformer can potentially made much cheaper and with less volume in these embodiments compared to a transformer for AC grid applications. Additionally, by operating at the higher effective switching frequencies it enables reduced capacitances of capacitors and inductances of inductors in some embodiments of the converter circuit.

The slow di/dt of the CSM inductor inductance enables a DC-current to be delivered to the lower-voltage DC network with small ripple. An advantage of this is that the peak currents through the circuit are reduced and in addition the lower-voltage network capacitance sinks the ripple current of the CSM inductor or inductors in some embodiments.

Therefore, if larger ripple currents were delivered to the lower-voltage DC network capacitor the lower-voltage DC network capacitor may have to be increased compared to the case for low ripple currents.

In some embodiments, power is exchanged bi-directionally between the VSM string and the higher-voltage DC network in-order to ensure VSM string energy balance. When the HV-side current, $i_H$, is of positive current direction, power is delivered from the higher-voltage DC network to the VSM string and to the CSM. When the HV-side current, $i_H$, is of negative current direction, the VSM string delivers power to the higher-voltage DC network and to the CSM. Therefore, through the application of a sufficiently long negative current interval, voltage regulation of the VSM string is achieved.

In some embodiments, mixed frequency AC and DC voltage components are generated within the converter in order to balance the VSM string and to deliver power to the CSM. This enables a DC current component to flow through the VSM string while still maintaining energy balance of the VSM string. The AC components can be of a higher frequency as the HV loop inductance can be made sufficiently small. Furthermore, this topology enables a VSM string current of near-square wave waveshape to propagate down the VSM string. This combination of higher frequency AC components and a near-square wave current waveshape enables reductions to the converter inductances and capacitances.

In some embodiments, it is the CSM that shapes the VSM string current. By using the CSM to shape the current, the current direction can be quickly changed and the magnitude controlled.

The CSM shapes the string current as it is in series with the string. In an embodiment, with a set of CSM switch states the string current is equal to an inductor current. Similarly, with another set of CSM switch states, the string current is equal to the negative of an inductor current. By controlling (either directly or indirectly) these CSM switch states, then the string current can be made to be equal to the inductor current and equal to the negative of an inductor current over a switching period.

It is in this way that it is said that the CSM shapes the string current. Since the string current amplitude during these two cases is equal to a CSM inductor current and is equal to either a positive or negative of this inductor current depending on the state of the CSM switches.

The string current can be quickly reversed as there is no required external inductor in series with the VSM string in some embodiments.

After the control acts to change the direction of the current into the series string a commutation or free-wheeling state first occurs where a loop is formed wherein the current in the series connected string is equal to a loop current and accordingly, there is no inductor of the CSM limiting a change in the current into the series connected string and an inductance in the loop is only a leakage inductance of the loop. It is also possible to add an external leakage inductance and actually this may be preferable in some embodiments.

Therefore the only inductance in this loop is the leakage inductance of the loop in some embodiments. Because the leakage inductance is typically of relatively small value, a fast change in string current di/dt can be realized.

Figure 30:
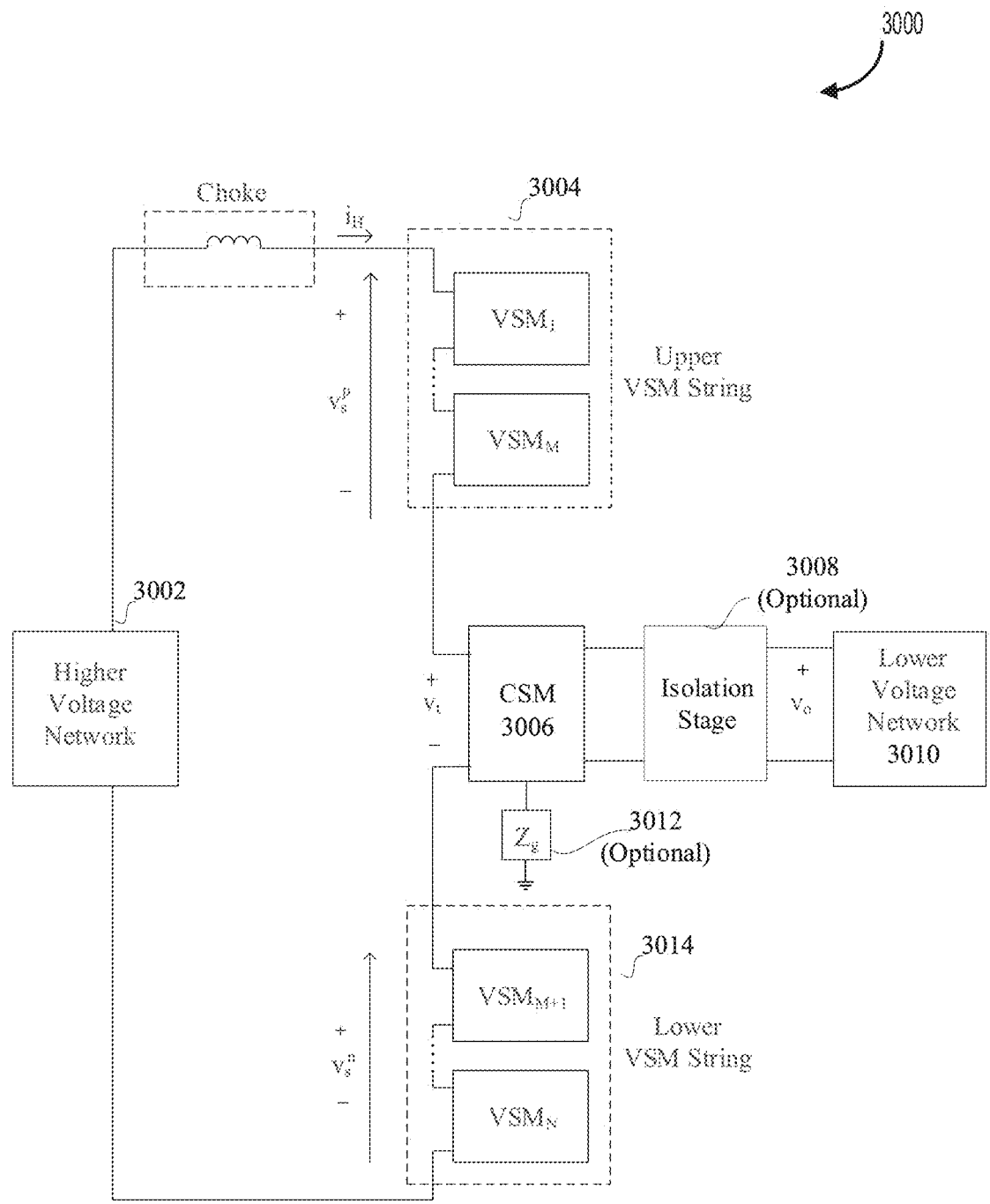
FIG. 30 presents a variant of FIG. 2 with a series choke.

Note, it is also possible to insert an external inductor alternatively termed a choke in series with the series string. Note, series string is the same as string of sub-module elements. The addition of this external inductor is shown in FIG. 30. If this external inductor is added in series with the string then during commutation or freewheeling states, this external inductor will always be in the circuit with the string and therefore will limit the rate of change in the string current value.

The inductance within the CSM ensures the current at the CSM DC side terminals remains nearly constant throughout switching of the CSM switching elements. The CSM switching elements are operated to route this current either up the high voltage string towards the positive high voltage DC terminal or towards the negative high voltage DC terminal. The CSM switches can also circulate the low voltage side current by imposing a short-circuit current path.

Regarding the optional galvanic isolation stage. At across the input terminals of the CSM, there exists in some embodiments both DC and AC voltage components. Furthermore, the VSM string current features both DC and AC current components in some embodiments. The structure of the CSM together with the optional galvanic isolation stage enables the converter to feature galvanic isolation without saturating the transformer nor circulating DC-current within the transformer.

Rating of Converter Elements

This section provides equations that could be used for guidance in rating the converter elements of the converter. Note, these are simplified equations and therefore other approaches could also be employed. This is only one such approach.

VSM String

The minimum number voltage sub-modules required, $N_{min}$, can be approximated by eq. (71), $$N_{min} = \left\lceil \frac{V_H}{V_c}\left(1 + \frac{2V_o}{V_H - 2V_o}\right)\right\rceil \tag{71}$$

In practice, additional sub-modules may be required for redundancy reasons.

The maximum current conducted by the VSM cells can be approximated as follows, $$I_{string,max} = \max(i_{l1}, i_{l2}) \tag{72}$$

The average current conducted by the inserted VSM cells during charge mode can be approximated as follows, $$I_{string} = I_{L1} \tag{73}$$

The average current conducted by the inserted VSM cells during discharge mode can be approximated as follows, $$I_{string} = I_{L2} \tag{74}$$

Current-Source Module Element

The maximum voltage magnitude across the terminals of the CSM can be approximated as follows, $$V_{t,max} = \max(|V_H - \lfloor N_c \rfloor V_c|, |\lceil N_d \rceil V_c - V_H|) \tag{75}$$

Other Design Considerations

DC-Side Filtering

A DC-side filter can be added between the series string of VSMs and the CSM and the high-voltage DC network as shown in the alternate embodiment of FIG. 29. This is an embodiment of the DC-side filter however other configurations of the DC-side filter are also possible. Some of the advantages of a DC-side filter include:
1. Reducing the commutation loop inductance when reversing the direction of the HV loop current, $i_H$;
2. Filtering of harmonics generated by the converter; and
3. The ability to use an inductor in series with the higher-voltage network to reduce fault currents without increasing the commutation loop inductance.

DC-Side Choke

A choke inductor can be added in series with the topology as shown in the alternate embodiment of FIG. 30. A choke inductor decreases the di/dt in the HV loop which can be advantageous.

As an example, in some embodiments if at least one of the voltage levels of $v_s$ (refer to FIG. 3 for reference to $v_s$) is sufficiently close to $v_H$ (for example, if $v_s(t) = v_H(t)$) it is possible for the HV and LV loops to become decoupled during the interval where $v_s$ is sufficiently close to $v_H$.

This interval could be in either the charge and/or discharge operating modes. When the HV and LV loops become decoupled under this condition, it is desirable in some embodiments that the magnitude of $i_H$ not deviate significantly from $i_L$.

Since, the change in $i_H$ when the HV and LV loops are decoupled is influenced by the HV loop inductance, by selecting a choke of sufficiently high inductance it is possible to reduce the di/dt of the current during this condition. This enables a more near square wave waveshape for the HV loop current $i_H$ to be realized.

Therefore, in some embodiments it may be desirable to include a choke inductor in the HV loop electrically in series between the higher-voltage DC network and the string of sub-module elements as shown in the alternate embodiment of FIG. 30.

Note in FIG. 30, the higher-voltage DC network is represented for illustrative purposes as a DC voltage source; however, this is only one such representation.

For instance, it may be desired to include an input filter between the choke inductor and the higher-voltage DC network. In this instance, the higher-voltage DC network could be considered as a DC voltage source with an input filter for example. Referring to FIG. 29, if an input filter is considered, the choke inductor would be electrically connected in series between the string of voltage and current source sub-module elements and the input filter. This can also be visualized from FIG. 30 if the higher-voltage DC network is instead represented as a DC-voltage source with an input filter.

Note, the larger the series inductance, the longer the commutation intervals will be assuming all else is maintained the same. Therefore, by introducing a DC-side choke the maximum effective switching frequency of the converter may be constrained.

Simulation Results

To demonstrate the operation of the converter, 7 simulation cases are provided. The simulation case results are provided in FIGS. 31 to 37. These cases demonstrate steady-state and transient operation in forward power transfer mode as well as steady-state operation in reverse power transfer mode.

The simulation cases 1 to 3 are for an embodiment of FIG. 3. The simulation cases 4 to 5 are for the alternate embodiment of FIG. 4. The simulation cases 6 to 7 are for the alternate embodiment of FIG. 5. The main circuit parameters for these simulation cases are provided in Table 1 and Table 2.

TABLE 1

Common Parameters

| Parameter | Value | Unit |
|---|---|---|
| Higher-Voltage DC Network ($V_H$) | 3 | kV |
| Switching Frequency ($f_{sw}$) | 10 | kHz |
| VSM Capacitor Capacitance (C) | 72 | uF |
| VSM Nominal Voltage ($V_c$) | 400 | V |
| Inductor $L_1$ Inductance ($L_1$) | 5 | mH |
| Inductor $L_2$ Inductance ($L_2$) | 5 | mH |
| Lower-Voltage DC Network Capacitance ($C_o$) | 1 | mF |

TABLE 2

Case Specific Parameters

| Description | Case 1 | Case 2 | Case 3 | Case 4 | Case 5 | Case 6 | Case 7 | Unit |
|---|---|---|---|---|---|---|---|---|
| Topology | FIG. 3 | FIG. 3 | FIG. 3 | FIG. 4 | FIG. 4 | FIG. 5 | FIG. 5 | |
| Lower-Voltage DC Network ($V_o$) | 380 | −380 | 380 | 380 | 367 | 380 | 346 | V |
| Output Current ($I_o$) | 20 | 20 | 10/20/5 | 20 | 25 | 25 | 25 | A |
| Number of Sub-Modules (N) | 12 | 12 | 12 | 12 | 11 | 12 | 12 | — |
| Turns Ratio Transformer | N/A | N/A | N/A | 2:1 | 2:1 | 1:1:1 | 1:1:1 | |

Case 1: Steady-State Forward Power Operation for FIG. 3 Topology

Figure 31:
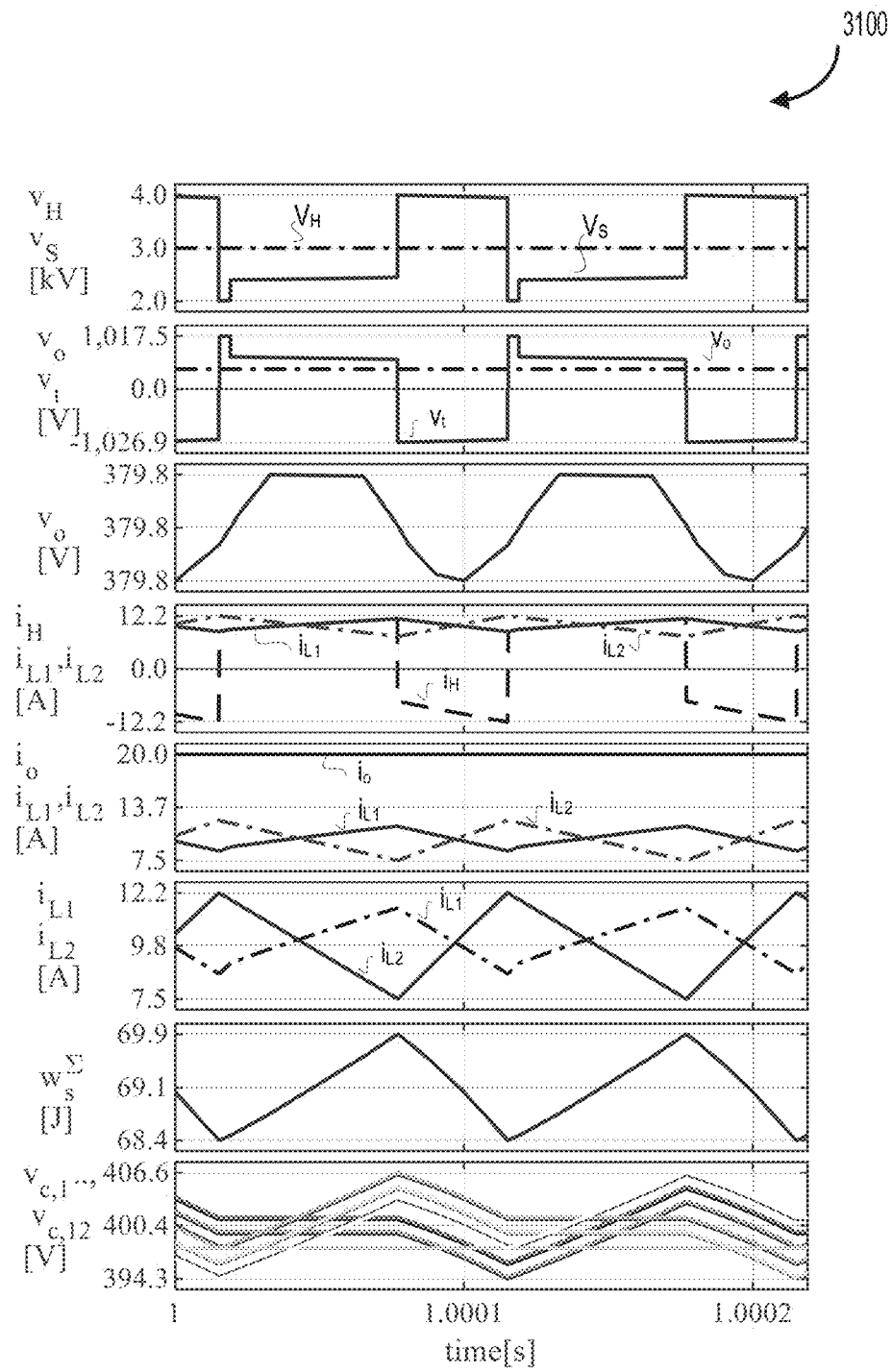
FIG. 31 presents steady-state simulation results for Case 1. In Case 1, the topology of FIG. 3 is simulated where 7.6 kW is delivered from the 3 kV higher-voltage DC network to a 380 V lower-voltage DC network.

FIG. 31 presents operating waveforms for the steady-state forward power transfer case. These simulation results are for an embodiment of FIG. 3.

In this case, the high-voltage DC network supplies 7.6 kW of power to the 380 V lower-voltage DC network. From the simulation results, it is shown that the average energy in the VSM string is approximately 69 J. This is consistent with the average cell voltages being maintained at the nominal voltage of 400 V as can be verified by the following equation, $$w_S^{\Sigma} = \frac{1}{2} C \sum_{i=1}^{N} v_{c,i}^2 \qquad (76)$$

This simulation case shows that the lower-voltage network voltage is regulated to the desired reference voltage of 380 V.

It is also important to highlight that the HV loop current, $i_H$, is of nearly square-wave shape and the converter is operating at an effective switching frequency 10 kHz. Additionally, the average current inductor $L_1$ and $L_2$ currents, $I_{L1}$ and $I_{L2}$, are approximately equal to $I_o/2=10$ Amp. The average HV loop current, $i_H$, during charge mode is equal to IL1 and equal to $-I_{L2}$ during discharge mode.

Case 2: Steady-State Reverse Power Operation for FIG. 3 Topology

Figure 32:
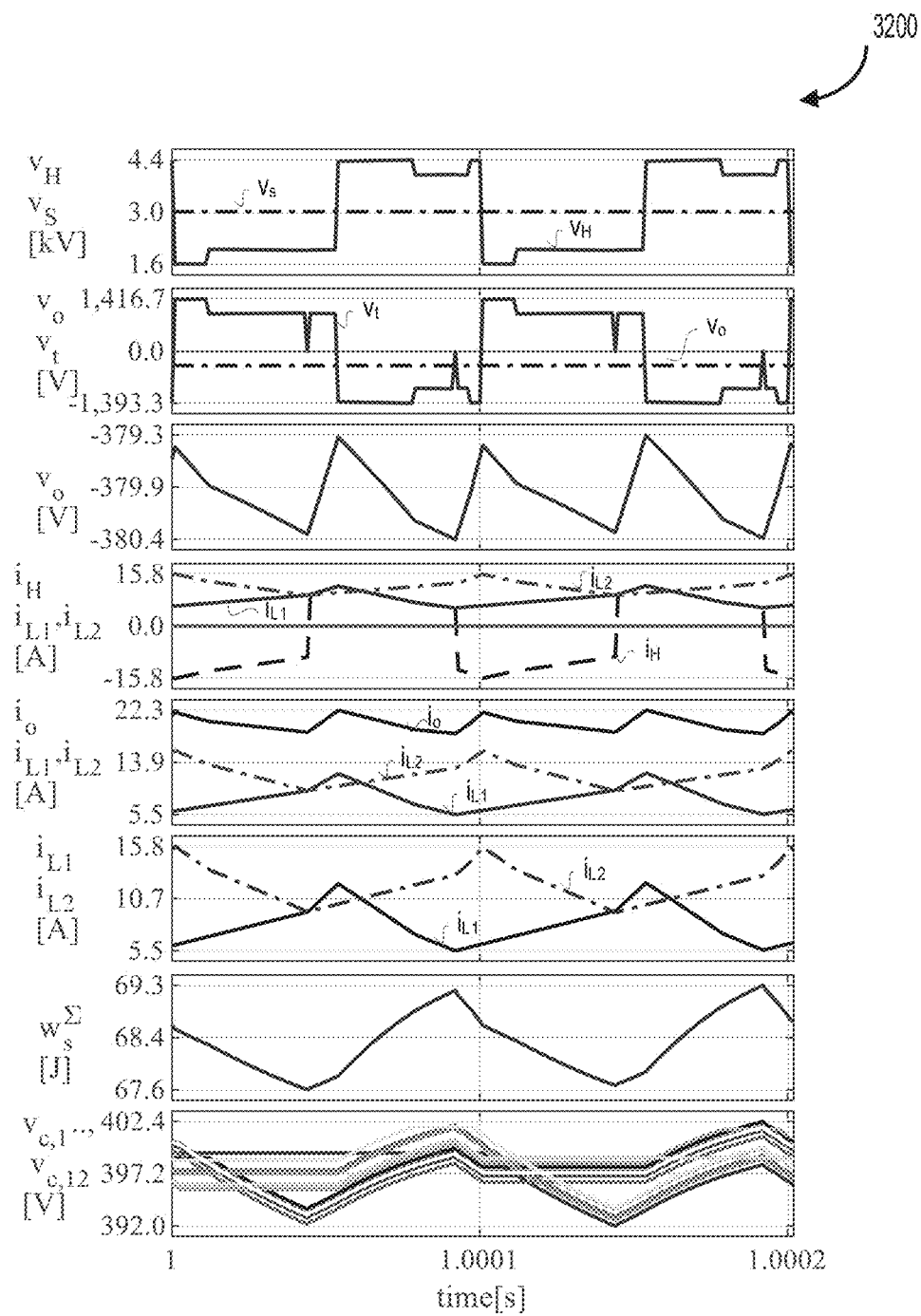
FIG. 32 presents steady-state simulation results for Case 2. In Case 2, the topology of FIG. 3 is simulated where 7.6 kW is delivered from the 380 V lower-voltage DC network to a 3 kV higher-voltage DC network.

FIG. 32 presents the results for Case 2 which is the reverse power transfer mode case. These simulation results are for an embodiment of FIG. 3. In this case, the lower-voltage network delivers 7.6 kW of power to the 3 kV high-voltage DC network.

This reversal of power flow can be directly seen as $v_o$ and $i_o$ are of opposite polarity, for instance. Additionally, the HV loop current, $i_H$ is out of phase with respect to the voltage across the input terminals of the CSM, $v_t$. The simulation results show that the energy in the upper VSM string=68.4 J which demonstrates that energy balance in the VSM string is achieved.

Case 3: Transient Forward Power Operation for FIG. 3 Topology

Figure 33:
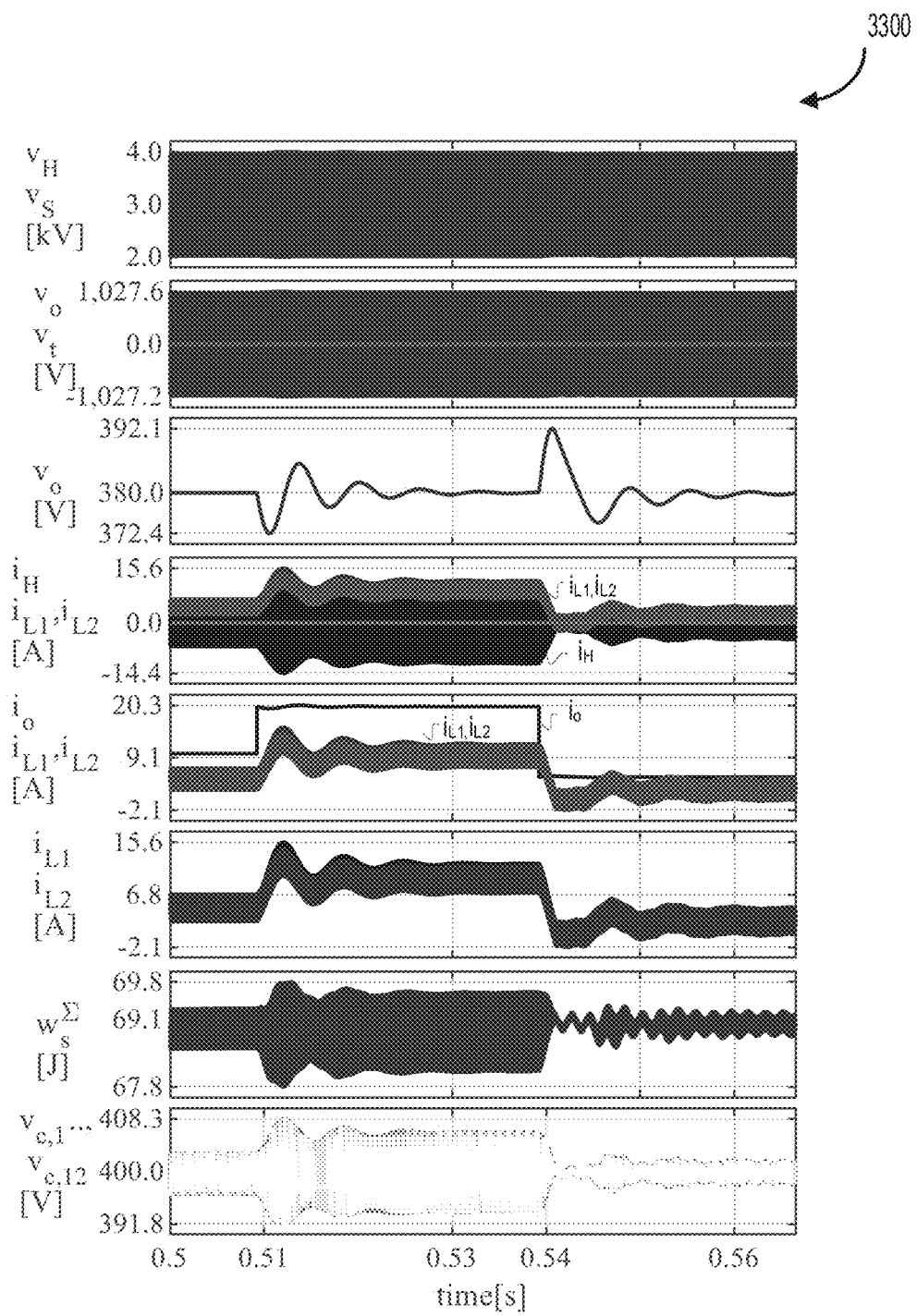
FIG. 33 presents transient simulation results for Case 3. In Case 3, the topology of FIG. 3 is simulated where power is delivered from the 3 kV higher-voltage DC network to a 380 V lower-voltage DC network. In this case, two step-changes in the load are simulated: 1) a step-change from 3.8 kW to 7.6 kW at t=0.51 sec; and 2) a step-change from 7.6 kW to 1.9 kW at t=0.54 sec.

FIG. 33 presents the results for Case 3 which is a transient case for the forward power transfer mode. These simulation results are for an embodiment of FIG. 3.

In this case, the higher-voltage DC network is initially supplying 3.8 kW to the low-voltage DC network. At t=0.51 s, the load undergoes a step change from 3.8 kW to 7.6 kW. It takes approximately 300 ms for the system to stabilize. At t=0.54 s, the load undergoes a step change from 7.6 kW to 1.9 kW. It takes approximately 200 ms for the system to stabilize. The ripple voltage in the VSM cell capacitors can be observed as being dependent on the output load current. It is also shown that the average energy in the VSM string is maintained at approximately 69 J throughout the step changes and therefore energy balance in the VSM strings is maintained. Additionally, the step-changes in load are accompanied by temporary deviations in the lower-voltage DC network voltage as is expected.

Case 4: Steady-State Forward Power Operation for FIG. 4 Topology

Figure 34:
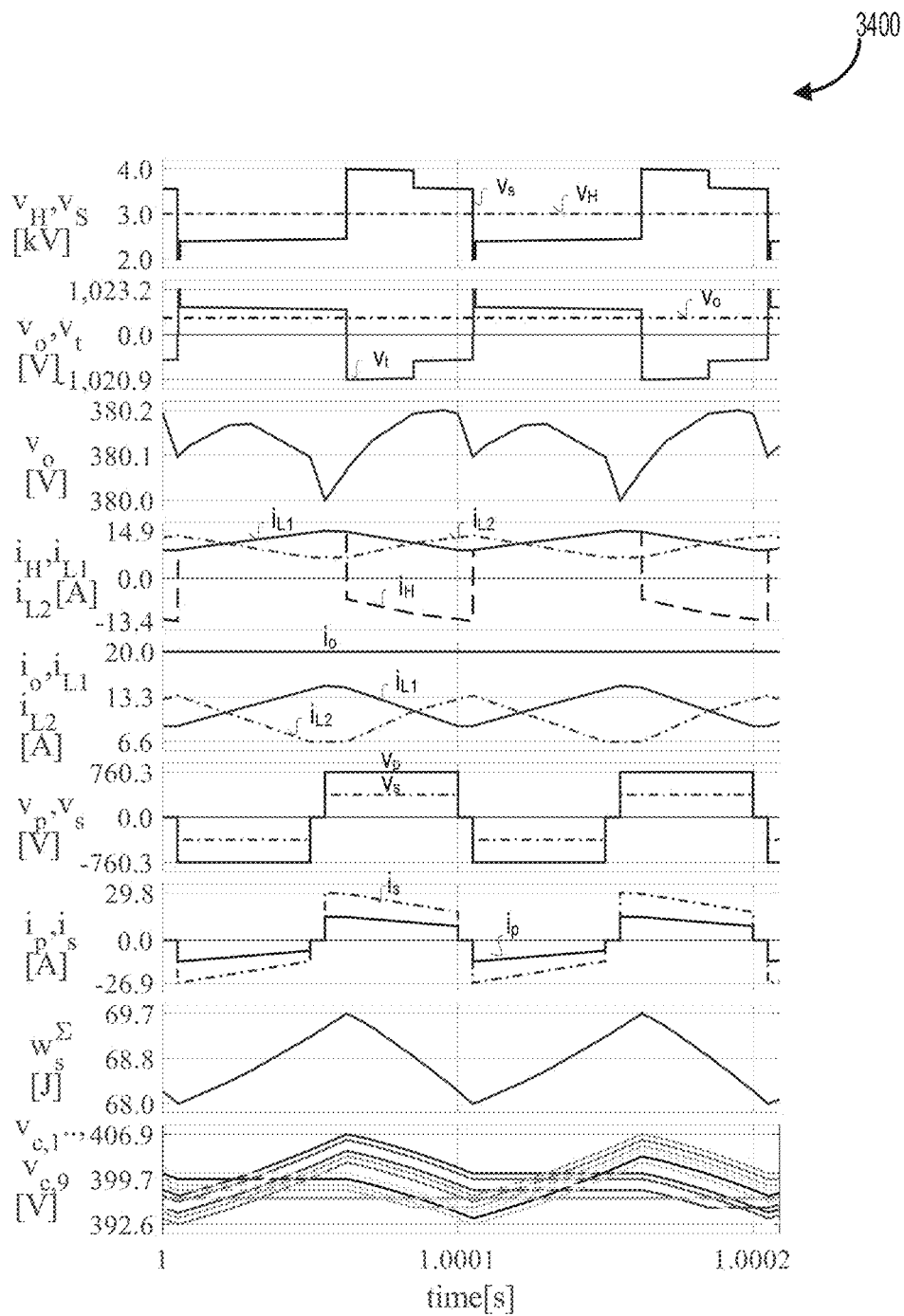
FIG. 34 presents steady-state simulation results for Case 4. In Case 4, the topology of FIG. 4 is simulated where 7.6 kW is delivered from a 3 kV higher-voltage DC network to a 380 V lower-voltage DC network.

FIG. 34 presents operating waveforms for the steady-state forward power transfer case. These simulation results are for the alternate embodiment of FIG. 4.

As can be observed 7.6 kW of power is transferred to the lower-voltage DC network. The VSM string energy is balanced over a switching period. The inductor $L_1$ and $L_2$ are shown to share the lower-voltage network current.

Additionally, the secondary side voltage of the transformer $v_s$ can be observed to be ½ the primary side voltage, corresponding to a 2:1 turns ratio for the transformer. The applied voltage to the transformer windings appears to be AC with a near square-wave waveshape. Additionally, the primary and secondary side currents of the transformer appear appears to be AC with a near square-wave waveshape.

Case 5: Steady-State Reverse Power Operation for FIG. 4 Topology

Figure 35:
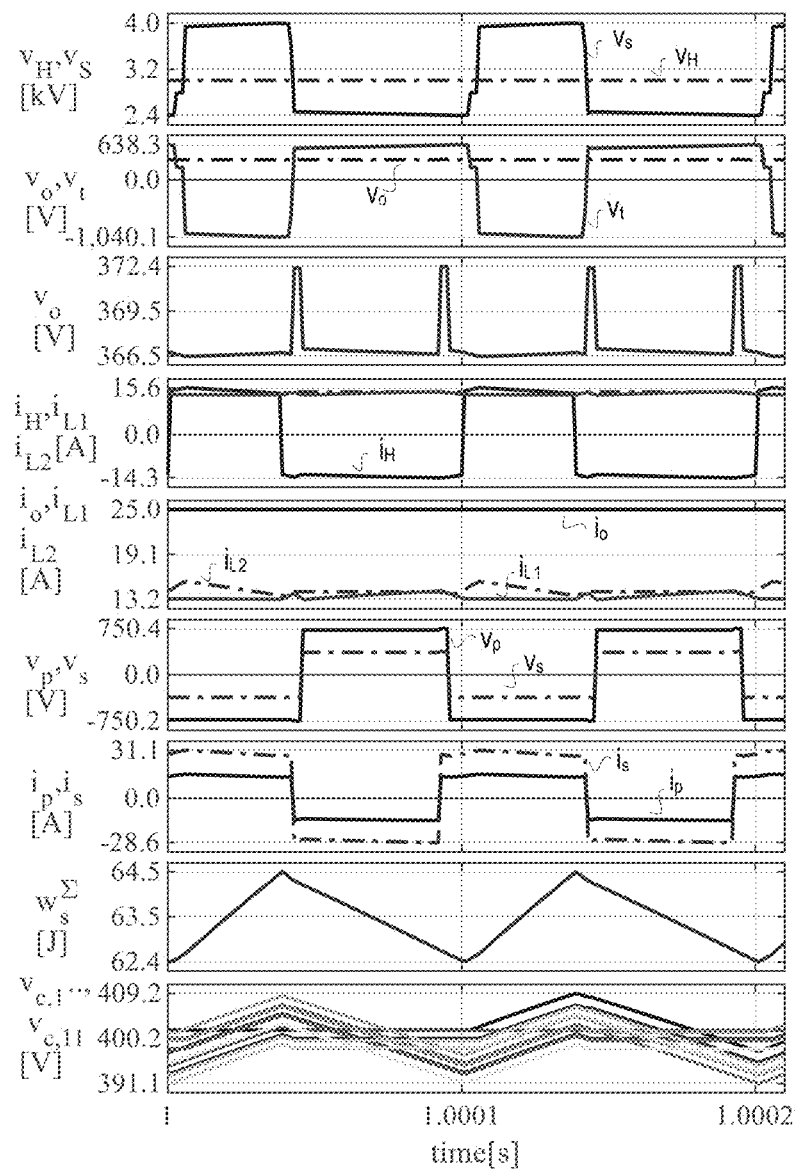
FIG. 35 presents steady-state simulation results for Case 5. In Case 5, the topology of FIG. 4 is simulated where 9.175 kW is delivered from a 367 V lower-voltage DC network to a 3 kV higher-voltage DC network.

FIG. 35 presents operating waveforms for the steady-state reverse power transfer case. These simulation results are for the alternate embodiment of FIG. 4.

As can be observed 9.175 kW of power is delivered by the 367 V low-voltage DC network.

The VSM string energy is balanced over a switching period. The inductor $L_1$ and $L_2$ are shown to share the lower-voltage network current. Additionally, the secondary side voltage of the transformer $v_s$ can be observed to be ½ the primary side voltage, corresponding to a 2:1 turns ratio for the transformer. The applied voltage to the transformer windings appears to be AC with a near square-wave shape. Additionally, the primary and secondary side currents of the transformer appear to be AC with a near square-wave shape.

Case 6: Steady-State Forward Power Operation for FIG. 5 Topology

Figure 36:
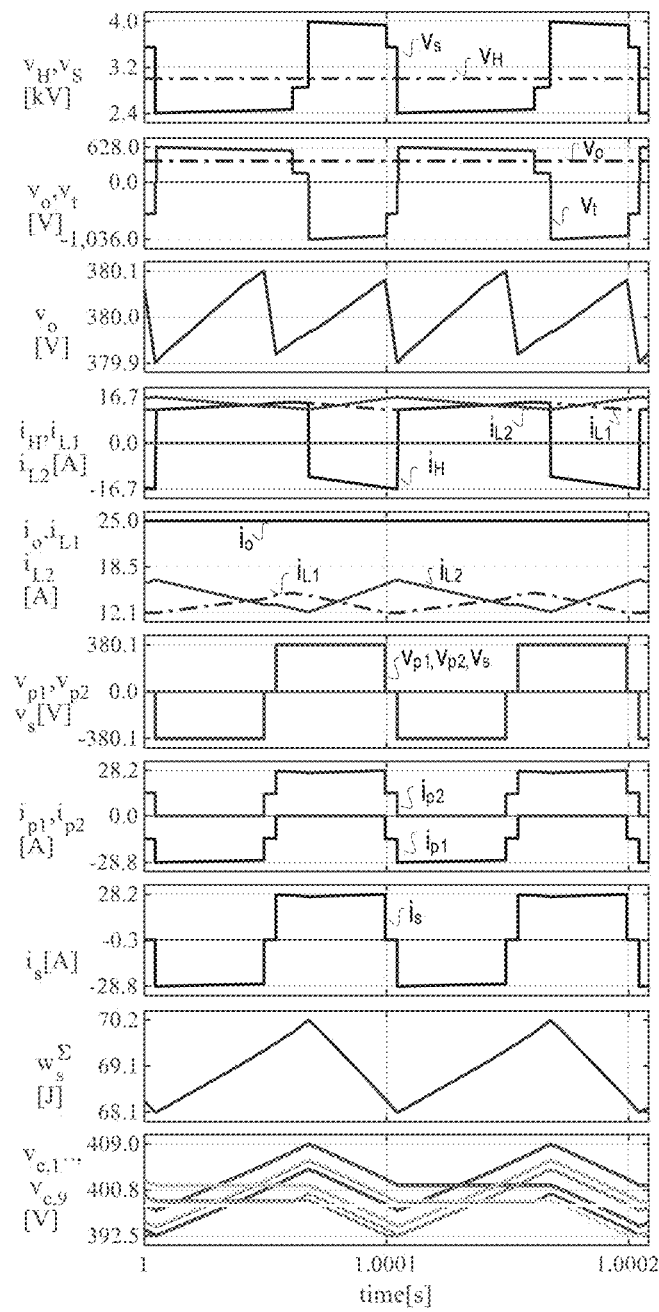
FIG. 36 presents steady-state simulation results for Case 6. In Case 6, the topology of FIG. 5 is simulated where 9.5 kW is delivered from a 3 kV higher-voltage DC network to a 380 V lower-voltage DC network.

FIG. 36 presents operating waveforms for the steady-state forward power transfer case. These simulation results are for the alternate embodiment of FIG. 5.

As can be observed 9.5 kW of power is transferred to the lower-voltage DC network. The VSM string energy is shown to be balanced over a switching period. The inductor $L_1$ and $L_2$ are shown to share the lower-voltage network current.

Additionally, the secondary side voltage of the transformer $v_s$ can be observed to be equal to the primary side voltage, corresponding to a 1:1 turns ratio for the two primary windings of the transformer with respect to the secondary winding.

The applied voltage to the transformer windings appears to be AC in nature with a near square-wave waveshape. Additionally, the primary and secondary side currents of the transformer appear to be AC in nature with a near square-wave waveshape.

Case 7: Steady-State Reverse Power Operation for FIG. 5 Topology

Figure 37:
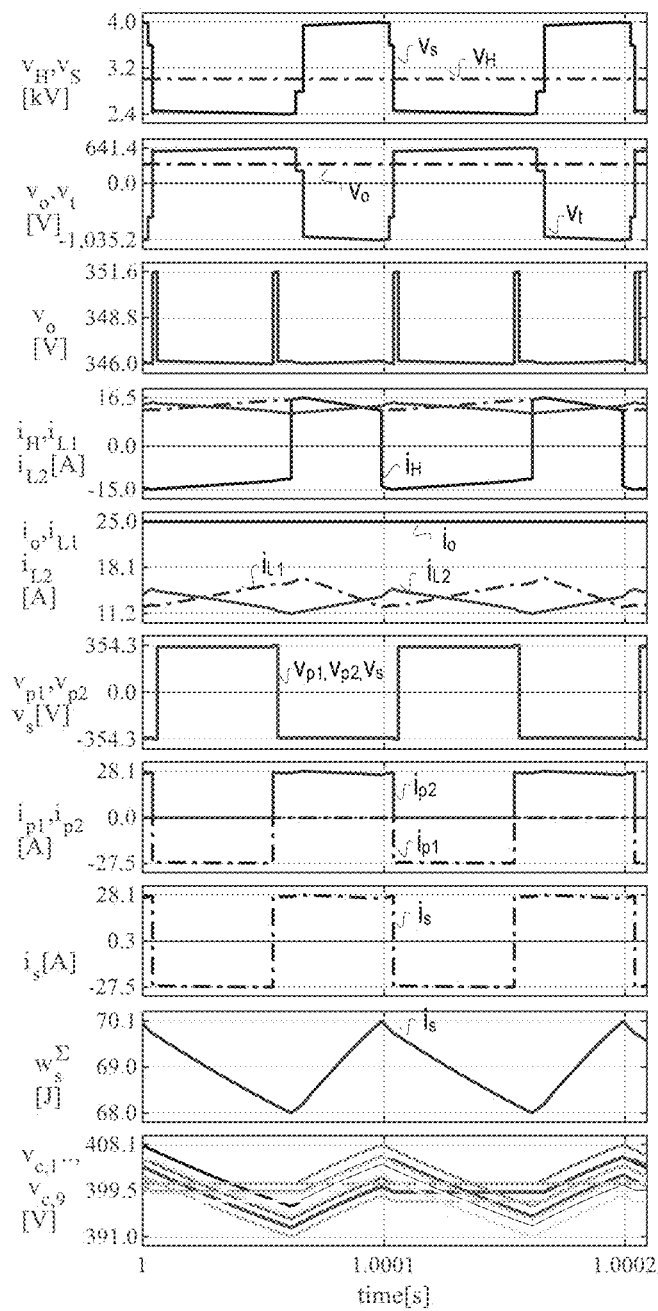
FIG. 37 presents steady-state simulation results for Case 7. In Case 7, the topology of FIG. 5 is simulated where 8.65 kW is delivered from a 346 V lower-voltage DC network to a 3 kV higher-voltage DC network.

FIG. 37 presents operating waveforms for the steady-state reverse power transfer case. These simulation results are for the alternate embodiment of FIG. 5.

As can be observed 8.65 kW of power is delivered from the lower-voltage DC network to the higher-voltage DC network. The VSM string energy is shown to be balanced over this interval. The inductor $L_1$ and $L_2$ are shown to share the lower-voltage network current.

Additionally, the secondary side voltage of the transformer $v_s$ can be observed to be equal to the primary side voltage, corresponding to a 1:1 turns ratio for the two primary windings of the transformer with respect to the secondary side of the transformer. The applied voltage to the transformer windings appears to be AC in nature with a near square-wave waveshape. Additionally, the primary and secondary side currents of the transformer appear to be AC in nature with a near square-wave waveshape.

Alternate Embodiment

Figure 38:
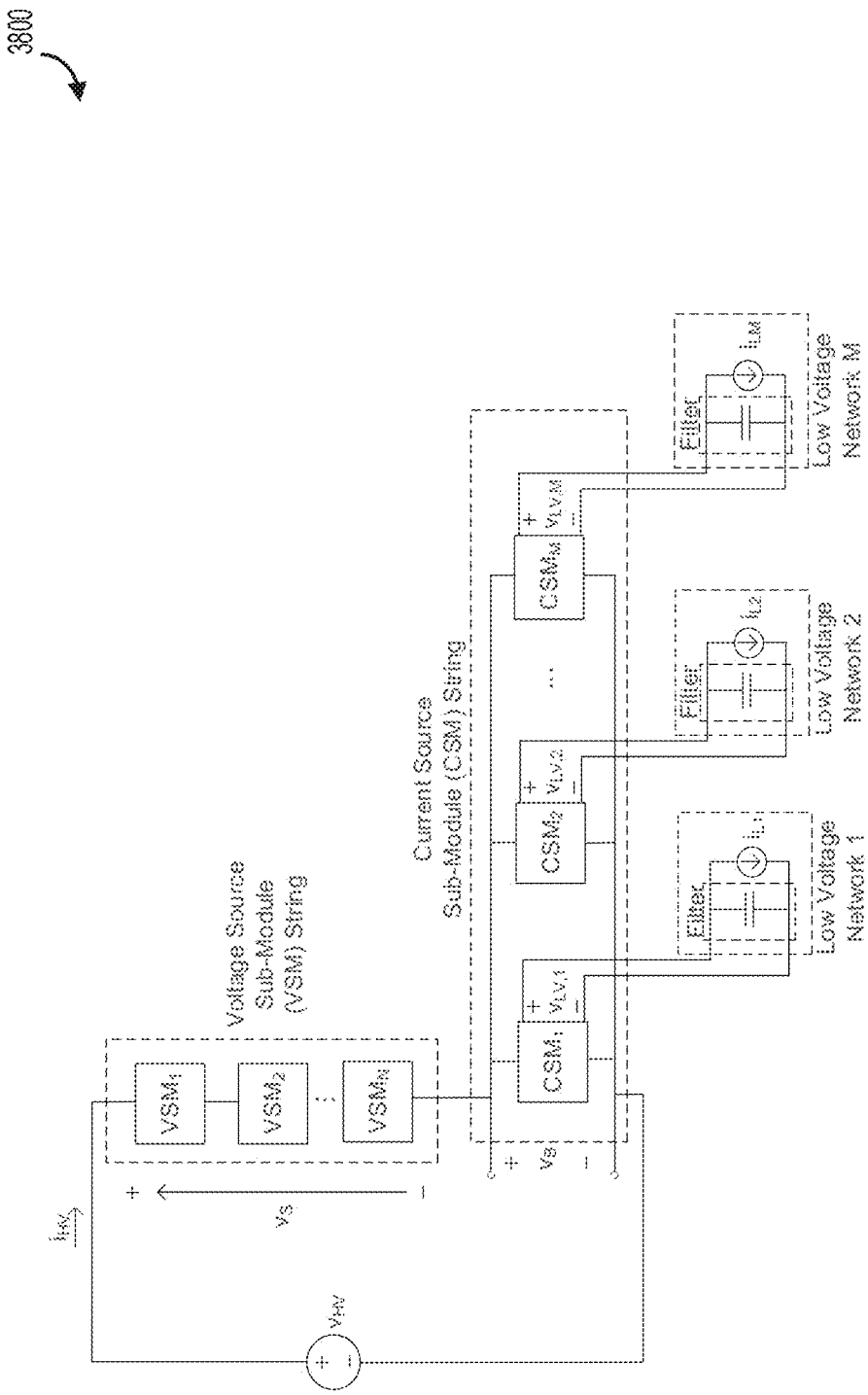
FIG. 38 presents an alternate embodiment of the converter circuit.

An alternate embodiment is presented in FIG. 38. An embodiment of the voltage source sub-module for this alternate embodiment is presented in FIG. 39. An embodiment of the current source sub-module for this alternate embodiment is presented in FIG. 40 for uni-directional and bi-directional power transfer, respectively. An example implementation of the alternate embodiment is presented in FIG. 41. Approaches may be provided in various combinations and are not limited to the specific embodiments described. For example, different method step order, orientations, and alternatives are contemplated in addition to the alternate embodiments.

In the example implementation, there are three voltage-source sub-modules and three current-source sub-modules, however the number of voltage sub-modules and current-sub modules is scalable as noted in FIG. 38.

In the following section the elements of various alternate embodiments are described.

This is followed in a later section by a description of the operating modes, control as well more detailed design considerations.

Various equations are provided in the sections below. It is important to recognize that the equations are provided as instructive examples, other approaches are possible. For example, some examples are more qualitative then quantitative, from an example perspective.

They are used to illustrate in a very idealized way the approximate ratings of various topologies. In practice, the determination of the minimum number of VSM cells, for instance, may be quite different. There are other approaches possible, especially in view of practical considerations (e.g., adjustments may need to be made in view of real-world adjustments, such as for environmental factors, parasitics, non-idealities, among others).

Figure 39:
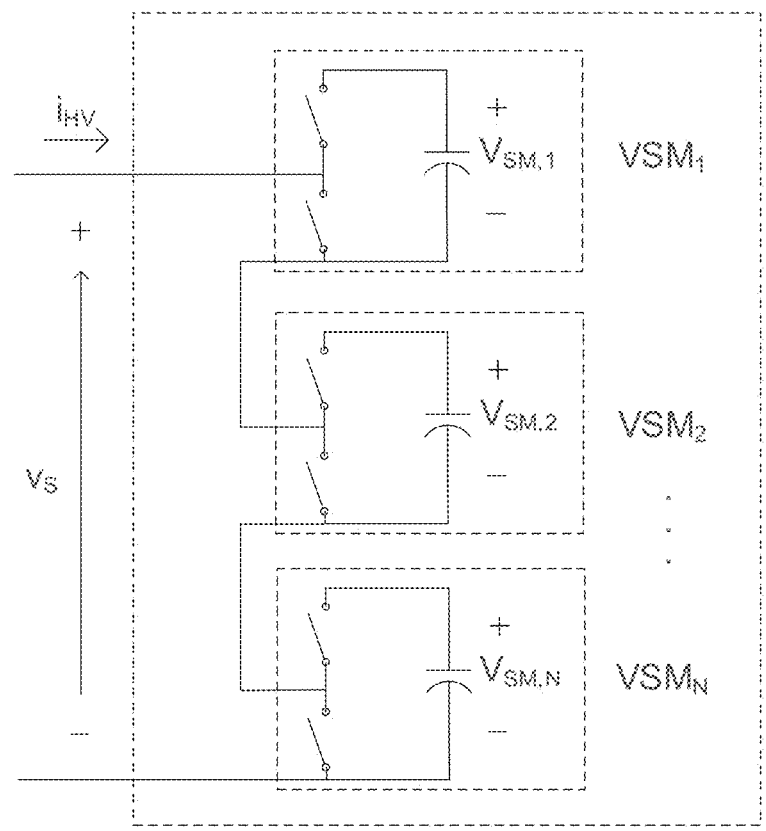
FIG. 39 presents the alternate embodiment for a voltage source sub-module.
Figure 42:
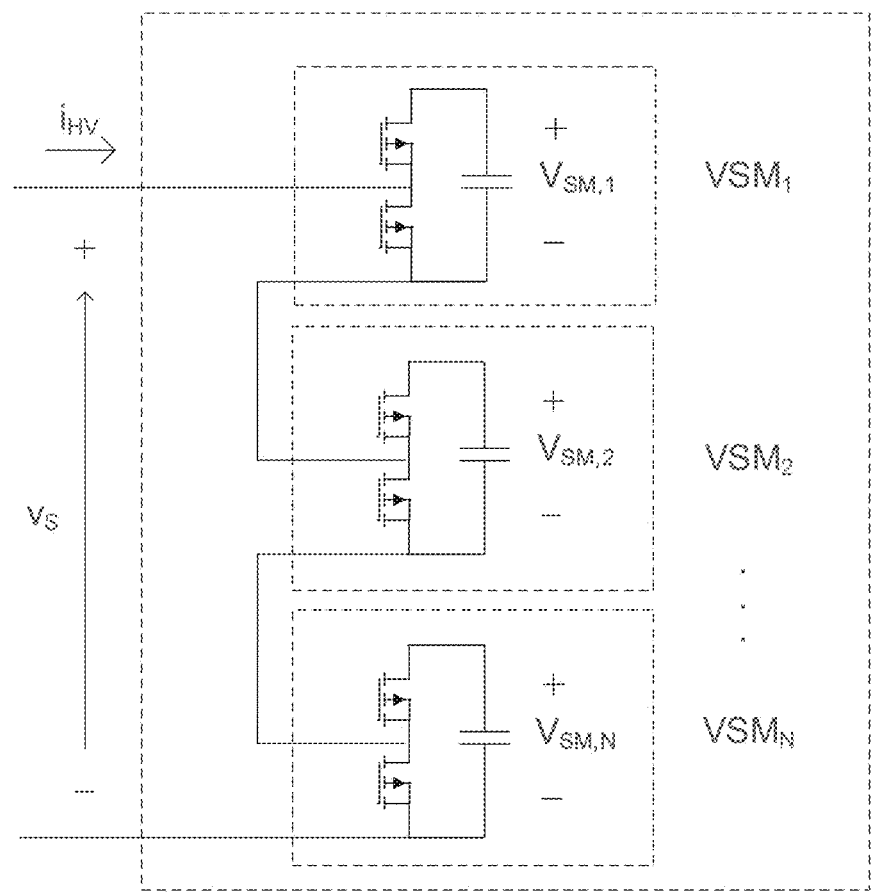
FIG. 42 presents an example implementation of the alternate embodiment for the voltage source sub-module string.

Regarding notation for this alternate embodiment:
The lower-voltage DC RMS voltage is the same as the average lower-voltage DC network voltage
The main loop current, $i_{ds}$, is the same as the higher-voltage loop current Description of the Voltage Source and Current Source Element Blocks Series String of Sub-Modules of Voltage-Source Type As shown in FIG. 39, the VSM string includes a series connection of multiple voltage source sub-modules. An example implementation of the VSM string is presented in FIG. 42. In the alternate embodiment, the sub-modules are of a half-bridge type consisting of two series switches and a capacitor across the outer terminals of the two switches.

Additionally, in the alternate embodiment, the sub-modules are combined into a single stack. With half-bridge type sub-modules, a maximum uni-polar voltage can be created by the VSM string, equal to the following:

$$V_{VSM,total} = \Sigma_{i=1}^{N} V_{SM,i} \qquad (77)$$

Where, N is the number of voltage sub-modules; $V_{SM,i}$ is the voltage of sub-module capacitor i; and $V_{VSM,total}$ is the sum of all sub-module capacitor voltages.

Referring to FIG. 38, the VSM string is electrically connected such that the positive polarity end of the stack is electrically connected to the positive terminal of the higher-voltage side network and the negative terminal to the positive rail of the LV bus.

With this electrical connection, the voltage imposed by the VSM string opposes the voltage of the higher-voltage network allowing for a lower voltage to be controlled for across the terminals of the current source modules. In this disclosure, the sub-module at the positive polarity end of the stack is called the upper sub-module; and the sub-module at the negative polarity end of the stack is called the lower sub-module. Modules are implemented as electronic circuits and may contain one or more electrical components.

In an alternate embodiment, it is important to highlight that the stack can be equivalently re-located such that the positive terminal of the stack is electrically connected to the negative terminal of the lower-voltage bus and the negative terminal of the stack is electrically connected to the negative terminal of the higher-voltage DC network. In another further embodiment, it is also equivalent to distribute the sub-modules into multiple stacks. These stacks can be electrically on either side of the lower-voltage bus.

In the alternate embodiment, the mid-point of the upper most sub-module (sub-module 1 in FIG. 39) is electrically connected to the positive polarity terminal of the higher-voltage network. For all other sub-modules, the mid-point of the two series switches is electrically connected to the negative terminal of the capacitor above it.

For instance, referring to FIG. 39, the mid-point of sub-module 2 is electrically connected to the negative terminal of the capacitor of sub-module 1. The negative terminal of the lower sub-module is electrically interfaced to the positive rail of the LV bus.

The minimum requirements of the switches of each sub-module are uni-polar voltage blocking capability and bi-directional current conduction capability. Switches that meet this criteria are MOSFETs and IGBTs with anti-parallel diodes, for instance.

One possible approach for calculating the minimum number voltage sub-modules required, $N_{min}$, is presented in eq. 78, $$N_{min} = \left\lceil \frac{V_{HV} + V_B}{V_{cell,min}} \right\rceil \qquad (78)$$

Where, $V_{HV}$ is the higher-voltage grid voltage; $V_B$ is the maximum lower-voltage bus voltage; and $V_{cell,min}$ is the minimum allowable voltage of an individual sub-module. The ceil function (e.g., ceiling function) is employed in eq. 2 as precise control of the lower-voltage bus rms voltage is achievable through appropriate control of the VSM string.

For instance, if the lower-voltage network voltage was selected to be 500 V and the sub-module voltages are at 400 V, the maximum voltage across the lower-voltage bus terminals, in one possible implementation of the control could be, 400 V*2=800 V. It is also possible to employ different modulation strategies involving less or additional cells, depending on the lower-voltage network voltage, which would impose lower or higher maximum lower-voltage side bus voltages, respectively.

In practice, additional sub-modules would be required for redundancy reasons.

One possible approach for calculating the minimum blocking voltage requirements of the VSM stack is presented in eq. 3, $$V_{S,block} = V_{HV} + V_B \qquad (79)$$

In an alternate embodiment, all sub-modules are identical. However, it is also possible to use different voltage sub-module types in the string, in an alternate embodiment. For instance, a mixture of half-bridge and full-bridge sub-module types could be employed, for instance. In addition, a string of only full-bridge sub-module types could also be employed, for instance. The sub-modules can also have different nominal voltage values as well as states-of-charge.

It is also important to note that it is possible to also parallel multiple voltage source sub-module elements. By paralleling the voltage source sub-module elements, the loop current is shared between the paralleled elements. If paralleling voltage sub-module strings, a di/dt reactor can be employed between the VSM strings to limit the di/dt due to voltage imbalances in the strings, for instance.

Current-Source Type Sub-Modules

Figure 40:
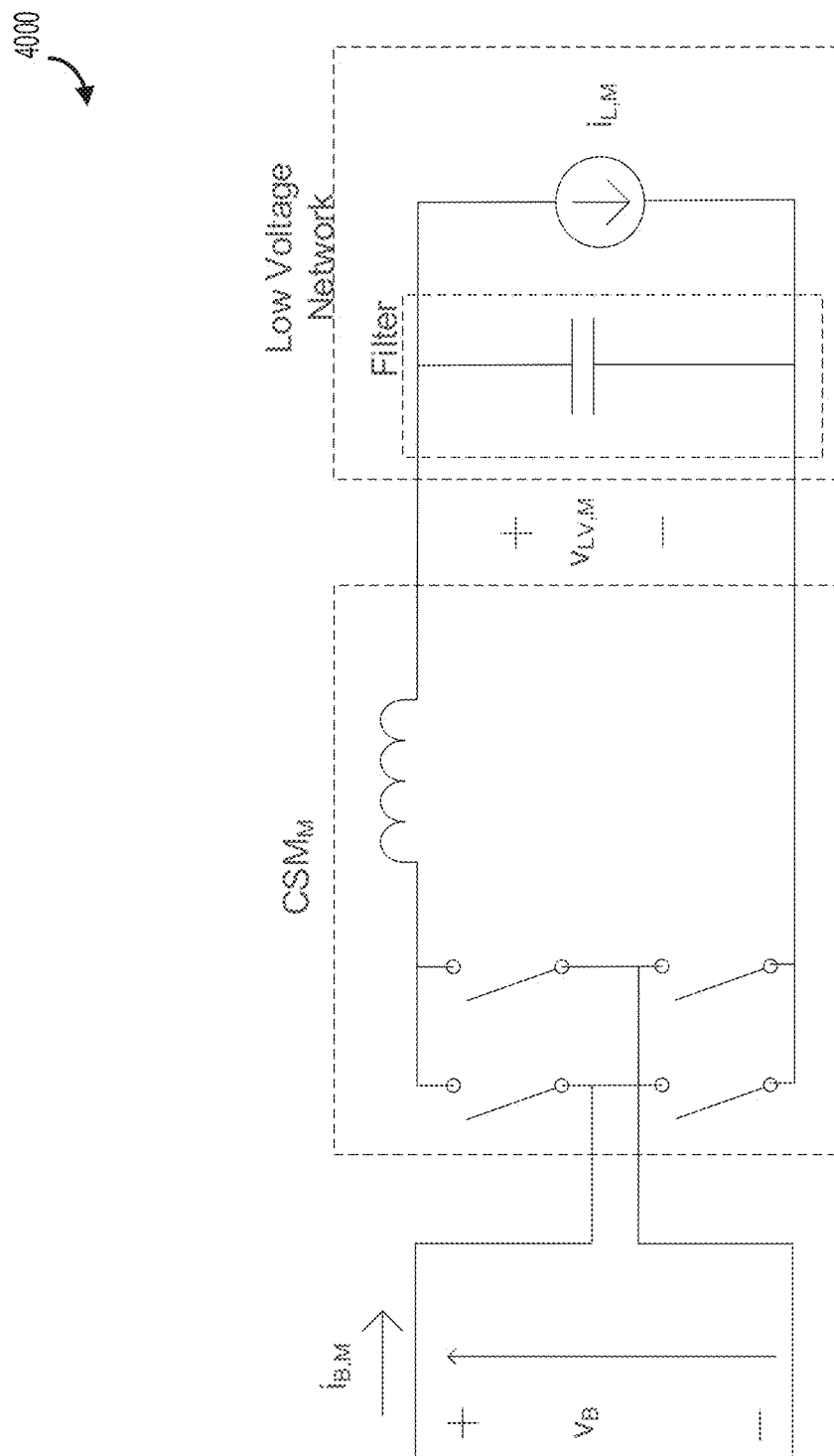
FIG. 40 presents the alternate embodiment for a current source sub-module.
Figure 41:
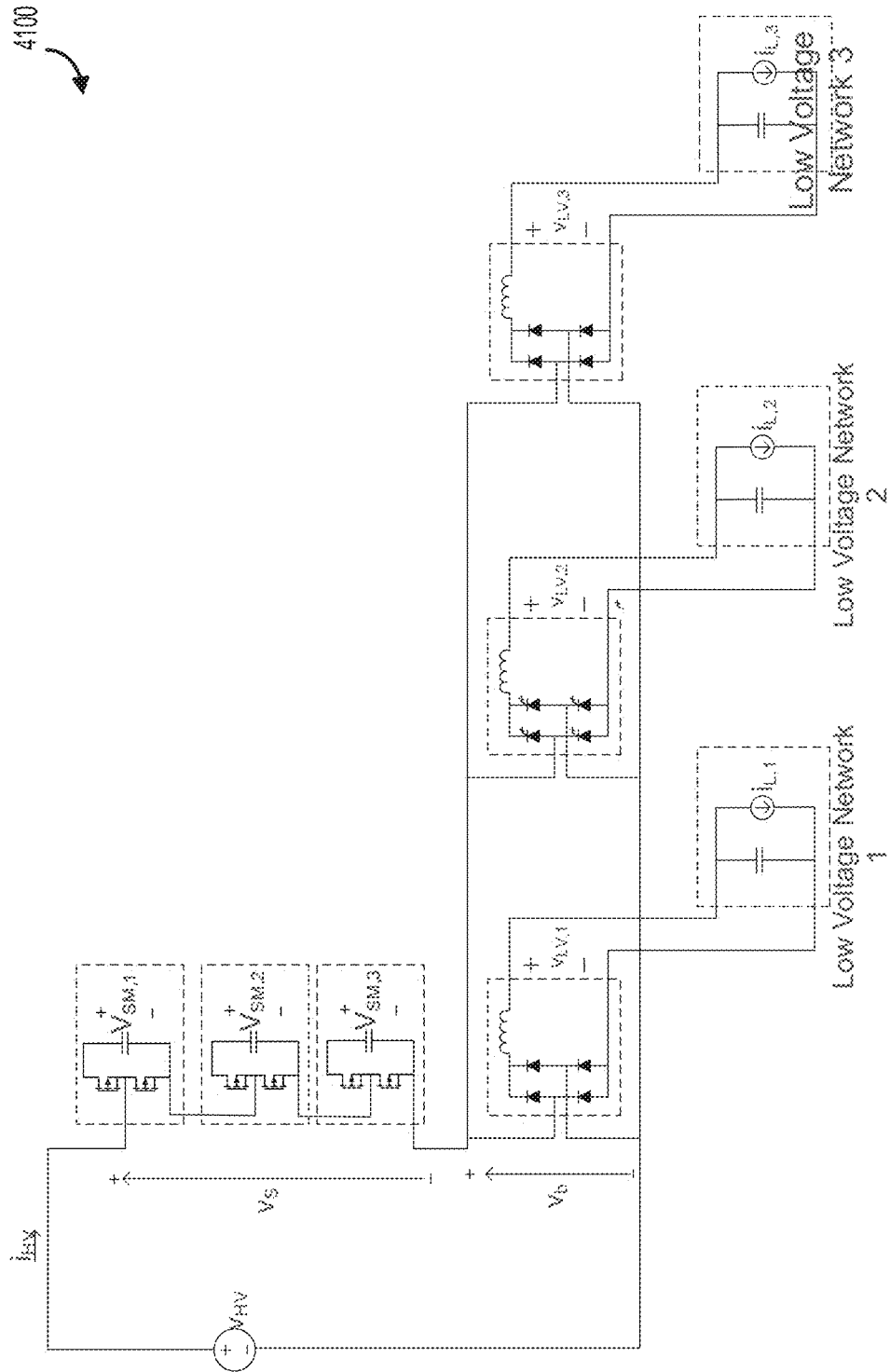
FIG. 41 presents an example implementation of the alternate embodiment of the converter circuit.

An alternate embodiment of the CSM is presented in FIG. 40. Depending on the type of switch utilized the CSM can feature either uni-directional or bi-directional power transfer capability.

The CSM has two AC side terminals and two DC side terminals in some embodiments. The AC terminals are not electrically bonded to either of the two DC terminals of the CSM in some embodiments. The AC terminals are connected in series with the VSMs. The DC terminals are connected to the lower-voltage DC network.

Figure 43:
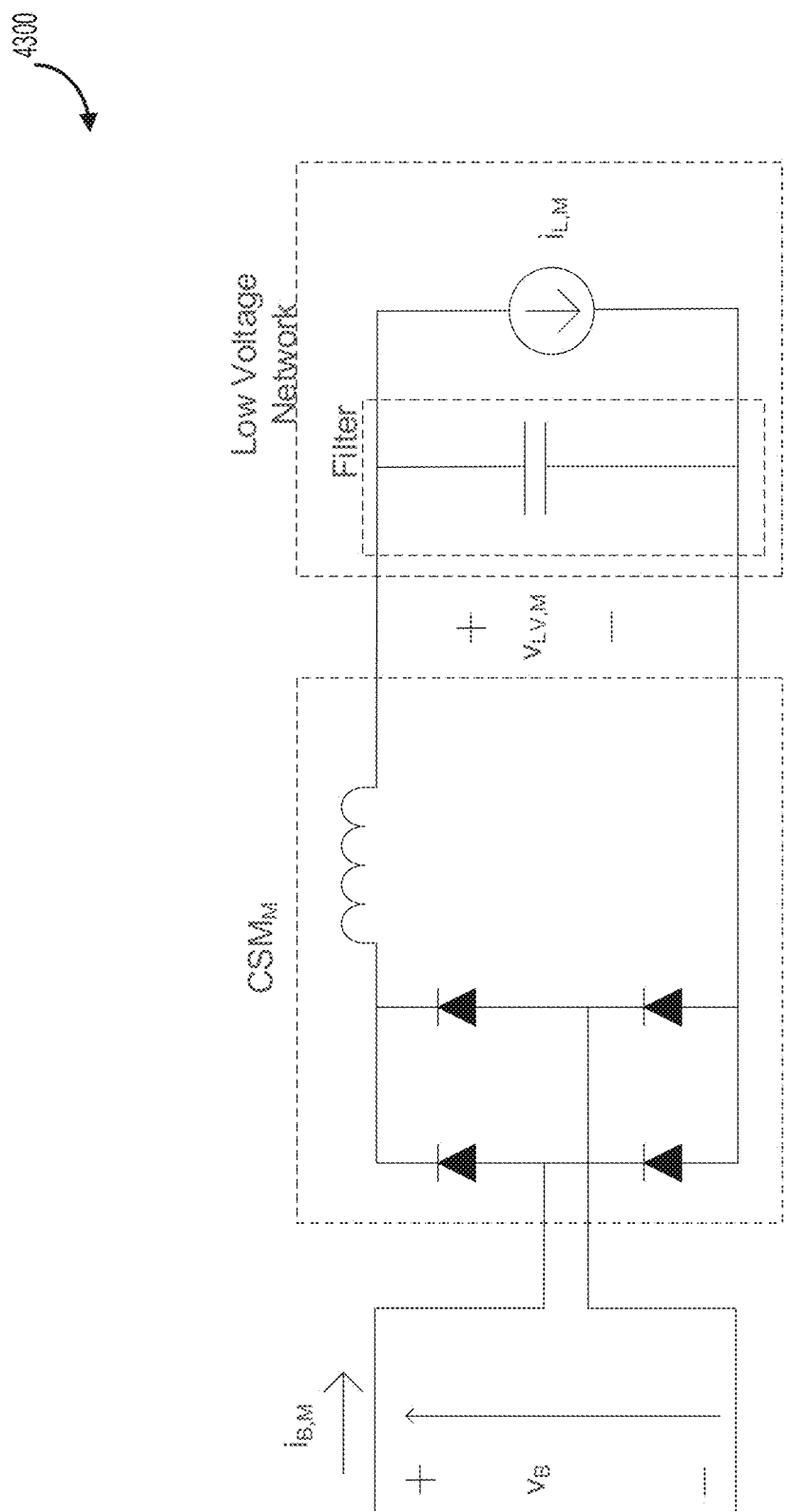
FIG. 43 presents an example implementation of the alternate embodiment for the current source sub-module for uni-directional power transfer from the higher-voltage DC side to the lower-voltage DC side.
Figure 44:
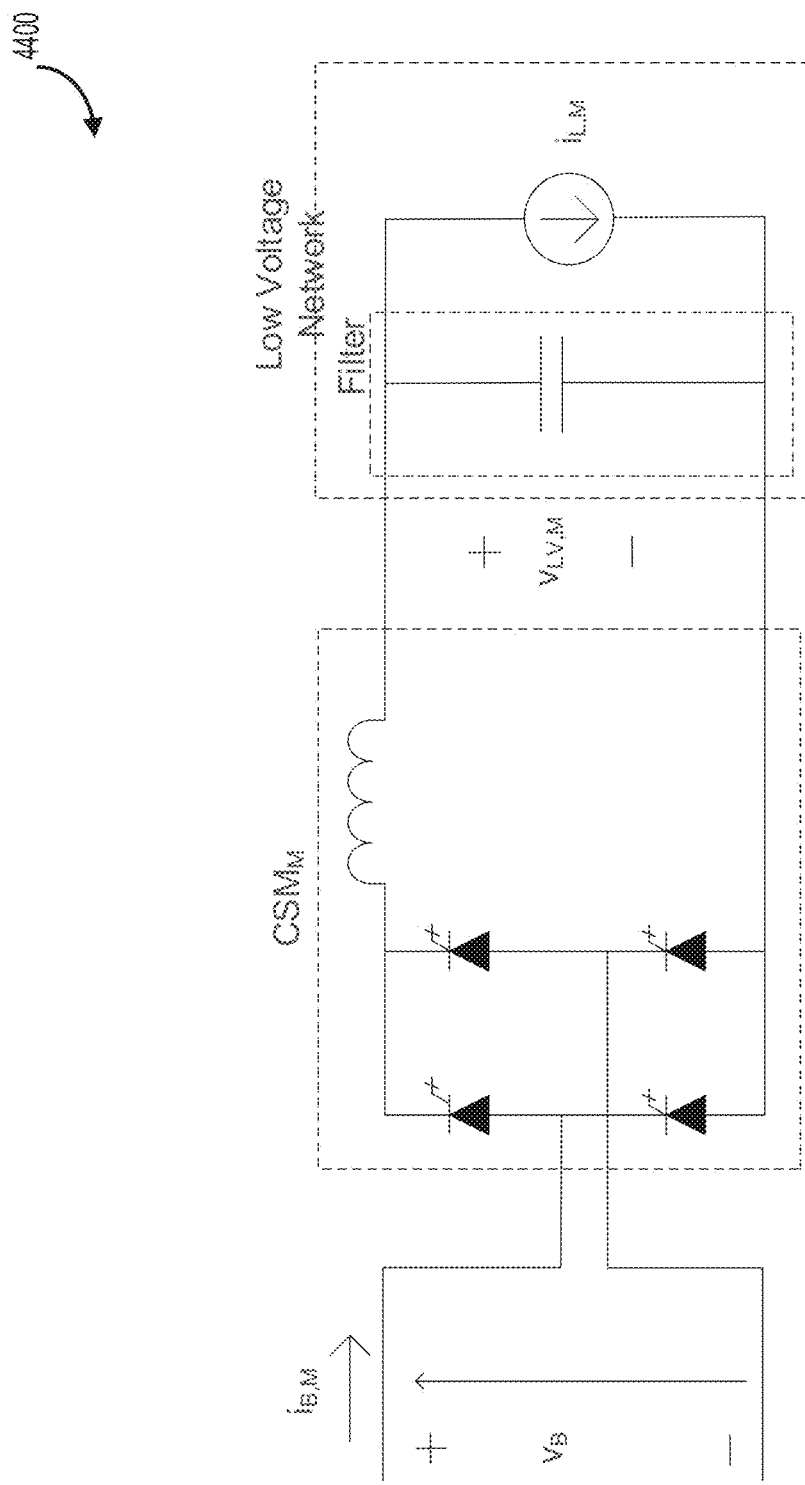
FIG. 44 presents the alternate embodiment for the current source sub-module for bi-directional power transfer between a higher-voltage DC side and a lower-voltage DC side.

An example implementation of a CSM with uni-directional power capability is presented in FIG. 43 and with bi-directional power capability in FIG. 44. In the alternate embodiment, each current source sub-module consists of a single-phase current source converter front-end with an inductor. For uni-directional power capability, the minimum requirements for the switches of the front-end include unipolar voltage blocking capability and uni-direction current conduction capability.

An example switch implementation for uni-directional power capability are diodes. The CSM resembles in this embodiment a full-bridge diode rectifier. For the bi-directional power capability, the minimum requirements for the switches of the front-end are bi-polar voltage blocking capability and uni-direction current conduction capability. An example switch implementation for the front-end are GTOs or IGBTs with a series diode, for instance. The CSM resembles in this embodiment a single phase current source inverter (csi).

The CSM operates as a load, when for instance the higher-voltage DC network is supplying power to the lower voltage DC network connected across the output terminals of that CSM. Referring to FIG. 40, when the LV bus voltage, $v_b$, is of positive polarity, a positive $i_{B,M}$ implies power is being delivered to the CSM; and a negative $i_{B,M}$ implies power is being delivered by the CSM.

Furthermore, when the LV bus voltage, $v_b$, is of negative polarity, a negative $i_{B,M}$ implies power is being delivered by the CSM; and a positive $i_{B,M}$ implies power is being delivered to the CSM. Uni-directional power transfer operation is demonstrated in FIG. 47. Bi-directional power transfer operation is demonstrated in FIG. 48. When the front-end switches are implemented by controllable devices, such as GTO or IGBT with a series diode, then an approach for achieving approximately constant power to the load would be to gate the $S_1$ and $S_4$ front-end switches such that $i_{B,M}$ is positive when $v_b$ is positive; and gate the $S_2$ and $S_3$ switches such that $i_{B,M}$ is negative when $v_b$ is negative.

Similarly, an approach for achieving approximately constant power delivery by the load, for bi-directional CSMs, would be to gate the $S_2$ and $S_3$ front-end switches such that $i_{B,M}$ is negative when $v_b$ is positive; and gate the $S_i$ and $S_4$ front-end switches such that $i_{B,M}$ is positive when $v_b$ is negative.

In the alternate embodiment, as shown in FIG. 40, the voltage at the terminals of the lower voltage network, $v_{LV,M}$, will be of positive polarity when power is being delivered to the lower voltage network. Conversely, the polarity will be negative when power is being delivered by the lower voltage network. In the alternate embodiment, the lower voltage network is represented as a capacitor with a parallel current source.

The capacitor functions as a filter. However, it is possible to employ different types of filtering approaches. In addition, this is only one such representation of the lower voltage DC network. For instance, the lower voltage network could be represented as a resistive load.

One equation for calculating the blocking voltage requirement of the switches in the front-end is the following, $$V_B = \max(|V_{HV} - V_{VSM,min}|, |V_{HV} - V_{VSM,max}|) \tag{80}$$

Where, $V_{VSM,min}$ is the voltage across the VSM string when the minimum number of sub-modules switched in the circuit; $V_{VSM,max}$ is the voltage across the VSM string when the maximum number of sub-modules is switched in the circuit. Generally, it is expected that $V_b$ will be equivalent to either 1 or 2 sub-module voltages. Where, $V_{VSM,min}$ and $V_{VSM,max}$ depend on factors including the control method employed. In one such control method, the $V_{VSM,min}$ and $V_{VSM,max}$ terms can be approximated by the following expressions, $$V_{VSM,min} = \left\lfloor \frac{V_{HV} - V_{LV}}{V_c} \right\rfloor V_c$$

$$V_{VSM,max} = \left\lceil \frac{V_{HV} - V_{LV}}{V_c} \right\rceil V_c$$

Where, $V_c$ is the nominal VSM cell capacitor voltage.

Therefore, only a fraction of the higher-side voltage is applied across the terminals of the CSMs. In addition, only a fraction of the higher-side voltage is applied across the power inductor of the CSM.

As shown in FIG. 38, it is possible to connect multiple current source sub-modules across the terminals of the LV bus. FIG. 38, shows a total of M CSMs connected across the LV terminals. Furthermore, the current source modules can have different load currents. Additionally, some current source modules may be generating power while others are consuming power.

It is also important to note that the CSM can be scaled to higher voltages through approaches such as series connection of multiple switches, for instance, enabling this mechanism to interface to lower voltage networks at higher voltages, for instance.

Operating Principle

To demonstrate the energy transfer mechanism, it is illustrative to first consider a single resistive load.

Figure 45:
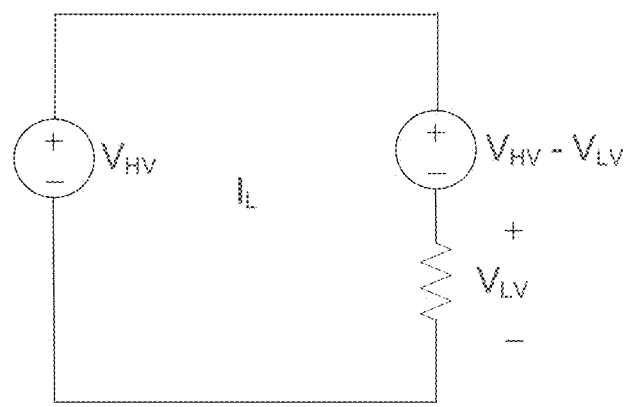
FIG. 45 presents two circuits for demonstrating the key principle of operation.
Figure 45:
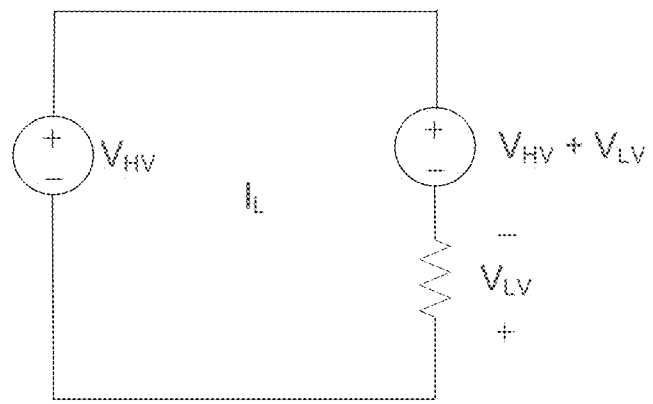

Referring to FIG. 45, in operating mode 1, the voltage across the resistor is controlled to be, $v_b = V_{LV}$. In this operating mode, the higher-voltage DC network delivers power to the inserted voltage sub-modules and to the lower-voltage load resistor, R. In operating mode 2, the voltage across the resistor is controlled to be, $v_b = -V_{LV}$. In this operating mode, the current direction in the main loop is reversed and the voltage sub-modules are discharged into the higher-voltage DC network and to the load. In both operating modes the magnitude of the current is, $I_{DC} = V_{LV}/R$. Therefore, in both operating modes the power delivered to the load, $P_L = V_{LV}^2/R$.

In operating mode 1, the total voltage of the voltage sub-module string is, $V_S = V_{DC} - V_{LV}$. In operating mode 2, the total voltage of the voltage sub-module string is, $V_S = V_{DC} + V_{LV}$. As the loop current is the same in operating mode 1 and 2, i.e. $|I_{DC}| = V_{LV}/R$, the relative on-time for operating mode 1 and 2 is made asymmetrical so as to balance the energy in the voltage sub-module string over a switching period. The following details a calculation for the duty ratio in-order to balance the energy in the VSM string over a switching period for the circuit described in FIG. 45, $$\frac{1}{T_s} \int_{t_0}^{t_0+T_s} P_s(t) \cdot dt = 0 \tag{81}$$

In operating mode 1, from $t=t_0$ to $DT_s$, the power to the VSM string is determined as follows, $$P_S = I_{DC}(V_{DC} - V_{LV}) \tag{82}$$

In operating mode 2, from $t=DT_s$ to $T_s$, the power to the VSM string is determined as follows, $$P_S = I_{DC}(V_{DC} + V_{LV}) \tag{83}$$

Substituting eqs. 6 and 7 into 5, $$\frac{1}{T_s} \int_{t_0}^{t_0+T_s} P_s = D \cdot I_{DC}(V_{DC} - V_{LV}) - (1-D) I_{DC}(V_{DC} + V_{LV}) \tag{84}$$

where, D is the duty ratio.

Re-arranging eq. 8 for the duty ratio, D, yields, $$D = \frac{1}{2} + \frac{V_{LV}}{2V_{DC}} \qquad (85)$$

It is by varying the duty ratio that the energy in the VSM string can be controlled while power is delivered to the load.

Figure 46:
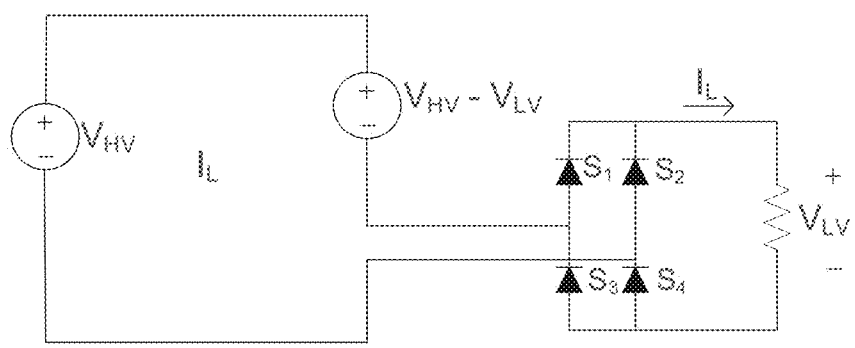
FIG. 46 presents an expanded circuit which includes a diode front-end with a resistive load.
Figure 46:
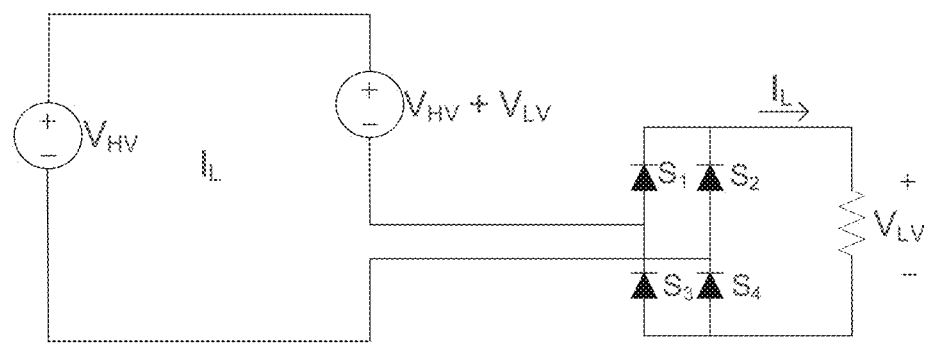

A more detailed model is presented in FIG. 46, where the resistor is replaced by with a single-phase diode bridge with a resistor. For this circuit, in operating mode 1, $+V_{LV}$ is applied across the terminals of the diode bridge, forward biasing $S_1$ and $S_4$. The load current circulates through the main loop such that the VSM string is charged.

Conversely, in operating mode 2, $-V_{LV}$ is applied across the terminals of the diode bridge forward biasing $S_2$ and $S_3$. The load current circulates through the main loop in the opposite direction such that the VSM string is being discharged. By using a diode-bridge, the voltage across the load resistor is in the ideal case constant through operating modes 1 and 2.

Figure 47:
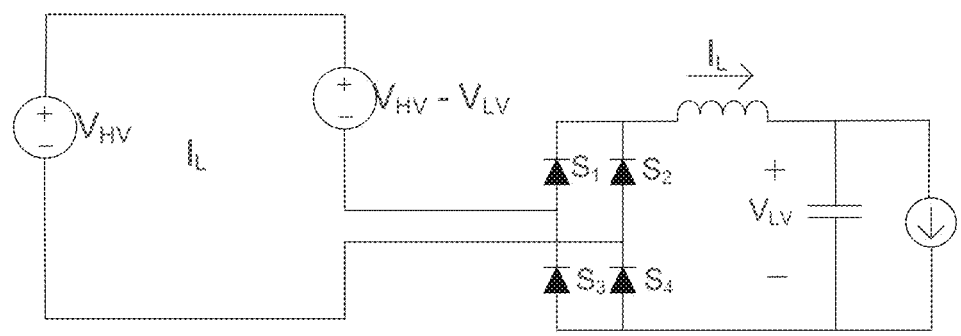
FIG. 47 presents a further expanded circuit for uni-directional power from the higher-voltage DC side to the lower-voltage DC side.
Figure 47:
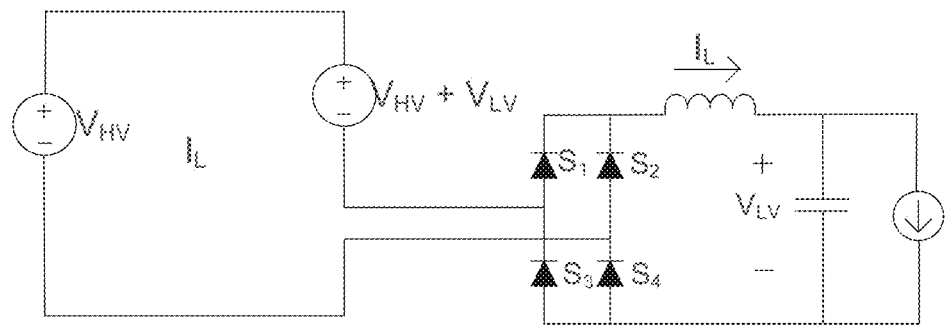
Figure 48:
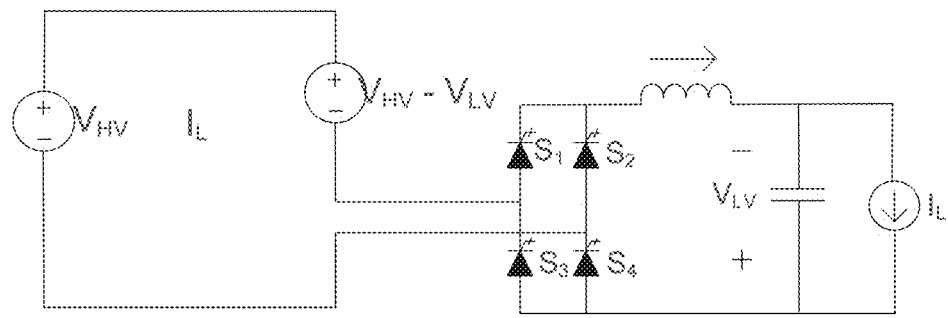
FIG. 48 presents an alternate circuit for bi-directional power from the lower-voltage DC side to the higher-voltage DC side.
Figure 48:
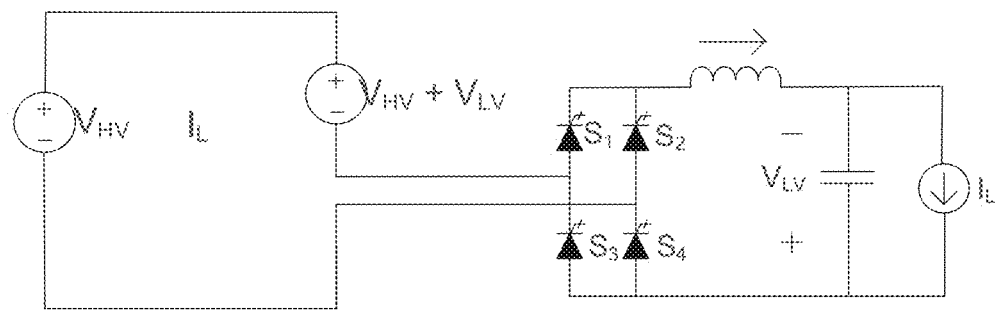

Expanding on FIG. 46 is FIG. 47. In FIG. 47, an inductor and capacitor is added between the resistor and the diode-bridge front-end. The capacitor may be part of the lower voltage network as outlined in FIG. 38 and the inductor is part of the CSM. A few of the purposes of the inductor, include:

Maintain continuity of main loop current
Maintain continuity of power delivered to the load.
Reduction in current ripple of the load and main loop current The above describes one such approach for operating the converter circuit when power is being delivered from the higher-voltage DC network to the lower-voltage DC network. Other variations on this approach are possible. It is also possible for this scheme to be operated such the lower-voltage side supplies power to the higher-voltage side. This is done by implementation of switches with bipolar voltage blocking and uni-directional conduction current capability. The operating modes where power is being delivered from the lower voltage network to the higher-voltage DC network is illustrated in FIG. 48.

Control of Voltage-Source Sub-Modules
Control of Lower-Voltage Bus Voltage and Energy Management of VSM String By varying the number of voltage sub-modules which are inserted in the circuit, the lower voltage bus voltage can be controlled.

To control for an average lower voltage DC network voltage, $V_{LV}$, which is an integer multiple of the sub-module cell voltages an approach that could be employed is to have two modes of operation where different number of sub-modules are inserted, as follows:

$$\text{Mode 1: From } t = t_0 \text{ to } DT_s, N_1 = \left\lfloor \frac{V_{HV} - V_{LV}}{V_{cell,avg}} \right\rfloor$$

$$\text{Mode 2: From } t = DT_s \text{ to } T_s, N_2 = \left\lceil \frac{V_{HV} + V_{LV}}{V_{cell,avg}} \right\rceil$$

Where, $N_1$ is the number of inserted voltage sub-modules in operating mode 1; $N_2$ is the number of inserted voltage sub-modules in operating mode 2; and $V_{cell,avg}$ is the average voltage of a sub-module.

In mode 1, a positive voltage is applied across the lower-voltage bus. In mode 2, a negative voltage is applied across the lower-voltage bus.

It is also possible to control for an average lower voltage DC network voltage which is a non-integer multiple of the sub-module cell voltages. An example of an approach that could be employed for this is to employ 2 modes of operation with 2 intervals each. Each mode and interval having a different number of inserted number of sub-modules, as follows:

$$\text{Mode 1, Interval 1: From } t = t_0 \text{ to } D_1 T_s, N_1 = \left\lfloor \frac{V_{HV} - V_{LV}}{V_{cell,avg}} \right\rfloor$$

$$\text{Mode 1, Interval 2: From } t = D_1 T_s \text{ to } DT_s, N_2 = \left\lceil \frac{V_{HV} - V_{LV}}{V_{cell,avg}} \right\rceil$$

$$\text{Mode 2, Interval 1: From } t = DT_s \text{ to } D_3 T_s, N_3 = \left\lfloor \frac{V_{HV} + V_{LV}}{V_{cell,avg}} \right\rfloor$$

$$\text{Mode 2, Interval 2: From } t = D_3 T_s \text{ to } T_s, N_4 = \left\lceil \frac{V_{HV} + V_{LV}}{V_{cell,avg}} \right\rceil$$

By varying the relative dwell time of interval 1 and interval 2 in both modes 1 and 2 an average lower voltage DC network voltage which is a non-integer multiple of a sub-module voltage can be realized. In addition, by varying the duty ratio, D, the energy in the voltage sub-module string is controlled. A proxy for energy in the VSM string is the sum of all cell capacitor voltages in the VSM string. Therefore, another way to regulate the energy in the string is to adjust D based on the sum of all cell capacitor voltages in the VSM string.

Note, these were examples of approaches that could be employed. However, there are many alternate ways to control for a lower voltage DC network voltage. In addition, the sequence of these modes and intervals can be interchanged.
Energy Balancing Within Voltage Sub-Module String As discussed in the preceding section, in order to control for the energy of the VSM string, the duty ratio between operating modes 1 and operating modes 2 can be adjusted. This enables control of energy to the VSM string; however, the individual voltage sub-modules within the string must also be balanced. This is best illustrated through an example for the case where the voltage across the lower-voltage bus is controlled to be a multiple of a cell voltage. As in the preceding section, $$\text{Mode 1: From } t = t_0 \text{ to } DT_s, N_1 = \left\lfloor \frac{V_{HV} - V_{LV}}{V_{VSM}} \right\rfloor = N - N_\Delta$$

$$\text{Mode 2: From } t = DT_s \text{ to } T_s, N_2 = \left\lceil \frac{V_{HV} + V_{LV}}{V_{VSM}} \right\rceil = N + N_\Delta$$

Where, $N = \frac{V_{HV}}{V_{cell,avg}}$ and $N_\Delta = \frac{V_{LV}}{V_{cell,avg}}$ In mode 1, $N-N_A$ VSMs are inserted. In mode 2, $N+N_A$, VSMs are inserted. Therefore, if no VSM string energy balancing is performed, $N-N_A$ VSMs will be maintained in the circuit for the entire switching period. While $2-N_A$ VSMs will be inserted in the circuit only during mode 2. This is only one such example scenario.

Therefore, if during a switching period, there is no energy accumulation in the VSM string, the $N-N_A$ cells will receive either an excess or deficit of energy depending on whether power is being delivered from the higher-voltage DC side network or whether power is being delivered from the lower-voltage DC network side. In case power is being delivered from the higher-voltage DC side network, N–N$_A$ sub-modules will receive excess energy over a switching period and 2·N$_A$ sub-modules will receive a deficit of energy over a switching period; conversely, if power is being delivered from the lower-voltage side, N–N$_A$ sub-modules receive a deficit of energy over a switching period and 2·N$_A$ receive an excess of energy over a switching period.

One approach for ensuring the individual sub-module energy remains balanced over a period of time is to ensure that the sub-modules that are receiving an excess of energy over a switching period are those sub-modules with the lowest state-of-charge and the sub-modules receiving a net deficit of energy over a switching period are those sub-modules at the greatest state of charge. It should be noted that there are multiple ways of implementing this sub-module balancing. Described is one such approach.

Control of Current-Source Module

For the uni-directional power capable CSM, with a diode front-end, the current source module is indirectly controlled. The states of the current source module diodes are indirectly set through the control of the VSM string. To this point, referring to FIG. 47, switches S$_1$ and S$_4$ will be forward biased when v$_B$ is positive. S$_2$ and S$_3$ will be forward biased when v$_B$ is negative. The voltage v$_B$ is set by control of the VSM string. In steady-state and for the ideal case, the average value of the CSM inductor current will be equal to the average load current for the network interfaced to that CSM, I$_L$, and the average value of the CSM terminal voltage, V$_{LV}$, which is the lower voltage DC network voltage will be equal to the rms voltage of the lower voltage bus, V$_{B,rms}$.

Referring to bi-directional operation, when power is being delivered from the lower voltage DC network, S$_2$ and S$_3$, are gated such that they are conduct the CSM current when v$_B$ is positive. Switches S$_2$ and S$_3$ can be gated when v$_B$ is negative. In steady-state, the average CSM inductor current will be equal to the average load current and the average value of the lower voltage network voltage of the CSM will be equal to the rms voltage of the lower-voltage bus.

Other Design Considerations

DC-Side Filtering

Figure 49:
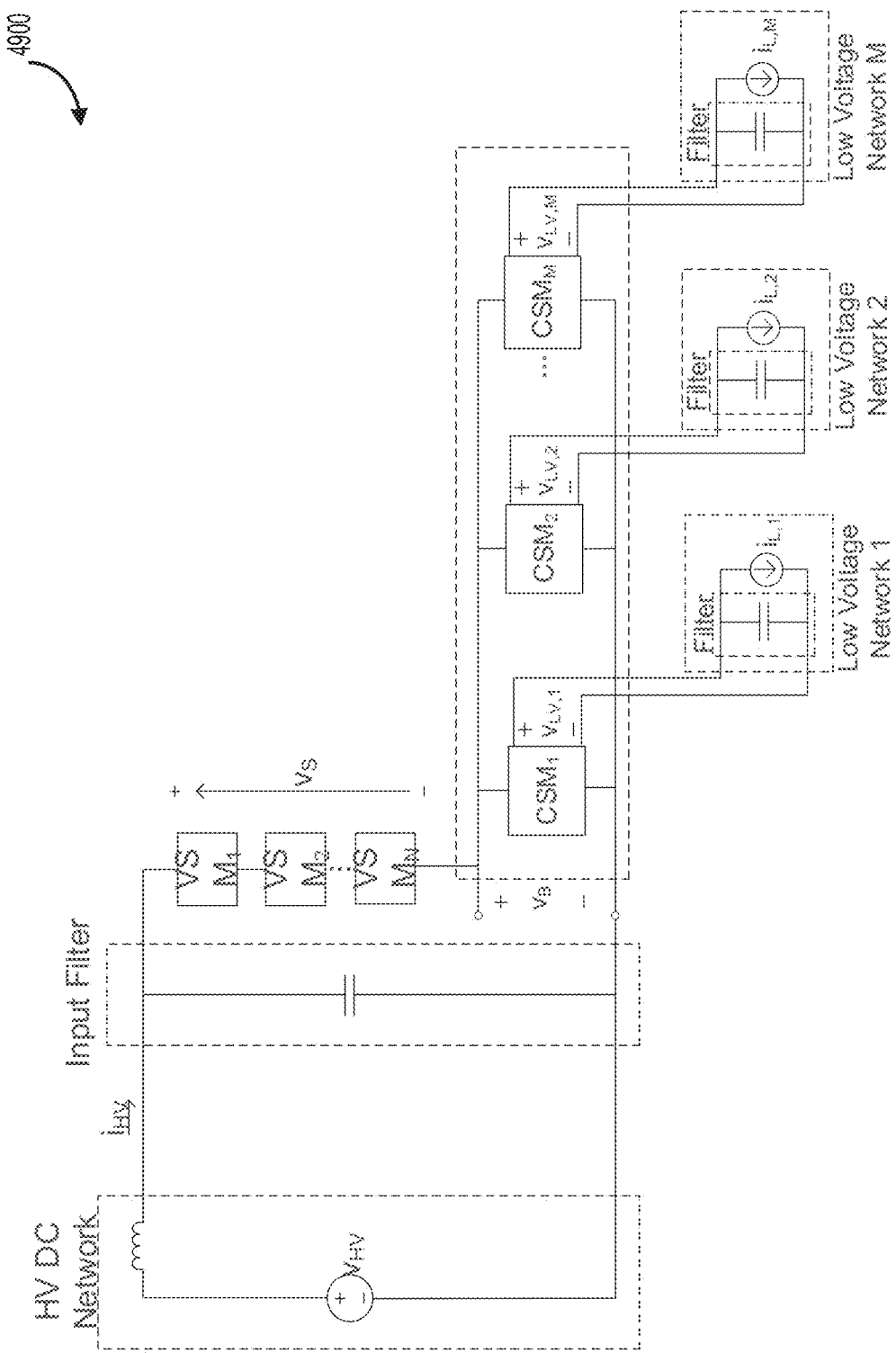
FIG. 49 presents a variant of the topology with an input filter.

A DC-side filter capacitor can be added between the series string and the higher-voltage DC side as shown in FIG. 49. Please note that this is preferred embodiment for the DC-filter however other configurations of the DC-side filter are possible. This DC-side filter offers benefits such as the following:

By adding a DC-side capacitor across the input stage of the series string the series inductance seen by the converter during commutation intervals can be reduced. This reduction enables the converter to operate at higher switching frequencies while maintaining a near square-wave main loop current.

In normal steady-state operation, there is an AC current component being fed back to the higher-voltage DC-side. By adding a capacitive element, the ripple of the current through the higher-voltage DC side network can be reduced.

DC-Side Choke

Figure 50:
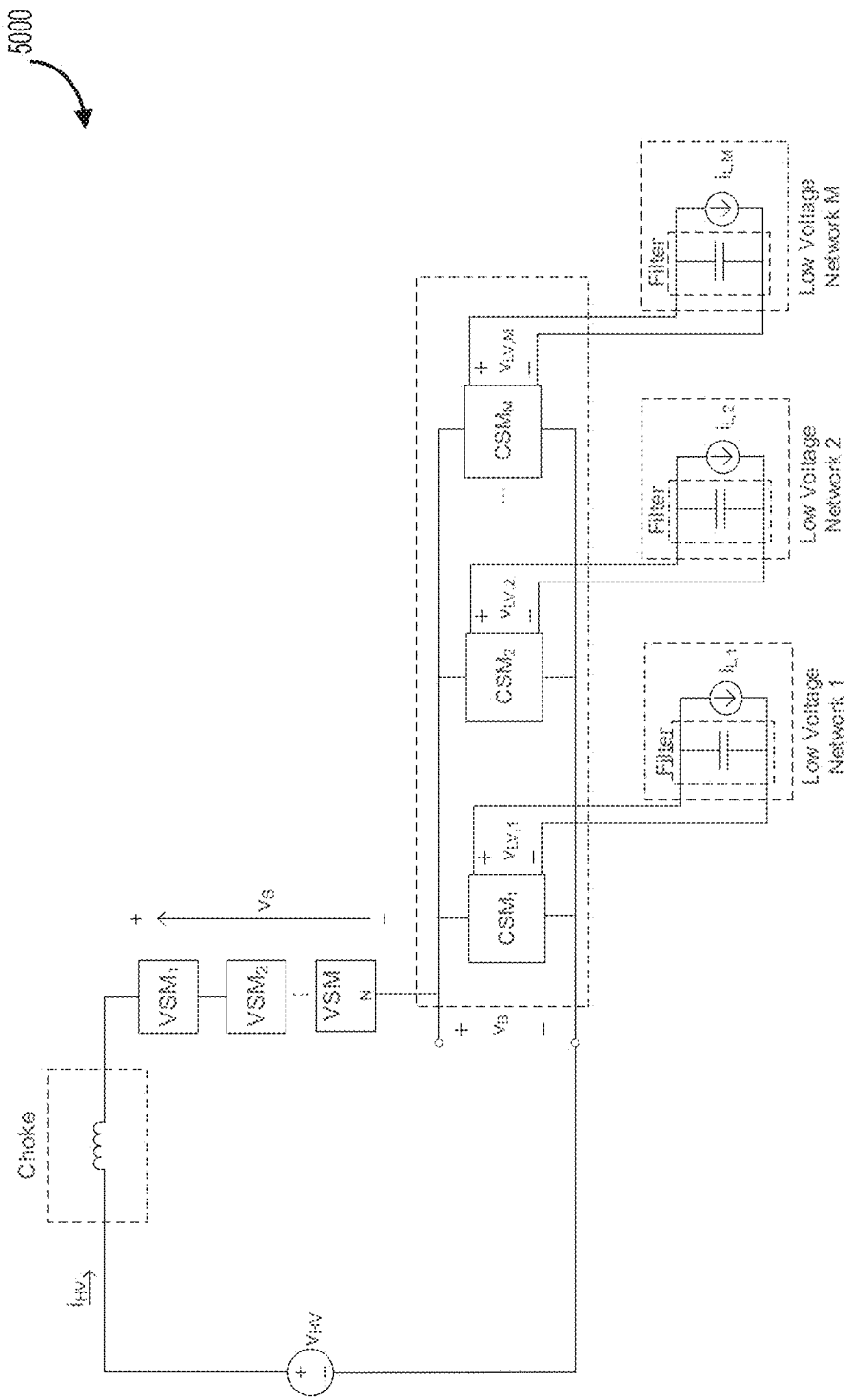
FIG. 50 presents a variant of the topology with a series choke.

A choke inductor can be added in series with the topology as shown in FIG. 50. A choke inductor limits the time rate of change of current in the main loop. The larger the series inductance, the larger the commutation interval will be when changing the direction of current in the main loop if all other circuit parameters are fixed.

Simulation Results

To demonstrate the operation of the scheme, four cases were simulated. The simulation case results are provided in FIGS. 51 to 54. These cases demonstrate the CSM operating as a load, the CSM operating as a generator, multiple parallel CSMs, as well as a step change in load current. The circuit parameters for these cases are provided below in Table 3.

TABLE 3

Circuit Parameters for Simulation Cases

| Input Parameter | Value | Unit |
| --- | --- | --- |
| Higher-Voltage DC Voltage (V$_{HV}$) | 10 | kV |
| Lower-Voltage DC Bus RMS Voltage (V$_{B,rms}$) | 500 | V |
| Switching Frequency (f$_{sw}$) | 1000 | Hz |
| Number of VSM Sub-Modules | 30 | — |
| VSM Capacitor Capacitance | 1 | mF |
| VSM Nominal Voltage | 400 | V |
| Load Inductance | 50 | mH |

FIG. 51 corresponds to Case 8, for which there is a single CSM. In this case, the higher-voltage DC side is supplying the power to the CSM. The load current is 20 Amp. The lower-voltage DC bus rms voltage=500 V. From the simulation results, it is shown that the average energy in the VSM stack=approximately 2400 J. The energy of a voltage sub-modules can be estimated by eq. 10, $$E = \frac{1}{2} \frac{C_{cell}}{N} \left( \sum_{i=1}^{N} V_{VSM,i} \right)^2 \qquad (86)$$

Where, C$_{cell}$/N is the equivalent capacitance of the series string of VSMs; N is the number of cells in the VSM stack; and $\Sigma_{i=1}^{N} V_{VSM,i}$ is the total sum of the sub-module voltages in the string. From eq. 86, it can be determined that the total cell voltage under nominal operating conditions=30*400 V which corresponds to 2400 J of energy storage. This implies that energy has been maintained across the VSM stack.

For Case 8, there are 5 unique gating signals for the voltage sub-modules of the string. These 5 gating signals are distributed to the appropriate voltage sub-modules in the string. A brief description of these 5 gating signals is provided here:

Of the cells, 23 of the 30 are continuously inserted in the circuit. This corresponds to a constant high gating signal.

Of the cells, 3 of the 30 are continuously by-passed. This corresponds to a constant low gating signal. The low gating signal occurs when a redundant number of sub-modules. When there are no redundant sub-modules this low gating signal is not used.

Referring to FIG. 51, t$_0$ denotes the start of a switching period. From t=t$_0$ to t$_1$, 23 VSM cells are inserted in the circuit. From t=t$_1$ to t$_2$, 24 VSM cells are inserted in the circuit. From t=t$_0$ to t$_2$, the voltage sub-modules of lowest state-of-charge have been inserted as during this interval the VSM string will be charged.

From t=t$_2$ to t$_3$, 26 VSM cells are inserted in the circuit. From t=t$_3$ to T$_s$, 27 VSM sub-modules are inserted in the circuit. From t=t$_2$ to T$_s$, the voltage sub-modules of greatest state-of-charge have been inserted as during this interval the VSM string will be discharged.

It is important to note, that the individual VSM cells that are inserted during each of these four time intervals is expected to change during operation depending on such factors such as relative state-of-charge, for instance. For instance, in this simulation case study, there are 30 VSM cells. The 23 VSM cells that are continuously in the circuit for a given switching period could be any of the VSM cells 1 through to 30 as long as the total equals 23 cells. This logic applies to the other time intervals.

It is shown in this simulation case that the rms voltage of the lower voltage network is approximately equal to the rms voltage value of the input voltage at the lower-voltage bus, $v_b$. It is also important to note that the maximum voltage across the terminals of the CSM is approximately 800 Volts which is the equivalent voltage of 2 series voltage source modules.

Finally, it is important to highlight that the main loop current, $i_{dc}$, is of near-square-wave shape while the converter is operating at 1 kHz and a 500 rms voltage is applied across the lower-voltage bus terminals.

Figure 52:
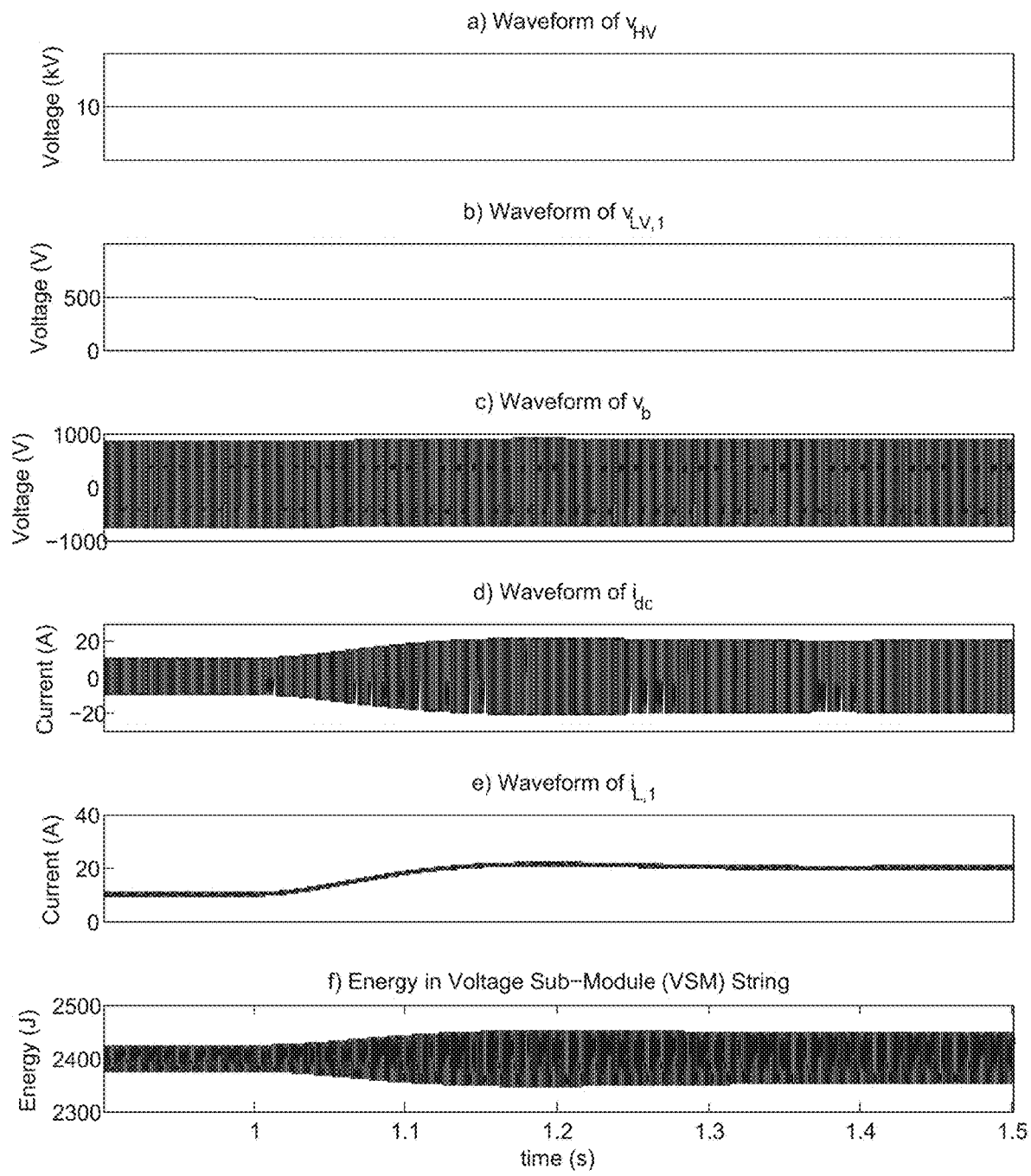
FIG. 52 presents the simulation results for Case 9. This is a transient operating case. In Case 9, the load undergoes a step-change from 10 Amp to 20 Amps. Power is supplied by the higher-voltage DC side.

FIG. 52 presents the results for Case 9 which features a single CSM operating as a load where the power is being delivered by the higher-voltage DC side. The load current is initially 10 Amp. At t=1 s, the load changes from 10 Amp to 20 Amp. It takes approximately 200 ms for the system to regain steady-state.

In this case, it is shown that the average energy in the VSM string=2400 J, implying that energy balance in the VSM string is maintained during the step change in loading. The sub-module ripple is greater for the 20 Amp loading case due to the higher magnitude of the charging and discharging current in the main loop. The gating signals for voltage sub-modules 24 to 27 are provided.

Figure 53:
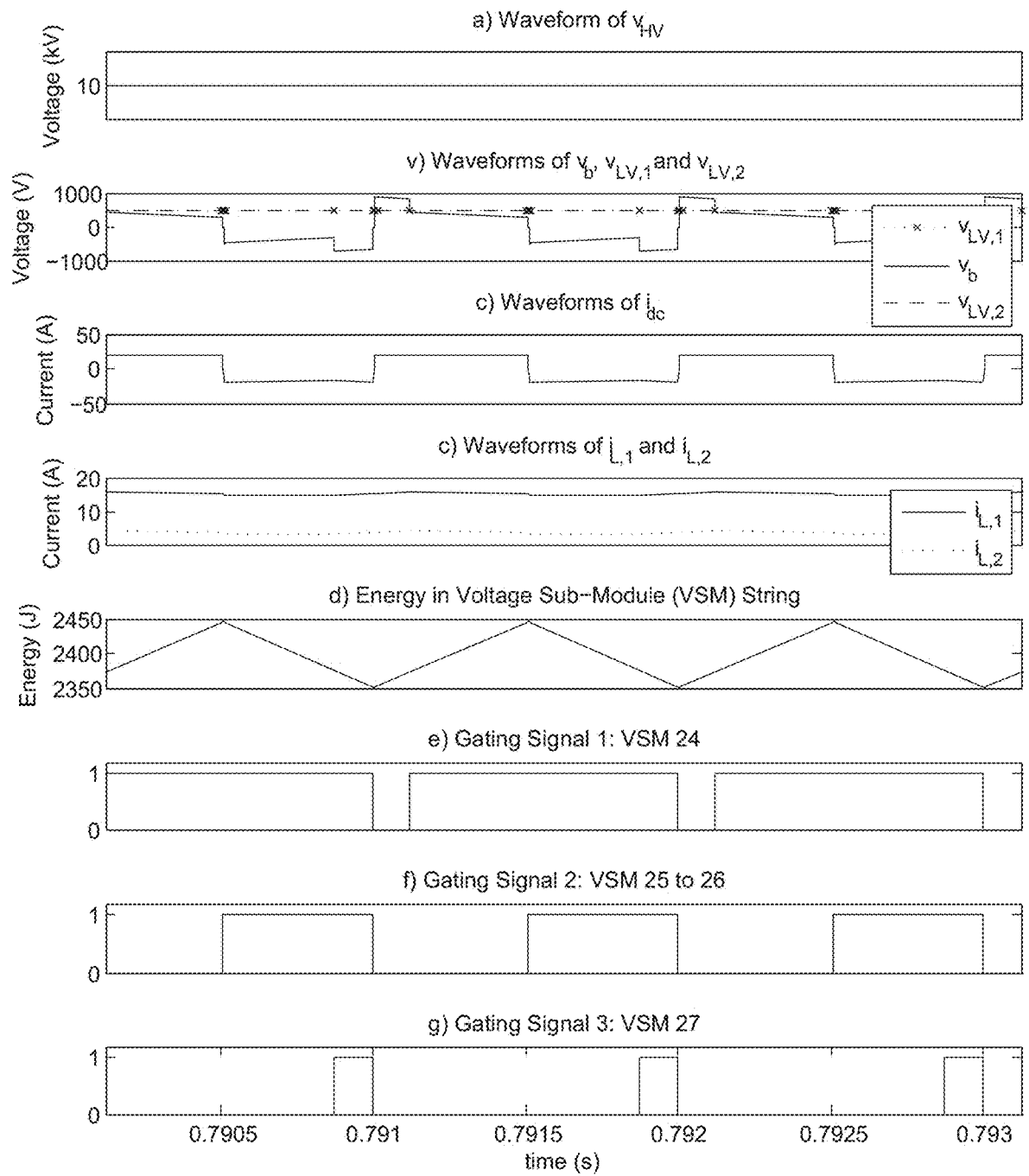
FIG. 53 presents the simulation results for Case 10. This is a steady-state operating case with two lower-voltage DC side loads. This is a simulation of the topology of FIG. 38. In Case 10, 15 amps is being delivered to load 1 and 5 Amps to load 2. Power is supplied by the higher-voltage DC side.

FIG. 53 presents the results for Case 10 which features two CSMs operating as loads, L,1 and L,2. In this case, the higher-voltage DC network is supplying 15 Amp and 5 Amp to loads L,1 and L,2, respectively. In the case, it is shown that the energy in the upper VSM stack=2400 J implying that energy balance in the VSM stack is achieved. The gating signals for voltage sub-modules 24 to 27 are provided. The lower voltage network voltages for both loads settle to the same value of approximately 500 V which is the rms voltage of the LV bus voltage, $v_b$.

Figure 54:
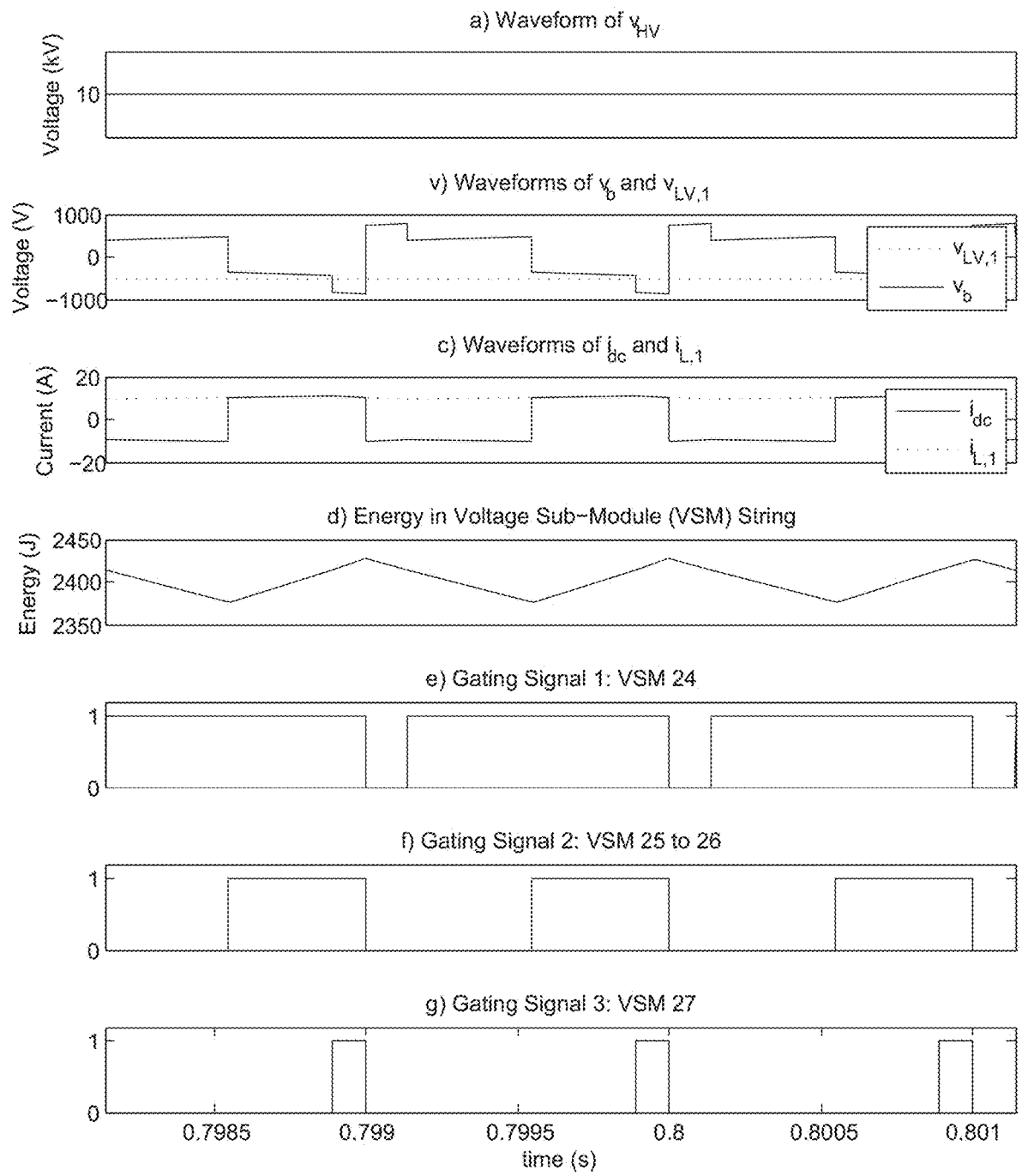
FIG. 54 presents the simulation results for Case 11. This is a steady-state operating case. This is a simulation of the topology of FIG. 38. In Case 11, 5 kW is delivered to the 10 kV higher-voltage DC side from the 500 V lower-voltage DC network.
Figure 55:
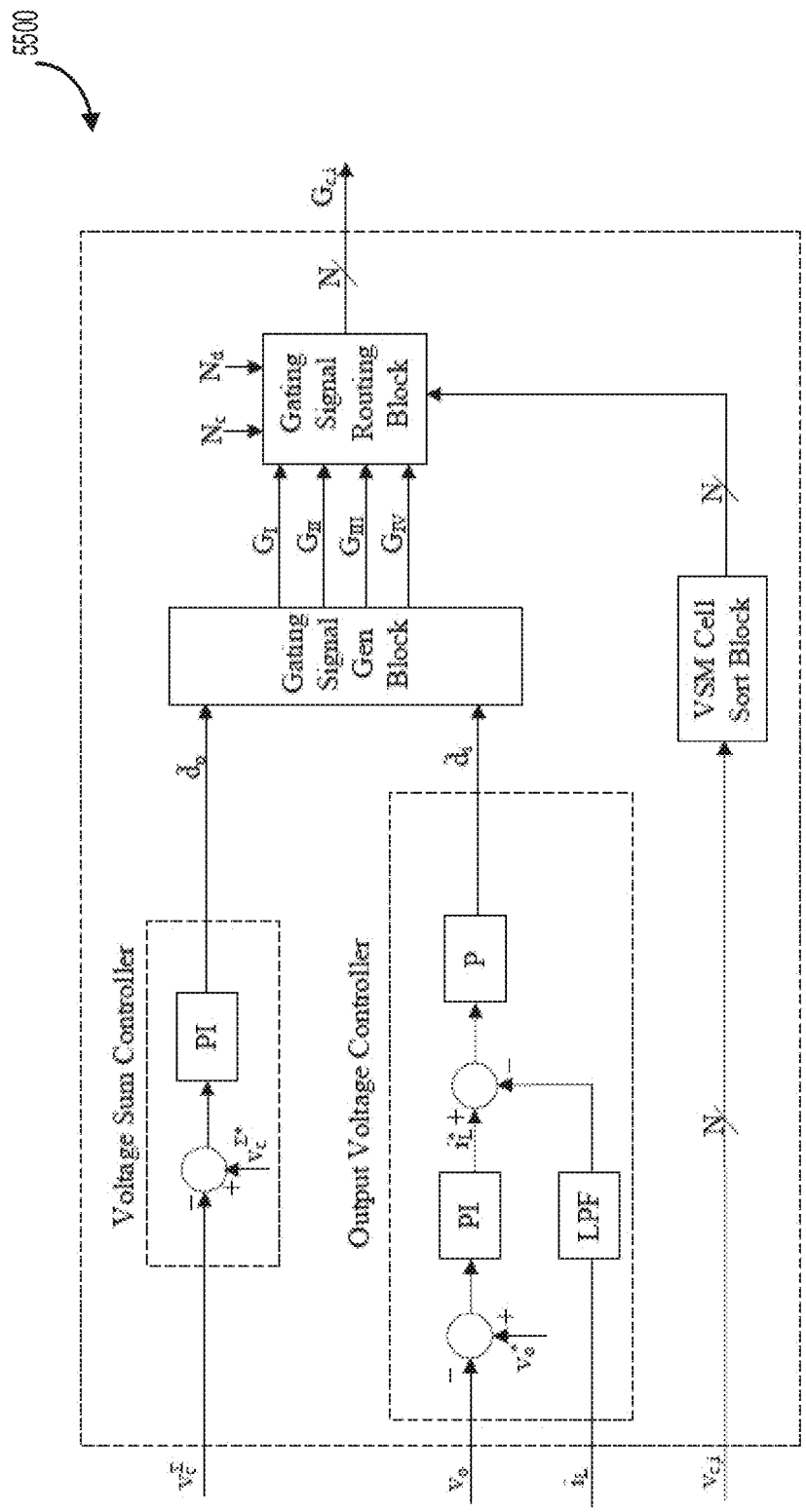
FIG. 55 presents an example controller design for an alternate embodiment of the converter circuit. This is for the topology of FIG. 38.
Figure 56:
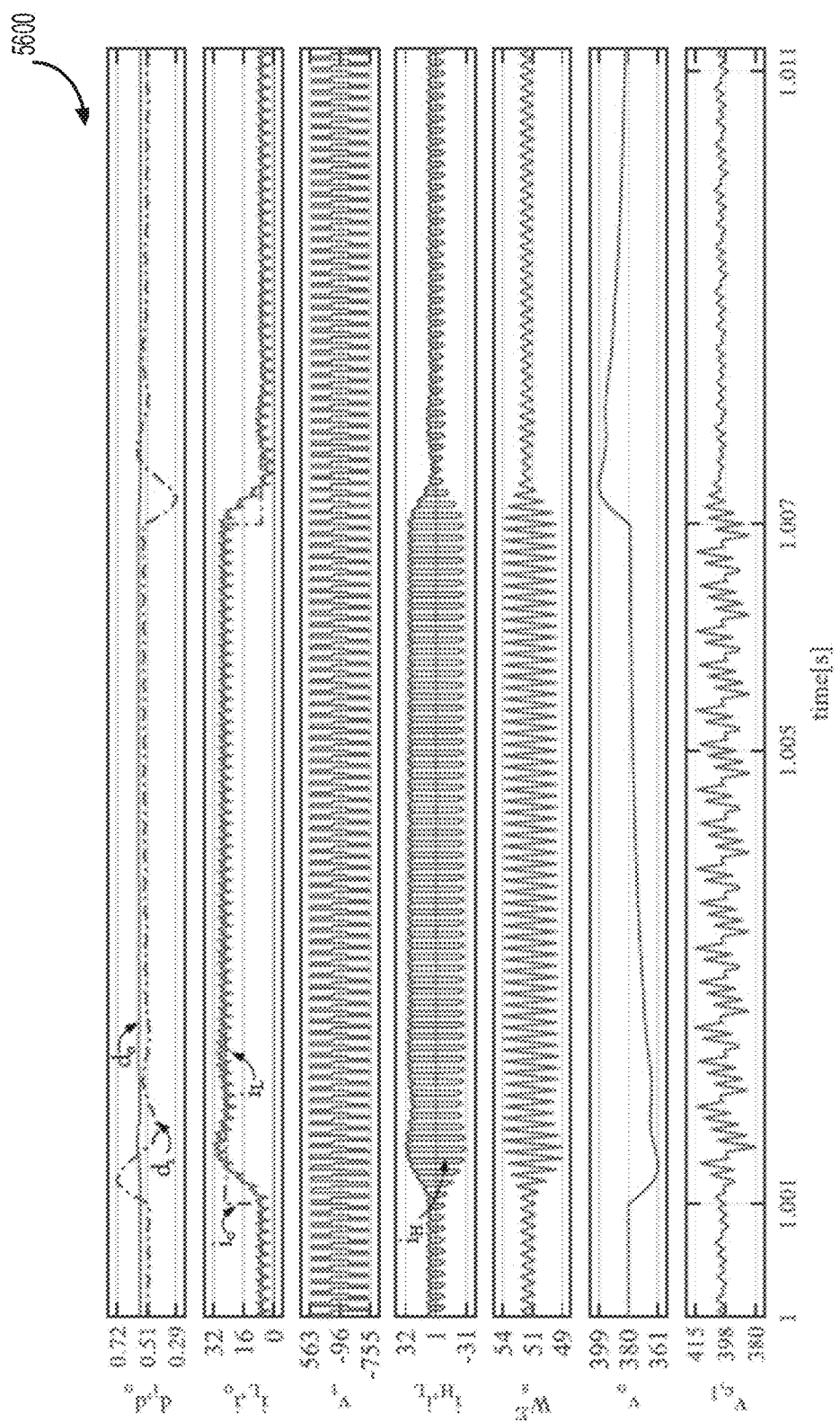
FIG. 56 presents transient simulation results for an alternate embodiment of the converter circuit. This is for the topology of FIG. 38.
Figure 57:
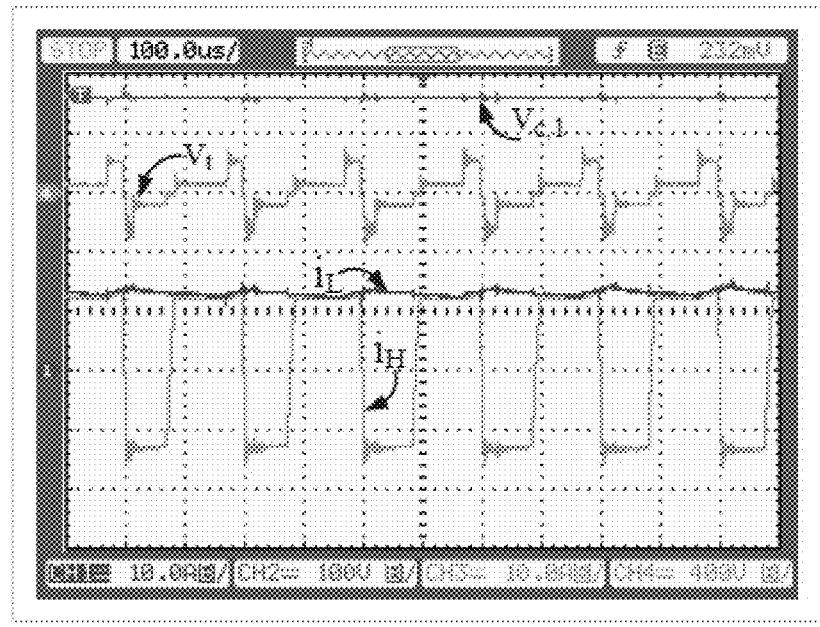
FIG. 57 presents steady-state experimental results for an alternate embodiment of the converter circuit. This is for the topology of FIG. 38.
Figure 57:
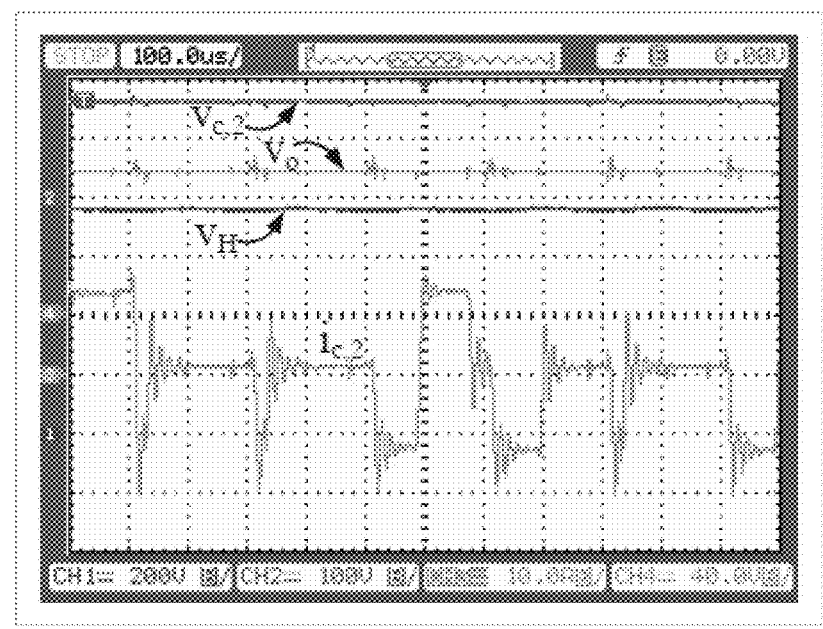

FIG. 54 presents the results for Case 11 which features one CSM operating as a generator. The lower voltage network in this case is supplying 5 kW of power to the higher-voltage DC side which is at 10 kV. This supply of power from the lower-voltage DC side to the higher-voltage DC-side can be inferred as the lower-voltage bus voltage, $v_B$, is out-of-phase with the main loop current, $i_{dC}$. In the case it is shown that the energy in the upper VSM stack=2400 J implying that energy balance in the VSM stack is achieved. The gating signals for voltage sub-modules 24 to 27 are provided.

In some embodiments with two inductors in the CSM. The two CSM inductors transfer power to or from the lower-voltage DC network for part, or all of the charge period and part or all of the discharge period.

In the embodiments with a single inductor in the CSM. The CSM inductor transfers power to or from the lower-voltage DC network for part, or all of the charge period and part or all of the discharge period.

The states of the switches within the current source module are controlled by the converter circuit enabling the current into the series connection of one or multiple voltage source modules to be equal to the current in a CSM inductor for a fraction of each switching period and equal to the negative of the current in a CSM inductor for a fraction of each switching period. Where a fraction is expected to be greater than 1% of a switching period.

When the CSM employs passive switches such as diodes the states of the CSM switches are indirectly controlled by the voltage source sub-modules. This is an indirect control approach. Conversely, when the CSM employs active switches such as MOSFETS with series diodes, the states of the CSM switches are directly controlled by sending appropriate gating signals to the CSM switches.

Alternate Variant

In example embodiments, an aspect includes a power electronic circuit consisting of one or more cascaded strings. Each cascaded string featuring one or more strings of voltage source submodules and a current source submodule (CSM), electrically in series, for interconnecting a higher and a lower DC voltage network. In this disclosure, several embodiments of the converter circuit are described.

In selected CSM configurations, the CSM features a transformer which is directly connected in series with the VSMs. This is achieved by applying a voltage across the input terminals of the CSM with zero or near zero dc-voltage component. By directly integrating a transformer in series with the VSM string, a power conversion stage can be removed. This can be observed by comparing the circuit of FIG. 8 and the CSM presented in FIG. 69c. In this particular example, FIG. 69c has four fewer switches. While both embodiments feature galvanic isolation, the embodiment of FIG. 69c is of lower complexity and requires fewer components. The embodiments in which a transformer is directly connected in series with the VSM string, such as FIG. 69c, leverage a control protocol which ensures a voltage with a zero or near zero dc component is applied across the input terminals of the CSM.

By directly connecting the transformer in series with the VSM, there is one less power conversion stage and therefore the converter can achieve higher efficiencies. Additionally, the converter control is less complex since there are fewer switches to control. Additionally, some embodiments, can feature self-balancing of the VSM cell capacitors through a process of sequentially transitioning through a fixed sequence of switching states. This is highly advantageous as it enables the cell capacitor voltages to balance without measuring the cell capacitor voltages, or requiring a sort algorithm to be implemented. This can reduce the cost because there is potentially no cell capacitor voltage sensors required in such embodiments. A variant embodiment of the converter circuit is provided in FIG. 59. Other embodiments of the converter circuit are provided in FIG. 60 to FIG. 69.

A collection of one or more cascaded voltage source submodules is termed a VSM string in this disclosure 5908. A current source submodule is termed a CSM this disclosure 5912. The two or more voltage source submodules 5910 are distributed to one or more VSM strings. The VSM string has two terminals termed the positive DC terminal and the negative DC terminal. The CSM has four or more terminals. At least two of the four or more terminals are referred to as AC-side terminals and at least two of the four or more terminals are referred to as the DC-side terminals.

In some embodiments of the converter circuit, a first terminal of a VSM string is electrically bonded to a terminal of the higher voltage DC network 5902 and a second terminal of a VSM string is electrically bonded to a terminal of the CSM.

In some embodiments of the converter circuit the current source submodule features a transformer and in other embodiments the CSM does not feature a transformer. In some embodiments of the CSM which feature a transformer, the higher voltage network and the lower voltage network are isolated. Some embodiments of the CSMs are provided in FIG. 68 to FIG. 70. A variant embodiment of the converter circuit is of a CSM of full bridge type featuring at least one inductor, a transformer and four switches. Some embodiments of the converter circuit featuring this CSM type are provided in FIG. 66 and FIG. 67. In some of these embodiments the transformer is connected in alternate ways to the cascaded string of VSMs and may include additional windings in some embodiments of the converter circuit.

In embodiments with a transformer, the primary side winding or windings, are electrically in series with the VSMs. The lower voltage DC network is connected to the secondary winding or windings of the transformer. The primary side winding or windings are electrically isolated from the secondary winding or windings of the transformer. Since the lower voltage DC network is coupled to the secondary winding or windings of the transformer, and the higher voltage dc network is coupled to the primary winding or windings of the transformer, the higher and lower voltage DC network are isolated from each other.

The higher voltage network can be of bipolar type, unipolar type in some embodiments of the converter circuit. Other higher voltage network types are also possible. In some embodiments of the converter circuit the higher voltage DC network has two terminals 5902. In some embodiments of the converter circuit the higher voltage DC network has three terminals. The voltage of a first with respect to a second terminal is positive and the voltage of the second terminal with respect to a third terminal is positive in some embodiments of the converter circuit.

In some embodiments of the converter circuit, the lower DC voltage network has a bipolar voltage. In other embodiments of the converter circuit, the lower DC voltage network is a unipolar voltage. Other configurations of the lower voltage DC network are also possible in some embodiments of the converter circuit. The lower DC voltage network has two terminals in some embodiments and three terminals in other embodiments of the converter circuit. Examples of the lower voltage DC network include a capacitor, supercapacitor, battery or PV array, power converter, DC distribution grid, DC household, auxiliary power converter for an electric train, electric vehicle.

In some embodiments of the converter circuit, each of the cascaded string of submodules is electrically bonded to the higher voltage network. In other embodiments of the converter circuit, each of the cascaded string of submodules is coupled to the higher voltage network through an input filter.

A variant embodiment of the converter circuit is configured to deliver bidirectional power from the higher voltage network to the lower voltage network. In this document, when power is delivered from the higher voltage network to the lower voltage network this is referred to as forward power transfer mode. Conversely, when power is delivered from the lower voltage network to the higher voltage network this is referred to as reverse power transfer mode. If the embodiment of the converter circuit is configured for bidirectional power transfer it features both a forward power transfer mode and a reverse power transfer mode.

In other embodiments of the converter circuit, the power electronic circuit is configured only to deliver power from the lower voltage network to the higher voltage network. In other embodiments of the converter circuit, the power electronic circuit is configured only to deliver power from the higher voltage network to the lower voltage network. In some embodiments of the converter circuit in which the power electronic circuit is configured for forward power transfer mode, the CSM switches can be implemented with at least single quadrant switches like diodes. However, in other embodiments of the converter circuit, the power electronic circuit is configured for both forward and reverse power transfer mode. This is the bidirectional implementation of the power electronic circuit. In this case, the CSM switches are implemented with at least two quadrant switches in some embodiments of the converter circuit, such as MOSFETS.

VSM Structure

In a variant embodiment of the converter circuit, there are at least two VSMs. There are at least two VSMs per VSM string in some variant embodiments of the converter circuit.

In a variant embodiment of the converter circuit the voltage source submodules of half-bridge type, consisting of two switches and a DC voltage source. This variant embodiment of the converter circuit is shown in FIG. 71a. In this half-bridge type of submodule, the first terminal of the first switch is electrically bonded to the positive terminal of the DC voltage source in some embodiments. The second terminal of the first switch is electrically bonded to the first terminal of the second switch, forming the midpoint of the VSM. The second terminal of the second switch is electrically bonded to the negative terminal of the DC voltage source. The voltage source submodule consists of two terminals. The voltage across these two terminals is termed the output voltage of the VSM.

In one embodiment of the converter circuit, the first terminal is electrically bonded to the midpoint of the VSM and the second terminal is electrically bonded to the negative terminal of the DC voltage source. In this embodiment, when the first switch of the VSM is conducting, the output voltage is equal to the DC voltage source. When the second switch of the VSM is conducting, the DC voltage source is bypassed and the output voltage is equal to 0 V.

In another embodiment of the converter circuit, the first terminal is electrically bonded to positive terminal of the DC voltage source and the second terminal is electrically bonded to the midpoint of the VSM. In this embodiment, when the second switch of the VSM is conducting, the output voltage is equal to the DC voltage source. When the first switch of the VSM is conducting, the DC voltage source is bypassed and the output voltage is equal to 0 V.

A VSM cell is said to be inserted when the output voltage is equal to the DC voltage source. A VSM cell is said to be bypassed when the output voltage is equal to 0 V.

Other embodiments of the VSMs are also possible such a VSM of full-bridge type. A VSM of full-bridge type consists of four switches and a DC voltage source. With the full-bridge type submodule, the output voltage can take on a i) positive voltage value equal to the DC voltage source, a ii) negative voltage equal to the negative of the DC voltage source and iii) a zero voltage value.

Each of the VSMs are configured to insert a voltage that opposes the voltage of the higher voltage network. In this way, by inserting additional VSMs, the voltage across the AC-side terminals of the CSM is reduced than if the full higher voltage DC network voltage were to be applied across the AC terminals of the CSM. Therefore, if the VSMs can output both positive and negative voltages it is possible for the higher voltage network to feature voltages of alternating positive and negative polarities.

In a VSM string, the VSMss are electrically bonded to adjacent VSMs 7100. For example, the first VSMs of the VSM string is electrically bonded to the second VSMs, the second VSMs is electrically bonded to the first and to the third VSMs and the last VSMs is electrically bonded to the second to last VSMs.

When the higher voltage DC network is of a unipolar variant whereby one of the terminals is grounded or near ground potential, the variant embodiment is applicable in some embodiments of the converter circuit 5900. If the terminal that is grounded or near ground potential is the second terminal of the higher voltage DC network, then the VSM string is electrically bonded to the first terminal of the higher voltage DC network. If instead the terminal that is grounded or near ground potential is the first terminal of the higher voltage DC network, then the VSM string is electrically bonded to the second terminal of the higher voltage DC network. This is referred to as a unipolar power electronic circuit.

When the higher voltage DC network is of a bipolar variant, a variant embodiment that can be employed are embodiments that employ two VSM strings that are series connected such as in the embodiment of 6100. The first VSM string is electrically bonded to a first CSM terminal and the second VSM string is electrically bonded to a second CSM terminal. This is referred to as the bipolar power electronic circuit.

CSM

In a variant embodiment of the converter circuit, the CSMs consist of a transformer, at least one inductor and two switches. Across the input terminals of the CSM the voltage features no or a very small DC component in variant embodiments. Across the fv terminals of the CSM the voltage is primarily DC.

In some embodiments, the output voltage can be of a positive polarity. In other embodiments, this output voltage can be of a negative polarity.

In some embodiments of the converter circuit, in which only forward power transfer mode is required, the switches of the CSM can be implemented with single quadrant switches such as diodes. This is shown in FIG. 70a and FIG. 70b.

In some embodiments of the converter circuit, in which bidirectional power transfer mode is required or if additional control flexibility is required or if lower losses are required, the switches of the CSM can be implemented with active switches. An example switch implementation is a MOSFET. This is illustrated in FIG. 70c and FIG. 70d.

In some embodiments of the converter circuit, the CSM is of an isolated variant. In some embodiments of the converter circuit, the isolated CSM variant consists of at least one transformer, two switches and one inductor. Example embodiments of the CSM of isolated type are provided in FIG. 68 and FIG. 69.

In some embodiments of the converter circuit, snubber circuits may be employed in the CSM stage to reduce the stresses on the submodule switches.

The CSM transformer consists of at least two transformer windings in some embodiments of the converter circuit. A first transformer winding is coupled to a VSM string of the cascaded string. A transformer winding that is coupled to a VSM string referred to as a primary winding. A second transformer winding is coupled to the lower voltage DC network. The transformer winding that is coupled to the lower voltage network is referred to as a secondary winding.

At least one of the primary windings of the transformer carries a DC current. In some embodiments of the converter circuit, this DC current is equal to the DC current into the higher voltage network. In other embodiments of the converter circuit, this DC current is not equal to the DC current into the higher voltage network.

In the freewheeling mode, in effect a short circuit appears across the secondary side of the transformer and therefore it is only the leakage or stray inductance of the loop that contributes to the commutation or current loop formed during the freewheeling mode in variant embodiments.

The CSM stage can be of many conventional current source types including but not limited to forward converter, full-bridge converter, current fed push-pull converter.

Operating Principles

In this section, the operating principles of the power electronic circuit are described with reference to the variant embodiment of the converter circuit of FIG. 59 with the specific implementation of FIG. 72. However, the operating principles also apply to other embodiments of the converter circuit.

Note, described in this section is only one possible way to operate the power electronic circuit. It provides an example of one control implementation.

Description of the Charge and Discharge Operating Modes

There are two main operating modes of the converter termed the charge mode and discharge mode. In this document the operating mode of the converter is used interchangeably with CSM state. These are graphically illustrated in FIG. 73a and FIG. 73b for one embodiment of the converter circuit. The paths of the circuit currents have been indicated by dashed lines. Representative operating waveforms are provided FIG. 74 and FIG. 78. The charge mode occurs from t=0 to $T_s/2$ and the discharge mode from $t=T_s/2$ to $T_s$ in the representative waveforms of FIG. 78. Therefore, in one approach of operating some embodiments of the converter circuit, the charge and discharge modes each have a total duration of $T_s/2$; where, $T_s$ represents the fundamental AC period. In this document $T_s$ and $T_{ac}$ are used interchangeably.

Since the switches of the CSM are implemented with passive diodes in FIG. 72, the operating mode of the converter is determined by the polarity of the voltage applied across the AC terminals of the CSM, denoted $v_t$. In charge mode $v_t>0$ which causes diode $D_1$ to be forward biased and diode $D_2$ to be reverse biased. In discharge mode $v_t<0$ which causes $D_1$ to be reverse biased and $D_2$ to be forward biased. The voltage $v_t$, is given mathematically by the following expression, $$v_t(t)=V_H-v_s \quad (87)$$

where, $v_s$ represents the net output voltage of the VSM string.

As can be observed in FIG. 78, the net VSM string voltage is controlled to be a 3-level voltage waveform. If it is assumed that the cell capacitor voltages are approximately balanced, it is convenient to expand out (87) as follows, $$v_t(t)=V_H-n(t)v_c(t) \quad (88)$$

Where, n represents the total number of inserted cells. Referring to FIG. 71a, VSM cell 1 is inserted if switch $S_{U,1}$ is on (or a conducting state) and $S_{L,1}$ is off (or in a non conducting state). Conversely, VSM cell 1 is bypassed if $S_{U,1}$ is off and $S_{L,1}$ is on. The term $v_c$ represents a cell capacitor voltage and is calculated by the following expression, $$v_c = \frac{1}{N}\sum_{i=1}^{N} v_{ci} \quad (89)$$

where, N represents the total number of VSM cells; and $v_{ci}$ corresponds to the cell capacitor voltage of VSM cell i, where $i \in [1, N]$.

Inserting a sufficient number of VSM cells such that $n(t)v_c(t)>V_H$, will cause $v_t$ to be a negative voltage. Conversely, bypassing a sufficient number of VSMs such that $n(t)v_c(t)<V_H$, will result in $v_t$ being a positive voltage. Therefore, positive and negative $v_t$ values are achieved by varying the number of inserted cells.

The bottom subplot of FIG. 78, is the total instantaneous energy in the VSM string, denoted $W_c^\Sigma$, which is calculated as follows, $$W_c^\Sigma = \frac{C}{2}\sum_{i=1}^{N} v_{c,i}^2 \tag{90}$$

Where, C is the capacitance of a VSM cell capacitor.

In charge mode the string energy increases and in discharge mode, the string energy decreases. The total energy of the VSM string is restored after each switching period.

Constructing the Net VSM String Voltage 3-Level Waveform and Output Voltage Regulation Principle It is only through switching action of the VSMs that the control objectives of the converter are achieved. In some control implementations, the objectives are to regulate the output voltage and to balance the energy internal to the converter. This section describes the construction of the 3-level voltage waveform of $v_s$ as well as the output voltage regulation.

The 3 voltage levels of $v_s$ are $(B-K)v_c$, $Bv_c$ and $(B+K)v_c$ and correspond to a total of B−K, B and B+K inserted VSM cells, respectively. The integer variables B and K each represent a number of inserted VSM cells. The relative duration of the B−K and the B+K voltage levels is equal to D. Where, D represents a duty ratio term and is valid in the range $0 \leq D \leq 0.5$. The voltage waveform of $v_s$ is symmetric about the voltage level $Bv_c$.

The number of cells, B, corresponds to the average number of inserted VSM cells in a switching period. The number of cells, K, corresponds to the total number of VSM cells that are switched in the charge and discharge operating modes. As an example, in FIG. 78, B=3 and K=1. Therefore, the average number of inserted VSM cells is 3 and there is 1 VSM cell inserted and bypassed in each operating mode. The total number of switching operations per switching period is equal to 2K.

The number of cells B is selected by the user. The selected value defines the average cell capacitor voltage, $V_c$. An expression relating $V_c$ and B is obtained by applying volt-second balance to inductor $L_1$. The result is the following, $$V_c = \frac{V_H}{B} \tag{91}$$

where, B can be selected based such that the maximum voltage rating of the VSM switches that is selected for a particular implementation is not exceeded.

The number of cells, K, can be preselected by the user in this implementation of the control. Therefore, it is the duty ratio term, D, that is variable and will change during operation. The conversion ratio for the converter is the following, $$\frac{V_o}{V_H} = \frac{D}{N-B} \tag{92}$$

Since D is adjustable, any non-integer output voltage reference in the range $$\left[0, \frac{0.5}{N-B}\right]$$

can be achieved provided there are enough VSM cells in some embodiments of the converter circuit. While this control was implemented to regulate a desired output voltage it is also possible for the control to be implemented to regulate a desired output current. This may be needed in applications such as for fuel cells or batteries or other applications.

Energy Balance of VSM String

In this section, the modulation approach for the VSM string is presented. For the proposed topology, a state machine modulation approach is employed. The proposed state machine-based approach ensures that self-balancing of the CS-MMC cell capacitors is achieved and that the average cell capacitor voltage is $V_c = V_H/B$.

In FIG. 79 a representative set of modulation waveforms are provided for 4 switching periods. To generate the 3-level net VSM string voltage waveform of $v_s$, the total number of inserted cells, n(t) is varied over a switching period. A representative plot of n(t) is provided in FIG. 79. To vary n(t) in this way, 3 unique gating signals are generated which are labelled as $g_1$, $g_2$ and $g_3$ in FIG. 79 and mathematically given by the following, $$g_1 = 1 \tag{93a}$$

$$g_2 = \begin{cases} 0, \text{ otherwise} \\ 1, 0.5T_s \leq t \leq (0.5+D_i)T_s \end{cases} \tag{93b}$$

$$g_3 = \begin{cases} 0, \text{ otherwise} \\ 1, t \geq D_i T_s \end{cases} \tag{93c}$$

These expressions are valid $\forall t \in [0, T_s]$.

In each switching period, gating signal $g_1$ is distributed to a total of B−K VSM cells, $g_2$ to K VSM cells and $g_3$ to K VSM cells. By distributing the gating signals in this way, the reference waveform for $v_s$ is realized.

TABLE 6

Distribution of the Gating Signals based on State of Machine

| Level | VSM 1 | VSM 2 | VSM 3 | VSM 4 |
|---|---|---|---|---|
| 1 | $g_2$ | $g_3$ | $g_1$ | $g_1$ |
| 2 | $g_1$ | $g_2$ | $g_3$ | $g_1$ |
| 3 | $g_1$ | $g_1$ | $g_2$ | $g_3$ |
| 4 | $g_3$ | $g_1$ | $g_1$ | $g_2$ |

Self-balancing of the individual VSMs is achieved by rotating the gating signals once per switching period. Each rotation corresponds to the next state of the machine. By rotating the gating signals, over N switching periods each VSM cell will see an identical distribution of gating signals. More specifically, over N switching cycles, $g_1$ will have been sent to each VSM B−K times, and $g_2$ and $g_3$ will each have been sent K times to each VSM.

For illustrative purposes, take as an example a converter featuring 4 VSMS, where B=3 and K=1. Table 6 provides the full distribution of the gating signals for each level of the state machine. Note, level of the state machine is rotated after each fundamental AC period in some embodiments of the converter circuit. It is possible to rotate more frequently or less frequently. The impact of changing the rotation frequency is switching loss and cell capacitor voltage ripple in some embodiments.

Proposed Controller

One example of a controller implementation is provided in FIG. 75. The output voltage is regulated to the reference $v_o^*$ by varying, the duty cycle d, which represents a time-varying duty ratio term. The controller features a fast inner and a slower outer control loop.

The output of the controller is a duty ratio, d. From this duty ratio, the gating signals for the VSMs are generated. The distribution of the 3 gating signals to the N VSMs is fully specified by K and the level of the state machine.

After each fundamental AC period, B–K $g_1$ gating signals, K $g_2$ gating signals and K $g_3$ gating signals are distributed to the N VSM cells based on the level of the state machine.

As can be observed, the cell capacitor voltages and the inductor $L_1$ current are not measured in the proposed controller. It is however possible to measure these parameters and in some embodiments of the converter circuit it may be preferable to incorporate these parameters into the control.

Note, when the CSM is implemented with active switches, in some embodiments, the gating of the switches of the CSM are coordinated with the positive and negative voltage pulses applied to the input terminals of the CSM. By synchronizing the two it is possible to achieve forward and reverse power transfer in some embodiments of the converter circuit.

Frequency Multiplicative Property

In some embodiments of the converter circuit there is as few as two cells being switched in a given fundamental AC period. To switch 2 VSMs there is a total of 4 turn-on and 4 turn-off switching operations per fundamental AC period in some embodiments of the converter circuit. For instance, when the VSMs are implemented as half-bridge cells. If there is a total of N VSMs then there is a total of 2N switches in the VSMs. Consequently, if the switching frequency of a VSM switch is fsw then the effective AC frequency is fsw*N/2 in variant embodiments. Therefore, a frequency multiplicative effect occurs whereby the effective AC frequency is greater than the switching frequency of the VSM switches. This is advantageous as it enables higher effective AC frequencies to be achieved by using additional VSM cells. This represents another degree of design freedom. It also enables higher effective AC frequencies to be employed as the switching losses will be less than other topologies in which this frequency multiplicative effect is not a feature.

By way of example, if there are a total of 100 VSMs in a string. In some control implementations, it could be as few as 2 of the 100 VSMs that are switched each fundamental AC period. Therefore, in this fundamental ac period, if the VSMs are implemented with half-bridge cells (half-bridges feature a total of 2 switches), then there are a total of 4 switches out of 200 switches that are switched each fundamental AC period. Accordingly, it is only after 50 fundamental AC periods that all 200 switches will have been switched. Therefore, if the fundamental AC period has a frequency of 100 kHz then the actual switching frequency of each VSM switch is only 2 kHz. This is advantageous as the switching losses can be significantly reduced, up to a factor of 50 times in this particular example, since the switching losses are generally proportional to frequency.

This frequency multiplicative effect is demonstrated in the experimental results of FIG. 83 for instance. To generate the $v_{t1}$ waveform in FIG. 83, there are a total of 4 VSM switching operations per fundamental AC period (there are 2 VSM switching operations for each VSM string). For the experimental results of FIG. 83, the effective ac frequency is 50 kHz (therefore the fundamental AC period $T_{ac}$=20 μs). The actual switching frequency of each VSM switch is therefore 33.3 kHz in this particular example.

DC Flux Cancellation Property

In some embodiments of the converter circuit in which the CSM features a transformer, there will be DC current flowing through the primary winding/s of the transformer if the higher voltage DC network represents a DC voltage source. This DC current is required for this converter to work in some embodiments. Without this DC current, no power could be extracted from the higher voltage DC network. In some embodiments, of the converter circuit, this DC current flows causes a DC flux in the CSM transformer. This is not desirable as a larger transformer is required to manage the increased magnetic flux density. In other embodiments of the converter circuit this DC flux in the CSM transformer is cancelled.

The DC flux cancellation in some embodiments of the converter circuit requires at least two VSM strings. Coupled to each VSM string is a separate primary winding of the CSM transformer in some embodiments. It is also possible to use a split winding with an accessible neutral in some embodiments. For instance, in FIG. 66b, there are two primary transformer windings. The first primary winding is coupled to VSM string 1 and the second primary winding is coupled to VSM string 2. The neutral of both primary windings are electrically bonded to the neutral of the input filter capacitors. In this configuration the input filter capacitors act as DC blocking capacitors and therefore the DC current into primary winding 1 must be equal to the DC current into primary winding 2. If the number of turns on the first primary winding is equal to the number of turns on the secondary winding, and the two windings are wound in opposing directions around the transformer core, the DC flux component in the transformer will cancel out in some embodiments while the AC flux component will add.

FIG. 67a presents another embodiment of the converter circuit in which DC flux cancellation is also possible in the transformer core. In this embodiment of the converter circuit, there is no DC blocking effect due to the input filter capacitors. Instead, the DC current flowing into VSM string 1 through control action can be made to be equal or nearly equal to the DC current flowing through VSM string 2. If the DC component of the string currents are identical, the number of turns are equal and the two windings are wound in opposing directions around the transformer core, the DC flux component will also cancel out.

The principle of DC flux cancellation is similar to a conventional common mode choke employed in DC applications. In common mode choke, the DC current in the two windings is equal but the DC current flows into the dot of one transformer winding and out of the dot of the other transformer winding. Consequently, the DC current passes through the transformer.

In some embodiments, the two primary windings are connected in common mode configuration. In common mode configuration, the DC current component passes through the transformer. A common mode configuration provides low or no impedance to common signals and provides high impedance to differential signals. Therefore in some embodiments of the converter circuit, the configuration of the primary windings of the transformer is such that the they represent a high impedance at the switching frequency of the converter and a low impedance at DC.

In some embodiments of the converter circuit, the net output voltage of the VSM strings is controlled such that the voltage across primary winding 1 of the transformer is equal to the negative of the voltage across primary winding 2. This enables the two primary windings to be wound around in opposing directions around the transformer core. This enables the string current to be shared equally between the two VSM strings in some embodiments of the converter circuit. In some embodiments of the converter circuit, the duty cycle corresponding to the first and the second VSM string is made to be different to regulate the difference between the input filter capacitor voltages. In some embodiments of the converter circuit, the duty cycle corresponding to the first and the second VSM string is made to be different to regulate the difference between the dc current components in the first VSM string and in the second VSM string. While we discuss two VSM strings here it is also possible to achieve flux cancellation in some embodiments if there more than two VSM strings using a similar approach.

Current Polarity Reversal Property—Changing Current Direction

Some embodiments of the CSM have at least two switches. The state of the CSM is defined by which of the CSM switches are in conducting states. For instance, in a first CSM state a first CSM switch is conducting and a second CSM switch is not conducting. In a second CSM state, the first CSM switch is not conducting and the second CSM switch is conducting. In some embodiments of the converter circuit, the polarity of the string current will be opposite in the first and second CSM states. This can be observed in FIG. 73. FIG. 73 presents three CSM states for one embodiment of the converter circuit. In FIG. 73a, the current into the VSM string is positive and CSM switch $D_1$ is conducting and CSM switch $D_2$ is not conducting. In FIG. 73b, the current into the VSM string is negative and CSM switch $D_1$ is not conducting and CSM switch $D_1$ is conducting.

It is this ability to change the polarity of the string current simply by changing the state of the CSM that enables some embodiments of the converter circuit to transfer power between the higher voltage DC network to the lower voltage DC network while achieving voltage balance of the VSM cell capacitors.

This current reversal can be done nearly instantaneously due to the low inductance when commutating current between the CSM switches. The equivalent circuit during commutation for one embodiment of the converter circuit is provided in FIG. 73c. As can be observed, both CSM switches are conducting in this third CSM state. An additional inductance term has been included in FIG. 73c which represents the stray inductance of the loop. As can be observed, when commutating current, it is only this stray inductance of the loop that is opposing commutation. Since this stray inductance can be made small, it is possible to rapidly commutate current between the CSM switches in some embodiments of the converter circuit.

In some embodiments of the converter circuit, either power is delivered to the AC-side terminals of the CSM for a first portion of a switching period when the direction of the string current is positive and for a second portion of a switching period when the direction of the string current is negative, or power is delivered from the AC-side terminals of the CSM for a first portion of a switching period when the direction of the string current is positive and for a second portion of a switching period when the direction of the string current is negative.

In some embodiments of the converter circuit, through controller control action the state of the CSM can be changed. In a first CSM state, a first CSM switch conducts current and a second CSM switch does not conduct current. In a second CSM state, the first CSM switch is not conducting current and a second CSM switch is conducting current. The direction of current in the two or more VSMs is opposite in the first and second CSM state. For instance, the first CSM state could be charge mode of the converter and the second CSM state could correspond to the discharge mode of the converter.

Harmonic Current Cancellation

When there are two VSM strings connected in parallel in some embodiments of converter circuit it is possible to achieve attenuation of harmonics from entering into the higher voltage DC grid through a coordinated control of the two VSM strings. In some embodiments of the converter circuit, the net output voltage of the VSM strings is the same or similar but phase shifted by 0.5/Tac. This has the effect of achieving attenuation of the switching harmonics generated by the converter in some embodiments negating the need of an input filter in some embodiments.

Simulation and Experimental Results

In this section, simulation and experimental results are provided for variant embodiments of the converter circuit. A summary of the cases is provided in Table 7.

TABLE 7

Summary of Cases

| Case Number | Relevant Simulation and/or Experimental Results | Relevant Embodiment | Relevant CSM Variant | Higher Voltage DC Network Type | Lower Voltage DC Network Type | Power Transfer Mode | Isolation |
| --- | --- | --- | --- | --- | --- | --- | --- |
| 1 | FIG. 76, FIG. 77, FIG. 80 | FIG. 59 | FIG. 68d | Unipolar | Unipolar | Forward | No |
| 2 | FIG. 81 | FIG. 59 | FIG. 68d | Unipolar | Unipolar | Reverse | No |
| 3 | FIG. 82 | FIG. 59 | FIG. 68c | Unipolar | Bipolar | Forward | Yes |
| 4 | FIG. 83, FIG. 84 | FIG. 62b | FIG. 66b | Bipolar | Unipolar | Forward | Yes |

Case 1: Forward Power Transfer Mode

FIG. 80 provides relevant steady-state operating waveforms for one embodiment of the converter circuit. This case corresponds to a higher voltage DC network of unipolar type, a lower voltage DC network of unipolar type, forward power transfer mode and is non-isolated. The relevant embodiment of the converter circuit is FIG. 59 and the relevant CSM variant implementation is FIG. 68*d*.

As can be observed in the last subplot/s, the VSM cell capacitors are well balanced with voltage values of approximately 1200V. The output voltage, $v_o$, or equivalently the voltage of the lower output voltage network is also shown to be steady with a voltage value of 380V. The voltage of the higher voltage network is 3600V.

The string current is nearly square wave shape. The value of the string current is positive during one half of the period and negative for one half the period. The value of the string current is defined by the two inductor currents, $i_{L1}$ and $i_{L2}$ for a portion of each fundamental AC period.

Experimental results for this forward power transfer mode are provided in FIG. 76 and FIG. 77.

Case 2: Reverse Power Transfer Mode

FIG. 81 provides relevant operating waveforms for one embodiment the converter circuit operating in reverse power transfer mode. This case corresponds to a higher voltage DC network of unipolar type, a lower voltage DC network of unipolar type, reverse power transfer mode. The relevant embodiment of the converter circuit is FIG. 59 and the relevant CSM variant implementation is FIG. 68*d*.

As can be observed in the last subplot, the VSM cell capacitors are well balanced with voltage values of approximately 1000V. The output voltage, $v_o$, or equivalently the voltage of the lower output voltage network is also shown to be steady with a voltage value of 359V and the average current being delivered to the load is −21 A, implying that power is being delivered from the lower voltage network to the higher voltage network. The voltage of the higher voltage network is 5000V.

The string current is nearly square wave shape. The value of the string current is positive during one half of the period and negative for one half the period. The value of the string current is defined by the two inductor currents, $i_{L1}$ and $i_{L2}$ for a portion of each fundamental AC period.

Case 3: Bipolar Lower Voltage DC-Network

FIG. 82 provides relevant operating waveforms for another embodiment of the converter circuit. This case corresponds to a higher voltage DC network of unipolar type, a lower voltage DC network of bipolar type, forward power transfer mode and isolation. The relevant embodiment of the converter circuit is FIG. 59 and the relevant CSM variant implementation is FIG. 68*c*.

As can be observed in the last subplot, the VSM cell capacitors are well balanced with voltage values of approximately 1000V. The output voltage, $v_o$, or equivalently the voltage of the lower output voltage network is also shown to be steady with a voltage value of 380V. The voltage of the higher voltage network is 5000V.

The string current is nearly square wave shape. The value of the string current is positive during one half of the period and negative for one half the period. The value of the string current is positive when switch $S_1$ is on and switch $S_2$ is off. Conversely, the value of the string current is negative when switch $S_1$ is off and switch $S_2$ is on.

The subplot of $v_{o1}$, labelled in FIG. 5, represents the voltage across the first and second terminal of the lower voltage DC network in some embodiments of the converter circuit. As can be observed, the voltage of $v_{o1}$ is approximately ½ the voltage of $v_o$. Therefore, with this bipolar variant of the CSM, the lower voltage DC network voltage is $+/-v_o/2$ or $+/-190V$.

Case 4: Directly Integrated Transformer with DC Flux Cancellation

FIG. 83 and FIG. 84 provides experimental operating waveforms for the an embodiment of the converter circuit. The case corresponds to a higher voltage DC network of bipolar type, a lower voltage DC network of unipolar type, forward power transfer mode and is isolation with DC flux cancellation. The rated conditions are 750-37.5V with a load of 17.5 A. The relevant embodiment of the converter circuit is FIG. 62*b* and the relevant CSM variant implementation is FIG. 66*b*.

As can be observed in (ii) the VSM cell capacitors are well balanced with voltage values of approximately 180V. This demonstrates that this embodiments of this invention can achieve self-balancing since no cell capacitor voltages are measured in the control. The output voltage, $v_o$, or equivalently the voltage of the lower output voltage network is also shown to be steady with a voltage value of 37.5V.

The string current is nearly square wave shape and is nearly identical in the first and second VSM string. The value of the string current is positive during one half of the period and negative for one half the period.

For this experimental result, the input filter acts as a DC blocking capacitor and therefore the DC current into the first transformer primary winding is forced to be equal to the DC current into the second transformer primary winding. This can be observed in the string waveforms of $i_{s1}$ and $i_{s2}$. It is shown that the DC current components of both string currents is equal.

The orientation of the transformer primary windings is such that the two DC currents which must be equal due to the blocking capacitor are imposing opposing mmfs on the transformer magnetic circuit. As a result, the two DC mmfs cancel out and there is no DC flux in the transformer core. This is verified in this experimental result, because a small transformer is employed that would saturate had there been DC flux in the transformer core.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A converter circuit for transferring power between a higher-voltage DC network and a lower-voltage DC network; the converter circuit comprising:
   two or more voltage source modules (VSMs);
   a current source module (CSM) having one or more inductors, two or more switches, the two or more voltage source modules (VSMs), and the CSM connected as a series connected string, wherein the series connected string is coupled to the higher-voltage DC network; wherein at least two AC side terminals of the CSM are connected in series with the two or more VSMs, and two or three DC side terminals of the CSM are coupled to a lower-voltage network; and a controller that is configured to control one or more states of operation of one or more switches within the CSM or the two or more VSMs of the series connected string to change a direction of a current in the two or more VSMs such that a direction of power flow to the two or more VSMs is reversed during a switching period.

2. The converter circuit of claim 1, wherein the controller controls one or more switches of the two or more switches of the CSM or one or more switches of a VSM of the two or more VSMs of the series connected string such that the current in the two or more VSMs is equal to a current in an inductor of the one or more inductors of the CSM for a first portion of the switching period and equal to a negative of the current in the inductor of the one or more inductors of the CSM for a second portion of the switching period.

3. The converter circuit of 1, wherein:
power is delivered to the at least two AC-side terminals of the CSM for a first portion of the switching period when a direction of a current of the series connected string current is positive and for a second portion of the switching period when the direction of the current of the series connected string is negative; or
power is delivered from the at least two AC-side terminals of the CSM for a first portion of the switching period when a direction of a current of the series connected string current is positive and for a second portion of the switching period when the direction of the current of the series connected string is negative.

4. The converter circuit of claim 1, wherein the one or more states of operation of the one or more switches within the CSM can be changed between:
a first CSM state, defined by a first CSM switch conducting current and a second CSM switch precluding current conduction; and
a second CSM state, defined by the first CSM switch precluding current conduction and the second CSM switch is conducting current; and
wherein when the direction of the current in a VSM of the two or more VSMs is positive in the first CSM state, the direction of the current is negative in the second CSM state; and
wherein when the direction of the current in a VSM of the two or more VSMs is negative in the first CSM state, the direction of the current is positive in the second CSM state.

5. The converter circuit of claim 1, wherein the CSM is configured to shape a current into the series connected string through a control protocol provided by the controller to at least one of the one or more switches within the CSM or the two or more VSMs.

6. The converter circuit of claim 1, wherein in response to the controller controlling the one or more switches to change the direction of the current into the series connected string, a commutation or free-wheeling state first occurs where a loop is formed wherein the current in the series connected string is equal to a loop current such that the one or more inductors of the CSM do not limit changes in the current of the series connected string and an inductance in the loop includes a leakage inductance of the loop.

7. The converter circuit of claim 1, further comprising:
a filtering circuit including at least one capacitor across the series connected string;
wherein the filtering circuit is configured to divert a portion of an AC current component of the current in the two or more VSMs from entering the higher voltage DC network.

8. The converter circuit of claim 1, wherein the CSM is coupled to the lower-voltage DC network through an intermediary isolation stage, the intermediary isolation stage providing galvanic isolation between the lower-voltage DC network and the higher-voltage DC network.

9. The converter circuit of claim 1, wherein the two or more VSMs are paralleled such that a high-voltage (HV) loop current can be shared between multiple voltage source sub-module strings.

10. The converter circuit of claim 1, wherein the series connected string comprises four or more VSMs, and is configured with at least one VSM of the four or more VSMs connected to a first AC terminal of the CSM and at least one VSM of the four or more VSMs connected to a second AC terminal of the CSM.

11. The converter circuit of claim 1, wherein at least one of the two or more VSMs are configured to conduct bidirectional current and insert unipolar voltages.

12. The converter circuit of claim 1, wherein at least one of the two or more VSMs are configured to conduct bidirectional current and insert bipolar voltages.

13. The converter circuit of claim 1, wherein the CSM has two switches and two inductors and is configured such that both inductors can simultaneously either deliver current to or receive current from the lower-voltage DC network, yielding an amplified current to or from the lower-voltage DC network, respectively.

14. The converter circuit of claim 1, wherein the CSM has four switches and one inductor, wherein the CSM is configured such that the inductor either delivers current to or receives current from the lower-voltage DC network.

15. The converter circuit of claim 1, wherein the controller is configured to change the switching state of at least two VSMs of the two or more VSMs each fundamental AC period, in accordance with a logic state machine that sequentially switches the VSMs such that after an integer number of fundamental AC periods, each VSM capacitor has been inserted for an equal amount of time.

16. The converter circuit of claim 1, wherein the controller is configured to switch only a subset of the two or more VSMs every fundamental AC period.

17. The converter circuit of claim 1, further comprising:
a transformer within the CSM, the transformer having at least one primary winding and at least one secondary winding, the at least one primary winding electrically in series with the two or more VSMs, the at least one secondary winding coupled to the lower voltage DC network through a network of switches and inductive elements, and wherein the at least one primary and at least one secondary windings are isolated from each other.

18. The converter circuit of claim 17, wherein:
the transformer within the CSM has at least two primary windings, each primary winding connected as a series string with at least two or more VSMs; and
wherein the controller is configured to cause a DC component of a current through the at least two or more primary windings to sum to zero.

19. The converter circuit of claim 17, wherein the transformer has at least two primary windings, the converter circuit further comprising:
- an input filter with at least two capacitors connected in series;
- a mid-point of the at least two capacitors electrically bonded to the at least two primary windings of the CSM transformer;
- wherein, the at least two primary windings have an equal number of turns and are wound in opposing directions around a transformer core.

20. A method for transferring power between a higher-voltage DC network and a lower-voltage DC network; the method comprising:
- providing a converter circuit comprising:
- two or more voltage source modules (VSMs);
- a current source module (CSM) having one or more inductors, and having two or more switches, the two or more voltage source modules (VSMs) and the current source module (CSM) connected as a series connected string, the series connected string coupled to the higher-voltage DC network;
- two AC side terminals of the CSM connected in series with two or more VSMs;
- two or three DC side terminals of the CSM coupled to a lower-voltage network; and
- generating a control command to control one or more states of one or more switches within the CSM and the two or more VSMs such that a current into the series connected string is equal to a current in an inductor of the one or more inductors of the CSM for a first portion of each period and equal to a negative of the current in the inductor of the one or more inductors of the CSM for a second portion of each period.

21. The method of claim 20, wherein the CSM is configured to shape the current into the series connected string, through applying a control protocol provided by the controller to one or more switches of the one or more switches within the string modules.

22. The method of claim 20, wherein after a change of the direction of the current in the series connected string, a commutation or free-wheeling state occurs where a loop is formed;
- wherein the current in the series connected string is equal to a loop current and accordingly, there is no inductor of the CSM limiting a change in the current in the series connected string and an inductance in the loop is only a leakage inductance of the loop.

23. The method of claim 20, wherein a filtering circuit interfaces the higher-voltage DC network and the series connected string, reducing harmonic currents of the higher-voltage DC network; wherein the filtering circuit is configured to divert a portion of an AC current component of a current in the two or more VSMs from entering the higher voltage DC network.

24. The method of claim 20, wherein the CSM is coupled to the lower-voltage DC network through an intermediary isolation stage, the intermediary isolation stage providing galvanic isolation between the lower-voltage DC network and the higher-voltage DC network.

25. The method of claim 20, wherein the two or more VSMs are paralleled in multiple voltage source sub-module strings such that by paralleling the voltage source sub-module strings, a high-voltage (HV) loop current can be shared between the multiple voltage source sub-module strings.

26. The method of claim 20, wherein the series connected string comprises four or more VSMs, and is configured with at least one VSM of the four or more VSMs connected to a first AC terminal of the CSM and at least one VSM of the four or more VSMs connected to a second AC terminal of the CSM.

27. The method of claim 20, wherein at least one of the two or more voltage source modules are configured to conduct bidirectional current and insert unipolar voltages.

28. The method of claim 20, wherein at least one of the two or more voltage source modules are configured to conduct bidirectional current and insert bipolar voltages.

29. The method of claim 20, wherein the CSM has two switches and two inductors and is configured such that both inductors can simultaneously either deliver current to or receive current from the lower-voltage DC network, yielding an amplified current to or from the lower-voltage DC network, respectively.

30. The method of claim 20, wherein the CSM has four switches and an inductor, wherein the CSM is configured such that the inductor either delivers current to or receives current from the lower-voltage DC network.

31. A non-transitory machine readable media, storing machine interpretable instructions, which when executed, cause a processor to perform a method comprising:
- generating a control command to control one or more states of one or more switches within:
- two or more voltage source modules (VSMs);
- a current source module (CSM) having one or more inductors, and having two or more switches, the two or more voltage source modules (VSMs) and the current source module (CSM) connected as a series connected string, the series connected string coupled to a higher-voltage DC network;
- wherein two AC side terminals of the CSM are connected in series with two or more VSMs; and
- two or three DC side terminals of the CSM are coupled to a lower-voltage network; and
- wherein a current into the series connected string is equal to a current in one of the one or more inductors of the CSM for a first portion of each period and equal to a negative of the current in an inductor of the one or more inductors of the CSM for a second portion of each period.

32. The converter circuit of claim 1, wherein the controller is configured to maintain a DC voltage across the two or more VSMs that is equal to the DC voltage of the higher voltage DC network.

* * * * *